(12) United States Patent
Yang et al.

(10) Patent No.: US 11,597,078 B2
(45) Date of Patent: Mar. 7, 2023

(54) MACHINE LEARNING CONTROL OF OBJECT HANDOVERS

(71) Applicant: NVIDIA Corporation, Santa Clara, CA (US)

(72) Inventors: Wei Yang, Seattle, WA (US); Christopher Jason Paxton, Pittsburgh, PA (US); Yu-Wei Chao, Seattle, WA (US); Dieter Fox, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 268 days.

(21) Appl. No.: 16/941,339

(22) Filed: Jul. 28, 2020

(65) Prior Publication Data
US 2022/0032454 A1 Feb. 3, 2022

(51) Int. Cl.
 *G05B 15/00* (2006.01)
 *G05B 19/00* (2006.01)
 (Continued)

(52) U.S. Cl.
 CPC .............. *B25J 9/1612* (2013.01); *G06T 7/50* (2017.01); *G06V 20/30* (2022.01); *G06V 20/64* (2022.01);
 (Continued)

(58) Field of Classification Search
 CPC . B25J 9/1612; B25J 9/16; B25J 9/1697; B25J 9/163; G06T 7/50; G06T 2207/10028; G06T 2207/20081; G06T 2207/20084; G06T 7/73; G06V 20/30; G06V 20/64; G06V 40/107; G05B 2219/39271; G05B 2219/39487; G05B 2219/39543;
 (Continued)

(56) References Cited

U.S. PATENT DOCUMENTS

| 7,822,508 B2 * | 10/2010 | Sugiyama | B25J 9/1641 |
| | | | 318/568.12 |
| 9,321,176 B1 * | 4/2016 | Sun | B25J 9/1656 |

(Continued)

FOREIGN PATENT DOCUMENTS

| DE | 102014102943 A1 | 8/2015 |
| DE | 102014223167 A1 | 5/2016 |

(Continued)

OTHER PUBLICATIONS

Qi et al., "Pointnet++: Deep Hierarchical Feature Learning on Point Sets in a Metric Space," Jun. 7, 2017, 14 pages.

(Continued)

*Primary Examiner* — Harry Y Oh
(74) *Attorney, Agent, or Firm* — Davis Wright Tremaine LLP

(57) ABSTRACT

A robotic control system directs a robot to take an object from a human grasp by obtaining an image of a human hand holding an object, estimating the pose of the human hand and the object, and determining a grasp pose for the robot that will not interfere with the human hand. In at least one example, a depth camera is used to obtain a point cloud of the human hand holding the object. The point cloud is provided to a deep network that is trained to generate a grasp pose for a robotic gripper that can take the object from the human's hand without pinching or touching the human's fingers.

26 Claims, 55 Drawing Sheets

(51) Int. Cl.
B25J 9/16 (2006.01)
G06T 7/50 (2017.01)
G06V 20/30 (2022.01)
G06V 20/64 (2022.01)
G06V 40/10 (2022.01)

(52) U.S. Cl.
CPC .............. *G06V 40/107* (2022.01); *B25J 9/16* (2013.01); *B25J 9/1697* (2013.01); *G06T 2207/10028* (2013.01)

(58) Field of Classification Search
CPC ........... G05B 2219/39546; G05B 2219/40202; G05B 2219/40559; G05B 2219/40609; G05B 2219/40613; G06N 3/08; G06N 3/0454; G06N 5/041; G06N 20/00
See application file for complete search history.

(56) References Cited

U.S. PATENT DOCUMENTS

| | | | | |
|---|---|---|---|---|
| 9,687,983 | B1* | 6/2017 | Prats .................. | G06V 20/58 |
| 10,471,591 | B1* | 11/2019 | Hinkle ................ | B25J 9/1612 |
| 11,192,242 | B2* | 12/2021 | Onuma ................ | B25J 13/08 |
| 11,331,799 | B1* | 5/2022 | Shafer ................. | B25J 9/163 |
| 2007/0239315 | A1* | 10/2007 | Sato .................... | B25J 9/1612 700/245 |
| 2009/0096790 | A1* | 4/2009 | Wiedemann ....... | G06V 30/2504 345/427 |
| 2018/0186004 | A1* | 7/2018 | Park ................... | G06T 7/70 |
| 2018/0285684 | A1* | 10/2018 | Levinshtein ....... | B25J 9/163 |
| 2019/0035108 | A1* | 1/2019 | Inazumi ............. | G06T 7/73 |
| 2019/0087976 | A1* | 3/2019 | Sugahara ........... | G06T 7/75 |
| 2019/0291277 | A1* | 9/2019 | Oleynik ............. | B25J 9/1664 |
| 2020/0061811 | A1* | 2/2020 | Iqbal ................. | B25J 9/1612 |
| 2021/0138655 | A1* | 5/2021 | Mousavian ........ | B25J 9/1612 |
| 2021/0178591 | A1* | 6/2021 | Floyd-Jones ...... | B25J 9/1666 |

FOREIGN PATENT DOCUMENTS

| | | |
|---|---|---|
| DE | 102019122790 A1 | 2/2020 |
| DE | 112019001507 T5 | 12/2020 |
| EP | 2834723 B1 | 2/2015 |

OTHER PUBLICATIONS

Shi et al., "A Model of Distributional Handing Interaction for a Mobile Robot." Robotics: Science and Systems, 2013, 8 pages.

Shibata et al., "An Analysis of the Process of Handing Over an Object and its Application to Robot Motions," IEEE International Conference on Systems, Man, and Cybernetics, Computational Cybernetics and Simulation, vol. 1, 1997, 6 pages.

Sidiropoulos et al., "A Human Inspired Handover Policy using Gaussian Mixture Models and Haptic Cues," Autonomous Robots, 43(6): 2019, 16 pages.

Society of Automotive Engineers On-Road Automated Vehicle Standards Committee, "Taxonomy and Definitions for Terms Related to Driving Automation Systems for On-Road Motor Vehicles," Standard No. J3016-201609, Sep. 30, 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Unhelkar et al., "Comparative Performance of Human and Mobile Robotic Assistants in Collaborative Fetch-Anddeliver Tasks," IEEE, 2014, 8 pages.

Vogt et al., "One-Shot Learning of Human Robot Handovers with Triadic Interaction Meshes," Autonomous Robots, 42(5): 2018, 13 pages.

Wang et al., "Controlling Object Hand-Over in Human Robot Collaboration via Natural Wearable Sensing," IEEE Transactions on Human-Machine Systems, 49(1): 2018, 13 pages.

Xiang et al., "PoseCNN: A Convolutional Neural Network for 6D Object Pose Estimation in Cluttered Scenes," May 26, 2018, 10 pages.

Yang et al., "Human Grasp Classification for Reactive Human-to-Robot Handovers," Mar. 12, 2020, 8 pages.

Zhou et al., "Early Prediction for Physical Human Robot Collaboration in the Operating Room," Autonomous Robots, 42(5): Sep. 26, 2017, 16 pages.

Zimmermann et al., "FreiHAND: A Dataset for Markerless Capture of Hand Pose and Shape from Single RGB Images," ICCV, Oct. 2019, 10 pages.

Office Action for German Application No. 102021118885.7, dated Mar. 15, 2022, 9 pages.

Admoni et al., "Deliberate Delays During Robot-to-Human Handovers Improve Compliance with Gaze Communication," HRI, 2014, 8 pages.

Aleotti et al., "An Affordance Sensitive System for Robot to Human Object Handover," International Journal of Social Robotics, 6(4): 2014, 14 pages.

Aleotti et al., "Comfortable Robot to Human Object Hand-Over," IFFF International Symposium on Robot and Human Interactive Communication, 2012, 6 pages.

Ardón et al., "Towards Robust Grasps: Using the Environment Semantics for Robotic Object Affordances," Proceedings of the AAAI Fall Symposium on Reasoning and Learning in Real-World Systems for Long-Term Autonomy, 2018, 8 pages.

Bauer et al., "Human-Robot Collaboration: A Survey," International Journal of Humanoid Robotics, 5(1): Dec. 11, 2007, 20 pages.

Becchio et al., "Toward You: The Social Side of Actions," Current Directions in Psychological Science, 19(3): 2010, 6 pages.

Bestick et al., "Implicitly Assisting Human to Choose Good Grasps in Robot to Human Handovers," International Symposium on Experimental Robotics, Springer, 2016, 12 pages.

Borgsen et al., "Hand in Hand with Robots: Differences Between Experienced and Naive users in Human-Robot Handover Scenarios," International Conference on Social Robotics, 2017, 11 pages.

Cakmak et al., "Human Preferences for Robot-Human Hand-Over Configurations," IROS, IEEE, 2011, 8 pages.

Cakmak et al., "Using Spatial and Temporal Contrast for Fluent Robot-Human Handovers," HRI, 2011, 8 pages.

Chan et al., "An Affordance and Distance Minimization Based Method for Computing Object Orientations for Robot Human Handovers," International Journal of Social Robotics, 2019, 20 pages.

Chan et al., "Determining Proper Grasp Configurations for Handovers through Observation of Object Movement Patterns and Inter-Object Interactions During Usage," IEEE/RSJ International Conference on Intelligent Robots and Systems, 2014, 6 pages.

Chan et al., "Grip Forces and Load Forces in Handovers: Implications for Designing Human-Robot Handover Controllers," Robot Manipulation and Programming, Mar. 5-8, 2012, 8 pages.

Cini et al., "On the Choice of Grasp Type and Location when Handing Over an Object," Science Robotics, 4(27): 2019, 18 pages.

Colledanchise et al., "Behavior Trees in Robotics and AI: An Introduction," Jan. 15, 2018, 198 pages.

De Momi et al., "A Neural Network-Based Approach for Trajectory Planning in Robot-Human Handover Tasks," Frontiers in Robotics and AI, 3(34): 2016, 10 pages.

Dragan et al., "Legibility and Predictability of Robot Motion," HRI, 2013, 8 pages.

Edsinger et al., "Human-Robot Interaction for Cooperative Manipulation: Handing Objects to One Another," IEEE, 2007, 6 pages.

Feix et al., "The Grasp Taxonomy of Human Grasp Types," IEEE Transactions on Human-Machine Systems, 46(1): 2015, 12 pages.

Garrett et al., "Online Replanning in Belief Space for Partially Observable Task and Motion Problems," ICRA, Nov. 11, 2019, 8 pages.

Ge et al., "3D Hand Shape and Pose Estimation from a Single RGB Image," In Proc. CVPR, dated 2019, pp. 10833-10842.

(56) References Cited

OTHER PUBLICATIONS

Ge et al., "Point-to-Point Regression Pointnet for 3D Hand Pose Estimation," ECCV, 2018, 17 pages.
Grigore et al., "Joint Action Understanding Improves Robot-to-Human Object Handover," IEEE/RSJ International Conference on Intelligent Robots and Systems. IEEE, 2013, 8 pages.
Hampali et al., "HOnnotate: A Method for 3D Annotation of Hand and Objects Poses," CVPR, 2019, 11 pages.
Han et al., "The Effects of Proactive Release Behaviors During Human-Robot Handovers," IEEE, 2019, 9 pages.
Handa et al., "DexPilot: Vision Based Teleoperation of Dexterous Robotic Hand-Arm System," Oct. 14, 2019, 18 pages.
Hasson et al., "Learning Joint Reconstruction of Hands and Manipulated Objects," CVPR, , Apr. 11, 2019, pp. 11807-11816.
Huang et al., "Adaptive Coordination Strategies for Human-Robot Handovers," Robotics: Science and Systems, 2015, 10 pages.
Huber et al., "Human-Robot Interaction in Handing-Over Tasks," IEEE, 2008, 6 pages.
IEEE, "IEEE Standard 754-2008 (Revision of IEEE Standard 754-1985): IEEE Standard for Floating-Point Arithmetic," Aug. 29, 2008, 70 pages.
Iqbal et al. "Hand Pose Estimation via Latent 2.5D Heatmap Regression," In Proc. ECCV, 2018, pp. 125-143.
Kase et al., "Transferable Task Execution from Pixels through Deep Planning Domain Learning," ICRA, Mar. 8, 2020, 7 pages.
Kato et al., "The Where of Handovers by Humans: Effect of Partner Characteristics, Distance and Visual Feedback," 14(6): 2019, 14 pages.
Koene et al. "Relative Importance of Spatial and Temporal Precision for User Satisfaction in Human-Robot Object Handover Interactions," Third International Symposium on New Frontiers in Human-Robot Interaction, 2014, 7 pages.
Kshirsagar et al., "Specifying and Synthesizing Human-Robot Handovers," IEEE, 2019, 7 pages.
Kuffner et al., "RRT-Connect: An Efficient Approach to Single-Query Path Planning," ICRA, vol. 2, 2000, 7 pages.
Kupcsik et al., "Learning Dynamic Robot-Tohuman Object Handover from Human Feedback," Robotics Research, 2018, 16 pages.
Maeda et al., "Probabilistic Movement Primitives for Coordination of Multiple Human-Robot Collaborative Tasks," Autonomous Robots, 41(3): 2017, 20 pages.
Mainprice et al., "Sharing Effort in Planning Human-Robot Handover Tasks," IEEE, 2012, 7 pages.
Marturi et al., "Dynamic Grasp and Trajectory Planning for Moving Objects," Autonomous Robots, 43(5): 2019, 17 pages.
Microsoft, "Azure Kinect DK," retrieved from the Internet on Feb. 28, 2020, from https://docs.microsoft.com/en-us/azure/kinect-dk/, 2020, 2 pages.
Moon et al., "Meet Me Where I'm Gazing: How Shared Attention Gaze Affects Human-Robot Handover Timing," HRI, 2014, 8 pages.
Murali et al., "6-DOF Grasping for Target-Driven Object Manipulation in Clutter," ICRA, May 1, 2020, 7 pages.
Pan et al., "Automated Detection of Handovers using Kinematic Features," International Journal of Robotics Research, 36(5-7): 2017, 18 pages.
Parastegari et al., "Failure Recovery In Robot-Human Object Handover," IEEE Transactions on Robotics, 34(3): 2018, 14 pages.
Parastegari et al., "Modeling Human Reaching Phase in Human-Human Object Handover with Application in Robot-Human Handover," IEEE/RSJ International Conference on Intelligent Robots and Systems, 2017, 6 pages.
Paxton et al., "Costar: Instructing Collaborative Robots with Behavior Trees and Vision," ICRA, 2017, 8 pages.
Paxton et al., "Evaluating Methods for End-User Creation of Robot Task Plans," IEEE, Nov. 6, 2018, 8 pages.
Paxton et al., "Representing Robot Task Plans as Robust Logical-Dynamical Systems," Aug. 5, 2019, 9 pages.
Peternel et al., "Towards Ergonomic Control of Human-Robot Co-Manipulation and Handover," IEEE, 2017, 6 pages.

* cited by examiner

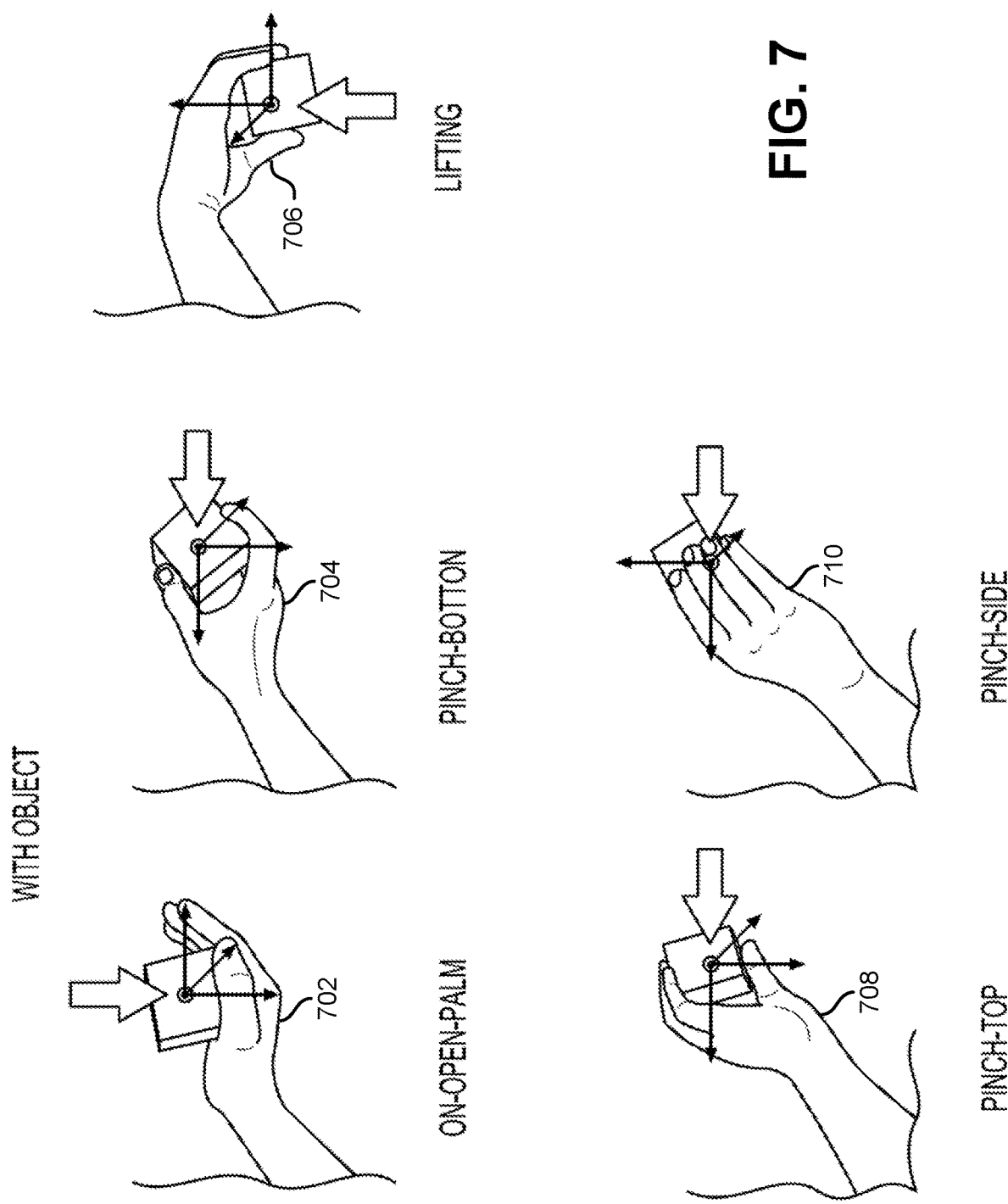

MACHINE LEARNING CONTROL OF OBJECT HANDOVERS

BACKGROUND

Robotic automation of tasks is an important developing field. Some tasks however, involve collaboration with human operators. Tasks such as personal care tasks, object handovers, or interface operations between robotic and manual tasks often involve interaction between robot and human being. One problem within the collaborative-task space is the exchange of objects between human operators and robots. As part of performing a task, exchanges may be made from robot to human and/or from human to robot. When taking an object from a human hand, the exchange can encounter difficulty if the robot selects a grasp that, while being able to reliably grip an object, interferes with the human hand. Failure can result in dropping the object and, in some cases, injuring the human operator. Therefore the development of reliable handover techniques that allow robots to receive objects from human operators is an important problem within the space of collaborative tasks.

BRIEF DESCRIPTION OF THE DRAWINGS

Various techniques will be described with reference to the drawings, in which:

FIG. 7 illustrates an example of hand poses that may be used to grasp an object, in accordance with an embodiment;

DETAILED DESCRIPTION

Figure 1:
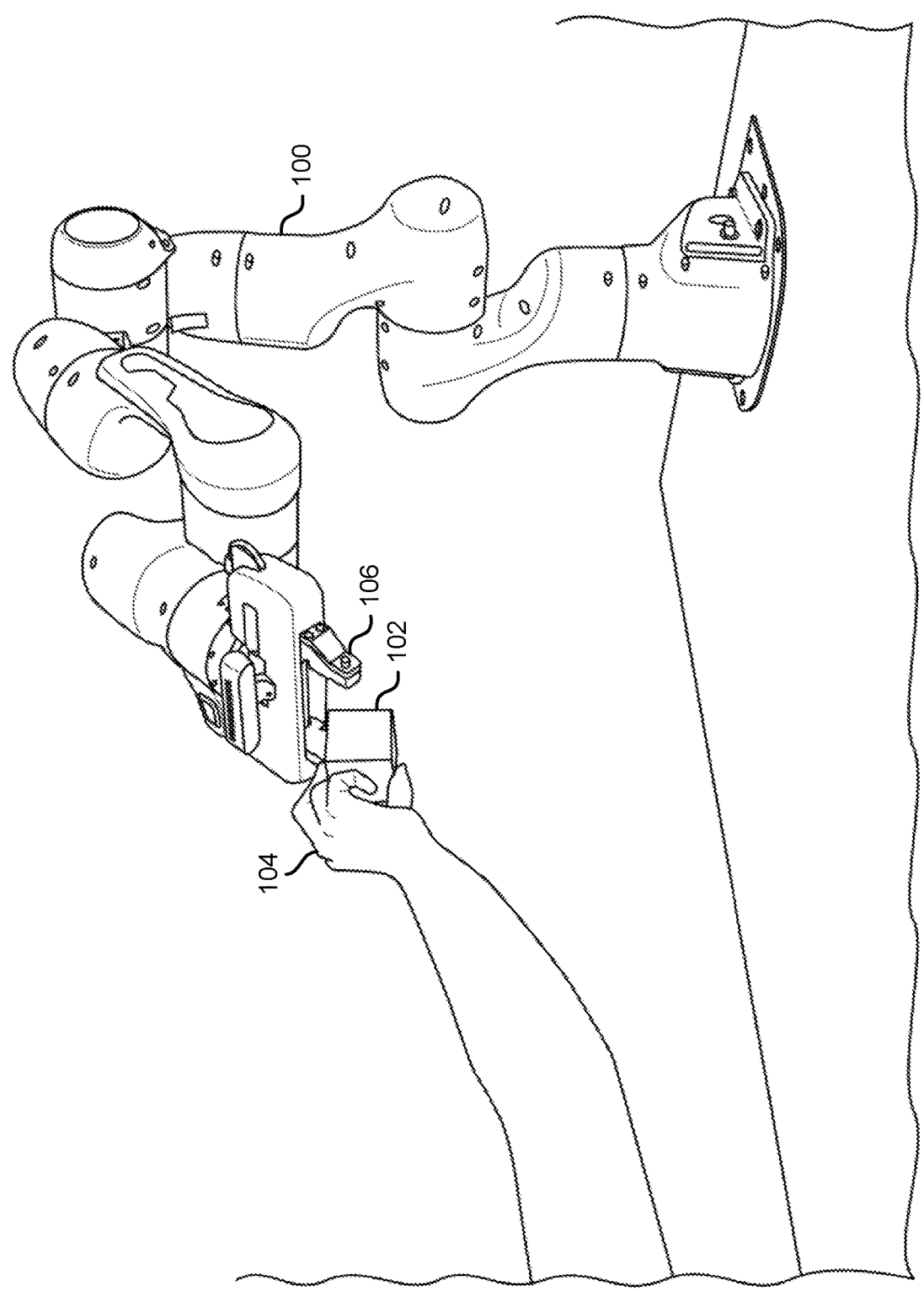
FIG. 1 illustrates an example of a human-robot interaction pose where the human executes a palm-down pinch grasp of an object, in accordance with an embodiment.

The present document describes a vision-based system that allows a robot to receive an object presented in a human hand. In one example, the human grasps an object and presents it in a visual field monitored with a depth camera. The depth camera takes a 3-D image of the hand grasping the object and provides it to the system. The system generates a point cloud from the image, and separates a portion of the point cloud associated with the human hand and a portion of the point cloud associated with the object. Using this information, the system is able to determine a pose of the human hand and a pose of the object. The system generates a set of grasps that can be performed by the robot to grasp the object, and then chooses a grasp from the set of grasps that does not interfere with the human hand. In one implementation, human grasps are classified into various types of hand poses to assist in the system selecting an appropriate robotic grasp for obtaining the object. In another implementation, given a dataset of human object handovers annotated with ground truth hand and object poses, a deep network is trained that takes as input a colored point cloud observed by the depth camera to segment the human hand from the object and propose good grasps and controls for the robot such that it can receive the object from the human hand while not pinching the human's fingers. Techniques described herein may be applied, in various embodiments, to systems where objects are handed from one robot to another, or from an animal to a robot, or in some examples, when an object is taken from an appendage other than the hand of a human (such as removing a hat).

The transfer of objects between humans and robots is an important capability for robots that collaborate with humans. Both robot-to-human handovers and human to robot handovers can be difficult. Some techniques described herein describe an approach for human-to-robot handovers in which the robot meets the human halfway, by classifying the human's grasp of the object and quickly planning a trajectory accordingly to take the object from the human's hand according to their intent. At least one embodiment collects a human grasp dataset which covers typical ways of holding objects with various hand shapes and poses, and learns a deep model on this dataset to classify the hand grasps into one of these categories. At least one embodiment provides a planning and execution approach that takes the object from the human hand according to the detected grasp and hand position, and replans as necessary when the handover is interrupted. Through a systematic evaluation, the present document shows that various embodiments produce improved handovers versus two baselines.

Giving and taking objects to and from humans are fundamental capabilities for collaborative robots across applications from manufacturing to physical assistance in the home. Some techniques focus on the transfer of objects from the robot to the human, assuming the human can just place the object in the robot's gripper for the reverse. This approach is sometimes not feasible in scenarios where the human needs to pay attention to their task at hand, such as performing a surgery, or where the human has limited mobility and arm movement due to an impairment. Therefore, at least one embodiment provides more reactive handovers that can adapt to the way that the human is presenting the object to the robot and meet them halfway to take the object.

In at least one embodiment, one of the challenges in making human-to-robot handovers reactive is reliable and continuous perception of the object and the human. At least one embodiment estimates the human hand pose as well as the 6D object pose by utilizing methods of computer vision. Various techniques may be used including those that estimate the pose of the hand and the pose of the object separately. At least some embodiments estimate hand and object pose while the hand is interacting with the object.

In at least one embodiment, the techniques described herein address the problem of perception for human-to-robot handovers by formulating it as a hand grasp classification problem. In one example, the techniques discretize the ways in which humans can hold small objects into several categories, and a data set is collected to learn a deep model that classifies a given human hand holding an object into one of those grasp categories. The handover task is modeled as a Robust Logical-Dynamical System, which generates motion plans that avoid contact between the gripper and the human hand given the human grasp classification. At least one embodiment is compared with two baseline methods, one without inferring the human hand pose and the other relying on independent hand and object pose estimation. At least one embodiment demonstrates higher success rate and time efficiency of our approach over the two baselines. The user study is presented (N=9) demonstrating the effectiveness with naive users, both while they are attentive to the robot and while they are focused on a secondary task.

At least one embodiment provides a vision-based reliable algorithm that can generate grasps to avoid collisions for the task of human-to-robot handovers or robot-to-robot handovers, for example, how robots may take objects from humans or another robot. At least one embodiment adjusts the way the robot grasps an object based on how the object is being held by a human hand. As a result, at least one embodiment is more reliable for not contacting the human hand.

Human-robot handovers are an important topic within human-robot collaboration across a multitude of application areas from collaborative manufacturing to assistance in the home. At least one embodiment focuses on robot-to-human handovers in which the robot starts with an object in hand and transfers it to the human. One challenge is choosing parameters of the robot's actions to optimize for a fluent handover. This includes the choice of object pose and robot's grasp on the object, taking into account user comfort, preferences based on subjective feedback, affordances and intended use of the objects after the handover, motion constraints of the human, social role of the human, and configuration of the object when being grasped before the handover. At least one embodiment emphasizes parameters of the trajectory to reach the handover pose, exploring the approach angle, starting pose of trajectory in contrast to the handover pose, motion smoothness, object release time, estimated human wrist pose, relative timing of handover phases, and ergonomic preferences of humans. While some embodiments focus on offline computation of handover parameters, at least one embodiment involves perception of the human to enable reactive handovers.

The techniques described herein focus on the perception of humans to enable reactive handovers and utilize human hand pose estimation techniques. Pose estimation of the human hand can be accomplished with both two-dimensional RGB monocular images or 3-D depth camera information. In general, 3-D depth cameras provide additional information that allows for a more precise estimate of hand pose than techniques that rely only on two-dimensional RGB images.

Techniques described herein implement a system for task execution based on Robust Logical-Dynamical Systems, an approach for automatically creating reactive task plans for robots. In at least one embodiment, the idea is to constantly identify the present logical state and reactively replan to handle uncertainty and changes in logical state, an approach that is useful for dealing with partially observable environments. In some examples, the task model can be thought of in a similar way to Behavior Trees, a method for representing complex tasks that is useful for human-robot collaboration.

At least one embodiment partially solves this problem by classifying human grasp poses. In at least one embodiment, the human grasp poses are discretized into seven categories, which may not cover all the ways that a human hand can grasp an object.

In at least one embodiment, a dataset of human object handovers annotated with ground truth hand and object poses is generated. This dataset is used to train a deep network that takes as input a colored point cloud obtained by an RGB depth camera to segment the human hand from the object and propose grasps and controls for the robot such that the robot can receive the object from the human hand while not pinching or touching the human's fingers.

One advantage of the techniques described herein is that the model may be able to generate robot grasps that can receive the object from the human hand/another robot while not pinching the human hand (or the gripper of another robot) by learning from a hand-object manipulation dataset. Some examples provide a low-cost solution which is based on RGB-D cameras which are cheap and lightweight compared to many wearable sensors. Various embodiments enable a reliable handover which is important when building more complex robotic systems. For example, the techniques described herein may be applicable to elderly-care robots or cooking robots that are able to work closely with humans.

The techniques described herein provide, in various embodiments: (1) hand-object interaction reasoning for handovers posed as a classification problem, via a dataset that covers a wide range of hand shapes and poses; (2) a system that adaptively plans robot grasps for taking the object from the human, so that the robot can respond to the human fluidly and naturally; and (3) experimental results demonstrating improvements over the baseline methods, and a user study validating our approach with naive users.

Humans hand objects over in different ways. They can present the object on their palm or use a pinch grasp and present the object in different orientations. The techniques described herein can determine which grasp a human is using and adapt accordingly, enabling a reactive human-robot handover.

FIG. 1 illustrates an example of a human-robot interaction pose where the human executes a palm-down pinch grasp of an object, in accordance with an embodiment. A robot 100 is positioned to take an object 102 from a human hand 104. In at least one embodiment, a depth camera takes an image of the human hand 104 grasping the object 102, generates a point cloud from the image, and provides the point cloud to a trained neural network. The neural network generates an appropriate grasp for a robotic gripper 106 connected to the robot 100, such that the robotic gripper 106 is able to grasp the object 102 without interfering with the human hand 104.

Figure 2:
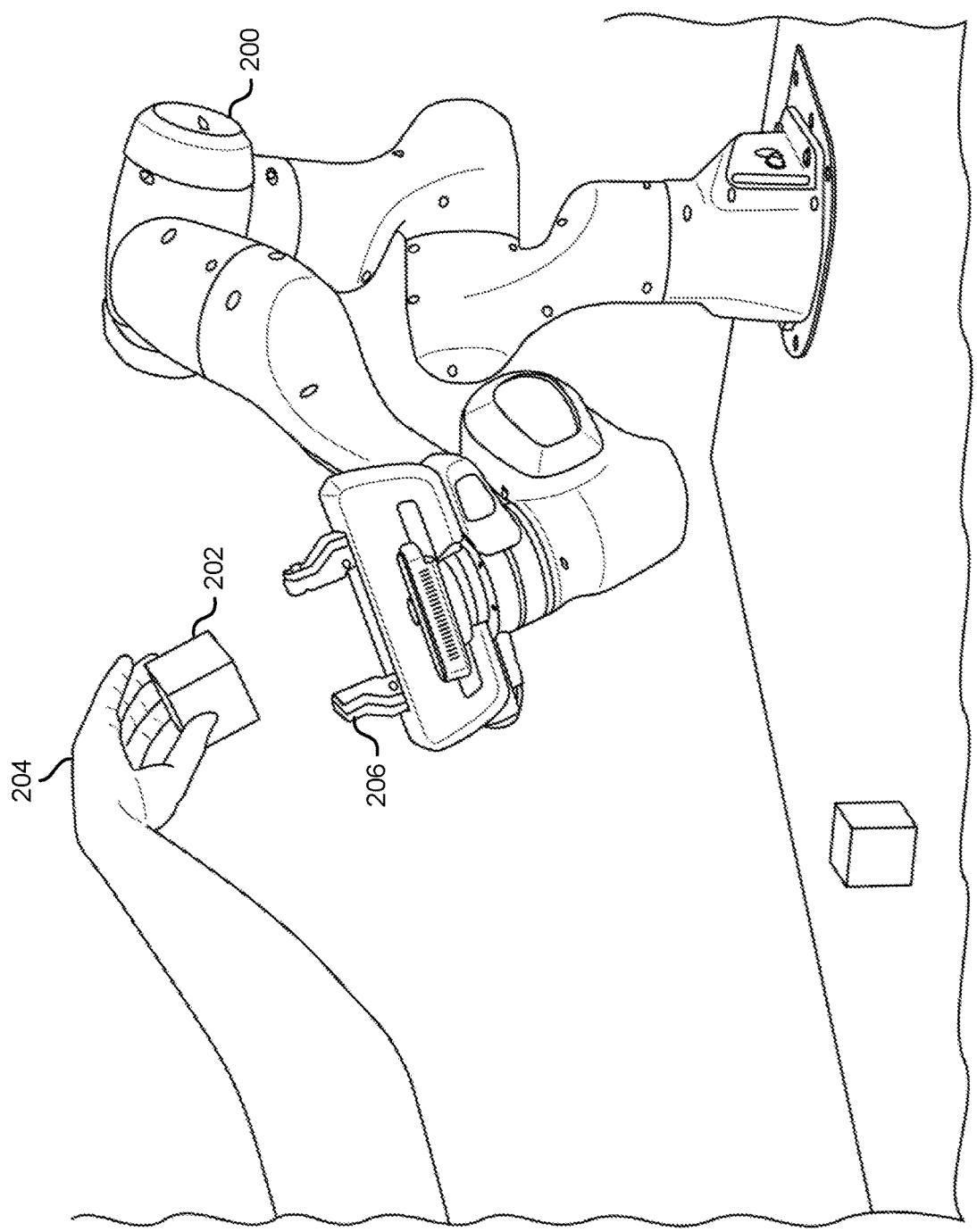
FIG. 2 illustrates an example of a human-robot interaction pose where the human executes a lowering grasp of an object, in accordance with an embodiment.

FIG. 2 illustrates an example of a human-robot interaction pose where the human executes a lowering grasp of an object, in accordance with an embodiment. A robot 200 is positioned to take an object 202 from a human hand 204. In at least one embodiment, a depth camera takes an image of the human hand 204 grasping the object 202, generates a point cloud from the image, and provides the point cloud to a trained neural network. The neural network generates an appropriate grasp for a robotic gripper 206 connected to the robot 200, such that the robotic gripper 206 is able to grasp the object 202 without interfering with the human hand 204.

Figure 3:
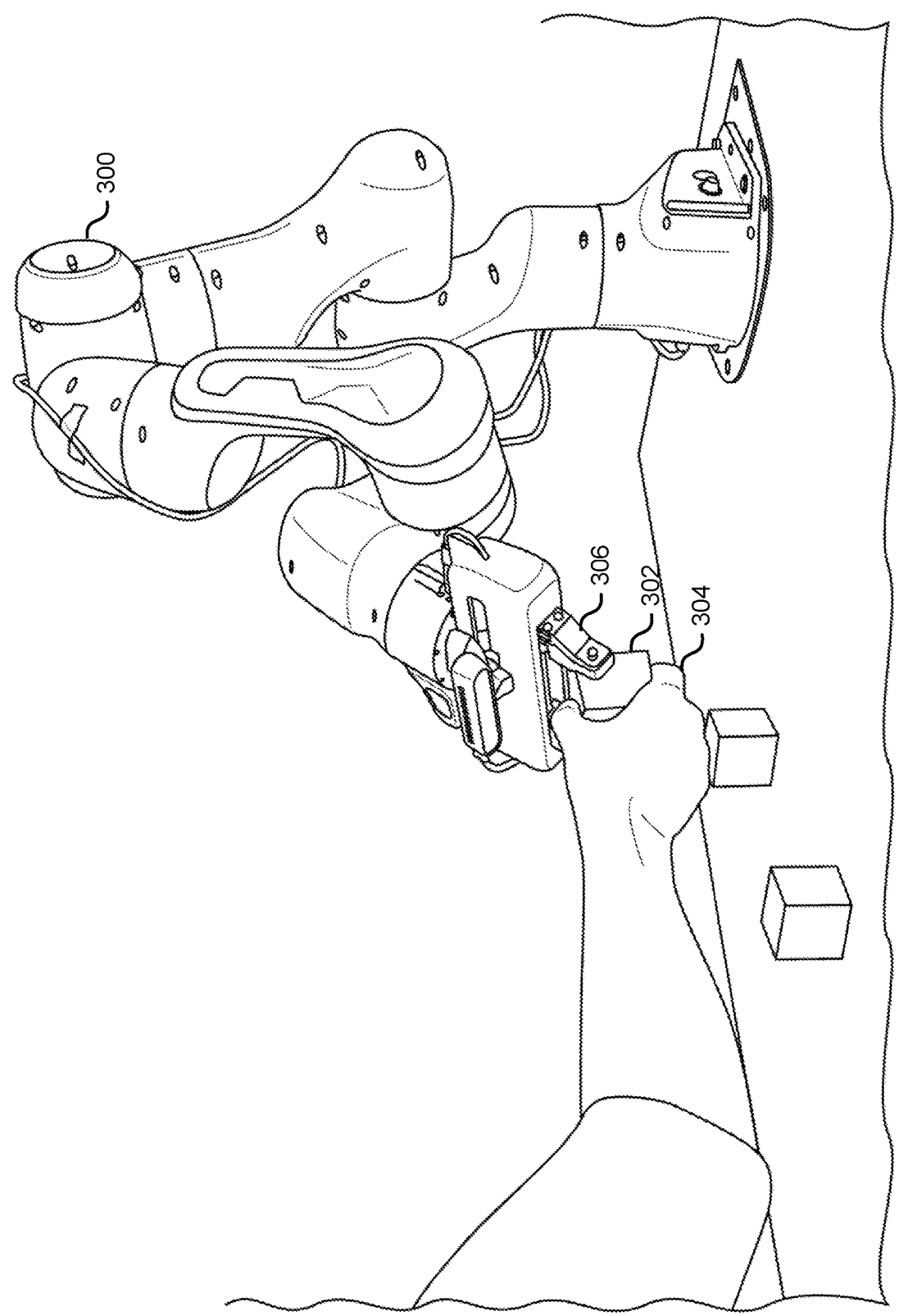
FIG. 3 illustrates an example of a human-robot interaction pose where the human executes a palm-up pinch grasp of an object, in accordance with an embodiment.

FIG. 3 illustrates an example of a human-robot interaction pose where the human executes a palm-up pinch grasp of an object, in accordance with an embodiment. A robot 300 is positioned to take an object 302 from a human hand 304. In at least one embodiment, a depth camera takes an image of the human hand 304 grasping the object 302, generates a point cloud from the image, and provides the point cloud to a trained neural network. The neural network generates an appropriate grasp for a robotic gripper 306 connected to the robot 300, such that the robotic gripper 306 is able to grasp the object 302 without interfering with the human hand 304.

Figure 4:
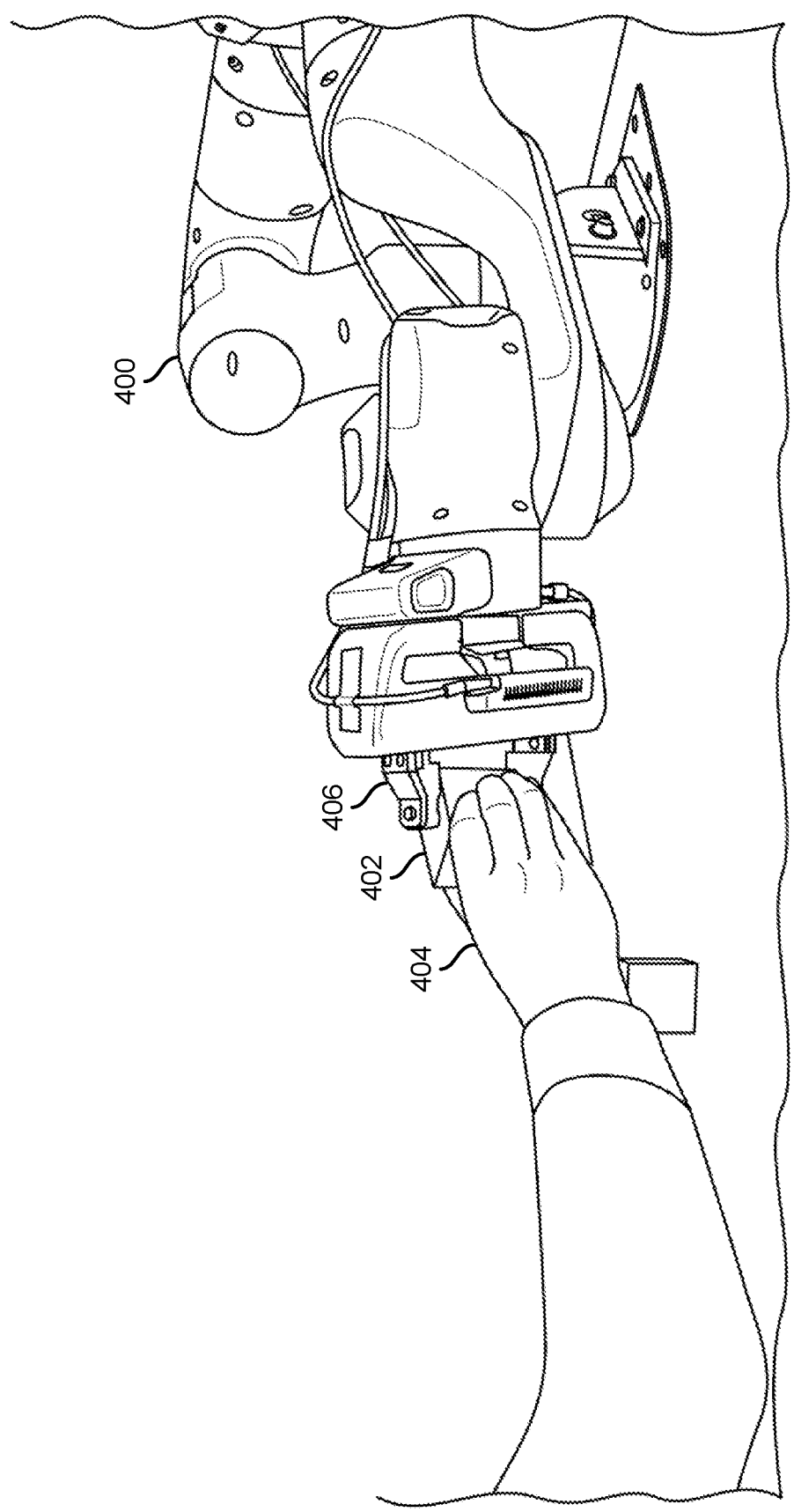
FIG. 4 illustrates an example of a human-robot interaction pose where the human executes a horizontal pinch grasp of an object, in accordance with an embodiment.

FIG. 4 illustrates an example of a human-robot interaction pose where the human executes a horizontal pinch grasp of an object, in accordance with an embodiment. A robot 400 is positioned to take an object 402 from a human hand 404. In at least one embodiment, a depth camera takes an image of the human hand 404 grasping the object 402, generates a point cloud from the image, and provides the point cloud to a trained neural network. The neural network generates an appropriate grasp for a robotic gripper 406 connected to the robot 400, such that the robotic gripper 406 is able to grasp the object 402 without interfering with the human hand 404.

In at least one embodiment, when a robot takes an object from a human hand, the motion of the robot is adjusted according to the way that the object is grasped by the human hand. In general, this prevents the robot from behaving in a nonintuitive way, or in a way that would interfere with or even come in harmful contact with human fingers. In at least one embodiment, a handover framework addresses this issue by taking the point cloud centered around the human hand detected by the Azure Body Tracking software development kit ("SDK"), and then estimating the hand grasp class based on how the object is grasped by the human hand. At least one embodiment then adaptively plans robot grasps.

Figure 5:
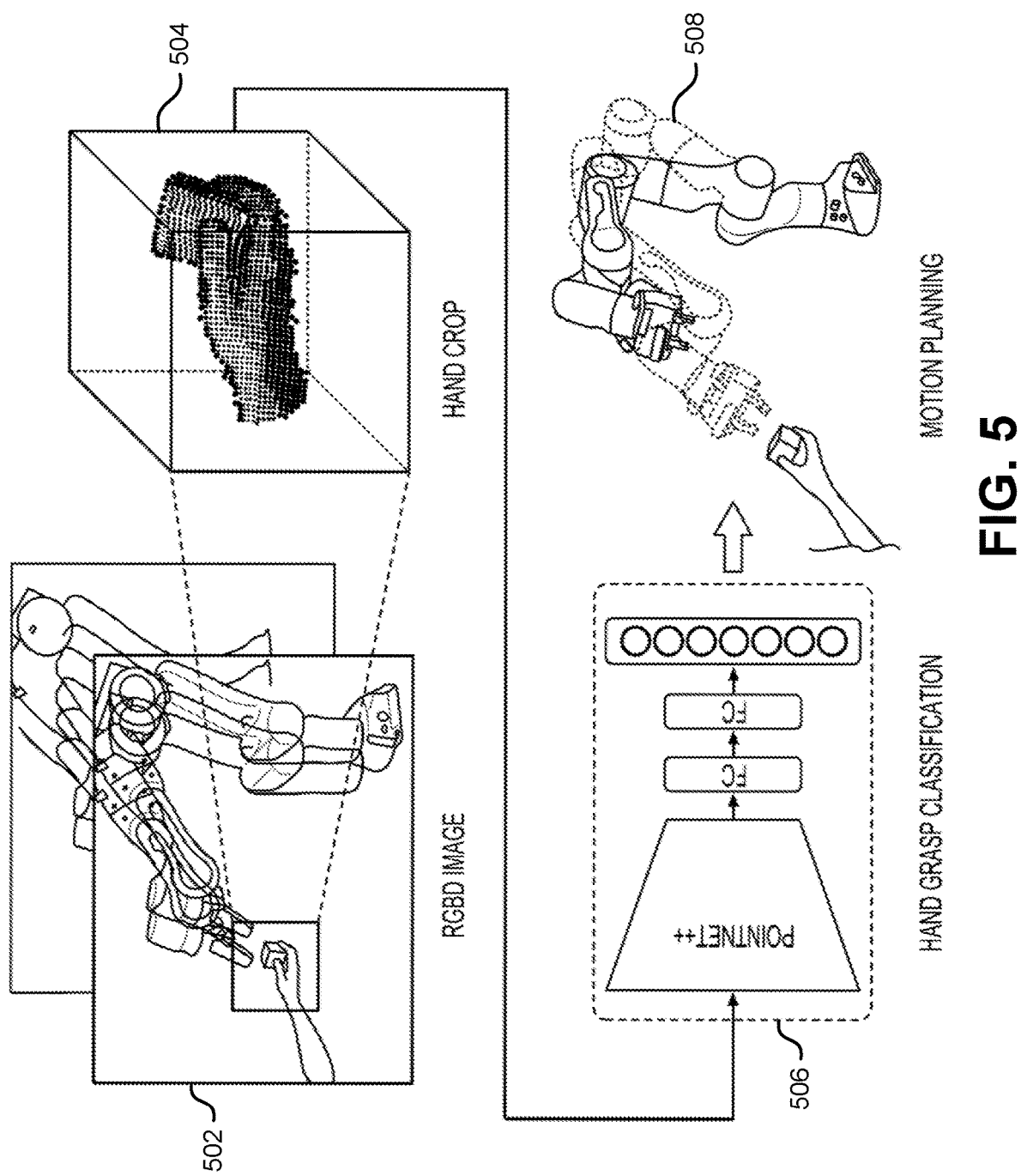
FIG. 5 illustrates an example of a framework for performing a handover between a robot and a human hand, in accordance with an embodiment.

FIG. 5 illustrates an example of a framework for performing a handover between a robot and a human hand, in accordance with an embodiment. In one example, the framework obtains an RGBD image 502 that shows the hand holding the object. Using the RGBD image, a point cloud 504 of the hand and the object is generated. In at least one embodiment, the framework takes the point cloud centered around the hand detection, and then uses a model 506 to classify it as one of seven grasp types which cover various ways objects tend to be grasped by the human user. The task model then plans 508 the robot grasps adaptively.

Figure 6:
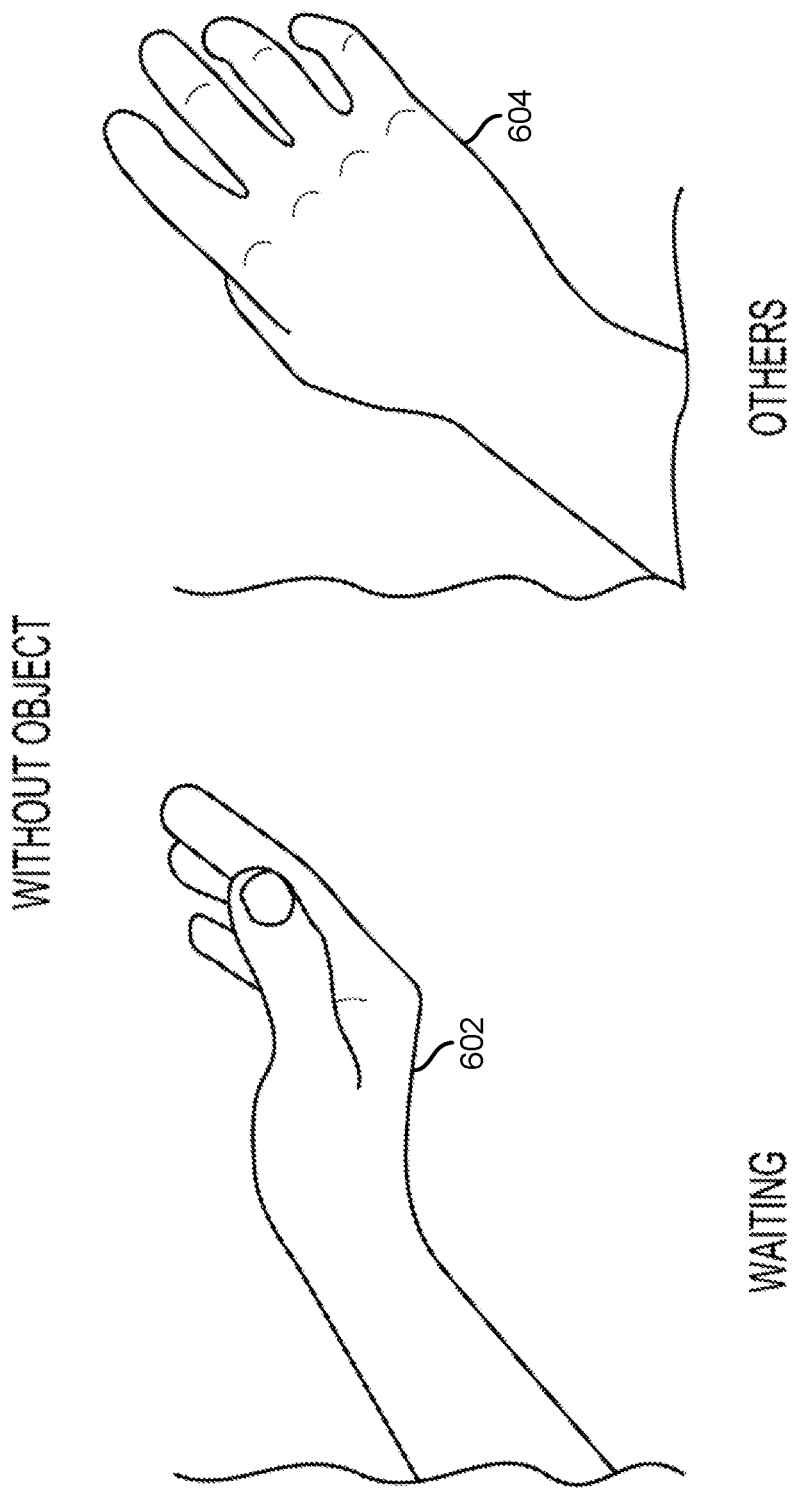
FIG. 6 illustrates an example of a human hand pose that can be used to prompt transfer of an object from a robot, in accordance with an embodiment.

FIG. 6 illustrates an example of a human hand pose that can be used to prompt transfer of an object from a robot, in accordance with an embodiment. For example, a first hand pose 602 may be designated as a pose that signals that the human is ready to receive an object, and a second hand pose 604 can be designated as a pose that indicates that the human is not ready to receive an object from the robot.

At least one embodiment defines a discrete set of human grasps which describe the way that the object is grasped by the human hand for the task of handover. At least one embodiment discretizes the common human grasps for the task of human-robot handover into seven categories, such as those shown in FIG. 7. For example, if the hand is grasping a block, then the hand pose can be categorized as on-open-palm, pinch-bottom, pinch-top, pinch-side, or lifting. In another example, if the hand is not holding anything, it could be either waiting for the robot to hand over an object or just doing nothing specific (others).

FIG. 7 illustrates an example of hand poses that may be used to grasp an object, in accordance with an embodiment. A first hand pose 704 illustrates an object being held in the open palm. A second hand pose 704 illustrates an object being held in a bottom pinch position. A third hand pose 706 illustrates an object being held in the lifting pose. A fourth hand pose 708 illustrates an object being held in a top pinch position. A fifth hand pose 710 illustrates an object being held when being pinched from the sides. These and other hand poses can be used by the human when presenting an object to a robot. In some implementations, classifications of hand poses may be used, such as the hand-pose categories illustrated in FIG. 7. In other implementations, the hand pose can be free-form which may include various types of hand poses not illustrated in FIG. 7. In such examples, the system may use a point cloud or a skeletal pose of the hand to construct an appropriate pose for the robot to take the object from the human hand.

Figure 8A:
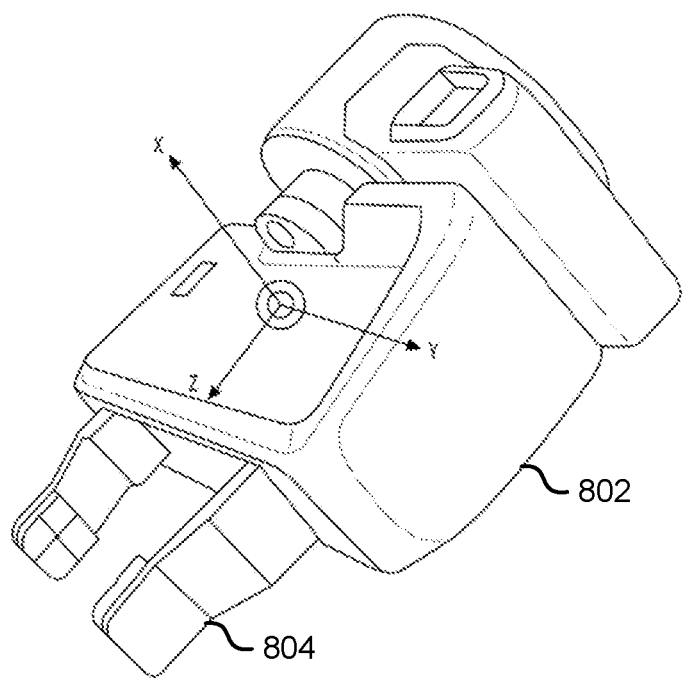
FIG. 8A illustrates an example of a robotic gripper, in accordance with an embodiment.

FIG. 8A illustrates an example of a robotic gripper, in accordance with an embodiment. In one example, the robotic gripper 802 includes a set of jaws 804 that can be closed and separated. Some examples may include tactile sensors on the surface of the jaws 804 so that a measure of force can be obtained by the system. In some examples, the gripper 802 includes a wrist joint that can articulate and position the set of jaws 804 under the control of the system.

Figure 8B:
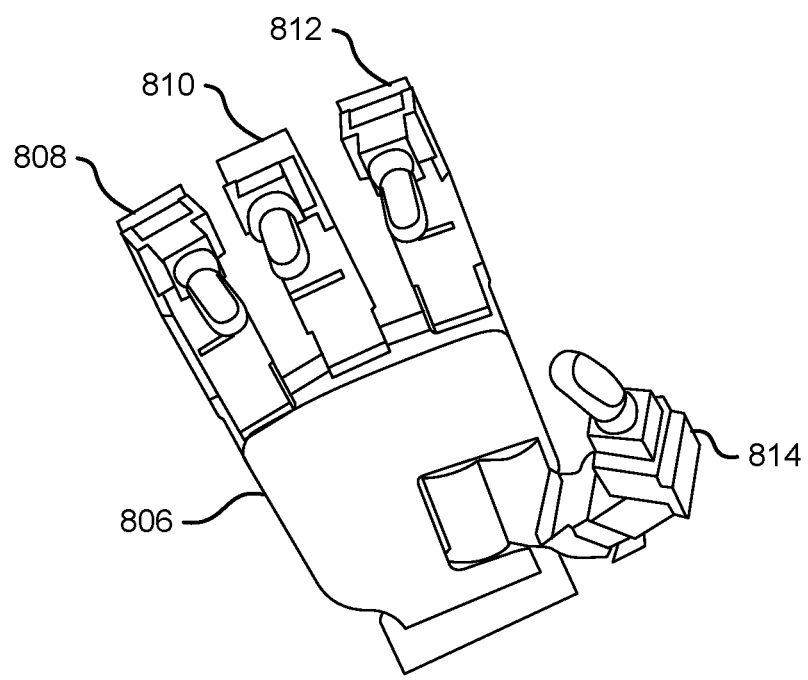
FIG. 8B illustrates an example of a robotic gripper with four fingers, in accordance with an embodiment.

FIG. 8B illustrates an example of a robotic gripper 806 with four fingers that can be used in an embodiment. The robotic gripper 806 includes a first digit 808, a second digit 810, a third digit 812, and an opposing digit 814 that approximately mimic a human hand. The robotic gripper 806 can be used in accordance with various embodiments described and shown herein. For example, the robotic gripper 806 can be used to take an object held in a human hand in a way that does not interfere with the human hand. In addition, other types of robotic grippers having more or less digits may be used as well. In one example, the robotic gripper may have 2, 3, 4, 5, or more fingers and each finger may have a friction surface to aid in grasping an object. In one example, the fingers of a robotic gripper may have tactile sensors that assist the system by indicating contact with the object. In one example, the gripper may include a magnetic element to assist in taking a ferrous object from the human hand. In another example, the gripper may include a vacuum pickup element to capture the object.

In one example, in order to learn a model to classify the human grasps, an embodiment creates a dataset which covers eight subjects with various hand shape and hand poses by using an Azure Kinect RGBD camera. For example, in one implementation an example image of a hand grasp is shown to the subject, and the similar poses performed by the subject are recorded for twenty to sixty seconds. The sequence of images are labeled as the corresponding human grasp category. During the recording, the subject can move his/her body and hand to different positions to diversify the camera viewpoints. Both left and right hands are recorded for each subject. In one example, the data set consists of 151, 551 images.

Instead of learning deep features with ConvNets on depth images, at least one embodiment adopts the PointNet++ on point clouds for human grasp classification. In at least one embodiment, the backbone network consists of four set-abstraction layers to learn point features and a three-layer perceptron with batch normalization, ReLu and Dropout for global feature learning and human grasp classification. Given a point cloud cropped around the hand, the network classifies it into one of the defined grasp categories, which may be used for further robot grasp planning.

At least one embodiment associates each human grasp type with a canonical robot grasp direction in order to minimize human's effort during the human-to-robot handovers. As shown in FIG. 3, the coordinates denote the canonical robot grasp frames in the camera frame. The motivation is to reduce the chance for the robot to grab human's hand while keep its motion and trajectory as natural and smooth as possible.

At least one embodiment of a task model is based on Robust Logical-Dynamical Systems. This represents tasks as a list of reactively executed operators o with certain properties. Each operator is a tuple o=$\{L_P, L_R, L_E, \pi\}$, where $L_P$ is a set of logical preconditions on entering o, $L_R$ is a set of run conditions that must hold while execution of o is ongoing, and $L_E$ is the set of logical effects that will be true. The operator is also associated with a policy $\pi$ which generates the necessary controls to achieve effects $L_E$. In at least one embodiment, the policy and predicates are learned from data, but in other embodiments they are specified manually. Given a plan, at least one embodiment chooses the highest-priority operator whose preconditions are met, checking conditions at 10 hz so changes can be quickly responded to.

Figure 9:
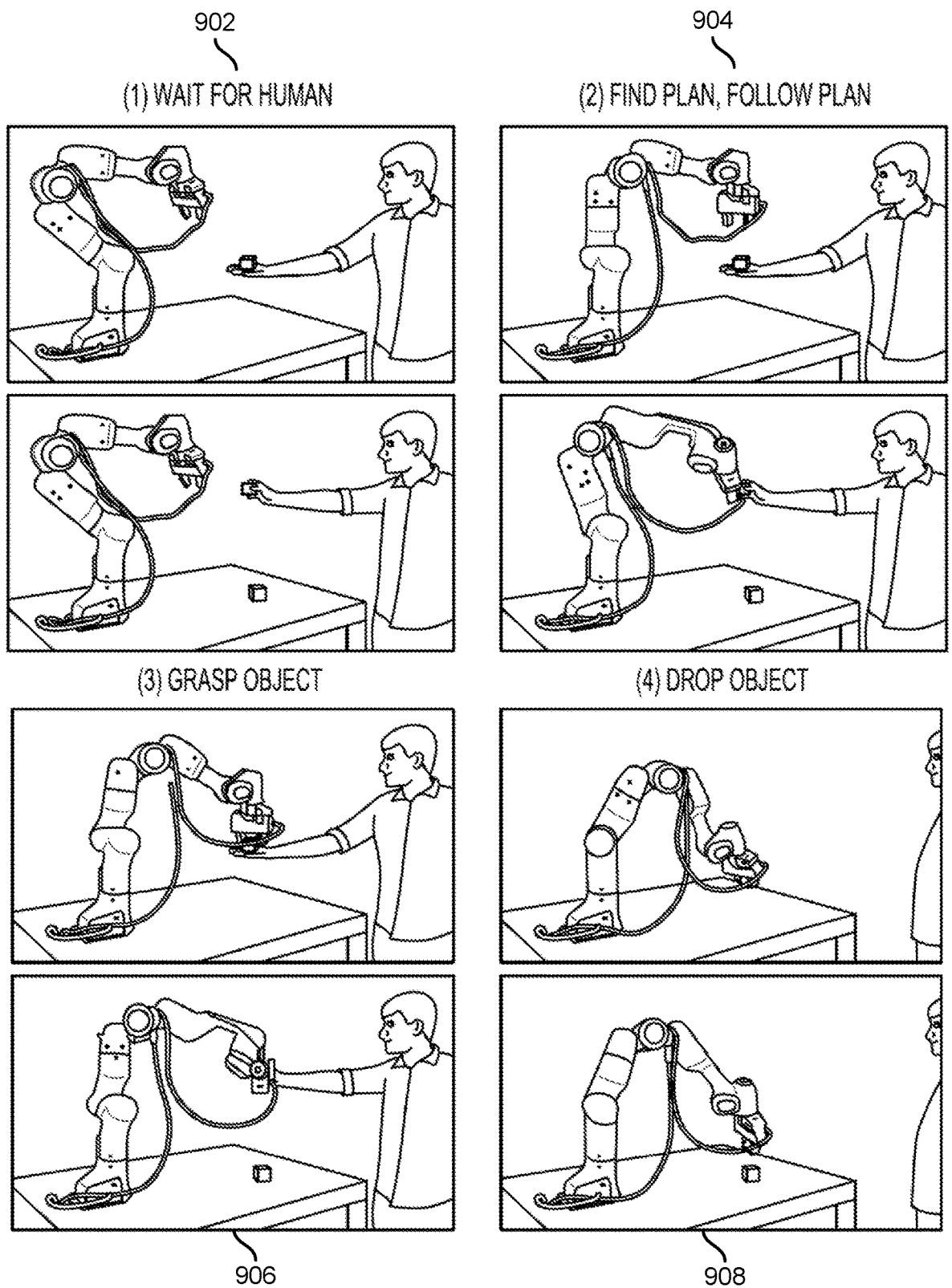
FIG. 9 illustrates an example of robot-human interactions, in accordance with an embodiment.

FIG. 9 illustrates an example of robot-human interactions, in accordance with an embodiment. FIG. 9 gives an overview of the different steps in a final task plan. In at least one embodiment, the system has to adapt to different possible grasps, reactively choosing the correct way to approach the human user and take the object from them. In one example, until it gets a stable estimate of how the human wants to present the block, it stays in a "home" position and waits.

In various embodiments, the handover from a human to a robot is accomplished in four stages where the robot waits for the human to present the object in an appropriate pose 902, then develops a plan that positions the robotic gripper so that the object can be grasped 904, grasps the object 906, and then in some examples, drops the object 908.

Instead of just using reactive local planning, some implementations plan and make intelligent decisions based on a large number of possible grasps in order to find the one that would be natural to the human user. The table below shows an embodiment of the task plan, in order of descending priority. In the table below, operators and corresponding preconditions $L_P$ for task execution and reactive execution are shown. Operators are listed in descending order of priority; if all the preconditions are true, techniques described herein execute the associated operator regardless of what the previously executed operator was.

| Operator | Preconditions |
| --- | --- |
| Open gripper | has_obj ∧ gripper_fully_closed |
| Wait for human | (stable ∧ hand_over_table ∧ hand_has_obj) |
| Avoid human | too_close_to_hand ∧ in_apporach_region |
| Drop object | at_drop_position ∧ has_obj |
| Go to drop | has_obj |
| Grasp object | in_approach_region ∧ has_goal ∧ is_goal_valid |
| Follow plan | has_goal ∧ is_goal_valid |
| Find plan | has_feasbile_goals |
| Find feasible goals | stable ∧ hand_over_table ∧ hand_has_obj |

Wait for human. At least one embodiment computes several predicates determining how the robot should interact with the hand: stable, hand_over_table, and hand_has_obj, and too_close_to_hand. The hand_over_table predicate corresponds to whether or not these observations are in a specified volume over the table depicted above, and stable( ) is true if the hand is not moving and the hand has been observed for at least 5 timesteps (0.5 seconds). This is defined based at least in part on velocity:

$$\text{stable}(\ )=\|x_{t-1}-x_t\|_2<\lambda,$$

with position x and time t, for a threshold λ. The robot waits at the home position if these conditions are not true.

Avoid human. In at least one embodiment, if too_close_to_hand( ) is true for either hand and the robot is not in the approach region corresponding to a particular grasp, the robot will attempt to avoid the hand and will move back to the home positions. At least one embodiment defines too_close_to_hand( ) to be true if the Euclidean distance between the end effector and the hand is less than 20 cm.

Find feasible goals. In order to ensure that the robot's motions are safe, instead of the purely reactive policies, techniques described herein plan whole trajectories for execution. If stable ( ), hand_over_table ( ), and hand_has_obj ( ), then the robot will attempt to take the object from the hand, using a canonical grasp pose as described above.

In at least one embodiment, in order to find a valid trajectory ξ, the robot first finds a valid grasp pose, so the system adds the has_goal and is_goal_valid. If either of these is false, the system searches for a reasonable goal pose.

In at least one embodiment, the planner creates a list of goal pose candidates and associated standoff positions. In one example, there are ten options, at rotations of θ_y∈{−π/4,−π/8,0,π/8,π/4} around the y-axis in FIG. 3, and θ_z∈{O,π} around the z-axis. In at least one embodiment, both grasp and standoff position must be collision-free and have a valid IK solution in order to be considered feasible goal options. Various examples also add a constraint that the robot should never occlude its view of the object when determining if states are valid.

Find plan. In at least one embodiment, if the planner has a list of goal options, it will then sort them according to their distance from the current joint configuration and attempt to find a motion plan to the standoff position using RRT-Connect [58]. If the system can both find a grasp pose and a motion plan, the robot executes a sub-policy to follow this motion plan.

However, a human might move their hand or change how they are holding an object in their hand. A goal is considered valid (as per the is_goal_valid predicate) if it has an associated motion plan and if the object has not moved within some threshold of where it was first observed. If the object moves excessively, the robot stops, and the task model transitions back to finding a new grasp.

Grasp Object. In at least one embodiment, once a motion plan has completed, the robot should be at a standoff pose and have an associated goal pose—the expected position of the object in the human hand. These two poses define an approach region—a conical volume within which the robot can move to approach the object. Once the gripper closes, if the robot is at its goal pose, the has_obj predicate is set to true. The grasp operator may occlude the object, so this is performed as the only blocking, open-loop action.

Open Gripper. In at least one embodiment, if has_obj is true, indicating that the robot believes it is holding an object, this perception may be incorrect in the event that the object moved or the pose estimate was incorrect. Some examples add a gripper_fully_closed predicate, saying that the gripper closed all the way. If both conditions are true, has_obj is set to false, and the robot reverts to a different state.

Move to drop and Drop object. In at least one embodiment, the drop position is a single joint-space position; the robot will find a safe, collision-free motion plan. If it is at the drop position, the system will direct the robot to open the gripper and put the object on the table.

We performed a systematic test of one example of the entire system, including the classification model and the task model described above, on a range of different hand positions and the grasps shown in FIG. 7. An embodiment uses two different Franka Panda robots, mounted on identical tables in different locations. A human user handed four colored blocks over to the robot, one at a time. During the systematic evaluation, each of three approaches for determining which grasp pose to use for taking an object from the human was tested:

Simple Baseline: Waits until it sees the block in a human hand and takes it from the hand, using a fixed grasp orientation. The human hand is detected via the Microsoft Azure body tracker.

Hand Pose Estimation: A state estimation-based version of the system, in which the human hand pose from the Azure body tracker is used to infer grasp direction.

An embodiment of the proposed system: The proposed system, classifying human grasps based on depth information as described above.

Variants executed the same task model, as described above. The order in which these three test cases were provided was randomized. Users used their right hand to present blocks to the robot.

System performance was evaluated with a set of metrics computed during trials. These were computed automatically and logged while users were performing the task.

Planning Success Rate: The number of times the follow_plan operator was able to execute successfully, bringing the robot to its standoff pose, and measures certainty both of the human and the system.

Grasp Success Rate: How often the robot was able to successfully take the object from the human, versus total number of grasp attempts that it made.

Action execution Time: Tracks the amount of time it took to execute a single planned trajectory, grasp a block, and place it on the table. This is higher if the robot must take a longer path to grasp the block from the human.

Total Execution Time: the amount of time it took to execute all planned paths, including replanning because the human moved or because of the changing of the way of grasp.

Trial Duration: Time since human hand was first detected until the trial was complete.

Figure 10:
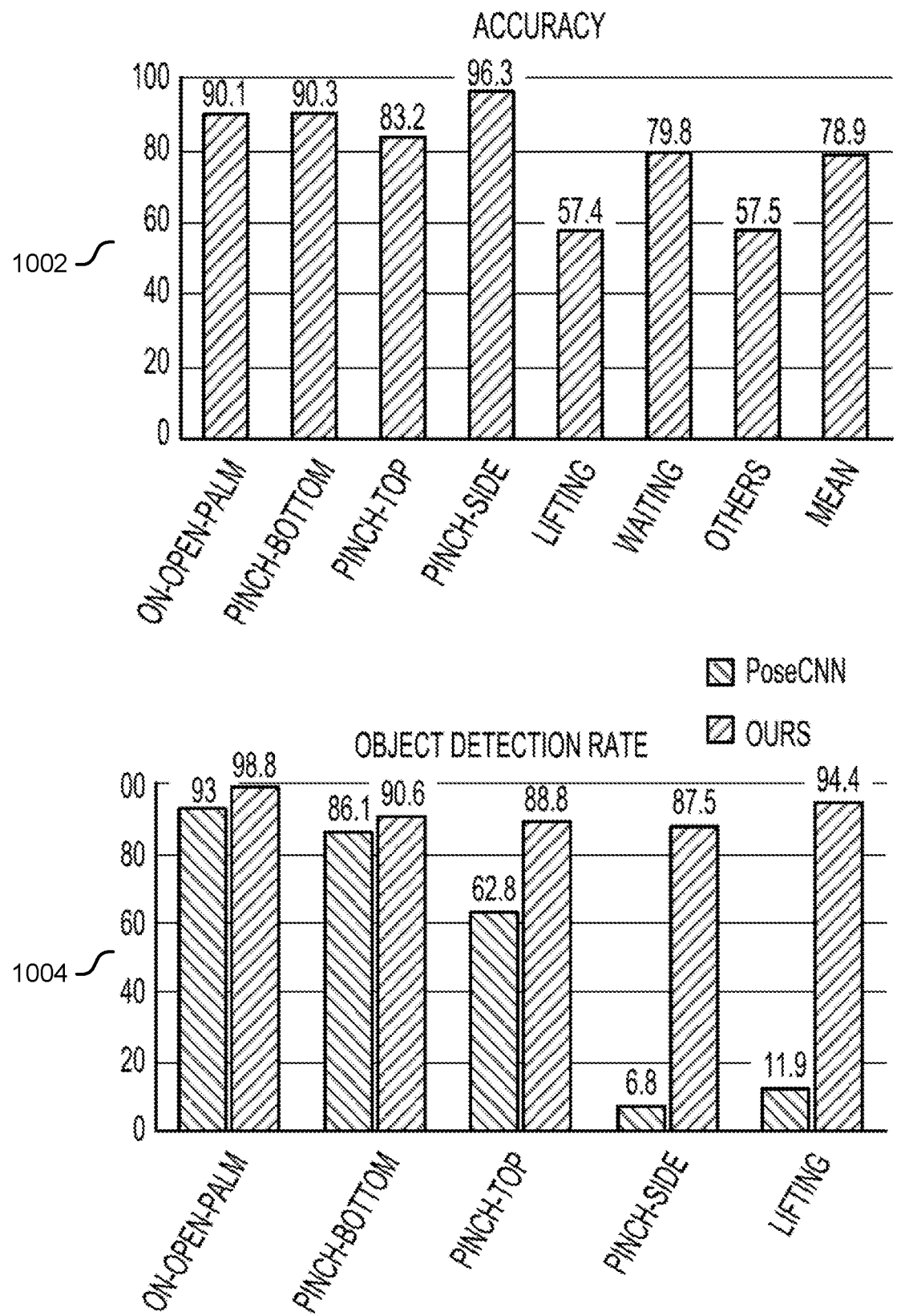
FIG. 10 illustrates data describing the performance of a human-robot interaction system, in accordance with an embodiment.

FIG. 10 shows results on various metrics during the systematic evaluation. The techniques described herein consistently improve the success rate and reduce the total execution time and the trial duration compared with the other two baseline methods, which proves the efficacy and the reliability of the method. In a first chart 1002, the accuracy of the human hand grasp classification is shown. In a second chart 1004, the comparison of the object miss-detection rate between our hand states classification and PoseCNN is illustrated. In many cases the hand occludes the object, meaning that it is very difficult to get an accurate pose estimate.

One exception is the Action Execution Time, where the simple baseline is sometimes faster because the simple baseline does not plan as adaptively as the others; it would not try to attempt an unusual grasp. This means that time from a successful approach to dropping the object may be, on average, notably lower on occasion.

Evaluation of Human Grasp Classification: An embodiment evaluates the hand grasp classification model on a validation set collected with a subject which is unseen during the training procedure. The classification accuracy is reported in the first chart 1002, which demonstrates the good generalization ability of our model on unseen subjects.

In addition, an experiment was conducted to evaluate the detection rate, i.e., whether there is an object in the hand, to provide an insight on how robust the handover system is against the occlusion. The detection rate of our hand grasp classification model (with/without object) is compared to that of an alternative object detection method. The result is reported in the second chart 1004. One embodiment of the human grasp model described herein achieves higher detection rate and is more robust compared with the alternative especially when heavy occlusion occurs (e.g., 87.5% vs. 6.8% for pinch-side and 94.4% vs. 11.9% for lifting).

A user study was performed in order to verify that the system allowed for fluid human-robot collaboration. Nine users were recruited, ages 20 to 36. Of these, two were female and seven were male. The average age was 30.44±4.74 years. The study consisted of three rounds:

Freeform: Users were given four blocks and instructed to stand in front of the table and hand the blocks over to the robot one at a time. They were instructed that the robot would only take blocks if their hand is still, but they could hold the blocks any way they liked.

Attentive: The set of five human grasps shown in FIG. 3 were demonstrated: pinch-top, pinch-bottom, pinch-side, lifting, and on-open-palm. The participants were told to hand over four blocks again. They were encouraged to try the predefined hand grasps, but they were able to use any others.

Distracted: User performance was tested in the presence of a distraction.

Results for handover performance on our quantitative metrics is shown in the table below. Planning success rate indicates how often the system needed to replan its approach, versus grasp success rate as the number of times the system successfully took the object.

| | Planning Success Rate | Grasp Success Rate | Action Execution Time (s) | Total Execution Time (s) | Trial Duration (s) |
|---|---|---|---|---|---|
| Simple Baseline | 42.1% | 66.7% | 11.37 | 20.93 | 21.59 |
| Hand Pose Estimation | 29.6% | 80.0% | 15.10 | 36.34 | 36.46 |
| Ours | 64.3% | 100% | 13.20 | 17.34 | 18.31 |

In addition to the metrics described above, the following statistics were also counted during the user study: (a) number of times robot gripper contacted human fingers, (b) number of times users changed the grasp they were using, and (c) number of times they changed their hand position. After each trial, participants were asked to describe any problems they experienced while handing the blocks to the robot. After all three trials were done, participants were asked to fill out a Likert scale questionnaire and explain their answers.

There was a range of responses, but users said that they worked fluently with the robot and trusted it to do the right thing, although they noted several common issues when asked for feedback. They also believed that the robot was aware of their actions.

Quantitative metrics on user data are shown in the table above. Approaches and grasps were less successful when users were distracted, but times are similar. Users counted an average of 12:88±3:48 faces in a music video, when the correct number was 13. This implies many of them felt a certain level of confident of the handover system and were paying a good amount of attention to the video.

Figure 11:
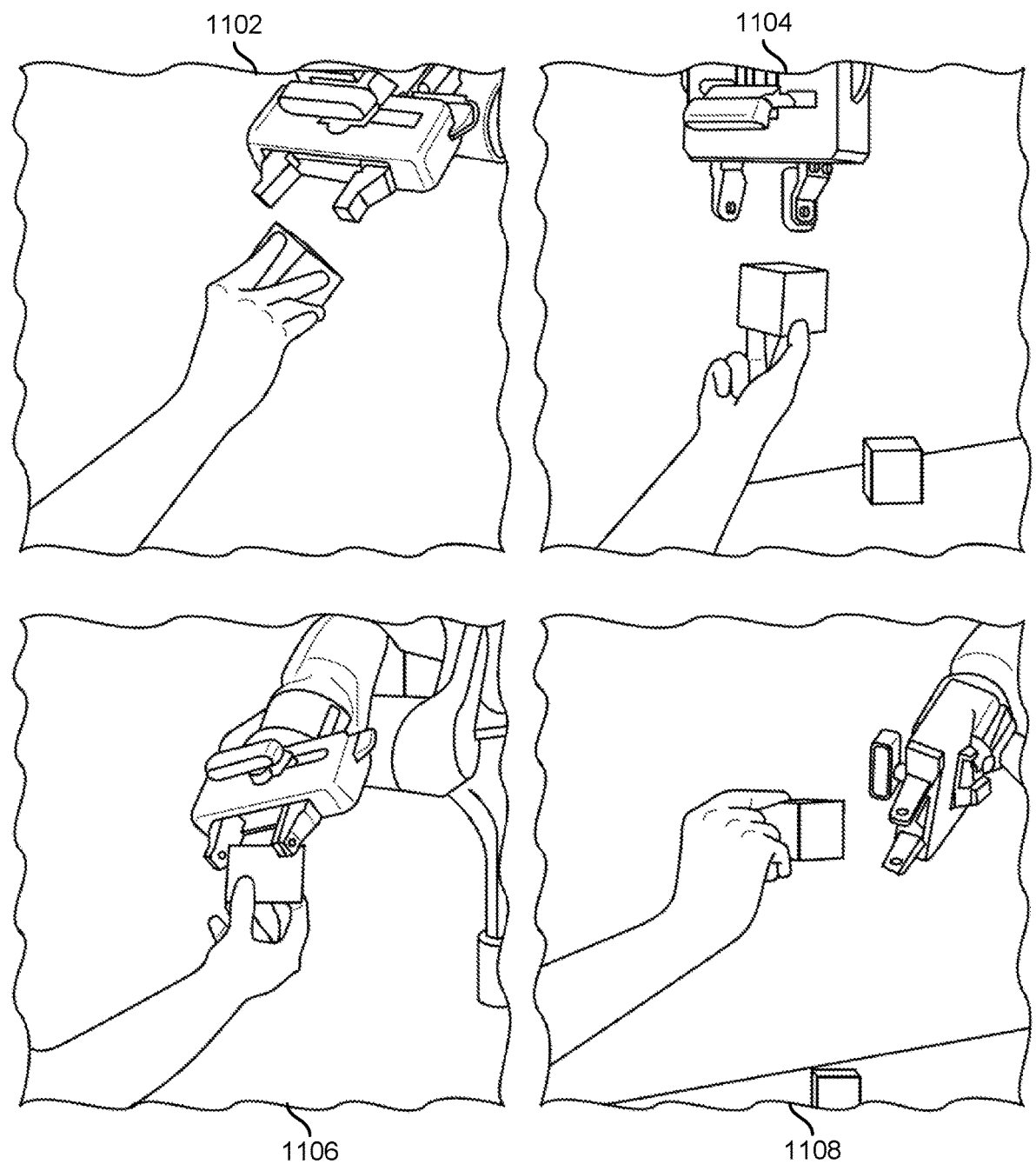
FIG. 11 illustrates an example of hand poses that may be used to present an object to a robot, in accordance with an embodiment.

In one embodiment, the categorization of human grasps described herein covers 77% of typical user grasps. At least one embodiment can deal with most of the unseen human grasps; they tend to lead to higher uncertainty and sometimes would cause the robot to back off and replan. Some of these unseen grasps are shown in FIG. 11. FIG. 11 illustrates examples of outlier grasps which do not appear in our training dataset, and are examples of the types of grasps where our system showed higher uncertainty, leading to slightly worse handover performance.

During the final, distracted test, users had to reposition or change their ways of grasp more often compared with the first two rounds. Several complained about their fingers being pinched or saw the robot fail to grasp objects. One specifically "chose to use the palm-facing-up hand pose" to minimize risk of failure; another "had to look at the robot every 10 s or so."

The table below provides quantitative results from the user study. Users were able to complete tasks quickly even when they were distracted and had to concentrate on a different scenario.

| | Planning Success Rate | Grasp Success Rate | Action Execution Time (s) | Total Execution Time (s) | Trial Duration (s) |
|---|---|---|---|---|---|
| Freeform | 32.7% | 67.3% | 13.21 | 25.99 | 26.92 |
| Attentive | 40.0% | 90.0% | 14.85 | 23.84 | 24.75 |
| Distracted | 29.8% | 67.9% | 11.08 | 26.08 | 27.02 |
| Overall | 33.6% | 73.6% | 13.05 | 25.31 | 26.24 |

In at least one example, the system more legible, indicating which blocks the robot wants to move to and how it wants to get there.

In general, during testing, users quickly notice when the robot is trying to grab the block in an unobtrusive way. They also sometimes note a slight inaccuracy during the robot's grasps and approaches but usually adjust to this themselves. After the second round of experiments, when they were shown how to grasp the objects, the system was more reliable and easier to work with.

The present document describes embodiments of a system that enables human-robot handovers by classifying different types of grasp. Other embodiments make the planning system more flexible and support general grasp types by training a neural network to produce a grasp from the point cloud of the human hand holding the object. Variations of these techniques can be applied to many other types of human-robot collaboration such as medical operations, manufacturing, and personal care work.

Figure 12:
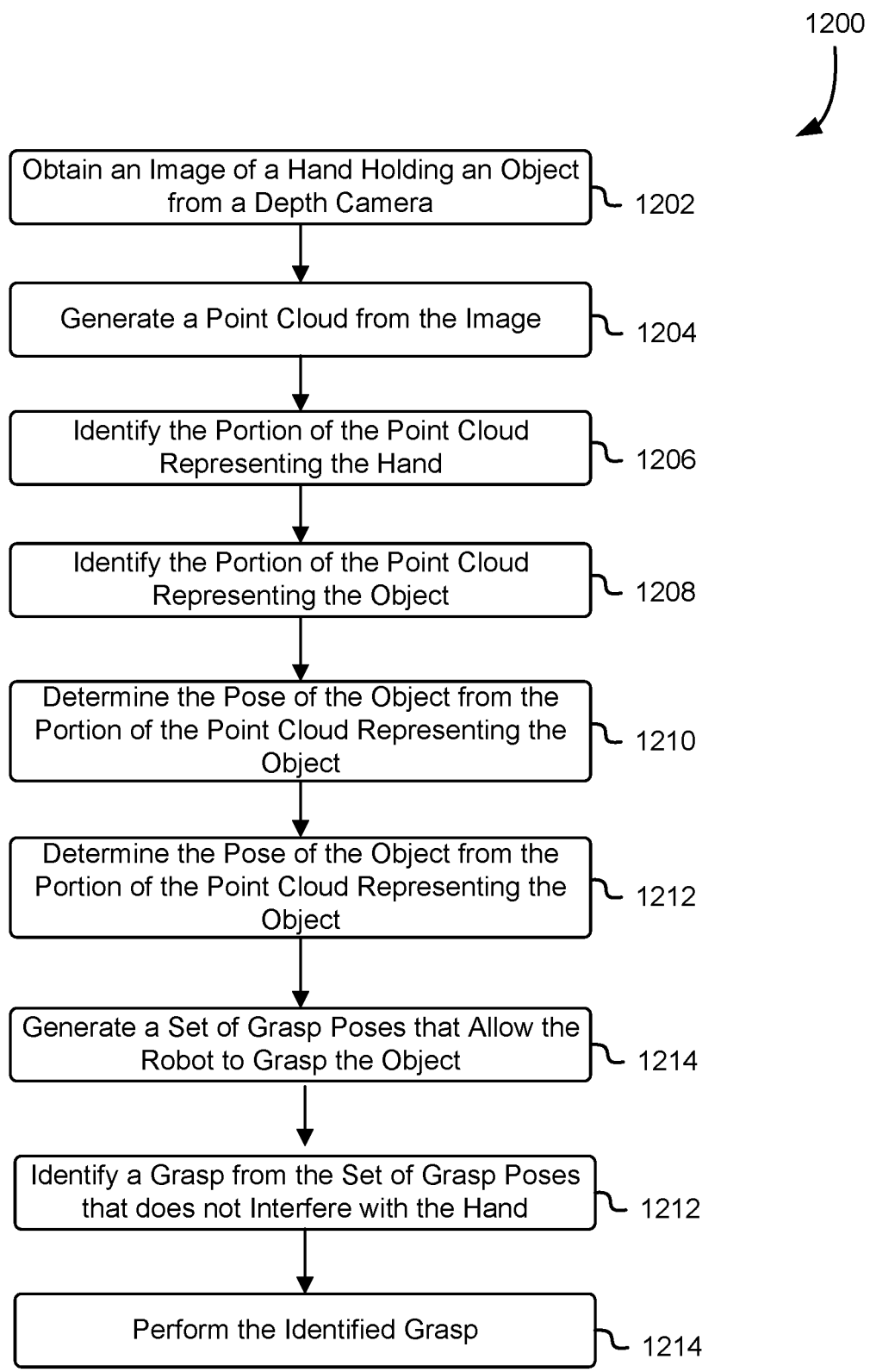
FIG. 12 illustrates an example of a process that, as a result of being performed by a computer system, performs a transfer of an object between a robot and a human hand, in accordance with an embodiment.

FIG. 12 illustrates an example of a process that, as a result of being performed by a computer system, performs a transfer of an object between a robot and a human hand, in accordance with an embodiment. At least one embodiment may be implemented using a computer system, processor, GPU, or machine-learning network such as those illustrated in FIGS. 13-41 and described in the associated description. At least one embodiment is implemented using a processor that reads executable instructions from computer-readable memory storing instructions that, as a result of being executed by one or more processors of the computer system, cause the computer system to perform the operations described below.

In at least one embodiment, at block 1202, an image of a hand holding an object is obtained using a depth camera. In various examples, a depth camera can be a binocular RGB camera, a medical imaging device such as a three-dimensional x-ray, ultrasound, CAT scan, or magnetic resonance imaging image ("MRI"). In some examples, such as those involving self-driving cars, the image may be an image generated with a radar imaging device or a laser imaging device ("LIDAR"). In at least one embodiment, at block 1204, the system generates a point cloud from the image. The point cloud provides a three-dimensional set of points that represent the object and the hand. In one example, the point cloud is a colored point cloud from an RGB depth camera.

In at least one example, at block 1206, the system processes the point cloud and identifies a first portion of the point cloud that represents the hand that is holding the object. At block 1208, the system identifies a second portion of the point cloud that represents the object. Using the appropriate portions of the point cloud, at block 1210, in at least one example determines the pose of the object from the second portion of the point cloud, and determines 1212 the pose of the hand from the first portion of the point cloud. In one example, the pose of the hand includes identifying a skeletal structure of the hand which includes joints and segment lengths for the fingers of the hand.

In at least one embodiment, at block 1214, the system generates a set of grasp poses for a robotic gripper that would allow the gripper to grasp the object. This may be accomplished using the portion of the point cloud that represents the object and/or the object pose information determined at block 1210. In at least one embodiment, the object pose information includes the size, shape, and orientation of the object in space. The orientation of the object can include vertical and horizontal rotation and inclination. The set of grasp poses may include many poses that would interfere with the human hand but would nonetheless be preferred if the hand is not present.

Therefore, at block 1216, the system identifies a particular grasp from the set of grasp poses but does not interfere with the hand. Interference with the hand means touching the hand or pinching the hand or a portion of the hand with the robotic gripper. In at least one embodiment, the system chooses a grasp that meets a sufficient standard of security for the object while maximizing the distance from the fingers of the hand. After identifying an appropriate grasp that does not touch the hand, at block 1218, the system directs the robot to perform the identified grasp to take the object from the human hand.

Inference and Training Logic

Figure 13A:
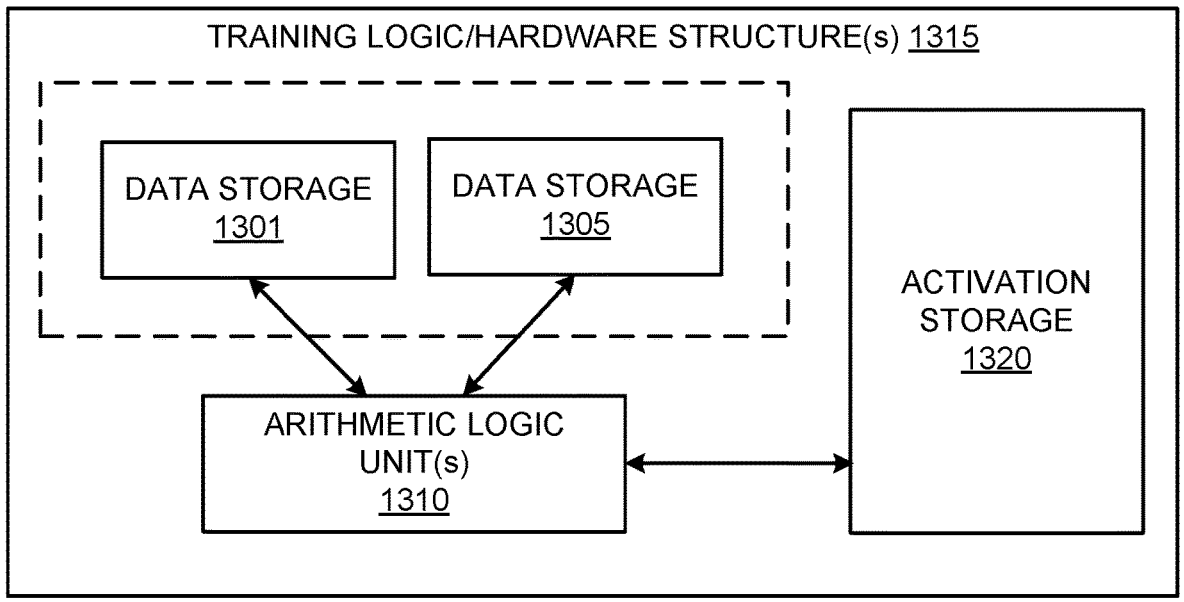
FIG. 13A illustrates inference and/or training logic, according to at least one embodiment.

FIG. 13A illustrates inference and/or training logic 1315 used to perform inferencing and/or training operations associated with one or more embodiments. Details regarding inference and/or training logic 1315 are provided below in conjunction with FIGS. 13A and/or 13B.

In at least one embodiment, inference and/or training logic 1315 may include, without limitation, code and/or data storage 1301 to store forward and/or output weight and/or input/output data, and/or other parameters to configure neurons or layers of a neural network trained and/or used for inferencing in aspects of one or more embodiments. In at least one embodiment, training logic 1315 may include, or be coupled to code and/or data storage 1301 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment code and/or data storage 1301 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1301 may be included with other on-chip or off-chip data storage, including a processor's L1, L2, or L3 cache or system memory.

In at least one embodiment, any portion of code and/or data storage 1301 may be internal or external to one or more processors or other hardware logic devices or circuits. In at least one embodiment, code and/or code and/or data storage 1301 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1301 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1315 may include, without limitation, a code and/or data storage 1305 to store backward and/or output weight and/or input/output data corresponding to neurons or layers of a neural network trained and/or used for inferencing in aspects of one or more embodiments. In at least one embodiment, code and/or data storage 1305 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1315 may include, or be coupled to code and/or data storage 1305 to store graph code or other software to control timing and/or order, in which weight and/or other parameter information is to be loaded to configure, logic, including integer and/or floating point units (collectively, arithmetic logic units (ALUs)). In at least one embodiment, code, such as graph code, loads weight or other parameter information into processor ALUs based on an architecture of a neural network to which the code corresponds. In at least one embodiment, any portion of code and/or data storage 1305 may be included with other on-chip or off-chip data storage, including a processor's L1, L2, or L3 cache or system memory. In at least one embodiment, any portion of code and/or data storage 1305 may be internal or external to on one or more processors or other hardware logic devices or circuits. In at least one embodiment, code and/or data storage 1305 may be cache memory, DRAM, SRAM, non-volatile memory (e.g., Flash memory), or other storage. In at least one embodiment, choice of whether code and/or data storage 1305 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1301 and code and/or data storage 1305 may be separate storage structures. In at least one embodiment, code and/or data storage 1301 and code and/or data storage 1305 may be same storage structure. In at least one embodiment, code and/or data storage 1301 and code and/or data storage 1305 may be partially same storage structure and partially separate storage structures. In at least one embodiment, any portion of code and/or data storage 1301 and code and/or data storage 1305 may be included with other on-chip or off-chip data storage, including a processor's L1, L2, or L3 cache or system memory.

In at least one embodiment, inference and/or training logic 1315 may include, without limitation, one or more arithmetic logic unit(s) ("ALU(s)") 1310, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1320 that are functions of input/output and/or weight parameter data stored in code and/or data storage 1301 and/or code and/or data storage 1305. In at least one embodiment, activations stored in activation storage 1320 are generated according to linear algebraic and or matrix-based mathematics performed by ALU(s) 1310 in response to performing instructions or other code, wherein weight values stored in code and/or data storage 1305 and/or data 1301 are used as operands along with other values, such as bias values, gradient information, momentum values, or other parameters or hyperparameters, any or all of which may be stored in code and/or data storage 1305 or code and/or data storage 1301 or another storage on or off-chip.

In at least one embodiment, ALU(s) 1310 are included within one or more processors or other hardware logic devices or circuits, whereas in another embodiment, ALUs 1310 may be external to a processor or other hardware logic device or circuit that uses them (e.g., a co-processor). In at least one embodiment, ALUs 1310 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1301, code and/or data storage 1305, and activation storage 1320 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1320 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1320 may be cache memory, DRAM, SRAM, non-volatile memory (e.g., Flash memory), or other storage. In at least one embodiment, activation storage 1320 may be completely or partially within or external to one or more processors or other logical circuits. In at least one embodiment, choice of whether activation storage 1320 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1315 illustrated in FIG. 13A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1315 illustrated in FIG. 13A may be used in conjunction with central processing unit ("CPU") hardware, graphics processing unit ("GPU") hardware or other hardware, such as field programmable gate arrays ("FPGAs").

Figure 13B:
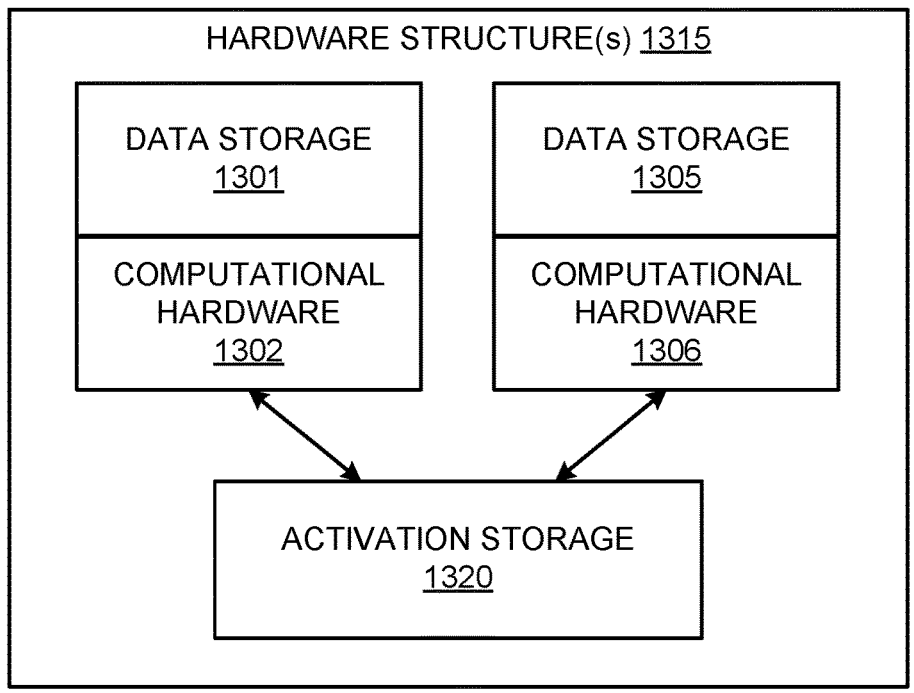
FIG. 13B illustrates inference and/or training logic, according to at least one embodiment.

FIG. 13B illustrates inference and/or training logic 1315, according to at least one embodiment various. In at least one embodiment, inference and/or training logic 1315 may include, without limitation, hardware logic in which computational resources are dedicated or otherwise exclusively used in conjunction with weight values or other information corresponding to one or more layers of neurons within a neural network. In at least one embodiment, inference and/or training logic 1315 illustrated in FIG. 13B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1315 illustrated in FIG. 13B may be used in conjunction with central processing unit (CPU) hardware, graphics processing unit (GPU) hardware or other hardware, such as field programmable gate arrays (FPGAs). In at least one embodiment, inference and/or training logic 1315 includes, without limitation, code and/or data storage 1301 and code and/or data storage 1305, which may be used to store code (e.g., graph code), weight values and/or other information, including bias values, gradient information, momentum values, and/or other parameter or hyperparameter information. In at least one embodiment illustrated in FIG. 13B, each of code and/or data storage 1301 and code and/or data storage 1305 is associated with a dedicated computational resource, such as computational hardware 1302 and computational hardware 1306, respectively. In at least one embodiment, each of computational hardware 1302 and computational hardware 1306 comprises one or more ALUs that perform mathematical functions, such as linear algebraic functions, only on information stored in code and/or data storage 1301 and code and/or data storage 1305, respectively, result of which is stored in activation storage 1320.

In at least one embodiment, each of code and/or data storage 1301 and 1305 and corresponding computational hardware 1302 and 1306, respectively, correspond to different layers of a neural network, such that resulting activation from one "storage/computational pair 1301/1302" of code and/or data storage 1301 and computational hardware 1302 is provided as an input to next "storage/computational pair 1305/1306" of code and/or data storage 1305 and computational hardware 1306, in order to mirror conceptual organization of a neural network. In at least one embodiment, each of storage/computational pairs 1301/1302 and 1305/1306 may correspond to more than one neural network layer. In at least one embodiment, additional storage/computation pairs (not shown) subsequent to or in parallel with storage computation pairs 1301/1302 and 1305/1306 may be included in inference and/or training logic 1315.

Neural Network Training and Deployment

Figure 14:
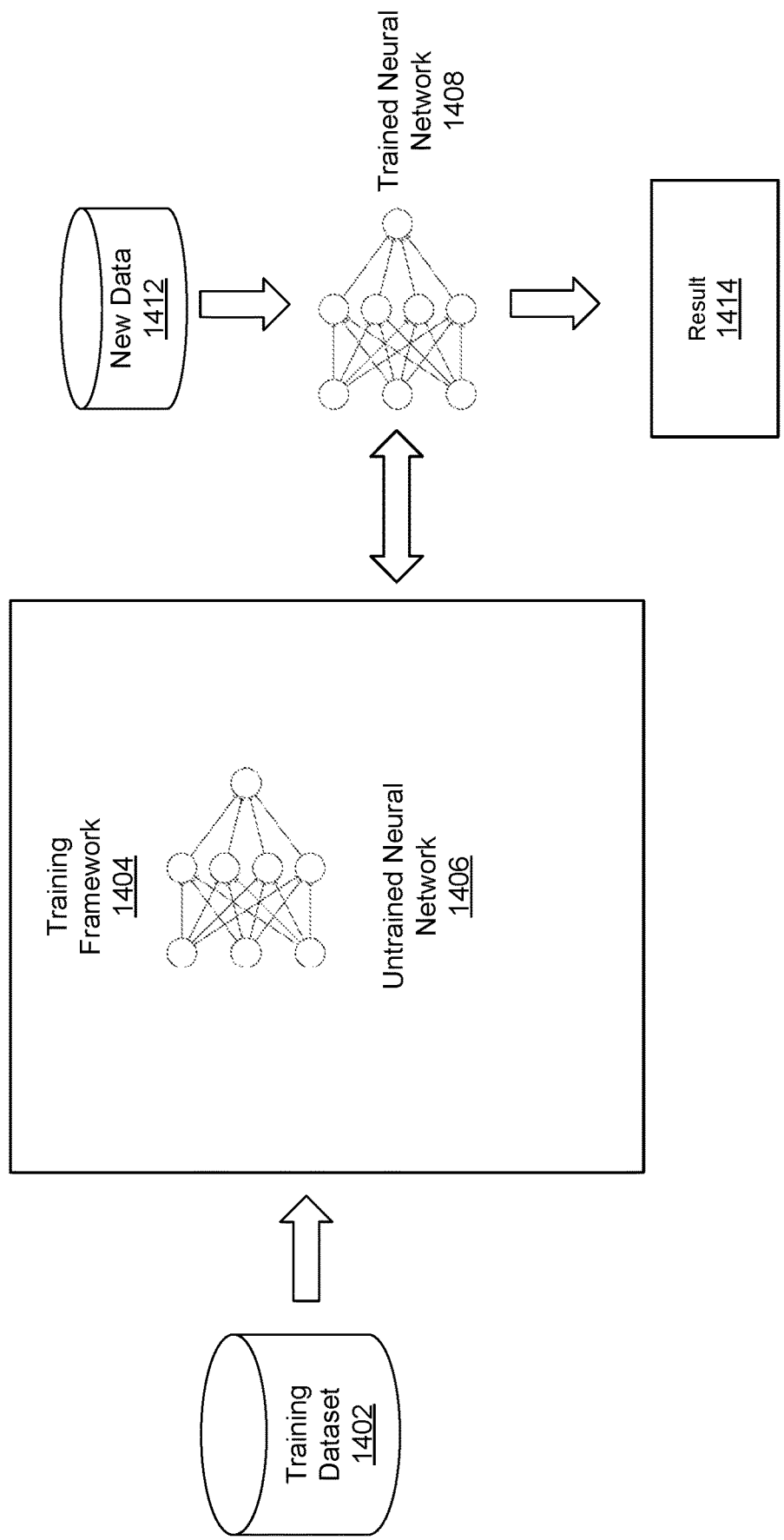
FIG. 14 illustrates training and deployment of a neural network, according to at least one embodiment.

FIG. 14 illustrates training and deployment of a deep neural network, according to at least one embodiment. In at least one embodiment, untrained neural network 91406 is trained using a training dataset 1402. In at least one embodiment, training framework 1404 is a PyTorch framework, whereas in other embodiments, training framework 1404 is a Tensorflow, Boost, Caffe, Microsoft Cognitive Toolkit/CNTK, MXNet, Chainer, Keras, Deeplearning4j, or other training framework. In at least one embodiment training framework 1404 trains an untrained neural network 1406 and enables it to be trained using processing resources described herein to generate a trained neural network 1408. In at least one embodiment, weights may be chosen randomly or by pre-training using a deep belief network. In at least one embodiment, training may be performed in either a supervised, partially supervised, or unsupervised manner.

In at least one embodiment, untrained neural network 1406 is trained using supervised learning, wherein training dataset 1402 includes an input paired with a desired output for an input, or where training dataset 1402 includes input having a known output and an output of neural network 1406 is manually graded. In at least one embodiment, untrained neural network 1406 is trained in a supervised manner processes inputs from training dataset 1402 and compares resulting outputs against a set of expected or desired outputs. In at least one embodiment, errors are then propagated back through untrained neural network 1406. In at least one embodiment, training framework 1404 adjusts weights that control untrained neural network 1406. In at least one embodiment, training framework 1404 includes tools to monitor how well untrained neural network 1406 is converging towards a model, such as trained neural network 1408, suitable to generating correct answers, such as in result 1414, based on known input data, such as new data 1412. In at least one embodiment, training framework 1404 trains untrained neural network 1406 repeatedly while adjust weights to refine an output of untrained neural network 1406 using a loss function and adjustment algorithm, such as stochastic gradient descent. In at least one embodiment, training framework 1404 trains untrained neural network 1406 until untrained neural network 1406 achieves a desired accuracy. In at least one embodiment, trained neural network 1408 can then be deployed to implement any number of machine learning operations.

In at least one embodiment, untrained neural network 1406 is trained using unsupervised learning, wherein untrained neural network 1406 attempts to train itself using unlabeled data. In at least one embodiment, unsupervised learning training dataset 1402 will include input data without any associated output data or "ground truth" data. In at least one embodiment, untrained neural network 1406 can learn groupings within training dataset 1402 and can determine how individual inputs are related to untrained dataset 1402. In at least one embodiment, unsupervised training can be used to generate a self-organizing map, which is a type of trained neural network 1408 capable of performing operations useful in reducing dimensionality of new data 1412. In at least one embodiment, unsupervised training can also be used to perform anomaly detection, which allows identification of data points in a new dataset 1412 that deviate from normal patterns of new dataset 1412.

In at least one embodiment, semi-supervised learning may be used, which is a technique in which in training dataset 1402 includes a mix of labeled and unlabeled data. In at least one embodiment, training framework 1404 may be used to perform incremental learning, such as through transferred learning techniques. In at least one embodiment, incremental learning enables trained neural network 1408 to adapt to new data 1412 without forgetting knowledge instilled within network during initial training.

Data Center

Figure 15:
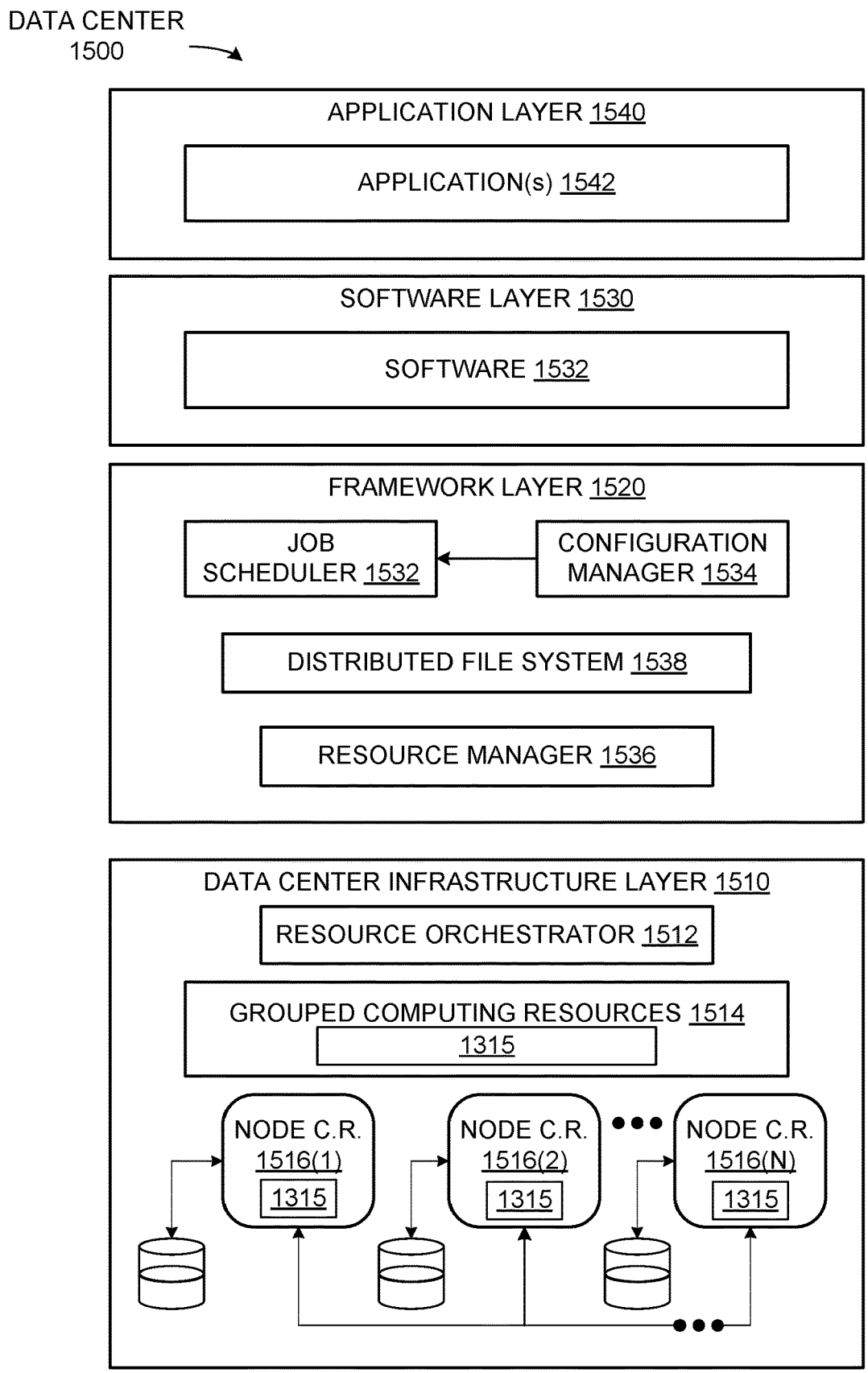
FIG. 15 illustrates an example data center system, according to at least one embodiment.

FIG. 15 illustrates an example data center 1500, in which at least one embodiment may be used. In at least one embodiment, data center 1500 includes a data center infrastructure layer 1510, a framework layer 1520, a software layer 1530 and an application layer 1540.

In at least one embodiment, as shown in FIG. 15, data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1516(1)-1516(N) may be a server having one or more of above-mentioned computing resources.

In at least one embodiment, grouped computing resources 1514 may include separate groupings of node C.R.s housed within one or more racks (not shown), or many racks housed in data centers at various geographical locations (also not shown). separate groupings of node C.R.s within grouped computing resources 1514 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1512 may configure or otherwise control one or more node C.R.s 1516(1)-1516(N) and/or grouped computing resources 1514. In at least one embodiment, resource orchestrator 1512 may include a software design infrastructure ("SDI") management entity for data center 1500. In at least one embodiment, resource orchestrator may include hardware, software or some combination thereof.

In at least one embodiment, as shown in FIG. 15, framework layer 1520 includes a job scheduler 1532, a configuration manager 1534, a resource manager 1536 and a distributed file system 1538. In at least one embodiment, framework layer 1520 may include a framework to support software 1532 of software layer 1530 and/or one or more application(s) 1542 of application layer 1540. In at least one embodiment, software 1532 or application(s) 1542 may respectively include web-based service software or applications, such as those provided by Amazon Web Services, Google Cloud and Microsoft Azure. In at least one embodiment, framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1532 may include a Spark driver to facilitate scheduling of workloads supported by various layers of data center 1500. In at least one embodiment, configuration manager 1534 may be capable of configuring different layers such as software layer 1530 and framework layer 1520 including Spark and distributed file system 1538 for supporting large-scale data processing. In at least one embodiment, resource manager 1536 may be capable of managing clustered or grouped computing resources mapped to or allocated for support of distributed file system 1538 and job scheduler 1532. In at least one embodiment, clustered or grouped computing resources may include grouped computing resource 1514 at data center infrastructure layer 1510. In at least one embodiment, resource manager 1536 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. one or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516(1)-1516(N), grouped computing resources 1514, and/or distributed file system 1538 of framework layer 1520. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. In at least one embodiment, self-modifying actions may relieve a data center operator of data center 1500 from making possibly bad configuration decisions and possibly avoiding underutilized and/or poor performing portions of a data center.

In at least one embodiment, data center 1500 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1500. In at least one embodiment, trained machine learning models corresponding to one or more neural networks may be used to infer or predict information using resources described above with respect to data center 1500 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 15 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Autonomous Vehicle

Figure 16A:
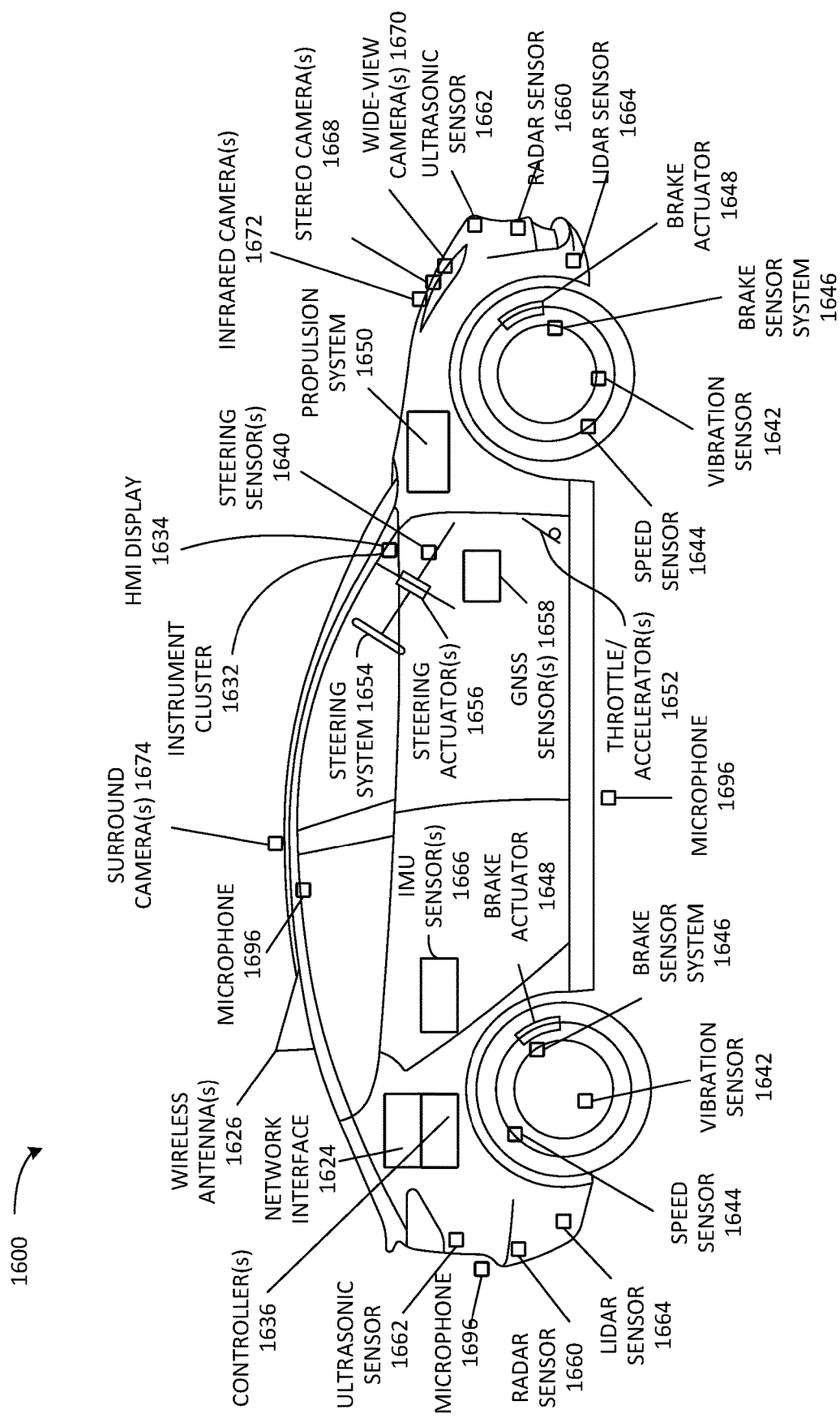
FIG. 16A illustrates an example of an autonomous vehicle, according to at least one embodiment.

FIG. 16A illustrates an example of an autonomous vehicle 1600, according to at least one embodiment. In at least one embodiment, autonomous vehicle 1600 (alternatively referred to herein as "vehicle 1600") may be, without limitation, a passenger vehicle, such as a car, a truck, a bus, and/or another type of vehicle that accommodates one or more passengers. In at least one embodiment, vehicle 1600 may be a semi-tractor-trailer truck used for hauling cargo. In at least one embodiment, vehicle 1600 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1600 may be capable of functionality in accordance with one or more of level 1-level 5 of autonomous driving levels. For example, in at least one embodiment, vehicle 1600 may be capable of conditional automation (Level 3), high automation (Level 4), and/or full automation (Level 5), depending on embodiment.

Various embodiments of the human-robot interaction system may be integrated into a vehicle to aid in tasks such as package delivery and warehouse automation. For example, an embodiment may be used to receive a parcel from a human for delivery, or to receive physical cash payment for a customer.

In at least one embodiment, vehicle 1600 may include, without limitation, components such as a chassis, a vehicle body, wheels (e.g., 2, 4, 6, 8, 18, etc.), tires, axles, and other components of a vehicle. In at least one embodiment, vehicle 1600 may include, without limitation, a propulsion system 1650, such as an internal combustion engine, hybrid electric power plant, an all-electric engine, and/or another propulsion system type. In at least one embodiment, propulsion system 1650 may be connected to a drive train of vehicle 1600, which may include, without limitation, a transmission, to enable propulsion of vehicle 1600. In at least one embodiment, propulsion system 1650 may be controlled in response to receiving signals from a throttle/accelerator(s) 1652.

In at least one embodiment, a steering system 1654, which may include, without limitation, a steering wheel, is used to steer a vehicle 1600 (e.g., along a desired path or route) when a propulsion system 1650 is operating (e.g., when vehicle is in motion). In at least one embodiment, a steering system 1654 may receive signals from steering actuator(s) 1656. steering wheel may be optional for full automation (Level 5) functionality. In at least one embodiment, a brake sensor system 1646 may be used to operate vehicle brakes in response to receiving signals from brake actuator(s) 1648 and/or brake sensors.

In at least one embodiment, controller(s) 1636, which may include, without limitation, one or more system on chips ("SoCs") (not shown in FIG. 16A) and/or graphics processing unit(s) ("GPU(s)"), provide signals (e.g., representative of commands) to one or more components and/or systems of vehicle 1600. For instance, in at least one embodiment, controller(s) 1636 may send signals to operate vehicle brakes via brake actuators 1648, to operate steering system 1654 via steering actuator(s) 1656, to operate propulsion system 1650 via throttle/accelerator(s) 1652. Controller(s) 1636 may include one or more onboard (e.g., integrated) computing devices (e.g., supercomputers) that process sensor signals, and output operation commands (e.g., signals representing commands) to enable autonomous driving and/or to assist a human driver in driving vehicle 1600. In at least one embodiment, controller(s) 1636 may include a first controller 1636 for autonomous driving functions, a second controller 1636 for functional safety functions, a third controller 1636 for artificial intelligence functionality (e.g., computer vision), a fourth controller 1636 for infotainment functionality, a fifth controller 1636 for redundancy in emergency conditions, and/or other controllers. In at least one embodiment, a single controller 1636 may handle two or more of above functionalities, two or more controllers 1636 may handle a single functionality, and/or any combination thereof.

In at least one embodiment, controller(s) 1636 provide signals for controlling one or more components and/or systems of vehicle 1600 in response to sensor data received from one or more sensors (e.g., sensor inputs). In at least one embodiment, sensor data may be received from, for example and without limitation, global navigation satellite systems ("GNSS") sensor(s) 1658 (e.g., Global Positioning System sensor(s)), RADAR sensor(s) 1660, ultrasonic sensor(s) 1662, LIDAR sensor(s) 1664, inertial measurement unit ("IMU") sensor(s) 1666 (e.g., accelerometer(s), gyroscope(s), magnetic compass(es), magnetometer(s), etc.), microphone(s) 1696, stereo camera(s) 1668, wide-view camera(s) 1670 (e.g., fisheye cameras), infrared camera(s) 1672, surround camera(s) 1674 (e.g., 360 degree cameras), long-range cameras (not shown in FIG. 16A), mid-range camera(s) (not shown in FIG. 16A), speed sensor(s) 1644 (e.g., for measuring speed of vehicle 1600), vibration sensor(s) 1642, steering sensor(s) 1640, brake sensor(s) (e.g., as part of brake sensor system 1646), and/or other sensor types.

In at least one embodiment, one or more of controller(s) 1636 may receive inputs (e.g., represented by input data) from an instrument cluster 1632 of vehicle 1600 and provide outputs (e.g., represented by output data, display data, etc.) via a human-machine interface ("HMI") display 1634, an audible annunciator, a loudspeaker, and/or via other components of vehicle 1600. In at least one embodiment, outputs may include information such as vehicle velocity, speed, time, map data (e.g., a High Definition map (not shown in FIG. 16A), location data (e.g., vehicle's 1600 location, such as on a map), direction, location of other vehicles (e.g., an occupancy grid), information about objects and status of objects as perceived by controller(s) 1636, etc. For example, in at least one embodiment, HMI display 1634 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1600 further includes a network interface 1624 which may use wireless antenna(s) 1626 and/or modem(s) to communicate over one or more networks. For example, in at least one embodiment, network interface 1624 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1626 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 16A for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 16B:
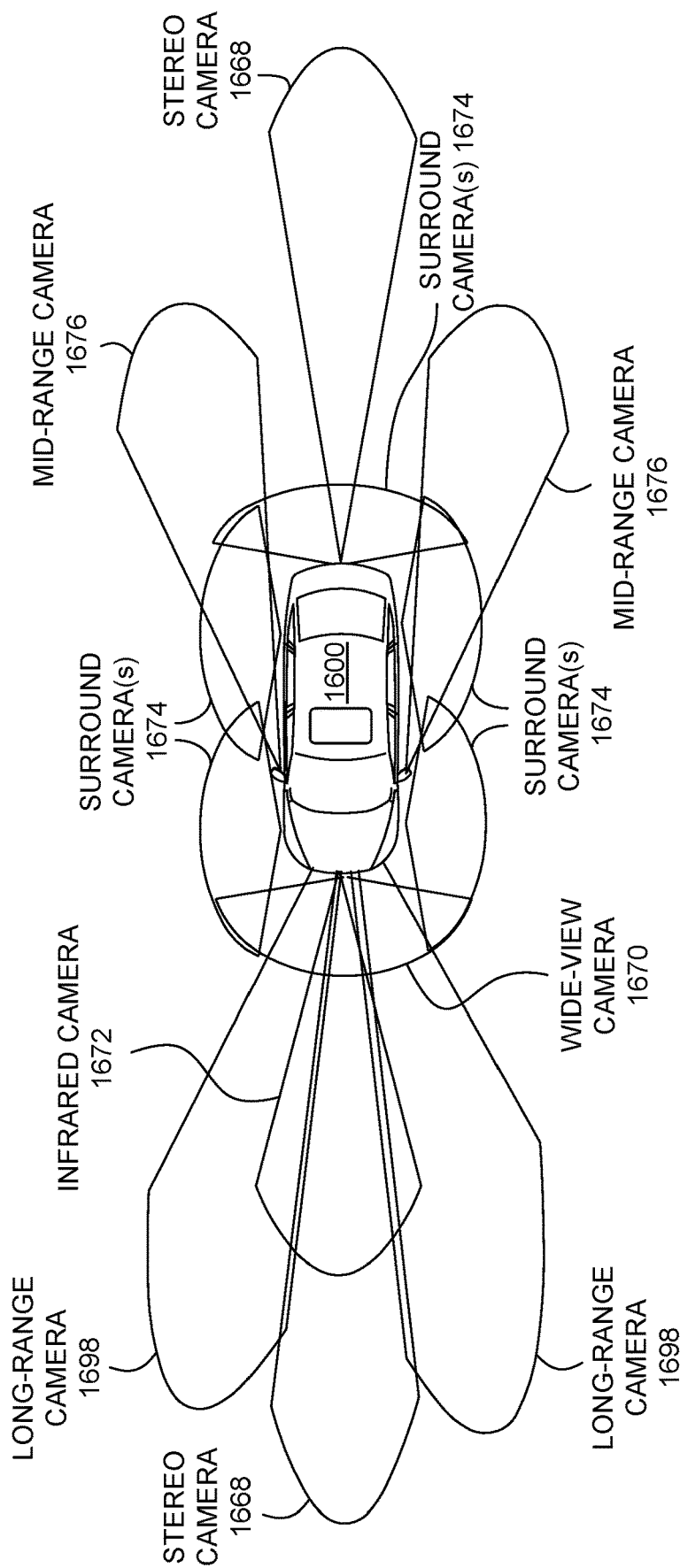
FIG. 16B illustrates an example of camera locations and fields of view for the autonomous vehicle of FIG. 16A, according to at least one embodiment.

FIG. 16B illustrates an example of camera locations and fields of view for autonomous vehicle 1600 of FIG. 16A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1600.

In at least one embodiment, camera types for cameras may include, but are not limited to, digital cameras that may be adapted for use with components and/or systems of vehicle 1600. Camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on emfbodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cabIn at least one embodiment.

In at least one embodiment, cameras with a field of view that include portions of environment in front of vehicle 1600 (e.g., front-facing cameras) may be used for surround view, to help identify forward facing paths and obstacles, as well as aid in, with help of one or more of controllers 1636 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1670 may be used to perceive objects coming into view from periphery (e.g., pedestrians, crossing traffic or bicycles). Although only one wide-view camera 1670 is illustrated in FIG. 16B, in other embodiments, there may be any number (including zero) of wide-view camera(s) 1670 on vehicle 1600. In at least one embodiment, any number of long-range camera(s) 1698 (e.g., a long-view stereo camera pair) may be used for depth-based object detection, especially for objects for which a neural network has not yet been trained. In at least one embodiment, long-range camera(s) 1698 may also be used for object detection and classification, as well as basic object tracking.

In at least one embodiment, any number of stereo camera(s) 1668 may also be included in a front-facing configuration. In at least one embodiment, one or more of stereo camera(s) 1668 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1600, including a distance estimate for all points in image. In at least one embodiment, one or more of stereo camera(s) 1668 may include, without limitation, compact stereo vision sensor(s) that may include, without limitation, two camera lenses (one each on left and right) and an image processing chip that may measure distance from vehicle 1600 to target object and use generated information (e.g., metadata) to activate autonomous emergency braking and lane departure warning functions. In at least one embodiment, other types of stereo camera(s) 1668 may be used in addition to, or alternatively from, those described herein.

In at least one embodiment, cameras with a field of view that include portions of environment to side of vehicle 1600 (e.g., side-view cameras) may be used for surround view, providing information used to create and update occupancy grid, as well as to generate side impact collision warnings. For example, in at least one embodiment, surround camera(s) 1674 (e.g., four surround cameras 1674 as illustrated in FIG. 16B) could be positioned on vehicle 1600. Surround camera(s) 1674 may include, without limitation, any number and combination of wide-view camera(s) 1670, fisheye camera(s), 360 degree camera(s), and/or like. For instance, in at least one embodiment, four fisheye cameras may be positioned on front, rear, and sides of vehicle 1600. In at least one embodiment, vehicle 1600 may use three surround camera(s) 1674 (e.g., left, right, and rear), and may leverage one or more other camera(s) (e.g., a forward-facing camera) as a fourth surround-view camera.

In at least one embodiment, cameras with a field of view that include portions of environment to rear of vehicle 1600 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1698 and/or mid-range camera(s) 1676, stereo camera(s) 1668), infrared camera(s) 1672, etc.), as described herein.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 16B for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 16C:
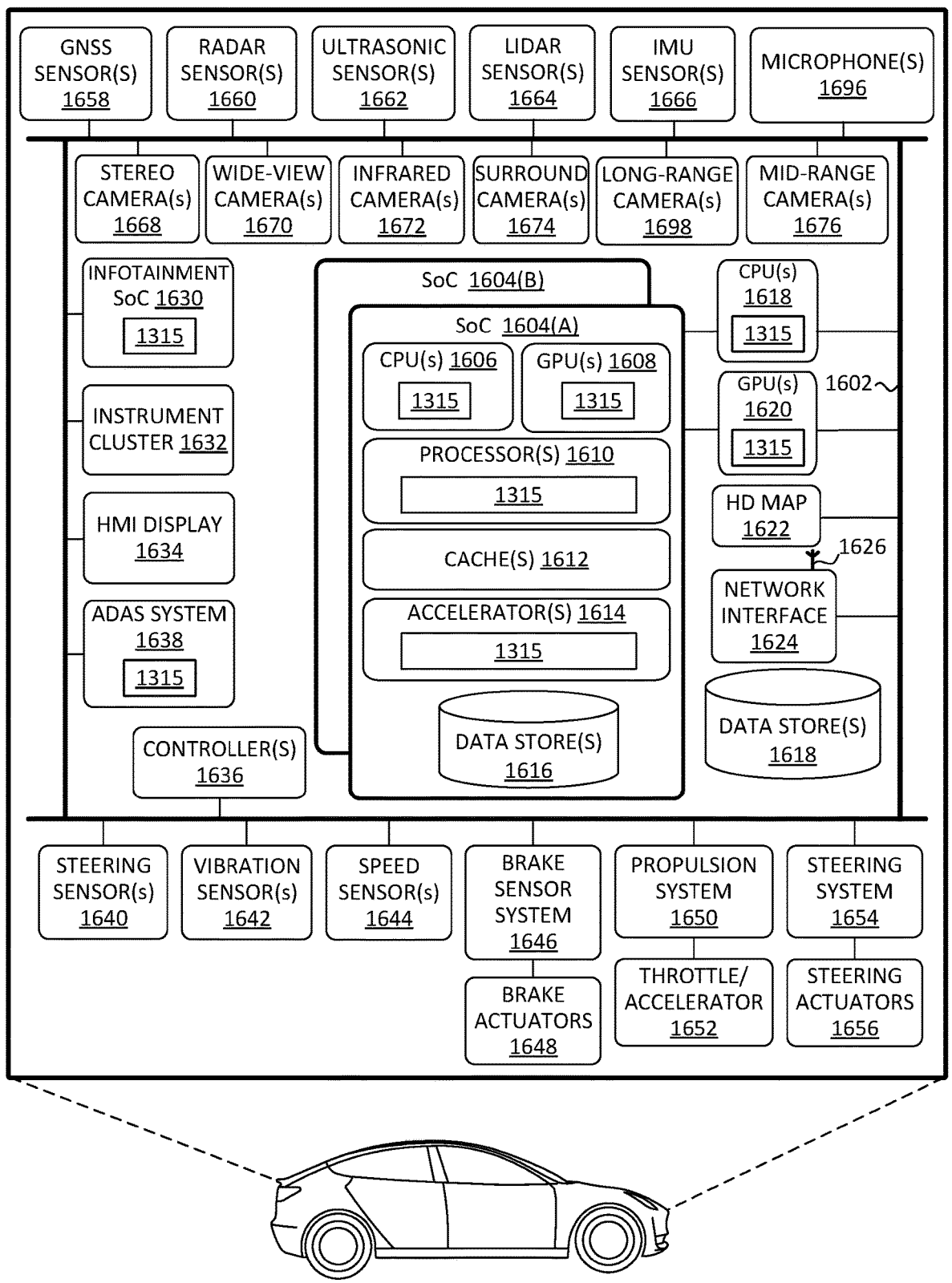
FIG. 16C is a block diagram illustrating an example system architecture for the autonomous vehicle of FIG. 16A, according to at least one embodiment.

FIG. 16C is a block diagram illustrating an example system architecture for autonomous vehicle 1600 of FIG. 16A, according to at least one embodiment. In at least one embodiment, each of components, features, and systems of vehicle 1600 in FIG. 16C are illustrated as being connected via a bus 1602. In at least one embodiment, bus 1602 may include, without limitation, a CAN data interface (alternatively referred to herein as a "CAN bus"). In at least one embodiment, a CAN may be a network inside vehicle 1600 used to aid in control of various features and functionality of vehicle 1600, such as actuation of brakes, acceleration, braking, steering, windshield wipers, etc. In at least one embodiment, bus 1602 may be configured to have dozens or even hundreds of nodes, each with its own unique identifier (e.g., a CAN ID). In at least one embodiment, bus 1602 may be read to find steering wheel angle, ground speed, engine revolutions per minute ("RPMs"), button positions, and/or other vehicle status indicators. In at least one embodiment, bus 1602 may be a CAN bus that is ASIL B compliant.

In at least one embodiment, in addition to, or alternatively from CAN, FlexRay and/or Ethernet may be used. In at least one embodiment, there may be any number of busses 1602, which may include, without limitation, zero or more CAN busses, zero or more FlexRay busses, zero or more Ethernet busses, and/or zero or more other types of busses using a different protocol. In at least one embodiment, two or more busses 1602 may be used to perform different functions, and/or may be used for redundancy. For example, a first bus 1602 may be used for collision avoidance functionality and a second bus 1602 may be used for actuation control. In at least one embodiment, each bus 1602 may communicate with any of components of vehicle 1600, and two or more busses 1602 may communicate with same components. In at least one embodiment, each of any number of system(s) on chip(s) ("SoC(s)") 1604, each of controller(s) 1636, and/or each computer within vehicle may have access to same input data (e.g., inputs from sensors of vehicle 1600), and may be connected to a common bus, such CAN bus.

In at least one embodiment, vehicle 1600 may include one or more controller(s) 1636, such as those described herein with respect to FIG. 16A. Controller(s) 1636 may be used for a variety of functions. In at least one embodiment, controller(s) 1636 may be coupled to any of various other components and systems of vehicle 1600, and may be used for control of vehicle 1600, artificial intelligence of vehicle 1600, infotainment for vehicle 1600, and/or like.

In at least one embodiment, vehicle 1600 may include any number of SoCs 1604. Each of SoCs 1604 may include, without limitation, central processing units ("CPU(s)") 1606, graphics processing units ("GPU(s)") 1608, processor(s) 1610, cache(s) 1612, accelerator(s) 1614, data store(s) 1616, and/or other components and features not illustrated. In at least one embodiment, SoC(s) 1604 may be used to control vehicle 1600 in a variety of platforms and systems. For example, in at least one embodiment, SoC(s) 1604 may be combined in a system (e.g., system of vehicle 1600) with a High Definition ("HD") map 1622 which may obtain map refreshes and/or updates via network interface 1624 from one or more servers (not shown in FIG. 16C).

In at least one embodiment, CPU(s) 1606 may include a CPU cluster or CPU complex (alternatively referred to herein as a "CCPLEX"). In at least one embodiment, CPU(s) 1606 may include multiple cores and/or level two ("L2") caches. For instance, in at least one embodiment, CPU(s) 1606 may include eight cores in a coherent multi-processor configuration. In at least one embodiment, CPU(s) 1606 may include four dual-core clusters where each cluster has a dedicated L2 cache (e.g., a 2 MB L2 cache). In at least one embodiment, CPU(s) 1606 (e.g., CCPLEX) may be configured to support simultaneous cluster operation enabling any combination of clusters of CPU(s) 1606 to be active at any given time.

In at least one embodiment, one or more of CPU(s) 1606 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1606 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1608 may include an integrated GPU (alternatively referred to herein as an "iGPU"). In at least one embodiment, GPU(s) 1608 may be programmable and may be efficient for parallel workloads. In at least one embodiment, GPU(s) 1608, in at least one embodiment, may use an enhanced tensor instruction set. In on embodiment, GPU(s) 1608 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1608 may include at least eight streaming microprocessors. In at least one embodiment, GPU(s) 1608 may use compute application programming interface(s) (API(s)). In at least one embodiment, GPU(s) 1608 may use one or more parallel computing platforms and/or programming models (e.g., NVIDIA's CUDA).

In at least one embodiment, one or more of GPU(s) 1608 may be power-optimized for best performance in automotive and embedded use cases. For example, in on embodiment, GPU(s) 1608 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1608 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1608 may include unified memory technology. In at least one embodiment, address translation services ("ATS") support may be used to allow GPU(s) 1608 to access CPU(s) 1606 page tables directly. In at least one embodiment, embodiment, when GPU(s) 1608 memory management unit ("MMU") experiences a miss, an address translation request may be transmitted to CPU(s) 1606. In response, CPU(s) 1606 may look in its page tables for virtual-to-physical mapping for address and transmits translation back to GPU(s) 1608, in at least one embodiment. In at least one embodiment, unified memory technology may allow a single unified virtual address space for memory of both CPU(s) 1606 and GPU(s) 1608, thereby simplifying GPU(s) 1608 programming and porting of applications to GPU(s) 1608.

In at least one embodiment, GPU(s) 1608 may include any number of access counters that may keep track of frequency of access of GPU(s) 1608 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1604 may include any number of cache(s) 1612, including those described herein. For example, in at least one embodiment, cache(s) 1612 could include a level three ("L3") cache that is available to both CPU(s) 1606 and GPU(s) 1608 (e.g., that is connected both CPU(s) 1606 and GPU(s) 1608). In at least one embodiment, cache(s) 1612 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1604 may include one or more accelerator(s) 1614 (e.g., hardware accelerators, software accelerators, or a combination thereof). In at least one embodiment, SoC(s) 1604 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1608 and to off-load some of tasks of GPU(s) 1608 (e.g., to free up more cycles of GPU(s) 1608 for performing other tasks). In at least one embodiment, accelerator(s) 1614 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1614 (e.g., hardware acceleration cluster) may include a deep learning accelerator(s) ("DLA"). DLA(s) may include, without limitation, one or more Tensor processing units ("TPUs") that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1696; a CNN for facial recognition and vehicle owner identification using data from camera sensors; and/or a CNN for security and/or safety related events.

In at least one embodiment, DLA(s) may perform any function of GPU(s) 1608, and by using an inference accelerator, for example, a designer may target either DLA(s) or GPU(s) 1608 for any function. For example, in at least one embodiment, designer may focus processing of CNNs and floating point operations on DLA(s) and leave other functions to GPU(s) 1608 and/or other accelerator(s) 1614.

In at least one embodiment, accelerator(s) 1614 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1638, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1606. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1614 (e.g., hardware acceleration cluster) may include a computer vision network on-chip and static random-access memory ("SRAM"), for providing a high-bandwidth, low latency SRAM for accelerator(s) 1614. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1604 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1614 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1600, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1666 that correlates with vehicle 1600 orientation, distance, 3D location estimates of object obtained from neural network and/or other sensors (e.g., LIDAR sensor(s) 1664 or RADAR sensor(s) 1660), among others.

In at least one embodiment, one or more of SoC(s) 1604 may include data store(s) 1616 (e.g., memory). In at least one embodiment, data store(s) 1616 may be on-chip memory of SoC(s) 1604, which may store neural networks to be executed on GPU(s) 1608 and/or DLA. In at least one embodiment, data store(s) 1616 may be large enough in capacity to store multiple instances of neural networks for redundancy and safety. In at least one embodiment, data store(s) 1612 may comprise L2 or L3 cache(s).

In at least one embodiment, one or more of SoC(s) 1604 may include any number of processor(s) 1610 (e.g., embedded processors). Processor(s) 1610 may include a boot and power management processor that may be a dedicated processor and subsystem to handle boot power and management functions and related security enforcement. In at least one embodiment, boot and power management processor may be a part of SoC(s) 1604 boot sequence and may provide runtime power management services. In at least one embodiment, boot power and management processor may provide clock and voltage programming, assistance in system low power state transitions, management of SoC(s) 1604 thermals and temperature sensors, and/or management of SoC(s) 1604 power states. In at least one embodiment, each temperature sensor may be implemented as a ring-oscillator whose output frequency is proportional to temperature, and SoC(s) 1604 may use ring-oscillators to detect temperatures of CPU(s) 1606, GPU(s) 1608, and/or accelerator(s) 1614. In at least one embodiment, if temperatures are determined to exceed a threshold, then boot and power management processor may enter a temperature fault routine and put SoC(s) 1604 into a lower power state and/or put vehicle 1600 into a chauffeur to safe stop mode (e.g., bring vehicle 1600 to a safe stop).

In at least one embodiment, processor(s) 1610 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1610 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1610 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1610 may further include a real-time camera engine that may include, without limitation, a dedicated processor subsystem for handling real-time camera management. In at least one embodiment, processor(s) 1610 may further include a high-dynamic range signal processor that may include, without limitation, an image signal processor that is a hardware engine that is part of camera processing pipeline.

In at least one embodiment, processor(s) 1610 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1670, surround camera(s) 1674, and/or on in-cabin monitoring camera sensor(s). In at least one embodiment, in-cabin monitoring camera sensor(s) are preferably monitored by a neural network running on another instance of SoC 1604, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1608 are not required to continuously render new surfaces. In at least one embodiment, when GPU(s) 1608 are powered on and active doing 3D rendering, video image compositor may be used to offload GPU(s) 1608 to improve performance and responsiveness.

In at least one embodiment, one or more of SoC(s) 1604 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1604 may further include an input/output controller(s) that may be controlled by software and may be used for receiving I/O signals that are uncommitted to a specific role.

In at least one embodiment, one or more of SoC(s) 1604 may further include a broad range of peripheral interfaces to enable communication with peripherals, audio encoders/decoders ("codecs"), power management, and/or other devices. SoC(s) 1604 may be used to process data from cameras (e.g., connected over Gigabit Multimedia Serial Link and Ethernet), sensors (e.g., LIDAR sensor(s) 1664, RADAR sensor(s) 1660, etc. that may be connected over Ethernet), data from bus 1602 (e.g., speed of vehicle 1600, steering wheel position, etc.), data from GNSS sensor(s) 1658 (e.g., connected over Ethernet or CAN bus), etc. In at least one embodiment, one or more of SoC(s) 1604 may further include dedicated high-performance mass storage controllers that may include their own DMA engines, and that may be used to free CPU(s) 1606 from routine data management tasks.

In at least one embodiment, SoC(s) 1604 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1604 may be faster, more reliable, and even more energy-efficient and space-efficient than conventional systems. For example, in at least one embodiment, accelerator(s) 1614, when combined with CPU(s) 1606, GPU(s) 1608, and data store(s) 1616, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1620) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1608.

In at least one embodiment, a CNN for facial recognition and vehicle owner identification may use data from camera sensors to identify presence of an authorized driver and/or owner of vehicle 1600. In at least one embodiment, an always on sensor processing engine may be used to unlock vehicle when owner approaches driver door and turn on lights, and, in security mode, to disable vehicle when owner leaves vehicle. In this way, SoC(s) 1604 provide for security against theft and/or carjacking.

In at least one embodiment, a CNN for emergency vehicle detection and identification may use data from microphones 1696 to detect and identify emergency vehicle sirens. In at least one embodiment, SoC(s) 1604 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1658. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1662, until emergency vehicle(s) passes.

In at least one embodiment, vehicle 1600 may include CPU(s) 1618 (e.g., discrete CPU(s), or dCPU(s)), that may be coupled to SoC(s) 1604 via a high-speed interconnect (e.g., PCIe). In at least one embodiment, CPU(s) 1618 may include an X86 processor, for example. CPU(s) 1618 may be used to perform any of a variety of functions, including arbitrating potentially inconsistent results between ADAS sensors and SoC(s) 1604, and/or monitoring status and health of controller(s) 1636 and/or an infotainment system on a chip ("infotainment SoC") 1630, for example.

In at least one embodiment, vehicle 1600 may include GPU(s) 1620 (e.g., discrete GPU(s), or dGPU(s)), that may be coupled to SoC(s) 1604 via a high-speed interconnect (e.g., NVIDIA's NVLINK). In at least one embodiment, GPU(s) 1620 may provide additional artificial intelligence functionality, such as by executing redundant and/or different neural networks, and may be used to train and/or update neural networks based at least in part on input (e.g., sensor data) from sensors of vehicle 1600.

In at least one embodiment, vehicle 1600 may further include network interface 1624 which may include, without limitation, wireless antenna(s) 1626 (e.g., one or more wireless antennas 1626 for different communication protocols, such as a cellular antenna, a Bluetooth antenna, etc.). In at least one embodiment, network interface 1624 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 160 and other vehicle and/or an indirect link may be established (e.g., across networks and over Internet). In at least one embodiment, direct links may be provided using a vehicle-to-vehicle communication link. Vehicle-to-vehicle communication link may provide vehicle 1600 information about vehicles in proximity to vehicle 1600 (e.g., vehicles in front of, on side of, and/or behind vehicle 1600). In at least one embodiment, aforementioned functionality may be part of a cooperative adaptive cruise control functionality of vehicle 1600.

In at least one embodiment, network interface 1624 may include an SoC that provides modulation and demodulation functionality and enables controller(s) 1636 to communicate over wireless networks. In at least one embodiment, network interface 1624 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1600 may further include data store(s) 1628 which may include, without limitation, off-chip (e.g., off SoC(s) 1604) storage. In at least one embodiment, data store(s) 1628 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1600 may further include GNSS sensor(s) 1658 (e.g., GPS and/or assisted GPS sensors), to assist in mapping, perception, occupancy grid generation, and/or path planning functions. In at least one embodiment, any number of GNSS sensor(s) 1658 may be used, including, for example and without limitation, a GPS using a USB connector with an Ethernet to Serial (e.g., RS-232) bridge.

In at least one embodiment, vehicle 1600 may further include RADAR sensor(s) 1660. RADAR sensor(s) 1660 may be used by vehicle 1600 for long-range vehicle detection, even in darkness and/or severe weather conditions. In at least one embodiment, RADAR functional safety levels may be ASIL B. RADAR sensor(s) 1660 may use CAN and/or bus 1602 (e.g., to transmit data generated by RADAR sensor(s) 1660) for control and to access object tracking data, with access to Ethernet to access raw data in some examples. In at least one embodiment, wide variety of RADAR sensor types may be used. For example, and without limitation, RADAR sensor(s) 1660 may be suitable for front, rear, and side RADAR use. In at least one embodiment, one or more of RADAR sensors(s) 1660 are Pulse Doppler RADAR sensor(s).

In at least one embodiment, RADAR sensor(s) 1660 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1660 may help in distinguishing between static and moving objects, and may be used by ADAS system 1638 for emergency brake assist and forward collision warning. Sensors 1660(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1600 surroundings at higher speeds with minimal interference from traffic in adjacent lanes. In at least one embodiment, other two antennae may expand field of view, making it possible to quickly detect vehicles entering or leaving vehicle's 1600 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1660 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1638 for blind spot detection and/or lane change assist.

In at least one embodiment, vehicle 1600 may further include ultrasonic sensor(s) 1662. Ultrasonic sensor(s) 1662, which may be positioned at front, back, and/or sides of vehicle 1600, may be used for park assist and/or to create and update an occupancy grid. In at least one embodiment, a wide variety of ultrasonic sensor(s) 1662 may be used, and different ultrasonic sensor(s) 1662 may be used for different ranges of detection (e.g., 2.5 m, 4 m). In at least one embodiment, ultrasonic sensor(s) 1662 may operate at functional safety levels of ASIL B.

In at least one embodiment, vehicle 1600 may include LIDAR sensor(s) 1664. LIDAR sensor(s) 1664 may be used for object and pedestrian detection, emergency braking, collision avoidance, and/or other functions. In at least one embodiment, LIDAR sensor(s) 1664 may be functional safety level ASIL B. In at least one embodiment, vehicle 1600 may include multiple LIDAR sensors 1664 (e.g., two, four, six, etc.) that may use Ethernet (e.g., to provide data to a Gigabit Ethernet switch).

In at least one embodiment, LIDAR sensor(s) 1664 may be capable of providing a list of objects and their distances for a 360-degree field of view. In at least one embodiment, commercially available LIDAR sensor(s) 1664 may have an advertised range of approximately 100 m, with an accuracy of 2 cm-3 cm, and with support for a 100 Mbps Ethernet connection, for example. In at least one embodiment, one or more non-protruding LIDAR sensors 1664 may be used. In such an embodiment, LIDAR sensor(s) 1664 may be implemented as a small device that may be embedded into front, rear, sides, and/or corners of vehicle 1600. In at least one embodiment, LIDAR sensor(s) 1664, in such an embodiment, may provide up to a 120-degree horizontal and 35-degree vertical field-of-view, with a 200 m range even for low-reflectivity objects. In at least one embodiment, front-mounted LIDAR sensor(s) 1664 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1600 up to approximately 200 m. In at least one embodiment, a flash LIDAR unit includes, without limitation, a receptor, which records laser pulse transit time and reflected light on each pixel, which in turn corresponds to range from vehicle 1600 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1600. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1666. In at least one embodiment, IMU sensor(s) 1666 may be located at a center of rear axle of vehicle 1600, in at least one embodiment. In at least one embodiment, IMU sensor(s) 1666 may include, for example and without limitation, accelerometer(s), magnetometer(s), gyroscope(s), magnetic compass(es), and/or other sensor types. In at least one embodiment, such as in six-axis applications, IMU sensor(s) 1666 may include, without limitation, accelerometers and gyroscopes. In at least one embodiment, such as in nine-axis applications, IMU sensor(s) 1666 may include, without limitation, accelerometers, gyroscopes, and magnetometers.

In at least one embodiment, IMU sensor(s) 1666 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1666 may enable vehicle 1600 to estimate heading without requiring input from a magnetic sensor by directly observing and correlating changes in velocity from GPS to IMU sensor(s) 1666. In at least one embodiment, IMU sensor(s) 1666 and GNSS sensor(s) 1658 may be combined in a single integrated unit.

In at least one embodiment, vehicle 1600 may include microphone(s) 1696 placed in and/or around vehicle 1600. In at least one embodiment, microphone(s) 1696 may be used for emergency vehicle detection and identification, among other things.

In at least one embodiment, vehicle 1600 may further include any number of camera types, including stereo camera(s) 1668, wide-view camera(s) 1670, infrared camera(s) 1672, surround camera(s) 1674, long-range camera(s) 1698, mid-range camera(s) 1676, and/or other camera types. In at least one embodiment, cameras may be used to capture image data around an entire periphery of vehicle 1600. In at least one embodiment, types of cameras used depends vehicle 1600. In at least one embodiment, any combination of camera types may be used to provide necessary coverage around vehicle 1600. In at least one embodiment, number of cameras may differ depending on embodiment. For example, in at least one embodiment, vehicle 1600 could include six cameras, seven cameras, ten cameras, twelve cameras, or another number of cameras. cameras may support, as an example and without limitation, Gigabit Multimedia Serial Link ("GMSL") and/or Gigabit Ethernet. In at least one embodiment, each of camera(s) is described with more detail previously herein with respect to FIG. 16A and FIG. 16B.

In at least one embodiment, vehicle 1600 may further include vibration sensor(s) 1642. vibration sensor(s) 1642 may measure vibrations of components of vehicle 1600, such as axle(s). For example, in at least one embodiment, changes in vibrations may indicate a change in road surfaces. In at least one embodiment, when two or more vibration sensors 1642 are used, differences between vibrations may be used to determine friction or slippage of road surface (e.g., when difference in vibration is between a power-driven axle and a freely rotating axle).

In at least one embodiment, vehicle 1600 may include ADAS system 1638. ADAS system 1638 may include, without limitation, an SoC, in some examples. In at least one embodiment, ADAS system 1638 may include, without limitation, any number and combination of an autonomous/ adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1660, LIDAR sensor(s) 1664, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1600 and automatically adjust speed of vehicle 1600 to maintain a safe distance from vehicles ahead. In at least one embodiment, lateral ACC system performs distance keeping, and advises vehicle 1600 to change lanes when necessary. In at least one embodiment, lateral ACC is related to other ADAS applications such as LC and CW.

In at least one embodiment, CACC system uses information from other vehicles that may be received via network interface 1624 and/or wireless antenna(s) 1626 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1600), while I2V communication concept provides information about traffic further ahead. In at least one embodiment, CACC system may include either or both I2V and V2V information sources. In at least one embodiment, given information of vehicles ahead of vehicle 1600, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1660, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1660, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1600 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1600 if vehicle 1600 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1660, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1600 is backing up. In at least one embodiment, RCTW system includes AEB system to ensure that vehicle brakes are applied to avoid a crash. In at least one embodiment, RCTW system may use one or more rear-facing RADAR sensor(s) 1660, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1600 itself decides, in case of conflicting results, whether to heed result from a primary computer or a secondary computer (e.g., first controller 1636 or second controller 1636). For example, in at least one embodiment, ADAS system 1638 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1638 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1604.

In at least one embodiment, ADAS system 1638 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1638 may be fed into primary computer's perception block and/or primary computer's dynamic driving task block. For example, in at least one embodiment, if ADAS system 1638 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1600 may further include infotainment SoC 1630 (e.g., an in-vehicle infotainment system (IVI)). Although illustrated and described as an SoC, infotainment system 1630, in at least one embodiment, may not be an SoC, and may include, without limitation, two or more discrete components. In at least one embodiment, infotainment SoC 1630 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1600. For example, infotainment SoC 1630 could include radios, disk players, navigation systems, video players, USB and Bluetooth connectivity, carputers, in-car entertainment, WiFi, steering wheel audio controls, hands free voice control, a heads-up display ("HUD"), FHMI display 1634, a telematics device, a control panel (e.g., for controlling and/or interacting with various components, features, and/or systems), and/or other components. In at least one embodiment, infotainment SoC 1630 may further be used to provide information (e.g., visual and/or audible) to user(s) of vehicle, such as information from ADAS system 1638, autonomous driving information such as planned vehicle maneuvers, trajectories, surrounding environment information (e.g., intersection information, vehicle information, road information, etc.), and/or other information.

In at least one embodiment, infotainment SoC 1630 may include any amount and type of GPU functionality. In at least one embodiment, infotainment SoC 1630 may communicate over bus 1602 (e.g., CAN bus, Ethernet, etc.) with other devices, systems, and/or components of vehicle 1600. In at least one embodiment, infotainment SoC 1630 may be coupled to a supervisory MCU such that GPU of infotainment system may perform some self-driving functions in event that primary controller(s) 1636 (e.g., primary and/or backup computers of vehicle 1600) fail. In at least one embodiment, infotainment SoC 1630 may put vehicle 1600 into a chauffeur to safe stop mode, as described herein.

In at least one embodiment, vehicle 1600 may further include instrument cluster 1632 (e.g., a digital dash, an electronic instrument cluster, a digital instrument panel, etc.). Instrument cluster 1632 may include, without limitation, a controller and/or supercomputer (e.g., a discrete controller or supercomputer). In at least one embodiment, instrument cluster 1632 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1630 and instrument cluster 1632. In at least one embodiment, instrument cluster 1632 may be included as part of infotainment SoC 1630, or vice versa.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 16C for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 16D:
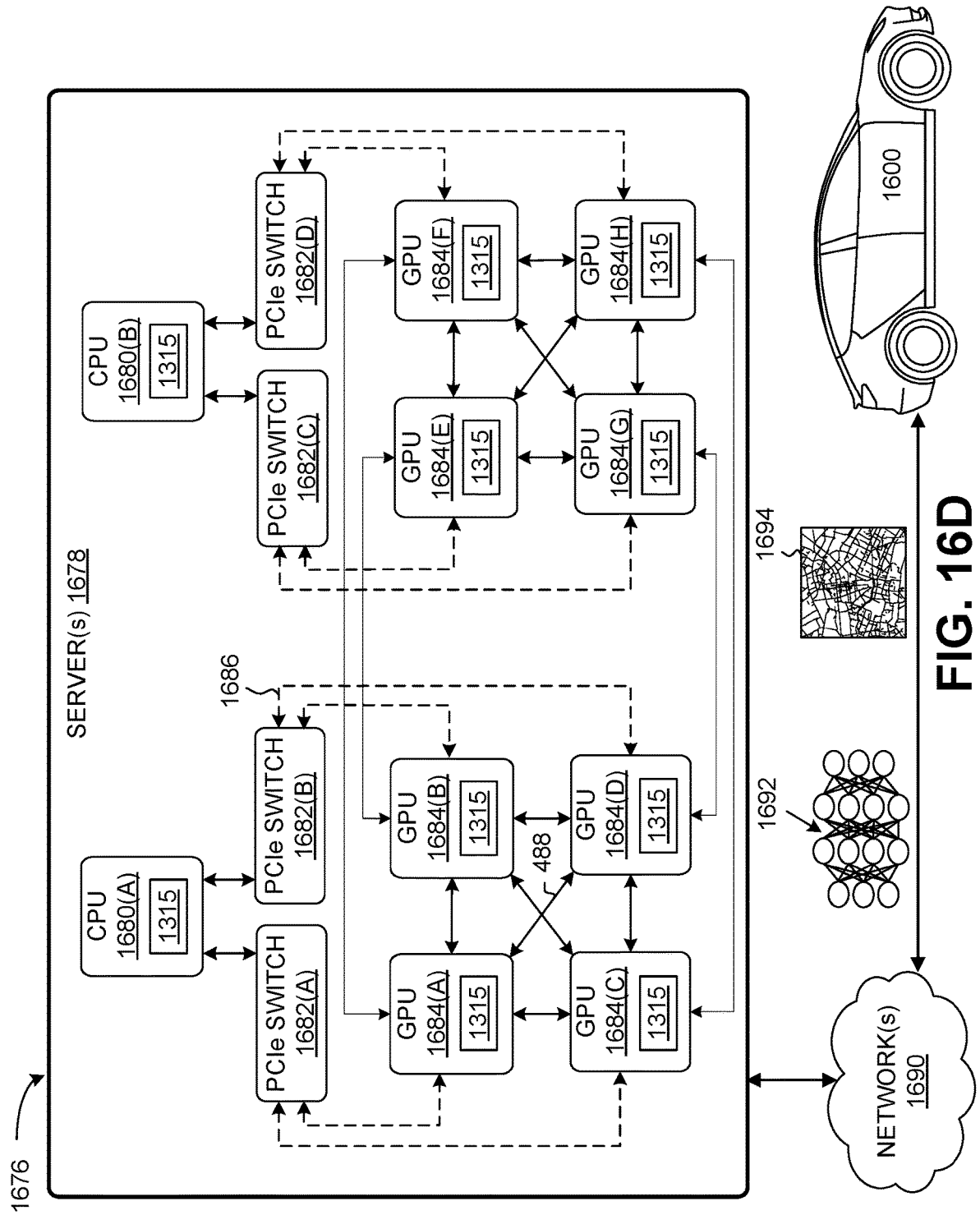
FIG. 16D is a diagram illustrating a system for communication between cloud-based server(s) and the autonomous vehicle of FIG. 16A, according to at least one embodiment.

FIG. 16D is a diagram of a system 1676 for communication between cloud-based server(s) and autonomous vehicle 1600 of FIG. 16A, according to at least one embodiment. In at least one embodiment, system 1676 may include, without limitation, server(s) 1678, network(s) 1690, and any number and type of vehicles, including vehicle 1600. server(s) 1678 may include, without limitation, a plurality of GPUs 1684(A)-1684(H) (collectively referred to herein as GPUs 1684), PCIe switches 1682(A)-1682(H) (collectively referred to herein as PCIe switches 1682), and/or CPUs 1680(A)-1680(B) (collectively referred to herein as CPUs 1680). GPUs 1684, CPUs 1680, and PCIe switches 1682 may be interconnected with high-speed interconnects such as, for example and without limitation, NVLink interfaces 1688 developed by NVIDIA and/or PCIe connections 1686. In at least one embodiment, GPUs 1684 are connected via an NVLink and/or NVSwitch SoC and GPUs 1684 and PCIe switches 1682 are connected via PCIe interconnects. In at least one embodiment, although eight GPUs 1684, two CPUs 1680, and four PCIe switches 1682 are illustrated, this is not intended to be limiting. In at least one embodiment, each of server(s) 1678 may include, without limitation, any number of GPUs 1684, CPUs 1680, and/or PCIe switches 1682, in any combination. For example, in at least one embodiment, server(s) 1678 could each include eight, sixteen, thirty-two, and/or more GPUs 1684.

In at least one embodiment, server(s) 1678 may receive, over network(s) 1690 and from vehicles, image data representative of images showing unexpected or changed road conditions, such as recently commenced road-work. In at least one embodiment, server(s) 1678 may transmit, over network(s) 1690 and to vehicles, neural networks 1692, updated neural networks 1692, and/or map information 1694, including, without limitation, information regarding traffic and road conditions. In at least one embodiment, updates to map information 1694 may include, without limitation, updates for HD map 1622, such as information regarding construction sites, potholes, detours, flooding, and/or other obstructions. In at least one embodiment, neural networks 1692, updated neural networks 1692, and/or map information 1694 may have resulted from new training and/or experiences represented in data received from any number of vehicles in environment, and/or based at least in part on training performed at a data center (e.g., using server(s) 1678 and/or other servers).

In at least one embodiment, server(s) 1678 may be used to train machine learning models (e.g., neural networks) based at least in part on training data. Training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1690, and/or machine learning models may be used by server(s) 1678 to remotely monitor vehicles).

In at least one embodiment, server(s) 1678 may receive data from vehicles and apply data to up-to-date real-time neural networks for real-time intelligent inferencing. In at least one embodiment, server(s) 1678 may include deep-learning supercomputers and/or dedicated AI computers powered by GPU(s) 1684, such as a DGX and DGX Station machines developed by NVIDIA. However, in at least one embodiment, server(s) 1678 may include deep learning infrastructure that use CPU-powered data centers.

In at least one embodiment, deep-learning infrastructure of server(s) 1678 may be capable of fast, real-time inferencing, and may use that capability to evaluate and verify health of processors, software, and/or associated hardware in vehicle 1600. For example, in at least one embodiment, deep-learning infrastructure may receive periodic updates from vehicle 1600, such as a sequence of images and/or objects that vehicle 1600 has located in that sequence of images (e.g., via computer vision and/or other machine learning object classification techniques). In at least one embodiment, deep-learning infrastructure may run its own neural network to identify objects and compare them with objects identified by vehicle 1600 and, if results do not match and deep-learning infrastructure concludes that AI in vehicle 1600 is malfunctioning, then server(s) 1678 may transmit a signal to vehicle 1600 instructing a fail-safe computer of vehicle 1600 to assume control, notify passengers, and complete a safe parking maneuver.

In at least one embodiment, server(s) 1678 may include GPU(s) 1684 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1315 are used to perform one or more embodiments. Details regarding hardware structure(x) 1315 are provided herein in conjunction with FIGS. 13A and/or 13B.

Computer Systems

Figure 17:
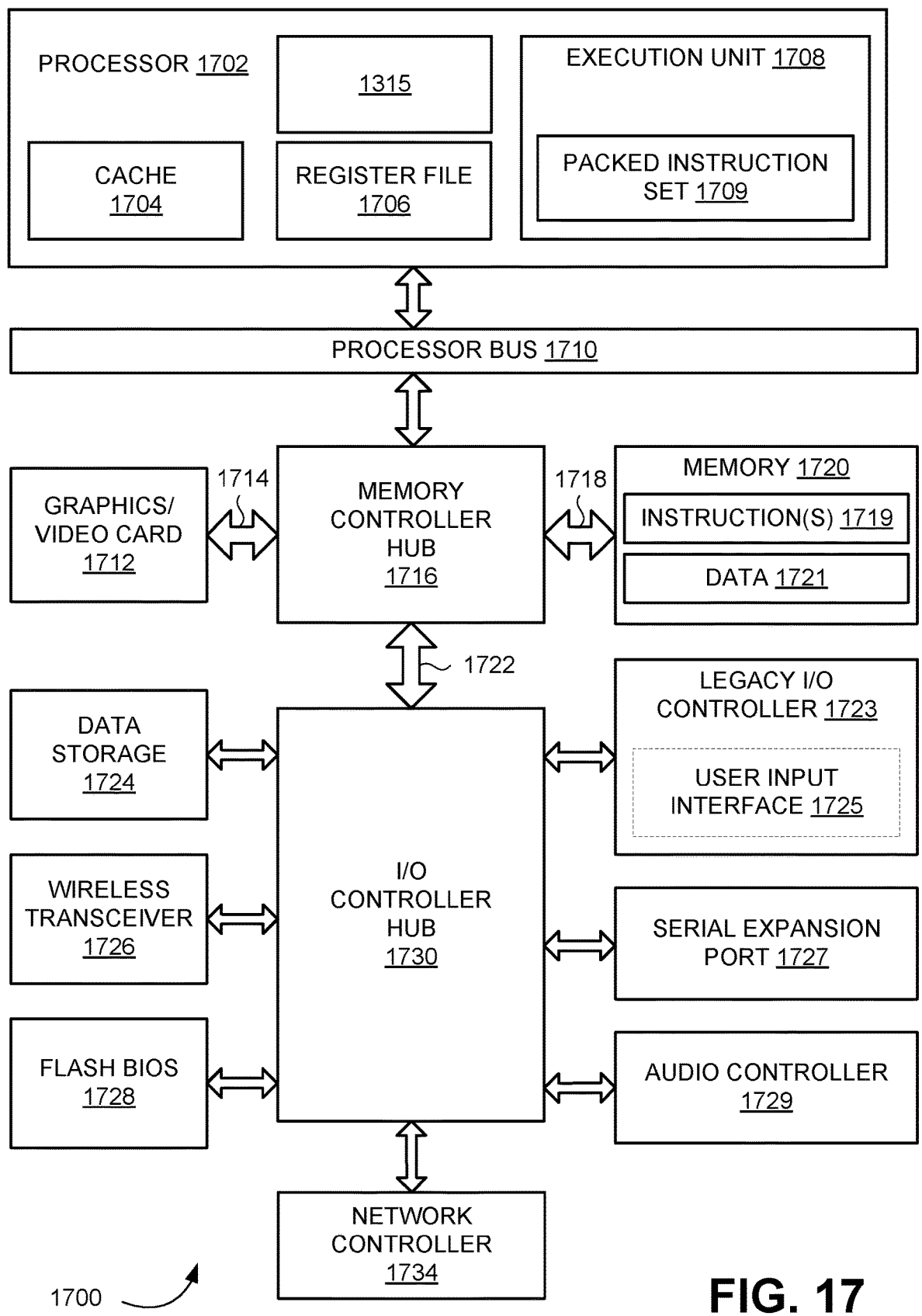
FIG. 17 is a block diagram illustrating a computer system, according to at least one embodiment.

FIG. 17 is a block diagram illustrating an exemplary computer system, which may be a system with interconnected devices and components, a system-on-a-chip (SOC) or some combination thereof 1700 formed with a processor that may include execution units to execute an instruction, according to at least one embodiment. In at least one embodiment, computer system 1700 may include, without limitation, a component, such as a processor 1702 to employ execution units including logic to perform algorithms for process data, in accordance with present disclosure, such as in embodiment described herein. In at least one embodiment, computer system 1700 may include processors, such as PENTIUM® Processor family, Xeon™, Itanium®, XScale™ and/or StrongARM™, Intel® Core™, or Intel® Nervana™ microprocessors available from Intel Corporation of Santa Clara, Calif., although other systems (including PCs having other microprocessors, engineering workstations, set-top boxes and like) may also be used. In at least one embodiment, computer system 1700 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1700 may include, without limitation, processor 1702 that may include, without limitation, one or more execution units 1708 to perform machine learning model training and/or inferencing according to techniques described herein. In at least one embodiment, system 17 is a single processor desktop or server system, but in another embodiment system 17 may be a multiprocessor system. In at least one embodiment, processor 1702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1702 may be coupled to a processor bus 1710 that may transmit data signals between processor 1702 and other components in computer system 1700.

In at least one embodiment, processor 1702 may include, without limitation, a Level 1 ("L1") internal cache memory ("cache") 1704. In at least one embodiment, processor 1702 may have a single internal cache or multiple levels of internal cache. In at least one embodiment, cache memory may reside external to processor 1702. Other embodiments may also include a combination of both internal and external caches depending on particular implementation and needs. In at least one embodiment, register file 1706 may store different types of data in various registers including, without limitation, integer registers, floating point registers, status registers, and instruction pointer register.

In at least one embodiment, execution unit 1708, including, without limitation, logic to perform integer and floating point operations, also resides in processor 1702. Processor 1702 may also include a microcode ("ucode") read only memory ("ROM") that stores microcode for certain macro instructions. In at least one embodiment, execution unit 1708 may include logic to handle a packed instruction set 1709. In at least one embodiment, by including packed instruction set 1709 in instruction set of a general-purpose processor 1702, along with associated circuitry to execute instructions, operations used by many multimedia applications may be performed using packed data in a general-purpose processor 1702. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1708 may also be used in microcontrollers, embedded processors, graphics devices, DSPs, and other types of logic circuits. In at least one embodiment, computer system 1700 may include, without limitation, a memory 1720. In at least one embodiment, memory 1720 may be implemented as a Dynamic Random Access Memory ("DRAM") device, a Static Random Access Memory ("SRAM") device, flash memory device, or other memory device. memory 1720 may store instruction(s) 1719 and/or data 1721 represented by data signals that may be executed by processor 1702.

In at least one embodiment, system logic chip may be coupled to processor bus 1710 and memory 1720. In at least one embodiment, system logic chip may include, without limitation, a memory controller hub ("MCH") 1716, and processor 1702 may communicate with MCH 1716 via processor bus 1710. In at least one embodiment, MCH 1716 may provide a high bandwidth memory path 1718 to memory 1720 for instruction and data storage and for storage of graphics commands, data and textures. In at least one embodiment, MCH 1716 may direct data signals between processor 1702, memory 1720, and other components in computer system 1700 and to bridge data signals between processor bus 1710, memory 1720, and a system I/O 1722. In at least one embodiment, system logic chip may provide a graphics port for coupling to a graphics controller. In at least one embodiment, MCH 1716 may be coupled to memory 1720 through a high bandwidth memory path 1718 and graphics/video card 1712 may be coupled to MCH 1716 through an Accelerated Graphics Port ("AGP") interconnect 1714.

In at least one embodiment, computer system 1700 may use system I/O 1722 that is a proprietary hub interface bus to couple MCH 1716 to I/O controller hub ("ICH") 1730. In at least one embodiment, ICH 1730 may provide direct connections to some I/O devices via a local I/O bus. In at least one embodiment, local I/O bus may include, without limitation, a high-speed I/O bus for connecting peripherals to memory 1720, chipset, and processor 1702. Examples may include, without limitation, an audio controller 1729, a firmware hub ("flash BIOS") 1728, a wireless transceiver 1726, a data storage 1724, a legacy I/O controller 1723 containing user input and keyboard interfaces, a serial expansion port 1727, such as Universal Serial Bus ("USB"), and a network controller 1734. data storage 1724 may comprise a hard disk drive, a floppy disk drive, a CD-ROM device, a flash memory device, or other mass storage device.

In at least one embodiment, FIG. 17 illustrates a system, which includes interconnected hardware devices or "chips", whereas in other embodiments, FIG. 17 may illustrate an exemplary System on a Chip ("SoC"). In at least one embodiment, devices illustrated in FIG. 17 may be interconnected with proprietary interconnects, standardized interconnects (e.g., PCIe) or some combination thereof. In at least one embodiment, one or more components of system 1700 are interconnected using compute express link (CXL) interconnects.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 17 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 18:
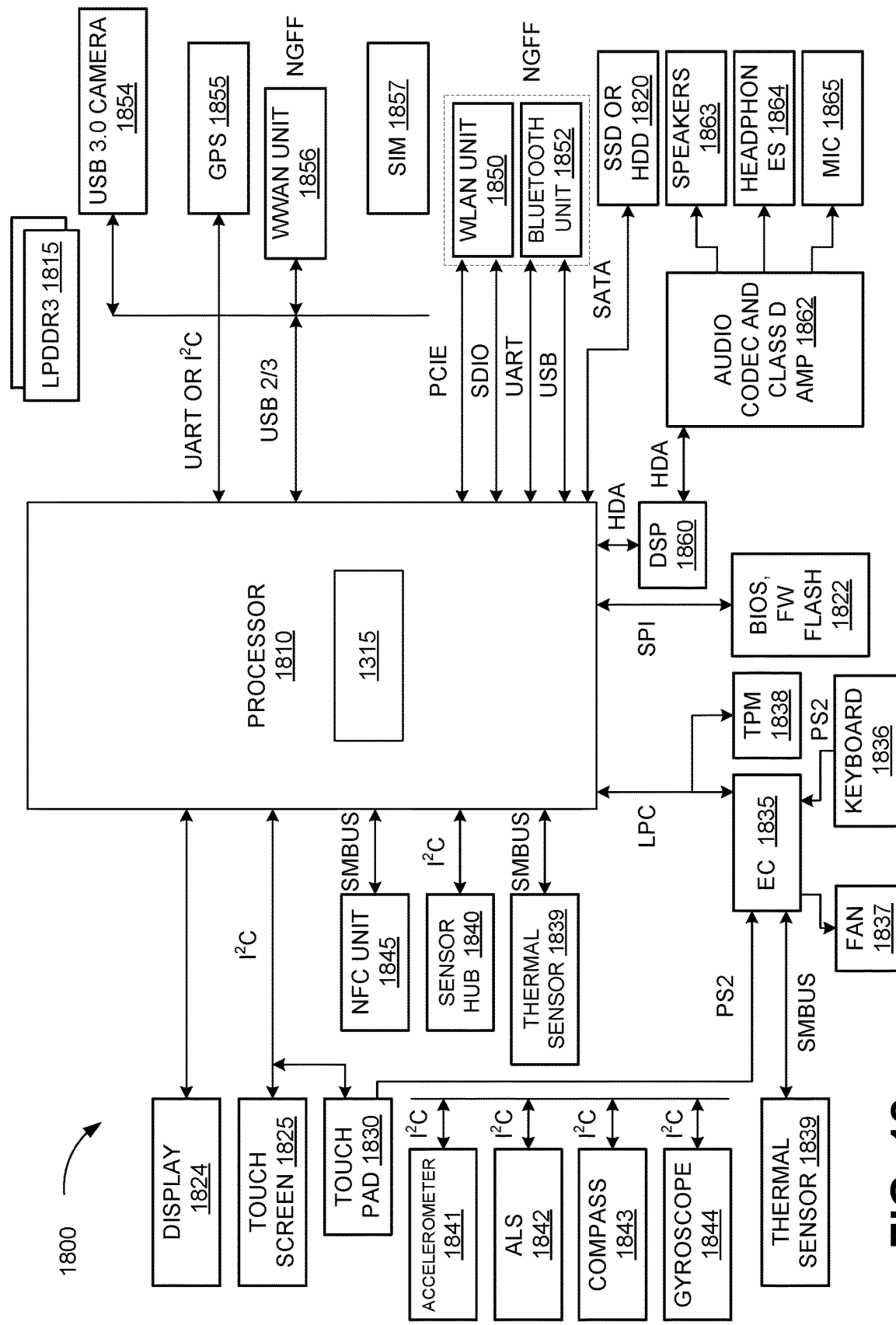
FIG. 18 is a block diagram illustrating computer system, according to at least one embodiment.

FIG. 18 is a block diagram illustrating an electronic device 1800 for utilizing a processor 1810, according to at least one embodiment. In at least one embodiment, electronic device 1800 may be, for example and without limitation, a notebook, a tower server, a rack server, a blade server, a laptop, a desktop, a tablet, a mobile device, a phone, an embedded computer, or any other suitable electronic device.

In at least one embodiment, system 1800 may include, without limitation, processor 1810 communicatively coupled to any suitable number or kind of components, peripherals, modules, or devices. In at least one embodiment, processor 1810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 18 illustrates a system, which includes interconnected hardware devices or "chips", whereas in other embodiments, FIG. 18 may illustrate an exemplary System on a Chip ("SoC"). In at least one embodiment, devices illustrated in FIG. 18 may be interconnected with proprietary interconnects, standardized interconnects (e.g., PCIe) or some combination thereof. In at least one embodiment, one or more components of FIG. 18 are interconnected using compute express link (CXL) interconnects.

In at least one embodiment, FIG. 18 may include a display 1824, a touch screen 1825, a touch pad 1830, a Near Field Communications unit ("NFC") 1845, a sensor hub 1840, a thermal sensor 1846, an Express Chipset ("EC") 1835, a Trusted Platform Module ("TPM") 1838, BIOS/firmware/flash memory ("BIOS, FW Flash") 1822, a DSP 1860, a drive "SSD or HDD") 1820 such as a Solid State Disk ("SSD") or a Hard Disk Drive ("HDD"), a wireless local area network unit ("WLAN") 1850, a Bluetooth unit 1852, a Wireless Wide Area Network unit ("WWAN") 1856, a Global Positioning System (GPS) 1855, a camera ("USB 3.0 camera") 1854 such as a USB 3.0 camera, or a Low Power Double Data Rate ("LPDDR") memory unit ("LPDDR3") 1815 implemented in, for example, LPDDR3 standard. These components may each be implemented in any suitable manner.

In at least one embodiment, other components may be communicatively coupled to processor 1810 through components discussed above. In at least one embodiment, an accelerometer 1841, Ambient Light Sensor ("ALS") 1842, compass 1843, and a gyroscope 1844 may be communicatively coupled to sensor hub 1840. In at least one embodiment, thermal sensor 1839, a fan 1837, a keyboard 1846, and a touch pad 1830 may be communicatively coupled to EC 1835. In at least one embodiment, speaker 1863, a head-phones 1864, and a microphone ("mic") 1865 may be communicatively coupled to an audio unit ("audio codec and class d amp") 1864, which may in turn be communicatively coupled to DSP 1860. In at least one embodiment, audio unit 1864 may include, for example and without limitation, an audio coder/decoder ("codec") and a class D amplifier. In at least one embodiment, SIM card ("SIM") 1857 may be communicatively coupled to WWAN unit 1856. In at least one embodiment, components such as WLAN unit 1850 and Bluetooth unit 1852, as well as WWAN unit 1856 may be implemented in a Next Generation Form Factor ("NGFF").

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 18 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 19:
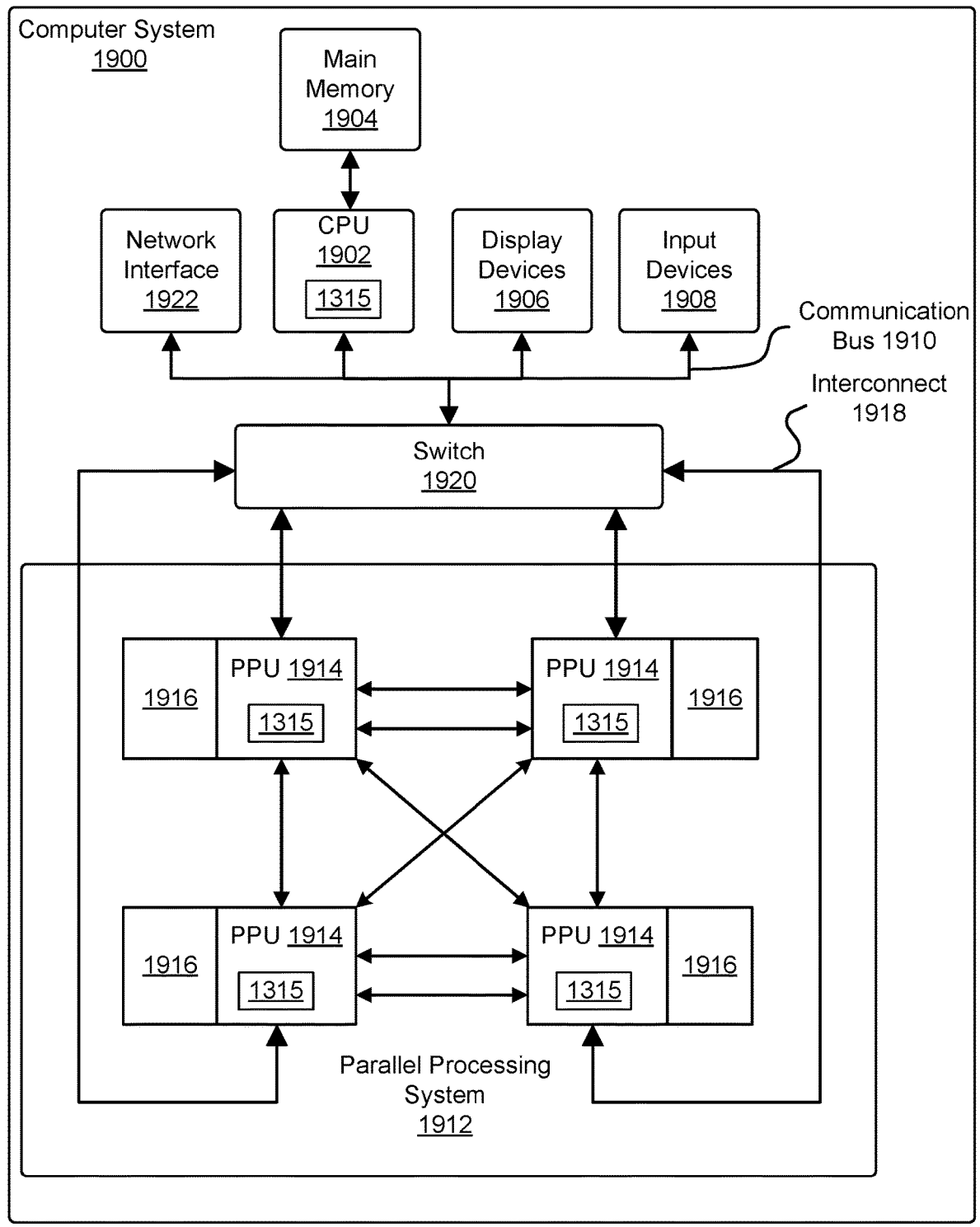
FIG. 19 illustrates a computer system, according to at least one embodiment.

FIG. 19 illustrates a computer system 1900, according to at least one embodiment. In at least one embodiment, computer system 1900 is configured to implement various processes and methods described throughout this disclosure.

In at least one embodiment, computer system 1900 comprises, without limitation, at least one central processing unit ("CPU") 1902 that is connected to a communication bus 1910 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1900 includes, without limitation, a main memory 1904 and control logic (e.g., implemented as hardware, software, or a combination thereof) and data are stored in main memory 1904 which may take form of random access memory ("RAM"). In at least one embodiment, a network interface subsystem ("network interface") 1922 provides an interface to other computing devices and networks for receiving data from and transmitting data to other systems from computer system 1900.

In at least one embodiment, computer system 1900, in at least one embodiment, includes, without limitation, input devices 1908, parallel processing system 1912, and display devices 1906 which can be implemented using a conventional cathode ray tube ("CRT"), liquid crystal display ("LCD"), light emitting diode ("LED"), plasma display, or other suitable display technologies. In at least one embodiment, user input is received from input devices 1908 such as keyboard, mouse, touchpad, microphone, and more. In at least one embodiment, each of foregoing modules can be situated on a single semiconductor platform to form a processing system.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 19 for inferencing or predicting operations based, at least in part, on weight parameters calculated using neural network training operations, neural network functions and/or architectures, or neural network use cases described herein.

The computer system described above may be used, for example, to implement a system for performing human-robot object exchanges. Some examples use the inference and/or training logic to create a neural network trained to generate a grasp of an object being held by a human hand as described above.

Figure 20:
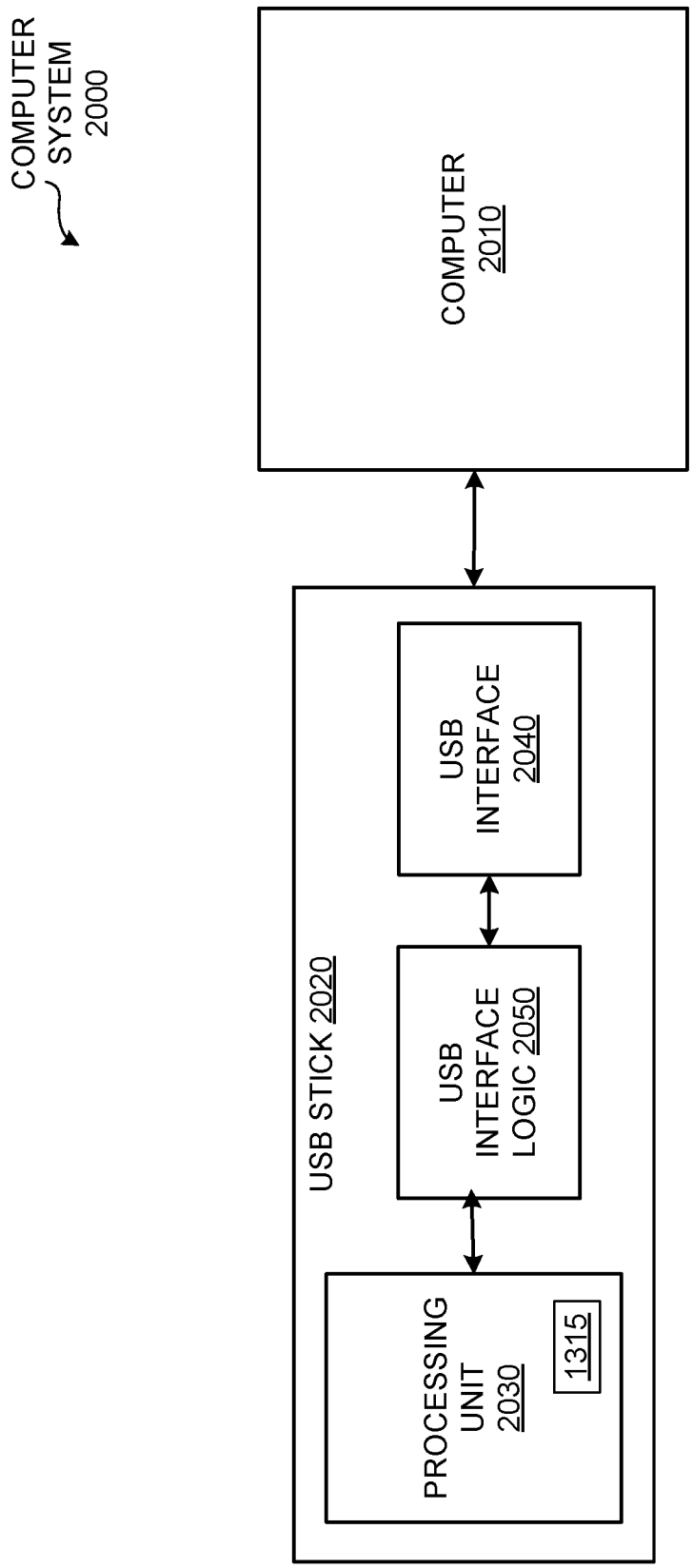
FIG. 20 illustrates a computer system, according at least one embodiment.

FIG. 20 illustrates a computer system 2000, according to at least one embodiment. In at least one embodiment, computer system 2000 includes, without limitation, a computer 2010 and a USB stick 2020. In at least one embodiment, computer 2010 may include, without limitation, any number and type of processor(s) (not shown) and a memory (not shown). In at least one embodiment, computer 2010 includes, without limitation, a server, a cloud instance, a laptop, and a desktop computer.

In at least one embodiment, USB stick 2020 includes, without limitation, a processing unit 2030, a USB interface 2040, and USB interface logic 2050. In at least one embodiment, processing unit 2030 may be any instruction execution system, apparatus, or device capable of executing instructions. In at least one embodiment, processing unit 2030 may include, without limitation, any number and type of processing cores (not shown). In at least one embodiment, processing core 2030 comprises an application specific integrated circuit ("ASIC") that is optimized to perform any amount and type of operations associated with machine learning. For instance, in at least one embodiment, processing core 2030 is a tensor processing unit ("TPC") that is optimized to perform machine learning inference operations. In at least one embodiment, processing core 2030 is a vision processing unit ("VPU") that is optimized to perform machine vision and machine learning inference operations.

In at least one embodiment, USB interface 2040 may be any type of USB connector or USB socket. For instance, in at least one embodiment, USB interface 2040 is a USB 3.0 Type-C socket for data and power. In at least one embodiment, USB interface 2040 is a USB 3.0 Type-A connector. In at least one embodiment, USB interface logic 2050 may include any amount and type of logic that enables processing unit 2030 to interface with or devices (e.g., computer 2010) via USB connector 2040.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 20 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 21A:
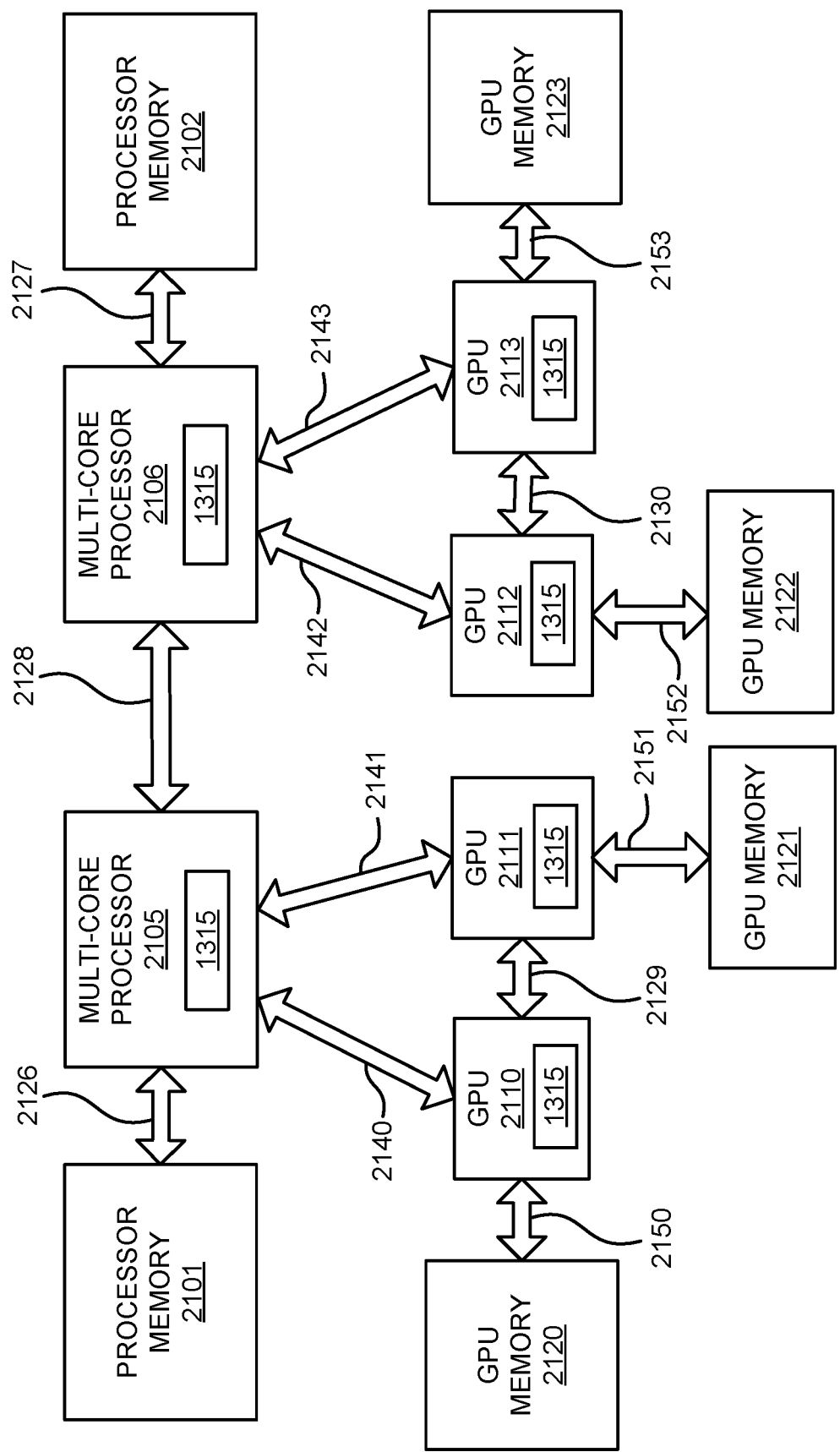
FIG. 21A illustrates a computer system, according to at least one embodiment.

FIG. 21A illustrates an exemplary architecture in which a plurality of GPUs 2110-2113 is communicatively coupled to a plurality of multi-core processors 2105-2106 over high-speed links 2140-2143 (e.g., buses, point-to-point interconnects, etc.). In one embodiment, high-speed links 2140-2143 support a communication throughput of 4 GB/s, 30 GB/s, 80 GB/s or higher. Various interconnect protocols may be used including, but not limited to, PCIe 4.0 or 5.0 and NVLink 2.0.

In addition, and in one embodiment, two or more of GPUs 2110-2113 are interconnected over high-speed links 2129-2130, which may be implemented using same or different protocols/links than those used for high-speed links 2140-2143. Similarly, two or more of multi-core processors 2105-2106 may be connected over high speed link 2128 which may be symmetric multi-processor (SMP) buses operating at 20 GB/s, 30 GB/s, 120 GB/s or higher. Alternatively, all communication between various system components shown in FIG. 21A may be accomplished using same protocols/links (e.g., over a common interconnection fabric).

In one embodiment, each multi-core processor 2105-2106 is communicatively coupled to a processor memory 2101-2102, via memory interconnects 2126-2127, respectively, and each GPU 2110-2113 is communicatively coupled to GPU memory 2120-2123 over GPU memory interconnects 2150-2153, respectively. Memory interconnects 2126-2127 and 2150-2153 may utilize same or different memory access technologies. By way of example, and not limitation, processor memories 2101-2102 and GPU memories 2120-2123 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 2101-2102 may be volatile memory and another portion may be non-volatile memory (e.g., using a two-level memory (2LM) hierarchy).

As described herein, although various processors 2105-2106 and GPUs 2110-2113 may be physically coupled to a particular memory 2101-2102, 2120-2123, respectively, a unified memory architecture may be implemented in which a same virtual system address space (also referred to as "effective address" space) is distributed among various physical memories. For example, processor memories 2101-2102 may each comprise 64 GB of system memory address space and GPU memories 2120-2123 may each comprise 32 GB of system memory address space (resulting in a total of 256 GB addressable memory in this example).

Figure 21B:
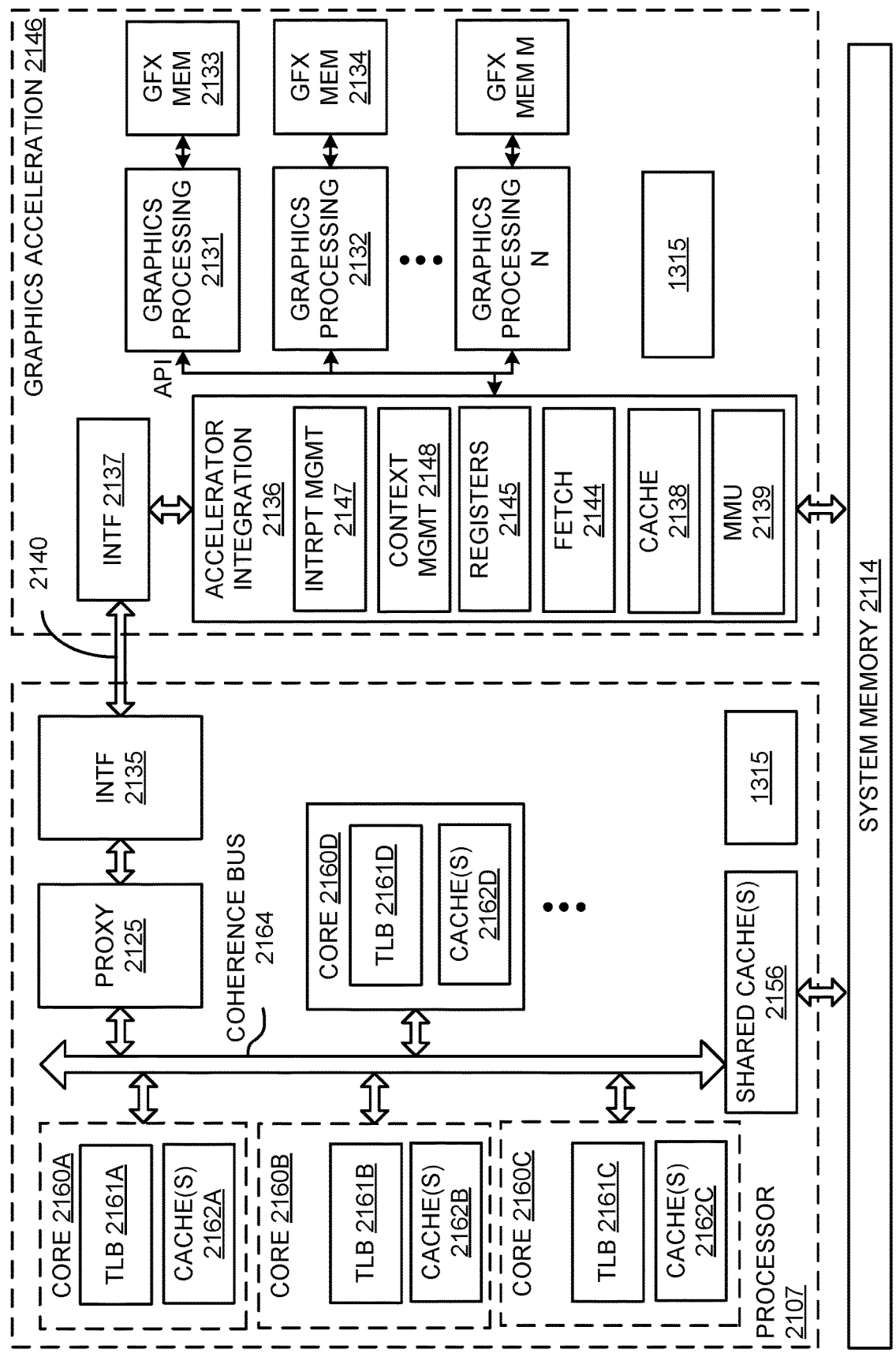
FIG. 21B illustrates a computer system, according to at least one embodiment.

FIG. 21B illustrates additional details for an interconnection between a multi-core processor 2107 and a graphics acceleration module 2146 in accordance with one exemplary embodiment. Graphics acceleration module 2146 may include one or more GPU chips integrated on a line card which is coupled to processor 2107 via high-speed link 2140. Alternatively, graphics acceleration module 2146 may be integrated on a same package or chip as processor 2107.

In at least one embodiment, illustrated processor 2107 includes a plurality of cores 2160A-2160D, each with a translation lookaside buffer 2161A-2161D and one or more caches 2162A-2162D. In at least one embodiment, cores 2160A-2160D may include various other components for executing instructions and processing data which are not illustrated. Caches 2162A-2162D may comprise level 1 (L1) and level 2 (L2) caches. In addition, one or more shared caches 2156 may be included in caches 2162A-2162D and shared by sets of cores 2160A-2160D. For example, one embodiment of processor 2107 includes 24 cores, each with its own L1 cache, twelve shared L2 caches, and twelve shared L3 caches. In this embodiment, one or more L2 and L3 caches are shared by two adjacent cores. Processor 2107 and graphics acceleration module 2146 connect with system memory 2114, which may include processor memories 2101-2102 of FIG. 21A.

Coherency is maintained for data and instructions stored in various caches 2162A-2162D, 2156 and system memory 2114 via inter-core communication over a coherence bus 2164. For example, each cache may have cache coherency logic/circuitry associated therewith to communicate to over coherence bus 2164 in response to detected reads or writes to particular cache lines. In one implementation, a cache snooping protocol is implemented over coherence bus 2164 to snoop cache accesses.

In one embodiment, a proxy circuit 2125 communicatively couples graphics acceleration module 2146 to coherence bus 2164, allowing graphics acceleration module 2146 to participate in a cache coherence protocol as a peer of cores 2160A-2160D. In particular, an interface 2135 provides connectivity to proxy circuit 2125 over high-speed link 2140 (e.g., a PCIe bus, NVLink, etc.) and an interface 2137 connects graphics acceleration module 2146 to link 2140.

In one implementation, an accelerator integration circuit 2136 provides cache management, memory access, context management, and interrupt management services on behalf of a plurality of graphics processing engines 2131, 2132, N of graphics acceleration module 2146. Graphics processing engines 2131, 2132, N may each comprise a separate graphics processing unit (GPU). Alternatively, graphics processing engines 2131, 2132, N may comprise different types of graphics processing engines within a GPU such as graphics execution units, media processing engines (e.g., video encoders/decoders), samplers, and blit engines. In at least one embodiment, graphics acceleration module 2146 may be a GPU with a plurality of graphics processing engines 2131-2132, N or graphics processing engines 2131-2132, N may be individual GPUs integrated on a common package, line card, or chip.

In one embodiment, accelerator integration circuit 2136 includes a memory management unit (MMU) 2139 for performing various memory management functions such as virtual-to-physical memory translations (also referred to as effective-to-real memory translations) and memory access protocols for accessing system memory 2114. MMU 2139 may also include a translation lookaside buffer (TLB) (not shown) for caching virtual/effective to physical/real address translations. In one implementation, a cache 2138 stores commands and data for efficient access by graphics processing engines 2131-2132, N. In one embodiment, data stored in cache 2138 and graphics memories 2133-2134, M is kept coherent with core caches 2162A-2162D, 2156 and system memory 2114. As mentioned, this may be accomplished via proxy circuit 2125 on behalf of cache 2138 and memories 2133-2134, M (e.g., sending updates to cache 2138 related to modifications/accesses of cache lines on processor caches 2162A-2162D, 2156 and receiving updates from cache 2138).

A set of registers 2145 store context data for threads executed by graphics processing engines 2131-2132, N and a context management circuit 2148 manages thread contexts. For example, context management circuit 2148 may perform save and restore operations to save and restore contexts of various threads during contexts switches (e.g., where a first thread is saved and a second thread is stored so that a second thread can be execute by a graphics processing engine). For example, on a context switch, context management circuit 2148 may store current register values to a designated region in memory (e.g., identified by a context pointer). It may then restore register values when returning to a context. In one embodiment, an interrupt management circuit 2147 receives and processes interrupts received from system devices.

In one implementation, virtual/effective addresses from a graphics processing engine 2131 are translated to real/ physical addresses in system memory 2114 by MMU 2139. One embodiment of accelerator integration circuit 2136 supports multiple (e.g., 4, 8, 16) graphics accelerator modules 2146 and/or other accelerator devices. Graphics accelerator module 2146 may be dedicated to a single application executed on processor 2107 or may be shared between multiple applications. In one embodiment, a virtualized graphics execution environment is presented in which resources of graphics processing engines 2131-2132, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 2136 performs as a bridge to a system for graphics acceleration module 2146 and provides address translation and system memory cache services. In addition, accelerator integration circuit 2136 may provide virtualization facilities for a host processor to manage virtualization of graphics processing engines 2131-2132, interrupts, and memory management.

Because hardware resources of graphics processing engines 2131-2132, N are mapped explicitly to a real address space seen by host processor 2107, any host processor can address these resources directly using an effective address value. One function of accelerator integration circuit 2136, in one embodiment, is physical separation of graphics processing engines 2131-2132, N so that they appear to a system as independent units.

In at least one embodiment, one or more graphics memories 2133-2134, M are coupled to each of graphics processing engines 2131-2132, N, respectively. Graphics memories 2133-2134, M store instructions and data being processed by each of graphics processing engines 2131-2132, N. Graphics memories 2133-2134, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 2140, biasing techniques are used to ensure that data stored in graphics memories 2133-2134, M is data which will be used most frequently by graphics processing engines 2131-2132, N and preferably not used by cores 2160A-2160D (at least not frequently). Similarly, a biasing mechanism attempts to keep data needed by cores (and preferably not graphics processing engines 2131-2132, N) within caches 2162A-2162D, 2156 of cores and system memory 2114.

Figure 21C:
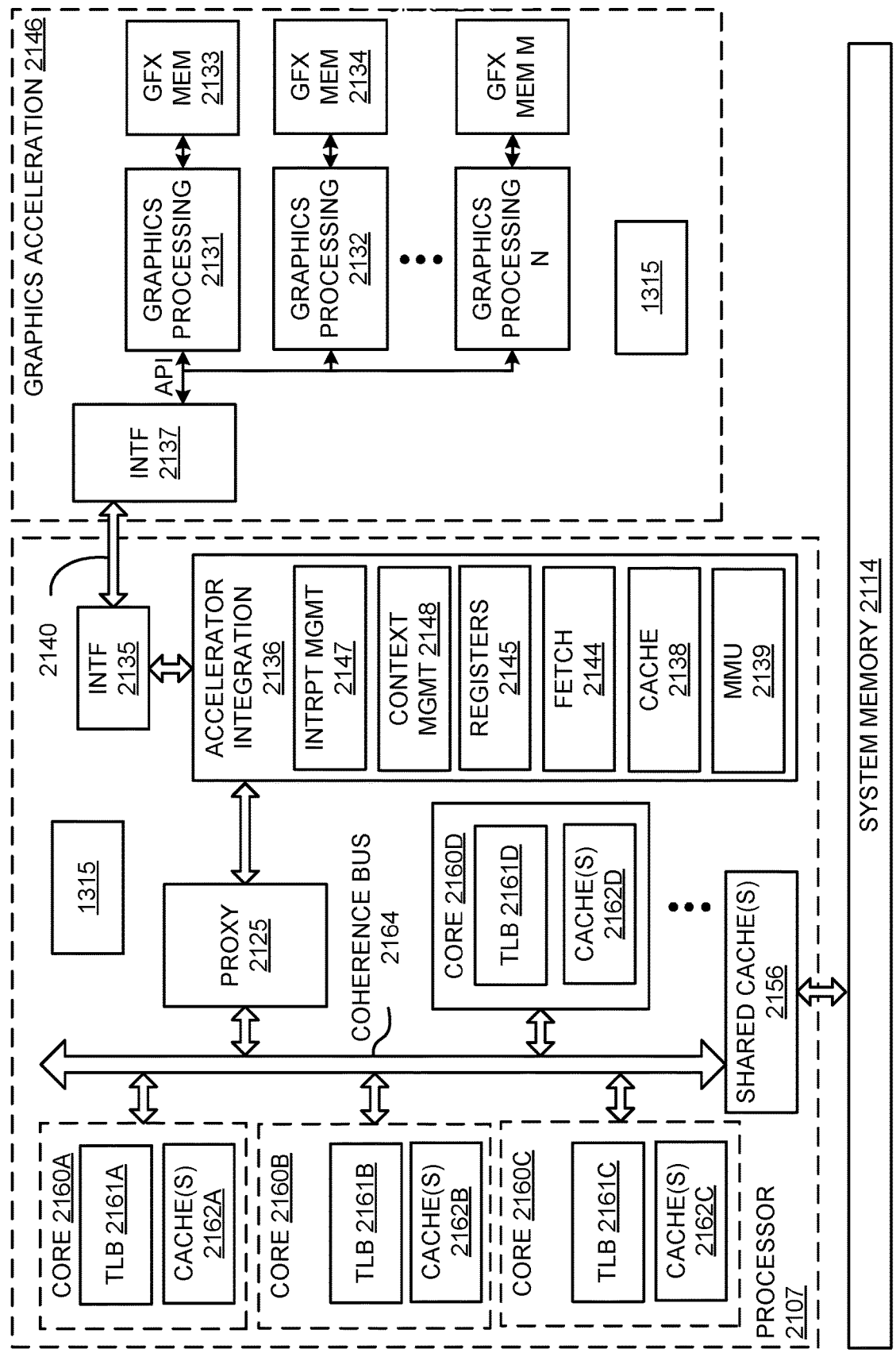
FIG. 21C illustrates a computer system, according to at least one embodiment.

FIG. 21C illustrates another exemplary embodiment in which accelerator integration circuit 2136 is integrated within processor 2107. In this embodiment, graphics processing engines 2131-2132, N communicate directly over high-speed link 2140 to accelerator integration circuit 2136 via interface 2137 and interface 2135 (which, again, may be utilize any form of bus or interface protocol). Accelerator integration circuit 2136 may perform same operations as those described with respect to FIG. 21B, but potentially at a higher throughput given its close proximity to coherence bus 2164 and caches 2162A-2162D, 2156. One embodiment supports different programming models including a dedicated-process programming model (no graphics acceleration module virtualization) and shared programming models (with virtualization), which may include programming models which are controlled by accelerator integration circuit 2136 and programming models which are controlled by graphics acceleration module 2146.

In at least one embodiment, graphics processing engines 2131-2132, N are dedicated to a single application or process under a single operating system. In at least one embodiment, a single application can funnel other application requests to graphics processing engines 2131-2132, N, providing virtualization within a VM/partition.

In at least one embodiment, graphics processing engines 2131-2132, N, may be shared by multiple VM/application partitions. In at least one embodiment, shared models may use a system hypervisor to virtualize graphics processing engines 2131-2132, N to allow access by each operating system. For single-partition systems without a hypervisor, graphics processing engines 2131-2132, N are owned by an operating system. In at least one embodiment, an operating system can virtualize graphics processing engines 2131-2132, N to provide access to each process or application.

In at least one embodiment, graphics acceleration module 2146 or an individual graphics processing engine 2131-2132, N selects a process element using a process handle. In one embodiment, process elements are stored in system memory 2114 and are addressable using an effective address to real address translation techniques described herein. In at least one embodiment, a process handle may be an implementation-specific value provided to a host process when registering its context with graphics processing engine 2131-2132, N (that is, calling system software to add a process element to a process element linked list). In at least one embodiment, a lower 16-bits of a process handle may be an offset of the process element within a process element linked list.

Figure 21D:
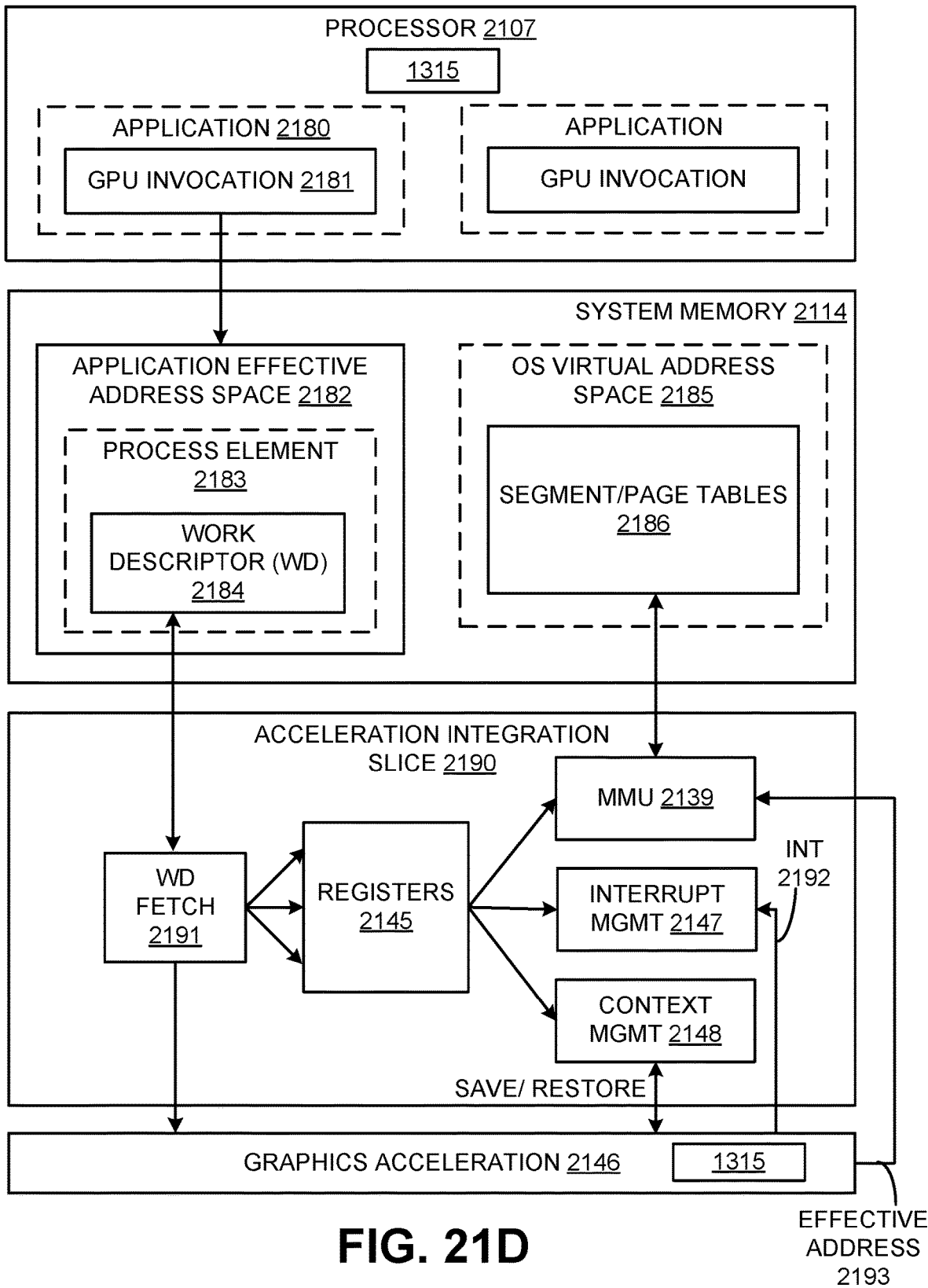
FIG. 21D illustrates a computer system, according to at least one embodiment.

FIG. 21D illustrates an exemplary accelerator integration slice 2190. As used herein, a "slice" comprises a specified portion of processing resources of accelerator integration circuit 2136. Application effective address space 2182 within system memory 2114 stores process elements 2183. In one embodiment, process elements 2183 are stored in response to GPU invocations 2181 from applications 2180 executed on processor 2107. A process element 2183 contains process state for corresponding application 2180. A work descriptor (WD) 2184 contained in process element 2183 can be a single job requested by an application or may contain a pointer to a queue of jobs. In at least one embodiment, WD 2184 is a pointer to a job request queue in an application's address space 2182.

Graphics acceleration module 2146 and/or individual graphics processing engines 2131-2132, N can be shared by all or a subset of processes in a system. In at least one embodiment, an infrastructure for setting up process state and sending a WD 2184 to a graphics acceleration module 2146 to start a job in a virtualized environment may be included.

In at least one embodiment, a dedicated-process programming model is implementation-specific. In this model, a single process owns graphics acceleration module 2146 or an individual graphics processing engine 2131. Because graphics acceleration module 2146 is owned by a single process, a hypervisor initializes accelerator integration circuit 2136 for an owning partition and an operating system initializes accelerator integration circuit 2136 for an owning process when graphics acceleration module 2146 is assigned.

In operation, a WD fetch unit 2191 in accelerator integration slice 2190 fetches next WD 2184 which includes an indication of work to be done by one or more graphics processing engines of graphics acceleration module 2146. Data from WD 2184 may be stored in registers 2145 and used by MMU 2139, interrupt management circuit 2147 and/or context management circuit 2148 as illustrated. For example, one embodiment of MMU 2139 includes segment/page walk circuitry for accessing segment/page tables 2186 within OS virtual address space 2185. Interrupt management circuit 2147 may process interrupt events 2192 received from graphics acceleration module 2146. When performing graphics operations, an effective address 2193 generated by a graphics processing engine 2131-2132, N is translated to a real address by MMU 2139.

In one embodiment, a same set of registers 2145 are duplicated for each graphics processing engine 2131-2132, N and/or graphics acceleration module 2146 and may be initialized by a hypervisor or operating system. Each of these duplicated registers may be included in an accelerator integration slice 2190. Exemplary registers that may be initialized by a hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by an operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WD 2184 is specific to a particular graphics acceleration module 2146 and/or graphics processing engines 2131-2132, N. It contains all information required by a graphics processing engine 2131-2132, N to do work or it can be a pointer to a memory location where an application has set up a command queue of work to be completed.

Figure 21E:
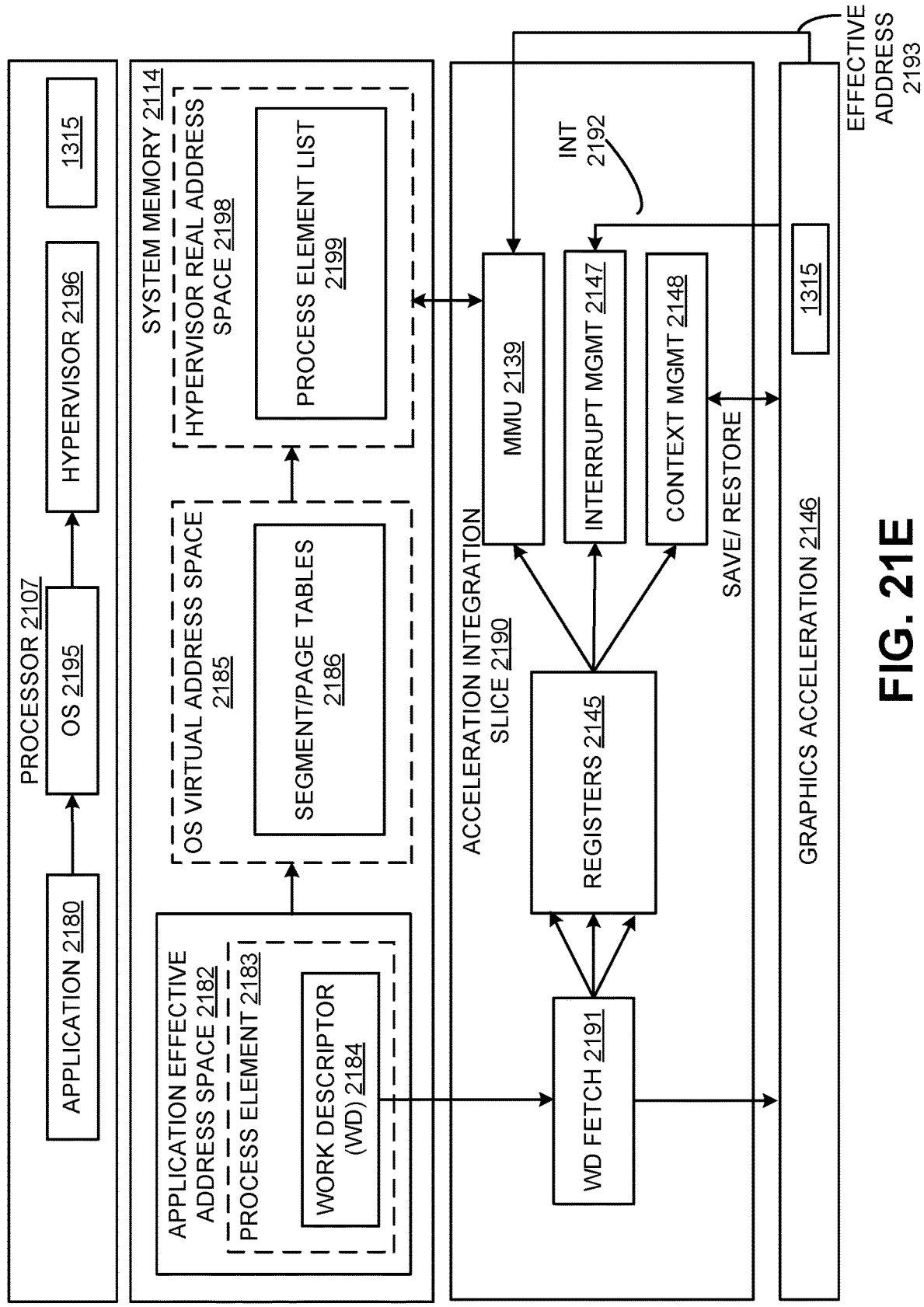
FIGS. 21E and 21F illustrate a shared programming model, according to at least one embodiment.

FIG. 21E illustrates additional details for one exemplary embodiment of a shared model. This embodiment includes a hypervisor real address space 2198 in which a process element list 2199 is stored. Hypervisor real address space 2198 is accessible via a hypervisor 2196 which virtualizes graphics acceleration module engines for operating system 2195.

In at least one embodiment, shared programming models allow for all or a subset of processes from all or a subset of partitions in a system to use a graphics acceleration module 2146. There are two programming models where graphics acceleration module 2146 is shared by multiple processes and partitions: time-sliced shared and graphics directed shared.

In this model, system hypervisor 2196 owns graphics acceleration module 2146 and makes its function available to all operating systems 2195. For a graphics acceleration module 2146 to support virtualization by system hypervisor 2196, graphics acceleration module 2146 may adhere to the following: 1) An application's job request must be autonomous (that is, state does not need to be maintained between jobs), or graphics acceleration module 2146 must provide a context save and restore mechanism. 2) An application's job request is guaranteed by graphics acceleration module 2146 to complete in a specified amount of time, including any translation faults, or graphics acceleration module 2146 provides an ability to preempt processing of a job. 3) Graphics acceleration module 2146 must be guaranteed fairness between processes when operating in a directed shared programming model.

In at least one embodiment, application 2180 is required to make an operating system 2195 system call with a graphics acceleration module 2146 type, a work descriptor (WD), an authority mask register (AMR) value, and a context save/restore area pointer (CSRP). In at least one embodiment, graphics acceleration module 2146 type describes a targeted acceleration function for a system call. In at least one embodiment, graphics acceleration module 2146 type may be a system-specific value. In at least one embodiment, WD is formatted specifically for graphics acceleration module 2146 and can be in a form of a graphics acceleration module 2146 command, an effective address pointer to a user-defined structure, an effective address pointer to a queue of commands, or any other data structure to describe work to be done by graphics acceleration module 2146. In one embodiment, an AMR value is an AMR state to use for a current process. In at least one embodiment, a value passed to an operating system is similar to an application setting an AMR. If accelerator integration circuit 2136 and graphics acceleration module 2146 implementations do not support a User Authority Mask Override Register (UAMOR), an operating system may apply a current UAMOR value to an AMR value before passing an AMR in a hypervisor call. Hypervisor 2196 may optionally apply a current Authority Mask Override Register (AMOR) value before placing an AMR into process element 2183. In at least one embodiment, CSRP is one of registers 2145 containing an effective address of an area in an application's address space 2182 for graphics acceleration module 2146 to save and restore context state. This pointer is optional if no state is required to be saved between jobs or when a job is preempted. In at least one embodiment, context save/restore area may be pinned system memory.

Upon receiving a system call, operating system 2195 may verify that application 2180 has registered and been given authority to use graphics acceleration module 2146. Operating system 2195 then calls hypervisor 2196 with information shown in Table 3.

TABLE 3

OS to Hypervisor Call Parameters

1 A work descriptor (WD)
2 An Authority Mask Register (AMR) value (potentially masked)
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)
7 A logical interrupt service number (LISN)

Upon receiving a hypervisor call, hypervisor 2196 verifies that operating system 2195 has registered and been given authority to use graphics acceleration module 2146. Hypervisor 2196 then puts process element 2183 into a process element linked list for a corresponding graphics acceleration module 2146 type. A process element may include information shown in Table 4.

TABLE 4

Process Element Information

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  Virtual address of storage segment table pointer (SSTP)
7  A logical interrupt service number (LISN)
8  Interrupt vector table, derived from hypervisor call parameters
9  A state register (SR) value
10 A logical partition ID (LPID)
11 Areal address (RA) hypervisor accelerator utilization record pointer
12 Storage Descriptor Register (SDR)

In at least one embodiment, hypervisor initializes a plurality of accelerator integration slice 2190 registers 2145.

Figure 21F:
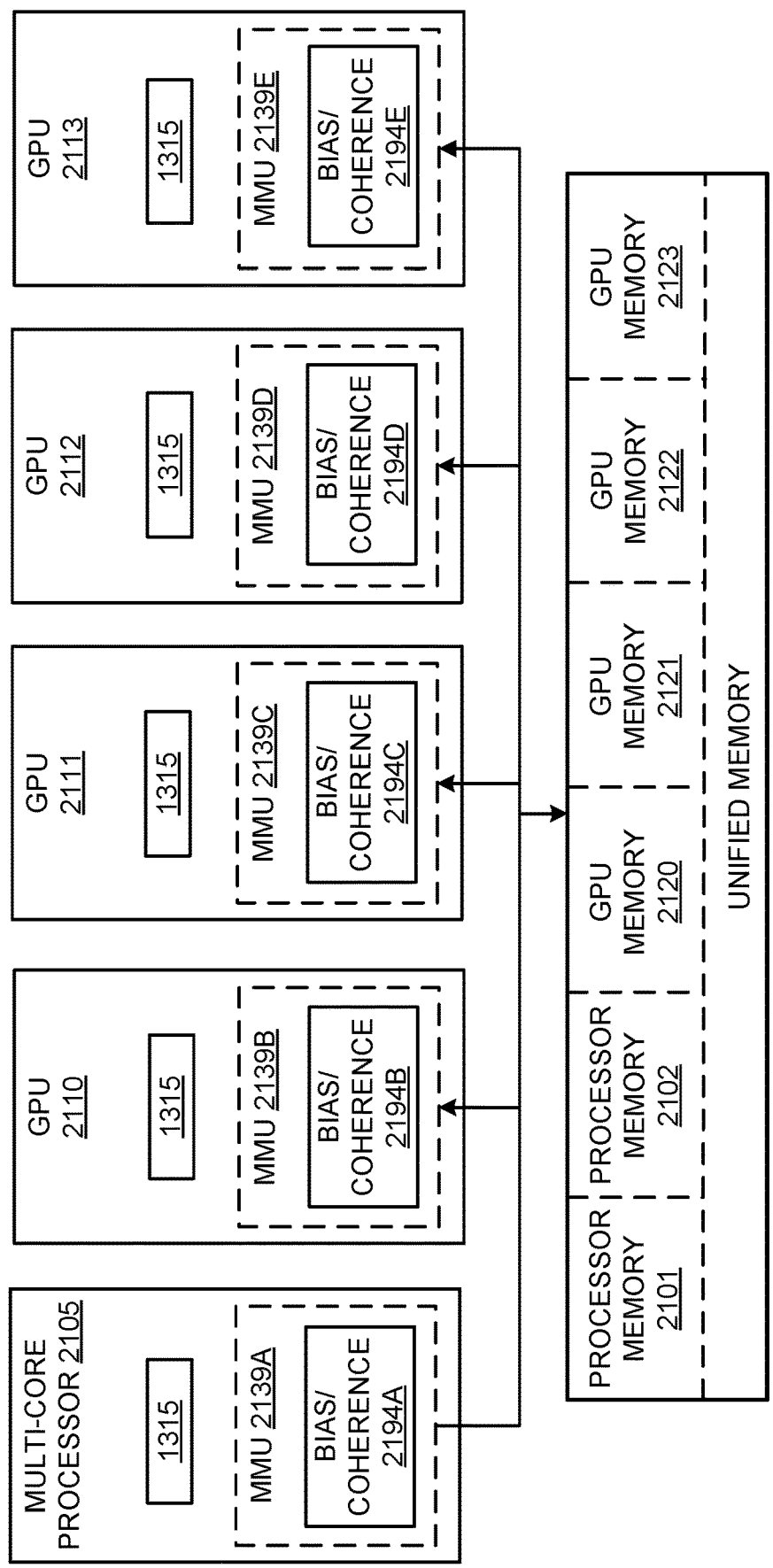

As illustrated in FIG. 21F, in at least one embodiment, a unified memory is used, addressable via a common virtual memory address space used to access physical processor memories 2101-2102 and GPU memories 2120-2123. In this implementation, operations executed on GPUs 2110-2113 utilize a same virtual/effective memory address space to access processor memories 2101-2102 and vice versa, thereby simplifying programmability. In one embodiment, a first portion of a virtual/effective address space is allocated to processor memory 2101, a second portion to second processor memory 2102, a third portion to GPU memory 2120, and so on. In at least one embodiment, an entire virtual/effective memory space (sometimes referred to as an effective address space) is thereby distributed across each of processor memories 2101-2102 and GPU memories 2120-2123, allowing any processor or GPU to access any physical memory with a virtual address mapped to that memory.

In one embodiment, bias/coherence management circuitry 2194A-2194E within one or more of MMUs 2139A-2139E ensures cache coherence between caches of one or more host processors (e.g., 2105) and GPUs 2110-2113 and implements biasing techniques indicating physical memories in which certain types of data should be stored. While multiple instances of bias/coherence management circuitry 2194A-2194E are illustrated in FIG. 21F, bias/coherence circuitry may be implemented within an MMU of one or more host processors 2105 and/or within accelerator integration circuit 2136.

One embodiment allows GPU-attached memory 2120-2123 to be mapped as part of system memory, and accessed using shared virtual memory (SVM) technology, but without suffering performance drawbacks associated with full system cache coherence. In at least one embodiment, an ability for GPU-attached memory 2120-2123 to be accessed as system memory without onerous cache coherence overhead provides a beneficial operating environment for GPU offload. This arrangement allows host processor 2105 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 2120-2123 without cache coherence overheads can be critical to execution time of an offloaded computation. In cases with substantial streaming write memory traffic, for example, cache coherence overhead can significantly reduce an effective write bandwidth seen by a GPU 2110-2113. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 2120-2123, with or without a bias cache in GPU 2110-2113 (e.g., to cache frequently/recently used entries of a bias table). Alternatively, an entire bias table may be maintained within a GPU.

In at least one embodiment, a bias table entry associated with each access to GPU-attached memory 2120-2123 is accessed prior to actual access to a GPU memory, causing the following operations. First, local requests from GPU 2110-2113 that find their page in GPU bias are forwarded directly to a corresponding GPU memory 2120-2123. Local requests from a GPU that find their page in host bias are forwarded to processor 2105 (e.g., over a high-speed link as discussed above). In one embodiment, requests from processor 2105 that find a requested page in host processor bias complete a request like a normal memory read. Alternatively, requests directed to a GPU-biased page may be forwarded to GPU 2110-2113. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g. OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 2105 bias to GPU bias, but is not for an opposite transition.

In one embodiment, cache coherency is maintained by temporarily rendering GPU-biased pages uncacheable by host processor 2105. To access these pages, processor 2105 may request access from GPU 2110 which may or may not grant access right away. Thus, to reduce communication between processor 2105 and GPU 2110 it is beneficial to ensure that GPU-biased pages are those which are required by a GPU but not host processor 2105 and vice versa.

Hardware structure(s) 1315 are used to perform one or more embodiments. Details regarding the hardware structure (x) 1315 are provided herein in conjunction with FIGS. 13A and/or 13B.

Figure 22:
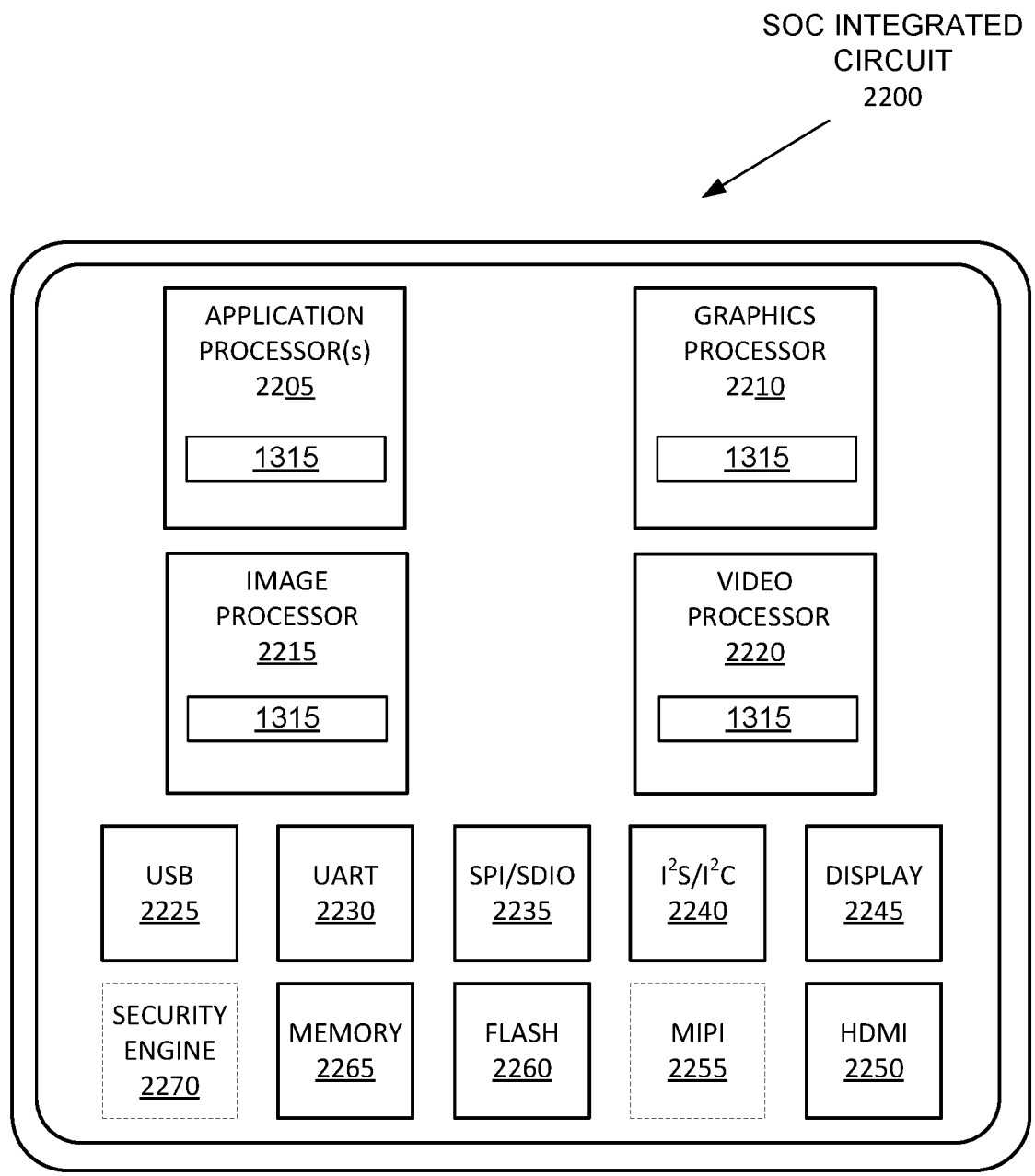
FIG. 22 illustrates exemplary integrated circuits and associated graphics processors, according to at least one embodiment.

FIG. 22 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 22 is a block diagram illustrating an exemplary system on a chip integrated circuit 2200 that may be fabricated using one or more IP cores, according to at least one embodiment. In at least one embodiment, integrated circuit 2200 includes one or more application processor(s) 2205 (e.g., CPUs), at least one graphics processor 2210, and may additionally include an image processor 2215 and/or a video processor 2220, any of which may be a modular IP core. In at least one embodiment, integrated circuit 2200 includes peripheral or bus logic including a USB controller 2225, UART controller 2230, an SPI/SDIO controller 2235, and an I.sup.2S/I.sup.2C controller 2240. In at least one embodiment, integrated circuit 2200 can include a display device 2245 coupled to one or more of a high-definition multimedia interface (HDMI) controller 2250 and a mobile industry processor interface (MIPI) display interface 2255. In at least one embodiment, storage may be provided by a flash memory subsystem 2260 including flash memory and a flash memory controller. In at least one embodiment, memory interface may be provided via a memory controller 2265 for access to SDRAM or SRAM memory devices. In at least one embodiment, some integrated circuits additionally include an embedded security engine 2270.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in integrated circuit 2200 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 23A:
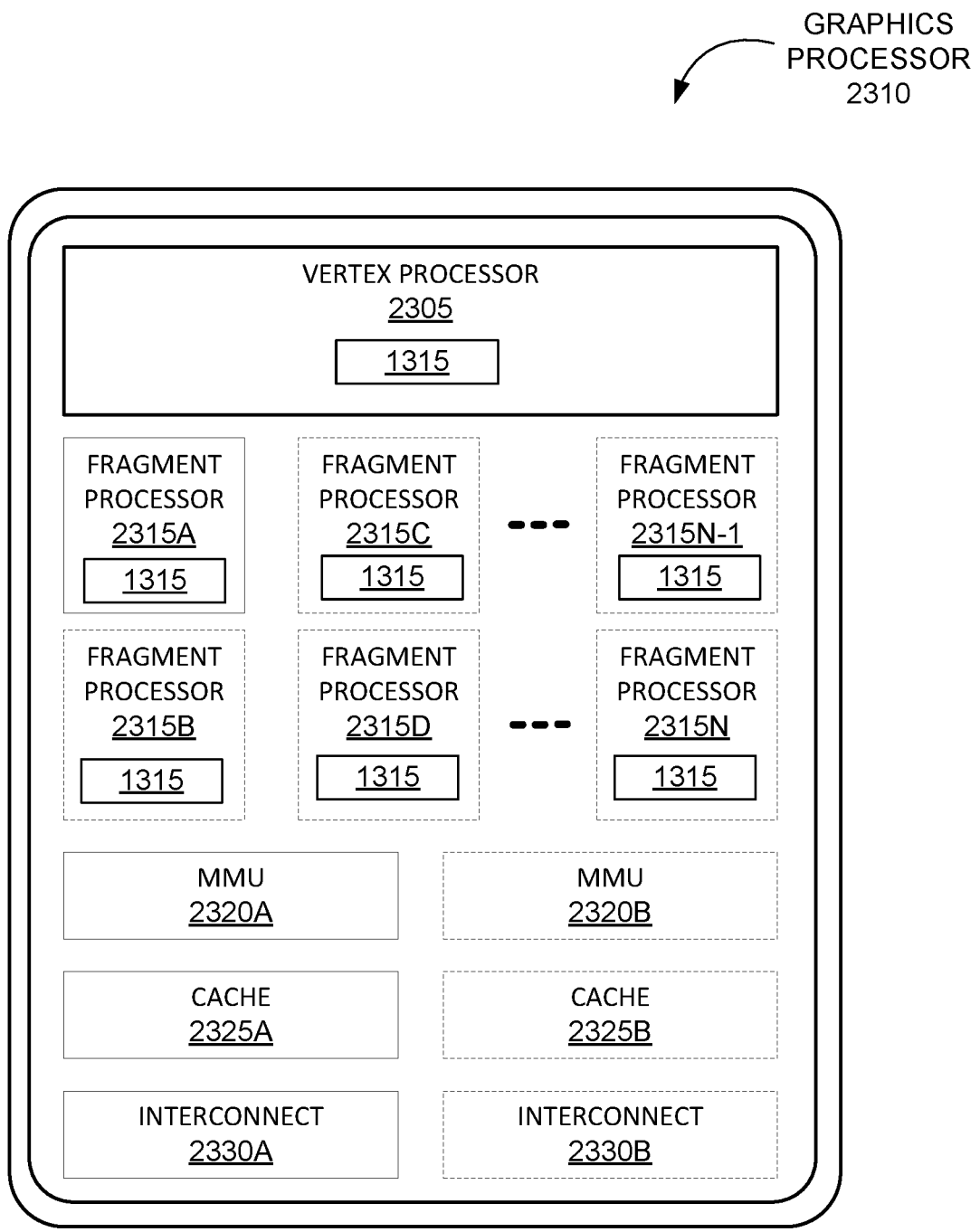
FIGS. 23A and 23B illustrate exemplary integrated circuits and associated graphics processors, according to at least one embodiment.
Figure 23B:
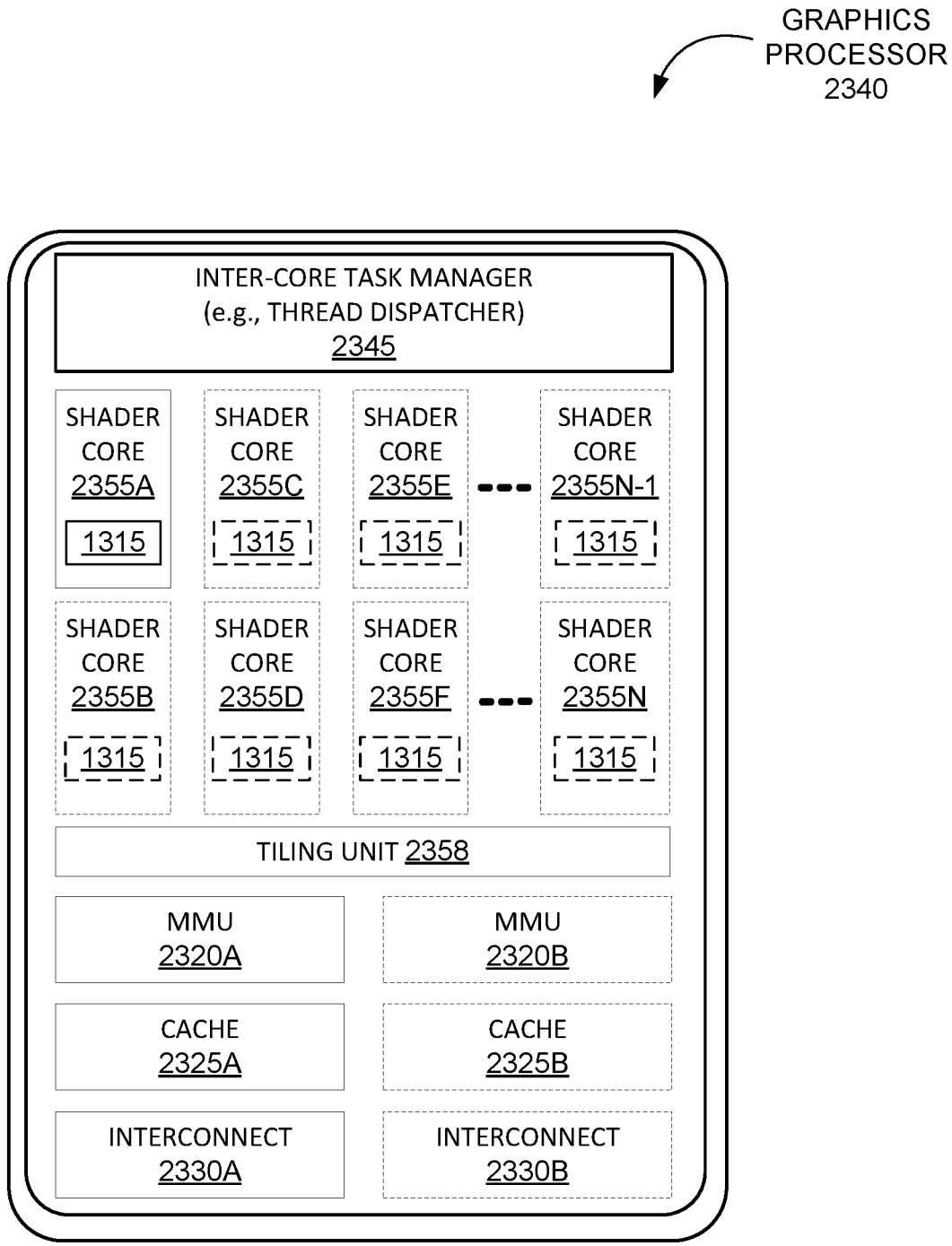

FIGS. 23A-23B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 23A-23B are block diagrams illustrating exemplary graphics processors for use within an SoC, according to embodiments described herein. FIG. 23A illustrates an exemplary graphics processor 2310 of a system on a chip integrated circuit that may be fabricated using one or more IP cores, according to at least one embodiment. FIG. 23B illustrates an additional exemplary graphics processor 2340 of a system on a chip integrated circuit that may be fabricated using one or more IP cores, according to at least one embodiment. In at least one embodiment, graphics processor 2310 of FIG. 23A is a low power graphics processor core. In at least one embodiment, graphics processor 2340 of FIG. 23B is a higher performance graphics processor core. In at least one embodiment, each of graphics processors 2310, 2340 can be variants of graphics processor 2210 of FIG. 22.

In at least one embodiment, graphics processor 2310 includes a vertex processor 2305 and one or more fragment processor(s) 2315A-2315N (e.g., 2315A, 2315B, 2315C, 2315D, through 2315N-1, and 2315N). In at least one embodiment, graphics processor 2310 can execute different shader programs via separate logic, such that vertex processor 2305 is optimized to execute operations for vertex shader programs, while one or more fragment processor(s) 2315A-2315N execute fragment (e.g., pixel) shading operations for fragment or pixel shader programs. In at least one embodiment, vertex processor 2305 performs a vertex processing stage of a 3D graphics pipeline and generates primitives and vertex data. In at least one embodiment, fragment processor(s) 2315A-2315N use primitive and vertex data generated by vertex processor 2305 to produce a framebuffer that is displayed on a display device. In at least one embodiment, fragment processor(s) 2315A-2315N are optimized to execute fragment shader programs as provided for in an OpenGL API, which may be used to perform similar operations as a pixel shader program as provided for in a Direct 3D API.

In at least one embodiment, graphics processor 2310 additionally includes one or more memory management units (MMUs) 2320A-2320B, cache(s) 2325A-2325B, and circuit interconnect(s) 2330A-2330B. In at least one embodiment, one or more MMU(s) 2320A-2320B provide for virtual to physical address mapping for graphics processor 2310, including for vertex processor 2305 and/or fragment processor(s) 2315A-2315N, which may reference vertex or image/texture data stored in memory, in addition to vertex or image/texture data stored in one or more cache(s) 2325A-2325B. In at least one embodiment, one or more MMU(s) 2320A-2320B may be synchronized with other MMUs within system, including one or more MMUs associated with one or more application processor(s) 2205, image processors 2215, and/or video processors 2220 of FIG. 22, such that each processor 2205-2220 can participate in a shared or unified virtual memory system. In at least one embodiment, one or more circuit interconnect(s) 2330A-2330B enable graphics processor 2310 to interface with other IP cores within SoC, either via an internal bus of SoC or via a direct connection.

In at least one embodiment, graphics processor 2340 includes one or more MMU(s) 2320A-2320B, caches 2325A-2325B, and circuit interconnects 2330A-2330B of graphics processor 2310 of FIG. 23A. In at least one embodiment, graphics processor 2340 includes one or more shader core(s) 2355A-2355N (e.g., 2355A, 2355B, 2355C, 2355D, 2355E, 2355F, through 2355N-1, and 2355N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2340 includes an inter-core task manager 2345, which acts as a thread dispatcher to dispatch execution threads to one or more shader cores 2355A-2355N and a tiling unit 2358 to accelerate tiling operations for tile-based rendering, in which rendering operations for a scene are subdivided in image space, for example to exploit local spatial coherence within a scene or to optimize use of internal caches.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in integrated circuit 23A and/or 23B for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 24A:
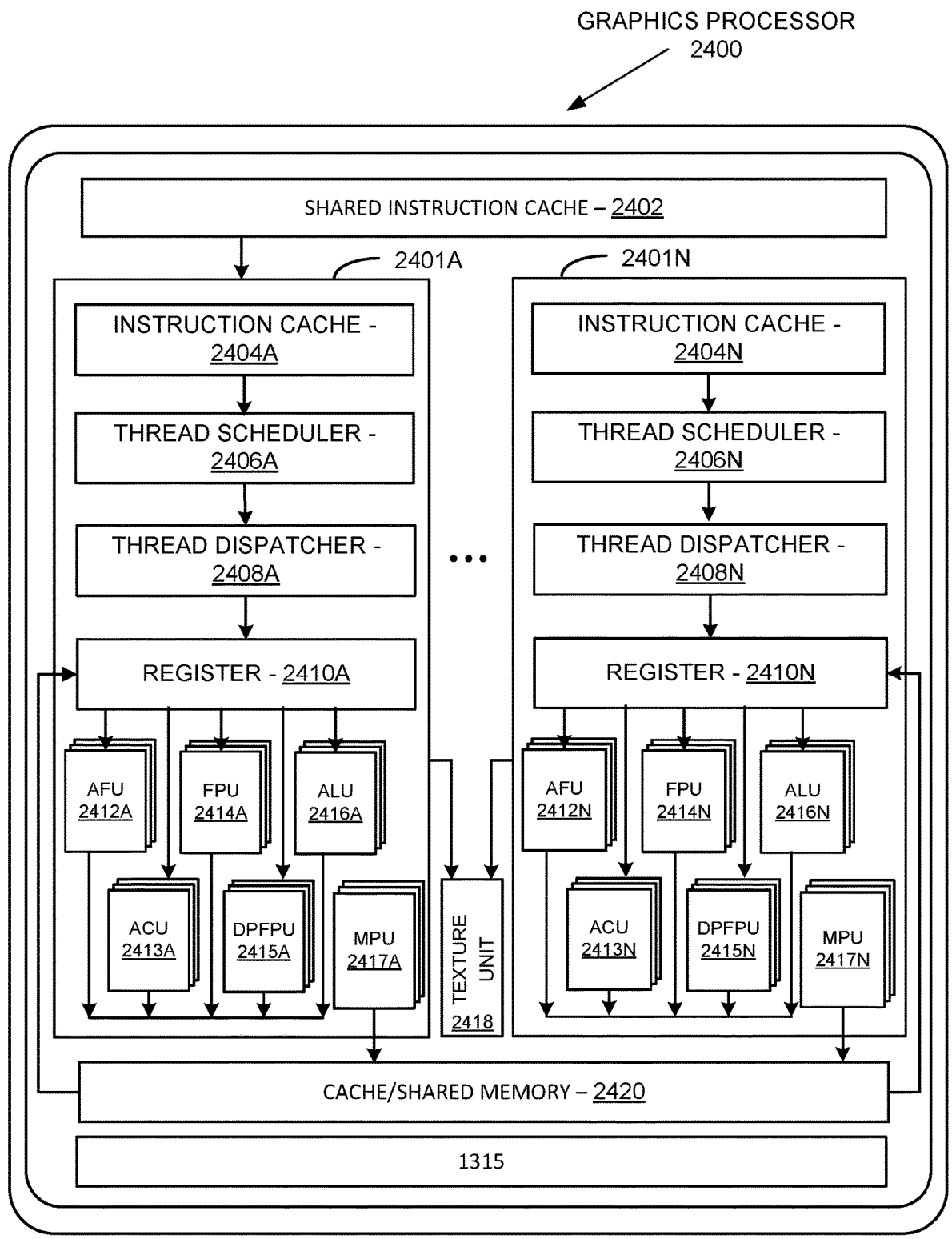
FIGS. 24A and 24B illustrate additional exemplary graphics processor logic according to at least one embodiment.
Figure 24B:
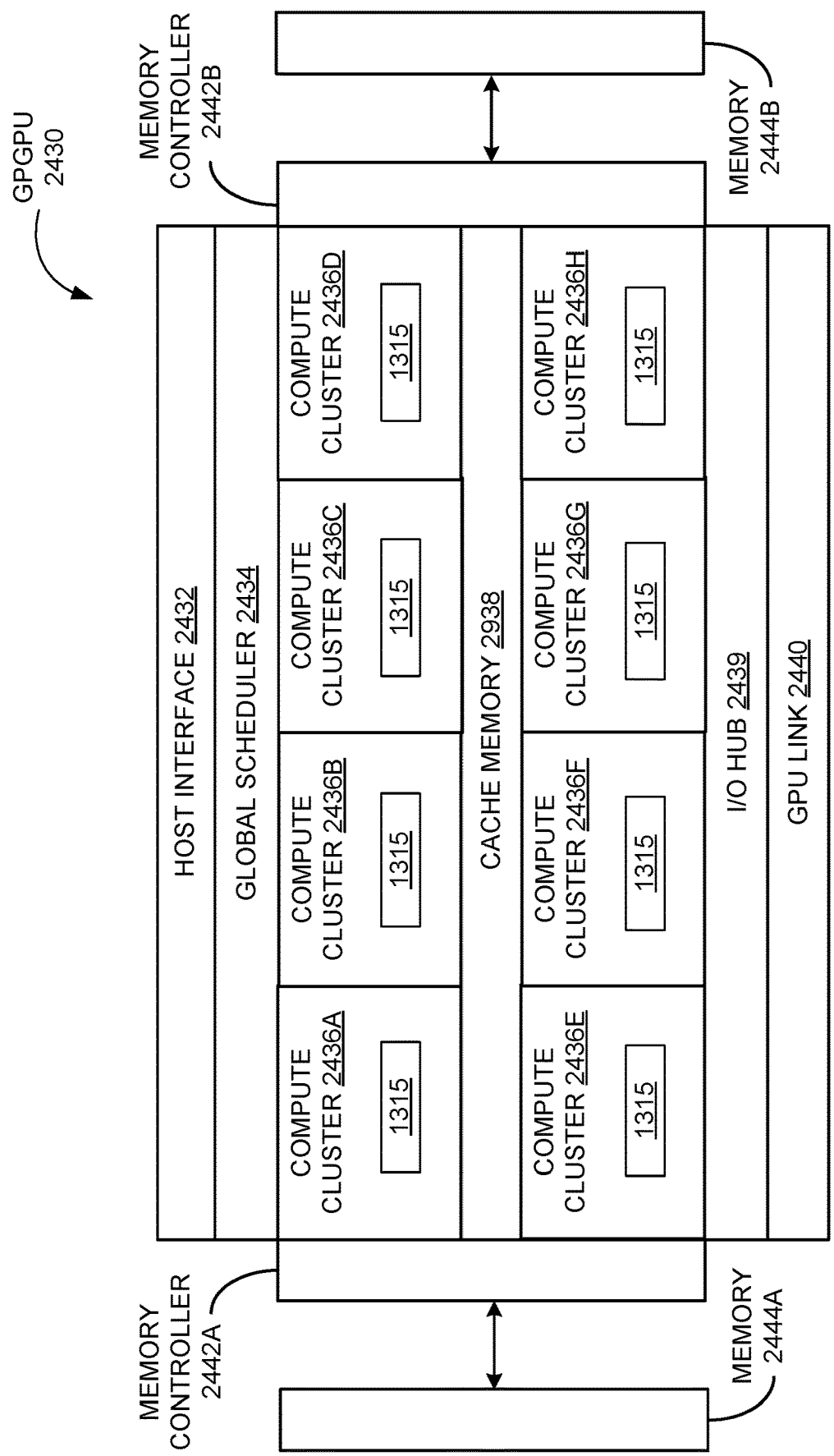

FIGS. 24A-24B illustrate additional exemplary graphics processor logic according to embodiments described herein. FIG. 24A illustrates a graphics core 2400 that may be included within graphics processor 2210 of FIG. 22, in at least one embodiment, and may be a unified shader core 2355A-2355N as in FIG. 23B in at least one embodiment. FIG. 24B illustrates a highly-parallel general-purpose graphics processing unit 2430 suitable for deployment on a multi-chip module in at least one embodiment.

In at least one embodiment, graphics core 2400 includes a shared instruction cache 2402, a texture unit 2418, and a cache/shared memory 2420 that are common to execution resources within graphics core 2400. In at least one embodiment, graphics core 2400 can include multiple slices 2401A-2401N or partition for each core, and a graphics processor can include multiple instances of graphics core 2400. Slices 2401A-2401N can include support logic including a local instruction cache 2404A-2404N, a thread scheduler 2406A-2406N, a thread dispatcher 2408A-2408N, and a set of registers 2410A-2410N. In at least one embodiment, slices 2401A-2401N can include a set of additional function units (AFUs 2412A-2412N), floating-point units (FPU 2414A-2414N), integer arithmetic logic units (ALUs 2416-2416N), address computational units (ACU 2413A-2413N), double-precision floating-point units (DPFPU 2415A-2415N), and matrix processing units (MPU 2417A-2417N).

In at least one embodiment, FPUs 2414A-2414N can perform single-precision (32-bit) and half-precision (16-bit) floating point operations, while DPFPUs 2415A-2415N perform double precision (64-bit) floating point operations. In at least one embodiment, ALUs 2416A-2416N can perform variable precision integer operations at 8-bit, 16-bit, and 32-bit precision, and can be configured for mixed precision operations. In at least one embodiment, MPUs 2417A-2417N can also be configured for mixed precision matrix operations, including half-precision floating point and 8-bit integer operations. In at least one embodiment, MPUs 2417-2417N can perform a variety of matrix operations to accelerate machine learning application frameworks, including enabling support for accelerated general matrix to matrix multiplication (GEMM). In at least one embodiment, AFUs 2412A-2412N can perform additional logic operations not supported by floating-point or integer units, including trigonometric operations (e.g., Sine, Cosine, etc.).

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in graphics core 2400 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

FIG. 24B illustrates a general-purpose processing unit (GPGPU) 2430 that can be configured to enable highly-parallel compute operations to be performed by an array of graphics processing units, in at least one embodiment. In at least one embodiment, GPGPU 2430 can be linked directly to other instances of GPGPU 2430 to create a multi-GPU cluster to improve training speed for deep neural networks. In at least one embodiment, GPGPU 2430 includes a host interface 2432 to enable a connection with a host processor. In at least one embodiment, host interface 2432 is a PCI Express interface. In at least one embodiment, host interface 2432 can be a vendor specific communications interface or communications fabric. In at least one embodiment, GPGPU 2430 receives commands from a host processor and uses a global scheduler 2434 to distribute execution threads associated with those commands to a set of compute clusters 2436A-2436H. In at least one embodiment, compute clusters 2436A-2436H share a cache memory 2438. In at least one embodiment, cache memory 2438 can serve as a higher-level cache for cache memories within compute clusters 2436A-2436H.

In at least one embodiment, GPGPU 2430 includes memory 2444A-2444B coupled with compute clusters 2436A-2436H via a set of memory controllers 2442A-2442B. In at least one embodiment, memory 2444A-2444B can include various types of memory devices including dynamic random access memory (DRAM) or graphics random access memory, such as synchronous graphics random access memory (SGRAM), including graphics double data rate (GDDR) memory.

In at least one embodiment, compute clusters 2436A-2436H each include a set of graphics cores, such as graphics core 2400 of FIG. 24A, which can include multiple types of integer and floating point logic units that can perform computational operations at a range of precisions including suited for machine learning computations. For example, in at least one embodiment, at least a subset of floating point units in each of compute clusters 2436A-2436H can be configured to perform 16-bit or 32-bit floating point operations, while a different subset of floating point units can be configured to perform 64-bit floating point operations.

In at least one embodiment, multiple instances of GPGPU 2430 can be configured to operate as a compute cluster. In at least one embodiment, communication used by compute clusters 2436A-2436H for synchronization and data exchange varies across embodiments. In at least one embodiment, multiple instances of GPGPU 2430 communicate over host interface 2432. In at least one embodiment, GPGPU 2430 includes an I/O hub 2439 that couples GPGPU 2430 with a GPU link 2440 that enables a direct connection to other instances of GPGPU 2430. In at least one embodiment, GPU link 2440 is coupled to a dedicated GPU-to-GPU bridge that enables communication and synchronization between multiple instances of GPGPU 2430. In at least one embodiment GPU link 2440 couples with a high speed interconnect to transmit and receive data to other GPGPUs or parallel processors. In at least one embodiment, multiple instances of GPGPU 2430 are located in separate data processing systems and communicate via a network device that is accessible via host interface 2432. In at least one embodiment GPU link 2440 can be configured to enable a connection to a host processor in addition to or as an alternative to host interface 2432.

In at least one embodiment, GPGPU 2430 can be configured to train neural networks. In at least one embodiment, GPGPU 2430 can be used within a inferencing platform. In at least one embodiment, in which GPGPU 2430 is used for inferencing, GPGPU may include fewer compute clusters 2436A-2436H relative to when GPGPU is used for training a neural network. In at least one embodiment, memory technology associated with memory 2444A-2444B may differ between inferencing and training configurations, with higher bandwidth memory technologies devoted to training configurations. In at least one embodiment, inferencing configuration of GPGPU 2430 can support inferencing specific instructions. For example, in at least one embodiment, an inferencing configuration can provide support for one or more 8-bit integer dot product instructions, which may be used during inferencing operations for deployed neural networks.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in GPGPU 2430 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 25:
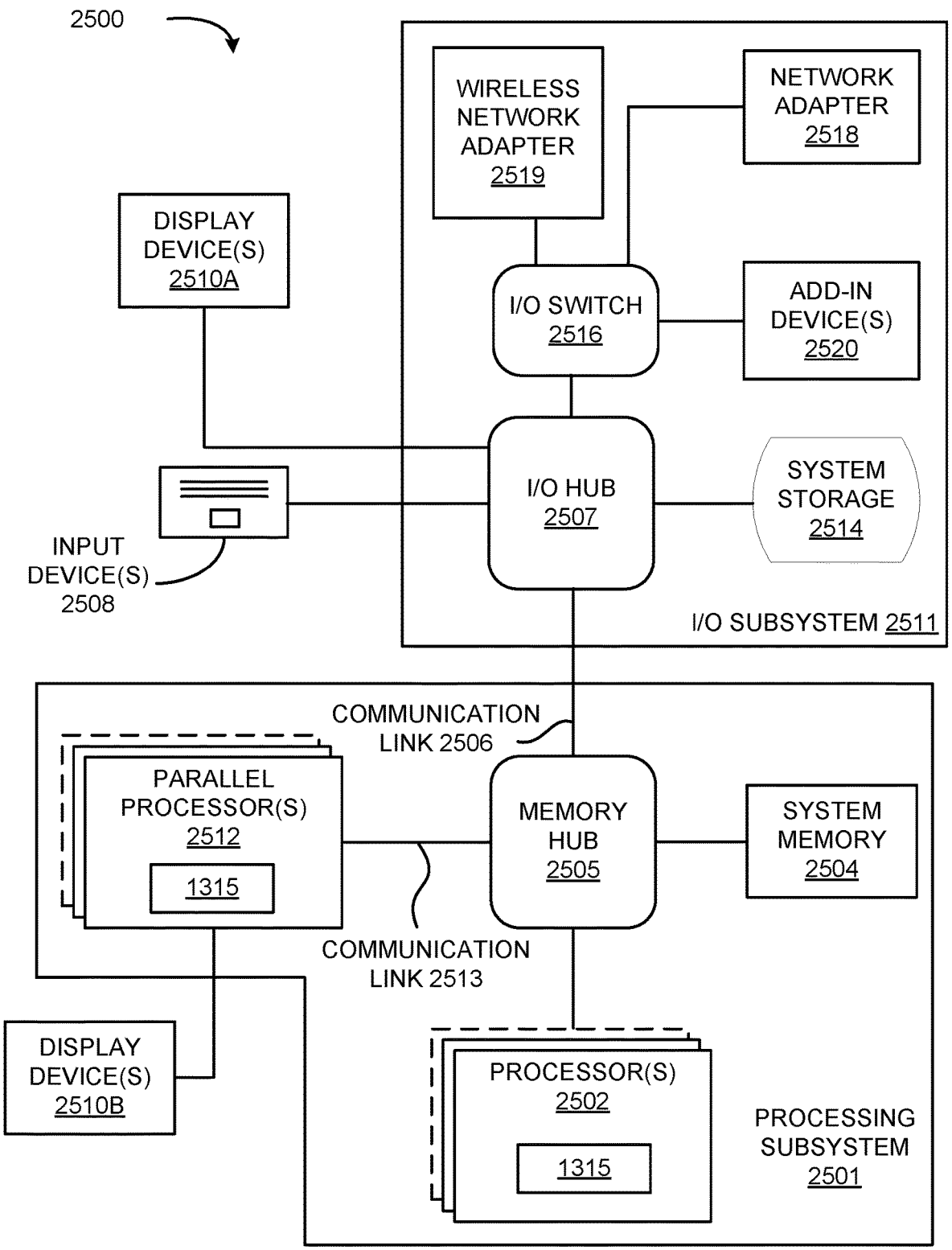
FIG. 25 illustrates a computer system, according to at least one embodiment.

FIG. 25 is a block diagram illustrating a computing system 2500 according to at least one embodiment. In at least one embodiment, computing system 2500 includes a processing subsystem 2501 having one or more processor(s) 2502 and a system memory 2504 communicating via an interconnection path that may include a memory hub 2505. In at least one embodiment, memory hub 2505 may be a separate component within a chipset component or may be integrated within one or more processor(s) 2502. In at least one embodiment, memory hub 2505 couples with an I/O subsystem 2511 via a communication link 2506. In at least one embodiment, I/O subsystem 2511 includes an I/O hub 2507 that can enable computing system 2500 to receive input from one or more input device(s) 2508. In at least one embodiment, I/O hub 2507 can enable a display controller, which may be included in one or more processor(s) 2502, to provide outputs to one or more display device(s) 2510A. In at least one embodiment, one or more display device(s) 2510A coupled with I/O hub 2507 can include a local, internal, or embedded display device.

In at least one embodiment, processing subsystem 2501 includes one or more parallel processor(s) 2512 coupled to memory hub 2505 via a bus or other communication link 2513. In at least one embodiment, communication link 2513 may be one of any number of standards based communication link technologies or protocols, such as, but not limited to PCI Express, or may be a vendor specific communications interface or communications fabric. In at least one embodiment, one or more parallel processor(s) 2512 form a computationally focused parallel or vector processing system that can include a large number of processing cores and/or processing clusters, such as a many integrated core (MIC) processor. In at least one embodiment, one or more parallel processor(s) 2512 form a graphics processing subsystem that can output pixels to one of one or more display device(s) 2510A coupled via I/O Hub 2507. In at least one embodiment, one or more parallel processor(s) 2512 can also include a display controller and display interface (not shown) to enable a direct connection to one or more display device(s) 2510B.

In at least one embodiment, a system storage unit 2514 can connect to I/O hub 2507 to provide a storage mechanism for computing system 2500. In at least one embodiment, an I/O switch 2516 can be used to provide an interface mechanism to enable connections between I/O hub 2507 and other components, such as a network adapter 2518 and/or wireless network adapter 2519 that may be integrated into platform, and various other devices that can be added via one or more add-in device(s) 2520. In at least one embodiment, network adapter 2518 can be an Ethernet adapter or another wired network adapter. In at least one embodiment, wireless network adapter 2519 can include one or more of a Wi-Fi, Bluetooth, near field communication (NFC), or other network device that includes one or more wireless radios.

In at least one embodiment, computing system 2500 can include other components not explicitly shown, including USB or other port connections, optical storage drives, video capture devices, and like, may also be connected to I/O hub 2507. In at least one embodiment, communication paths interconnecting various components in FIG. 25 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2512 incorporate circuitry optimized for graphics and video processing, including, for example, video output circuitry, and constitutes a graphics processing unit (GPU). In at least one embodiment, one or more parallel processor(s) 2512 incorporate circuitry optimized for general purpose processing. In at least embodiment, components of computing system 2500 may be integrated with one or more other system elements on a single integrated circuit. For example, in at least one embodiment, one or more parallel processor(s) 2512, memory hub 2505, processor(s) 2502, and I/O hub 2507 can be integrated into a system on chip (SoC) integrated circuit. In at least one embodiment, components of computing system 2500 can be integrated into a single package to form a system in package (SIP) configuration. In at least one embodiment, at least a portion of components of computing system 2500 can be integrated into a multi-chip module (MCM), which can be interconnected with other multi-chip modules into a modular computing system.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in system FIG. 2500 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Processors

Figure 26A:
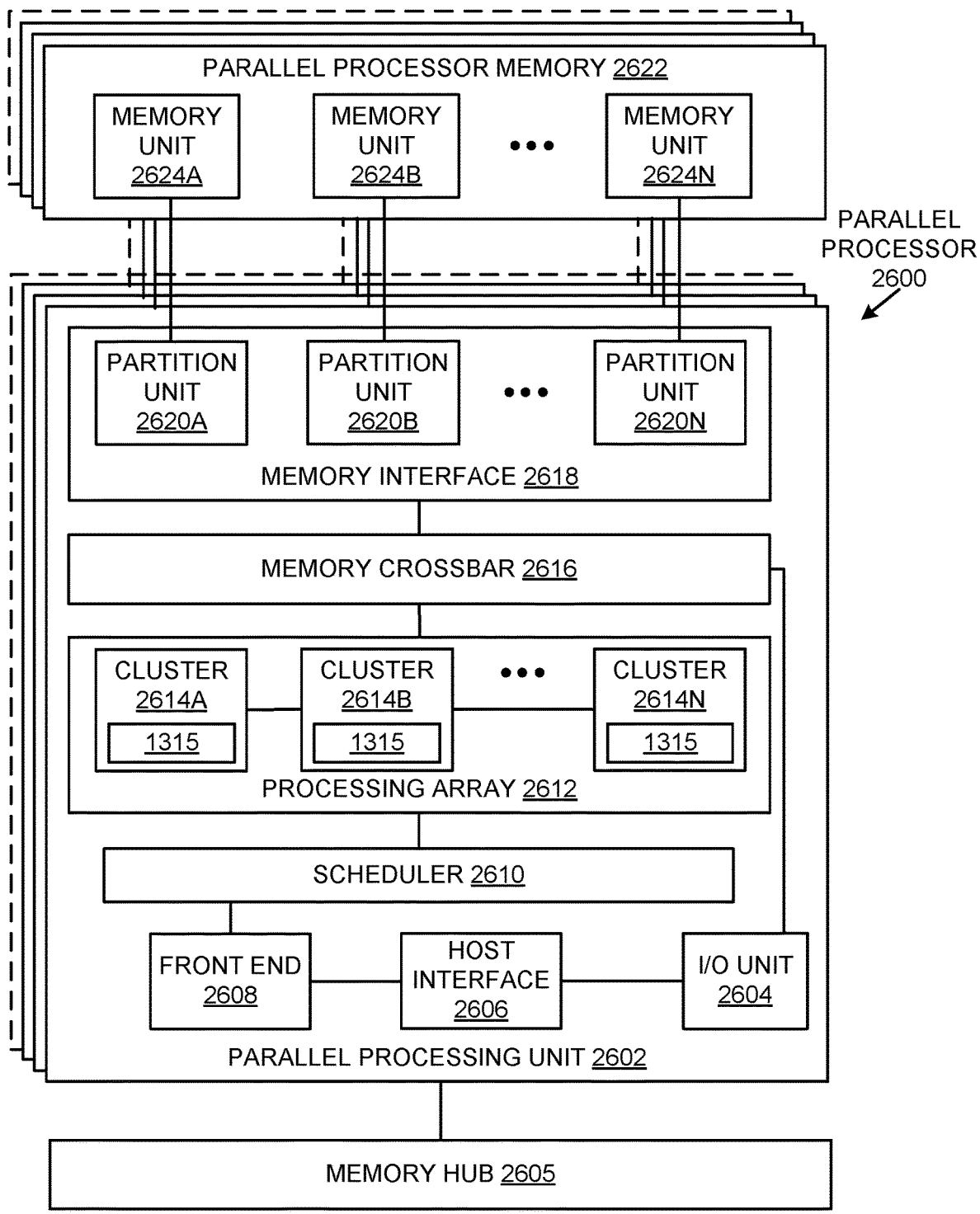
FIG. 26A illustrates a parallel processor, according to at least one embodiment.

FIG. 26A illustrates a parallel processor 2600 according to at least on embodiment. In at least one embodiment, various components of parallel processor 2600 may be implemented using one or more integrated circuit devices, such as programmable processors, application specific integrated circuits (ASICs), or field programmable gate arrays (FPGA). In at least one embodiment, illustrated parallel processor 2600 is a variant of one or more parallel processor(s) 2512 shown in FIG. 25 according to an exemplary embodiment.

In at least one embodiment, parallel processor 2600 includes a parallel processing unit 2602. In at least one embodiment, parallel processing unit 2602 includes an I/O unit 2604 that enables communication with other devices, including other instances of parallel processing unit 2602. In at least one embodiment, I/O unit 2604 may be directly connected to other devices. In at least one embodiment, I/O unit 2604 connects with other devices via use of a hub or switch interface, such as memory hub 2505. In at least one embodiment, connections between memory hub 2505 and I/O unit 2604 form a communication link 2513. In at least one embodiment, I/O unit 2604 connects with a host interface 2606 and a memory crossbar 2616, where host interface 2606 receives commands directed to performing processing operations and memory crossbar 2616 receives commands directed to performing memory operations.

In at least one embodiment, when host interface 2606 receives a command buffer via I/O unit 2604, host interface 2606 can direct work operations to perform those commands to a front end 2608. In at least one embodiment, front end 2608 couples with a scheduler 2610, which is configured to distribute commands or other work items to a processing cluster array 2612. In at least one embodiment, scheduler 2610 ensures that processing cluster array 2612 is properly configured and in a valid state before tasks are distributed to processing cluster array 2612 of processing cluster array 2612. In at least one embodiment, scheduler 2610 is implemented via firmware logic executing on a microcontroller. In at least one embodiment, microcontroller implemented scheduler 2610 is configurable to perform complex scheduling and work distribution operations at coarse and fine granularity, enabling rapid preemption and context switching of threads executing on processing array 2612. In at least one embodiment, host software can prove workloads for scheduling on processing array 2612 via one of multiple graphics processing doorbells. In at least one embodiment, workloads can then be automatically distributed across processing array 2612 by scheduler 2610 logic within a microcontroller including scheduler 2610.

In at least one embodiment, processing cluster array 2612 can include up to "N" processing clusters (e.g., cluster 2614A, cluster 2614B, through cluster 2614N). In at least one embodiment, each cluster 2614A-2614N of processing cluster array 2612 can execute a large number of concurrent threads. In at least one embodiment, scheduler 2610 can allocate work to clusters 2614A-2614N of processing cluster array 2612 using various scheduling and/or work distribution algorithms, which may vary depending on workload arising for each type of program or computation. In at least one embodiment, scheduling can be handled dynamically by scheduler 2610, or can be assisted in part by compiler logic during compilation of program logic configured for execution by processing cluster array 2612. In at least one embodiment, different clusters 2614A-2614N of processing cluster array 2612 can be allocated for processing different types of programs or for performing different types of computations.

In at least one embodiment, processing cluster array 2612 can be configured to perform various types of parallel processing operations. In at least one embodiment, processing cluster array 2612 is configured to perform general-purpose parallel compute operations. For example, in at least one embodiment, processing cluster array 2612 can include logic to execute processing tasks including filtering of video and/or audio data, performing modeling operations, including physics operations, and performing data transformations.

In at least one embodiment, processing cluster array 2612 is configured to perform parallel graphics processing operations. In at least one embodiment, processing cluster array 2612 can include additional logic to support execution of such graphics processing operations, including, but not limited to texture sampling logic to perform texture operations, as well as tessellation logic and other vertex processing logic. In at least one embodiment, processing cluster array 2612 can be configured to execute graphics processing related shader programs such as, but not limited to vertex shaders, tessellation shaders, geometry shaders, and pixel shaders. In at least one embodiment, parallel processing unit 2602 can transfer data from system memory via I/O unit 2604 for processing. In at least one embodiment, during processing, transferred data can be stored to on-chip memory (e.g., parallel processor memory 2622) during processing, then written back to system memory.

In at least one embodiment, when parallel processing unit 2602 is used to perform graphics processing, scheduler 2610 can be configured to divide a processing workload into approximately equal sized tasks, to better enable distribution of graphics processing operations to multiple clusters 2614A-2614N of processing cluster array 2612. In at least one embodiment, portions of processing cluster array 2612 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2614A-2614N may be stored in buffers to allow intermediate data to be transmitted between clusters 2614A-2614N for further processing.

In at least one embodiment, processing cluster array 2612 can receive processing tasks to be executed via scheduler 2610, which receives commands defining processing tasks from front end 2608. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2610 may be configured to fetch indices corresponding to tasks or may receive indices from front end 2608. In at least one embodiment, front end 2608 can be configured to ensure processing cluster array 2612 is configured to a valid state before a workload specified by incoming command buffers (e.g., batch-buffers, push buffers, etc.) is initiated.

In at least one embodiment, each of one or more instances of parallel processing unit 2602 can couple with parallel processor memory 2622. In at least one embodiment, parallel processor memory 2622 can be accessed via memory crossbar 2616, which can receive memory requests from processing cluster array 2612 as well as I/O unit 2604. In at least one embodiment, memory crossbar 2616 can access parallel processor memory 2622 via a memory interface 2618. In at least one embodiment, memory interface 2618 can include multiple partition units (e.g., partition unit 2620A, partition unit 2620B, through partition unit 2620N) that can each couple to a portion (e.g., memory unit) of parallel processor memory 2622. In at least one embodiment, a number of partition units 2620A-2620N is configured to be equal to a number of memory units, such that a first partition unit 2620A has a corresponding first memory unit 2624A, a second partition unit 2620B has a corresponding memory unit 2624B, and an Nth partition unit 2620N has a corresponding Nth memory unit 2624N. In at least one embodiment, a number of partition units 2620A-2620N may not be equal to a number of memory devices.

In at least one embodiment, memory units 2624A-2624N can include various types of memory devices, including dynamic random access memory (DRAM) or graphics random access memory, such as synchronous graphics random access memory (SGRAM), including graphics double data rate (GDDR) memory. In at least one embodiment, memory units 2624A-2624N may also include 3D stacked memory, including but not limited to high bandwidth memory (HBM). In at least one embodiment, render targets, such as frame buffers or texture maps may be stored across memory units 2624A-2624N, allowing partition units 2620A-2620N to write portions of each render target in parallel to efficiently use available bandwidth of parallel processor memory 2622. In at least one embodiment, a local instance of parallel processor memory 2622 may be excluded in favor of a unified memory design that utilizes system memory in conjunction with local cache memory.

In at least one embodiment, any one of clusters 2614A-2614N of processing cluster array 2612 can process data that will be written to any of memory units 2624A-2624N within parallel processor memory 2622. In at least one embodiment, memory crossbar 2616 can be configured to transfer an output of each cluster 2614A-2614N to any partition unit 2620A-2620N or to another cluster 2614A-2614N, which can perform additional processing operations on an output. In at least one embodiment, each cluster 2614A-2614N can communicate with memory interface 2618 through memory crossbar 2616 to read from or write to various external memory devices. In at least one embodiment, memory crossbar 2616 has a connection to memory interface 2618 to communicate with I/O unit 2604, as well as a connection to a local instance of parallel processor memory 2622, enabling processing units within different processing clusters 2614A-2614N to communicate with system memory or other memory that is not local to parallel processing unit 2602. In at least one embodiment, memory crossbar 2616 can use virtual channels to separate traffic streams between clusters 2614A-2614N and partition units 2620A-2620N.

In at least one embodiment, multiple instances of parallel processing unit 2602 can be provided on a single add-in card, or multiple add-in cards can be interconnected. In at least one embodiment, different instances of parallel processing unit 2602 can be configured to inter-operate even if different instances have different numbers of processing cores, different amounts of local parallel processor memory, and/or other configuration differences. For example, in at least one embodiment, some instances of parallel processing unit 2602 can include higher precision floating point units relative to other instances. In at least one embodiment, systems incorporating one or more instances of parallel processing unit 2602 or parallel processor 2600 can be implemented in a variety of configurations and form factors, including but not limited to desktop, laptop, or handheld personal computers, servers, workstations, game consoles, and/or embedded systems.

Figure 26B:
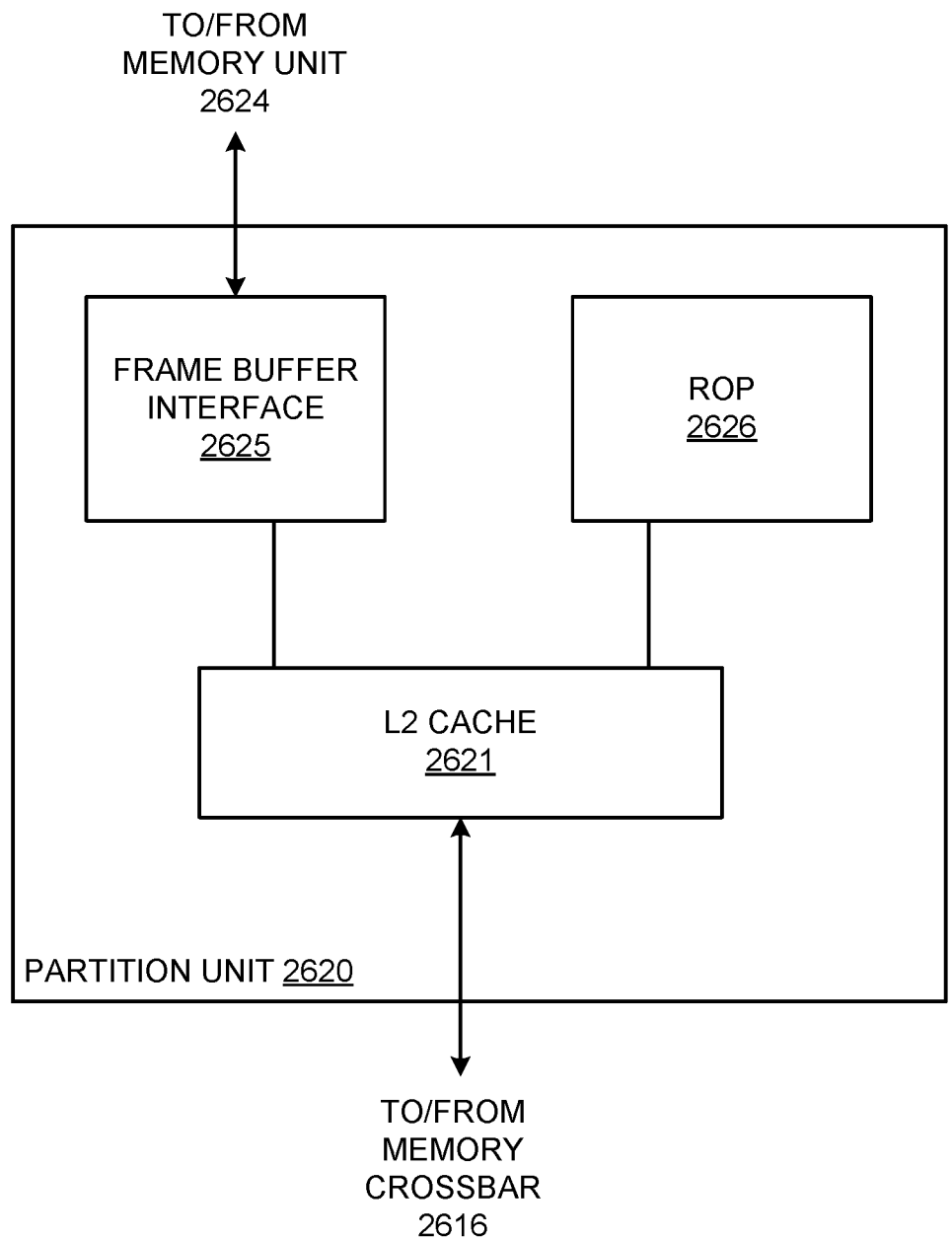
FIG. 26B illustrates a partition unit, according to at least one embodiment.

FIG. 26B is a block diagram of a partition unit 2620 according to at least one embodiment. In at least one embodiment, partition unit 2620 is an instance of one of partition units 2620A-2620N of FIG. 26A. In at least one embodiment, partition unit 2620 includes an L2 cache 2621, a frame buffer interface 2625, and a ROP 2626 (raster operations unit). L2 cache 2621 is a read/write cache that is configured to perform load and store operations received from memory crossbar 2616 and ROP 2626. In at least one embodiment, read misses and urgent write-back requests are output by L2 cache 2621 to frame buffer interface 2625 for processing. In at least one embodiment, updates can also be sent to a frame buffer via frame buffer interface 2625 for processing. In at least one embodiment, frame buffer interface 2625 interfaces with one of memory units in parallel processor memory, such as memory units 2624A-2624N of FIG. 26 (e.g., within parallel processor memory 2622).

In at least one embodiment, ROP 2626 is a processing unit that performs raster operations such as stencil, z test, blending, and like. In at least one embodiment, ROP 2626 then outputs processed graphics data that is stored in graphics memory. In at least one embodiment, ROP 2626 includes compression logic to compress depth or color data that is written to memory and decompress depth or color data that is read from memory. In at least one embodiment, compression logic can be lossless compression logic that makes use of one or more of multiple compression algorithms. Type of compression that is performed by ROP 2626 can vary based on statistical characteristics of data to be compressed. For example, in at least one embodiment, delta color compression is performed on depth and color data on a per-tile basis.

In at least one embodiment, ROP 2626 is included within each processing cluster (e.g., cluster 2614A-2614N of FIG. 26) instead of within partition unit 2620. In at least one embodiment, read and write requests for pixel data are transmitted over memory crossbar 2616 instead of pixel fragment data. In at least one embodiment, processed graphics data may be displayed on a display device, such as one of one or more display device(s) 2510 of FIG. 25, routed for further processing by processor(s) 2502, or routed for further processing by one of processing entities within parallel processor 2600 of FIG. 26A.

Figure 26C:
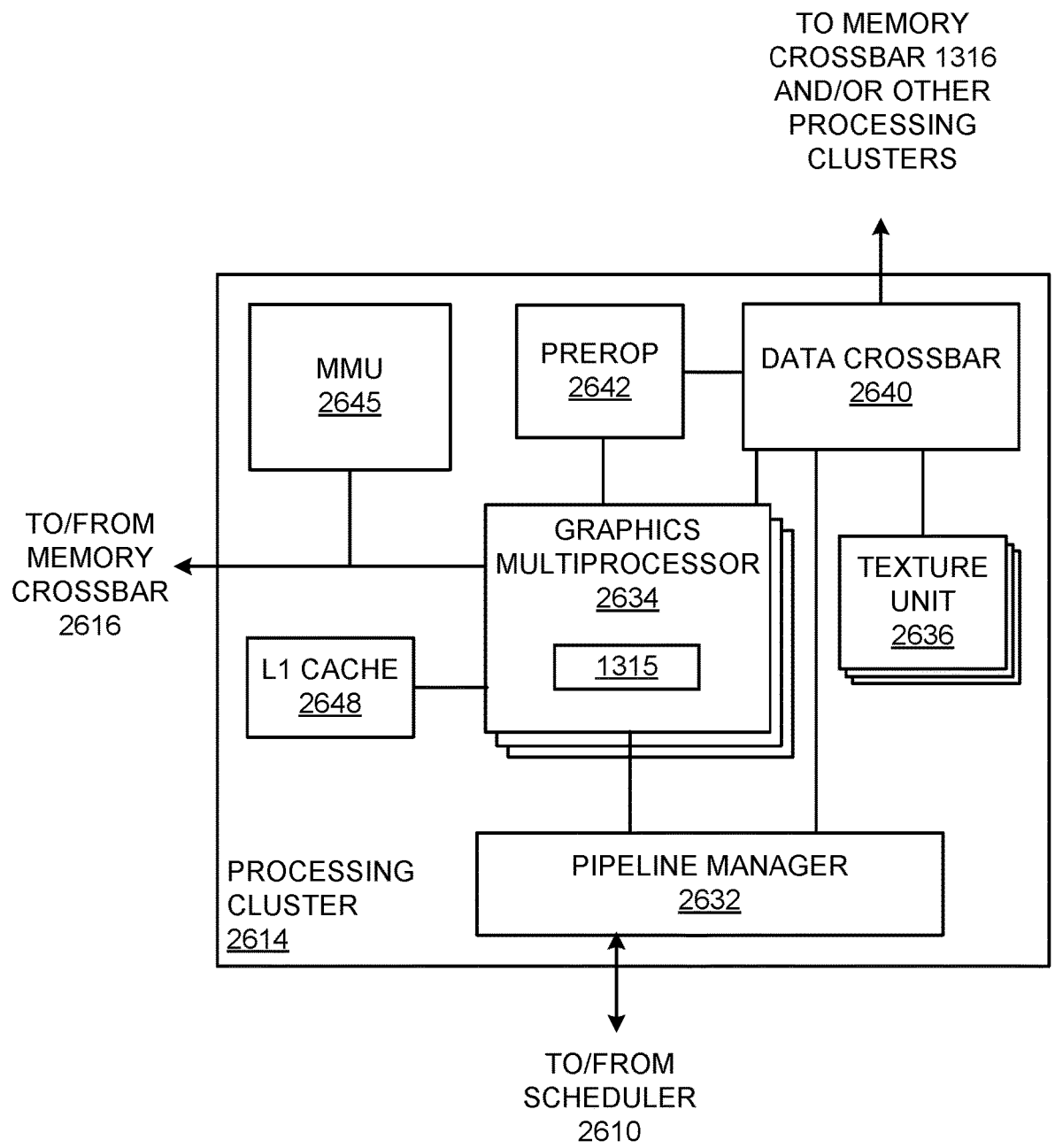
FIG. 26C illustrates a processing cluster, according to at least one embodiment.

FIG. 26C is a block diagram of a processing cluster 2614 within a parallel processing unit according to at least one embodiment. In at least one embodiment, a processing cluster is an instance of one of processing clusters 2614A-2614N of FIG. 26. In at least one embodiment, processing cluster 2614 can be configured to execute many threads in parallel, where term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2614 can be controlled via a pipeline manager 2632 that distributes processing tasks to SIMT parallel processors. In at least one embodiment, pipeline manager 2632 receives instructions from scheduler 2610 of FIG. 26 and manages execution of those instructions via a graphics multiprocessor 2634 and/or a texture unit 2636. In at least one embodiment, graphics multiprocessor 2634 is an exemplary instance of a SIMT parallel processor. However, in at least one embodiment, various types of SIMT parallel processors of differing architectures may be included within processing cluster 2614. In at least one embodiment, one or more instances of graphics multiprocessor 2634 can be included within a processing cluster 2614. In at least one embodiment, graphics multiprocessor 2634 can process data and a data crossbar 2640 can be used to distribute processed data to one of multiple possible destinations, including other shader units. In at least one embodiment, pipeline manager 2632 can facilitate distribution of processed data by specifying destinations for processed data to be distributed via data crossbar 2640.

In at least one embodiment, each graphics multiprocessor 2634 within processing cluster 2614 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2614 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 2634. In at least one embodiment, a thread group may include fewer threads than a number of processing engines within graphics multiprocessor 2634. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2634. In at least one embodiment, when a thread group includes more threads than number of processing engines within graphics multiprocessor 2634, processing can be performed over consecutive clock cycles. In at least one embodiment, multiple thread groups can be executed concurrently on a graphics multiprocessor 2634.

In at least one embodiment, graphics multiprocessor 2634 includes an internal cache memory to perform load and store operations. In at least one embodiment, graphics multiprocessor 2634 can forego an internal cache and use a cache memory (e.g., L1 cache 2648) within processing cluster 2614. In at least one embodiment, each graphics multiprocessor 2634 also has access to L2 caches within partition units (e.g., partition units 2620A-2620N of FIG. 26) that are shared among all processing clusters 2614 and may be used to transfer data between threads. In at least one embodiment, graphics multiprocessor 2634 may also access off-chip global memory, which can include one or more of local parallel processor memory and/or system memory. In at least one embodiment, any memory external to parallel processing unit 2602 may be used as global memory. In at least one embodiment, processing cluster 2614 includes multiple instances of graphics multiprocessor 2634 can share common instructions and data, which may be stored in L1 cache 2648.

In at least one embodiment, each processing cluster 2614 may include an MMU 2645 (memory management unit) that is configured to map virtual addresses into physical addresses. In at least one embodiment, one or more instances of MMU 2645 may reside within memory interface 2618 of FIG. 26. In at least one embodiment, MMU 2645 includes a set of page table entries (PTEs) used to map a virtual address to a physical address of a tile (talk more about tiling) and optionally a cache line index. In at least one embodiment, MMU 2645 may include address translation lookaside buffers (TLB) or caches that may reside within graphics multiprocessor 2634 or L1 cache or processing cluster 2614. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2614 may be configured such that each graphics multiprocessor 2634 is coupled to a texture unit 2636 for performing texture mapping operations, e.g., determining texture sample positions, reading texture data, and filtering texture data. In at least one embodiment, texture data is read from an internal texture L1 cache (not shown) or from an L1 cache within graphics multiprocessor 2634 and is fetched from an L2 cache, local parallel processor memory, or system memory, as needed. In at least one embodiment, each graphics multiprocessor 2634 outputs processed tasks to data crossbar 2640 to provide processed task to another processing cluster 2614 for further processing or to store processed task in an L2 cache, local parallel processor memory, or system memory via memory crossbar 2616. In at least one embodiment, preROP 2642 (pre-raster operations unit) is configured to receive data from graphics multiprocessor 2634, direct data to ROP units, which may be located with partition units as described herein (e.g., partition units 2620A-2620N of FIG. 26). In at least one embodiment, PreROP 2642 unit can perform optimizations for color blending, organize pixel color data, and perform address translations.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in graphics processing cluster 2614 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 26D:
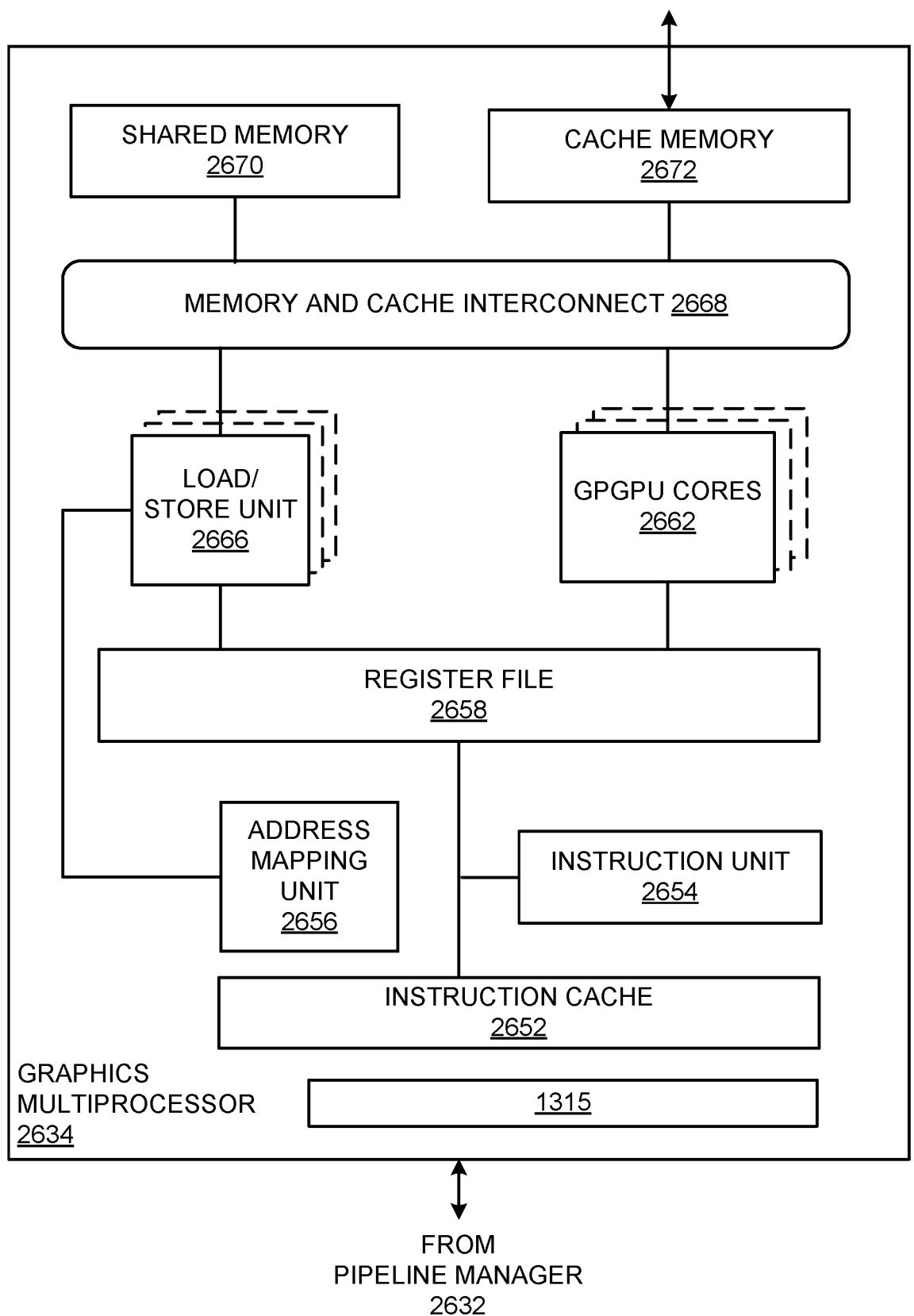
FIG. 26D illustrates a graphics multiprocessor, according to at least one embodiment.

FIG. 26D shows a graphics multiprocessor 2634 according to at least one embodiment. In at least one embodiment, graphics multiprocessor 2634 couples with pipeline manager 2632 of processing cluster 2614. In at least one embodiment, graphics multiprocessor 2634 has an execution pipeline including but not limited to an instruction cache 2652, an instruction unit 2654, an address mapping unit 2656, a register file 2658, one or more general purpose graphics processing unit (GPGPU) cores 2662, and one or more load/store units 2666. GPGPU cores 2662 and load/store units 2666 are coupled with cache memory 2672 and shared memory 2670 via a memory and cache interconnect 2668.

In at least one embodiment, instruction cache 2652 receives a stream of instructions to execute from pipeline manager 2632. In at least one embodiment, instructions are cached in instruction cache 2652 and dispatched for execution by instruction unit 2654. In at least one embodiment, instruction unit 2654 can dispatch instructions as thread groups (e.g., warps), with each thread of thread group assigned to a different execution unit within GPGPU core 2662. In at least one embodiment, an instruction can access any of a local, shared, or global address space by specifying an address within a unified address space. In at least one embodiment, address mapping unit 2656 can be used to translate addresses in a unified address space into a distinct memory address that can be accessed by load/store units 2666.

In at least one embodiment, register file 2658 provides a set of registers for functional units of graphics multiprocessor 2634. In at least one embodiment, register file 2658 provides temporary storage for operands connected to data paths of functional units (e.g., GPGPU cores 2662, load/store units 2666) of graphics multiprocessor 2634. In at least one embodiment, register file 2658 is divided between each of functional units such that each functional unit is allocated a dedicated portion of register file 2658. In at least one embodiment, register file 2658 is divided between different warps being executed by graphics multiprocessor 2634.

In at least one embodiment, GPGPU cores 2662 can each include floating point units (FPUs) and/or integer arithmetic logic units (ALUs) that are used to execute instructions of graphics multiprocessor 2634. GPGPU cores 2662 can be similar in architecture or can differ in architecture. In at least one embodiment, a first portion of GPGPU cores 2662 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 2634 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 2662 include SIMD logic capable of performing a single instruction on multiple sets of data. In at least one embodiment GPGPU cores 2662 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 2668 is an interconnect network that connects each functional unit of graphics multiprocessor 2634 to register file 2658 and to shared memory 2670. In at least one embodiment, memory and cache interconnect 2668 is a crossbar interconnect that allows load/store unit 2666 to implement load and store operations between shared memory 2670 and register file 2658. In at least one embodiment, register file 2658 can operate at a same frequency as GPGPU cores 2662, thus data transfer between GPGPU cores 2662 and register file 2658 is very low latency. In at least one embodiment, shared memory 2670 can be used to enable communication between threads that execute on functional units within graphics multiprocessor 2634. In at least one embodiment, cache memory 2672 can be used as a data cache for example, to cache texture data communicated between functional units and texture unit 2636. In at least one embodiment, shared memory 2670 can also be used as a program managed cached. In at least one embodiment, threads executing on GPGPU cores 2662 can programmatically store data within shared memory in addition to automatically cached data that is stored within cache memory 2672.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in graphics multiprocessor 2634 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 27:
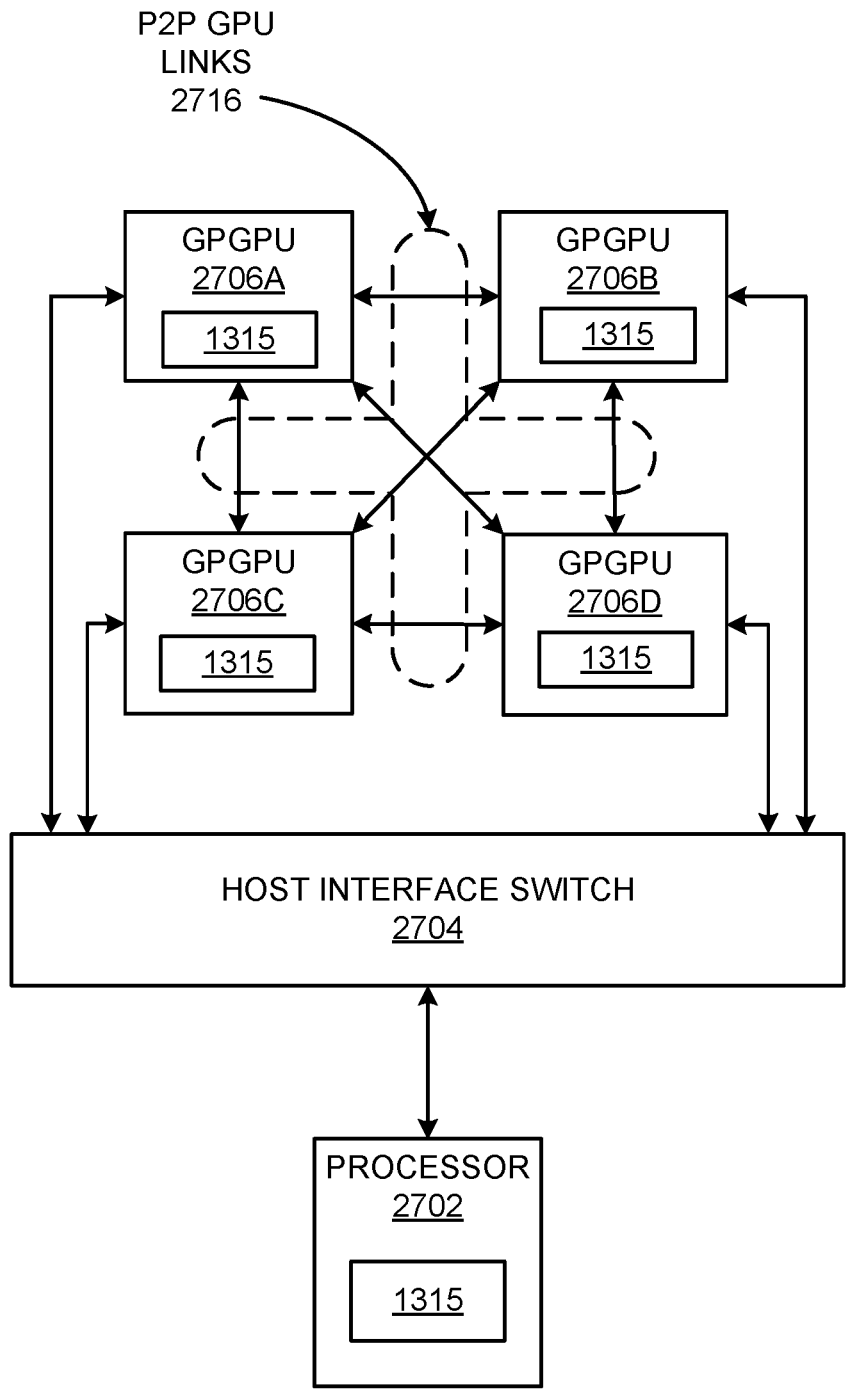
FIG. 27 illustrates a multi-graphics processing unit (GPU) system, according to at least one embodiment.

FIG. 27 illustrates a multi-GPU computing system 2700, according to at least one embodiment. In at least one embodiment, multi-GPU computing system 2700 can include a processor 2702 coupled to multiple general purpose graphics processing units (GPGPUs) 2706A-D via a host interface switch 2704. In at least one embodiment, host interface switch 2704 is a PCI express switch device that couples processor 2702 to a PCI express bus over which processor 2702 can communicate with GPGPUs 2706A-D. GPGPUs 2706A-D can interconnect via a set of high-speed point to point GPU to GPU links 2716. In at least one embodiment, GPU to GPU links 2716 connect to each of GPGPUs 2706A-D via a dedicated GPU link. In at least one embodiment, P2P GPU links 2716 enable direct communication between each of GPGPUs 2706A-D without requiring communication over host interface bus 2704 to which processor 2702 is connected. In at least one embodiment, with GPU-to-GPU traffic directed to P2P GPU links 2716, host interface bus 2704 remains available for system memory access or to communicate with other instances of multi-GPU computing system 2700, for example, via one or more network devices. While in at least one embodiment GPGPUs 2706A-D connect to processor 2702 via host interface switch 2704, in at least one embodiment processor 2702 includes direct support for P2P GPU links 2716 and can connect directly to GPGPUs 2706A-D.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in multi-GPU computing system 2700 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 28:
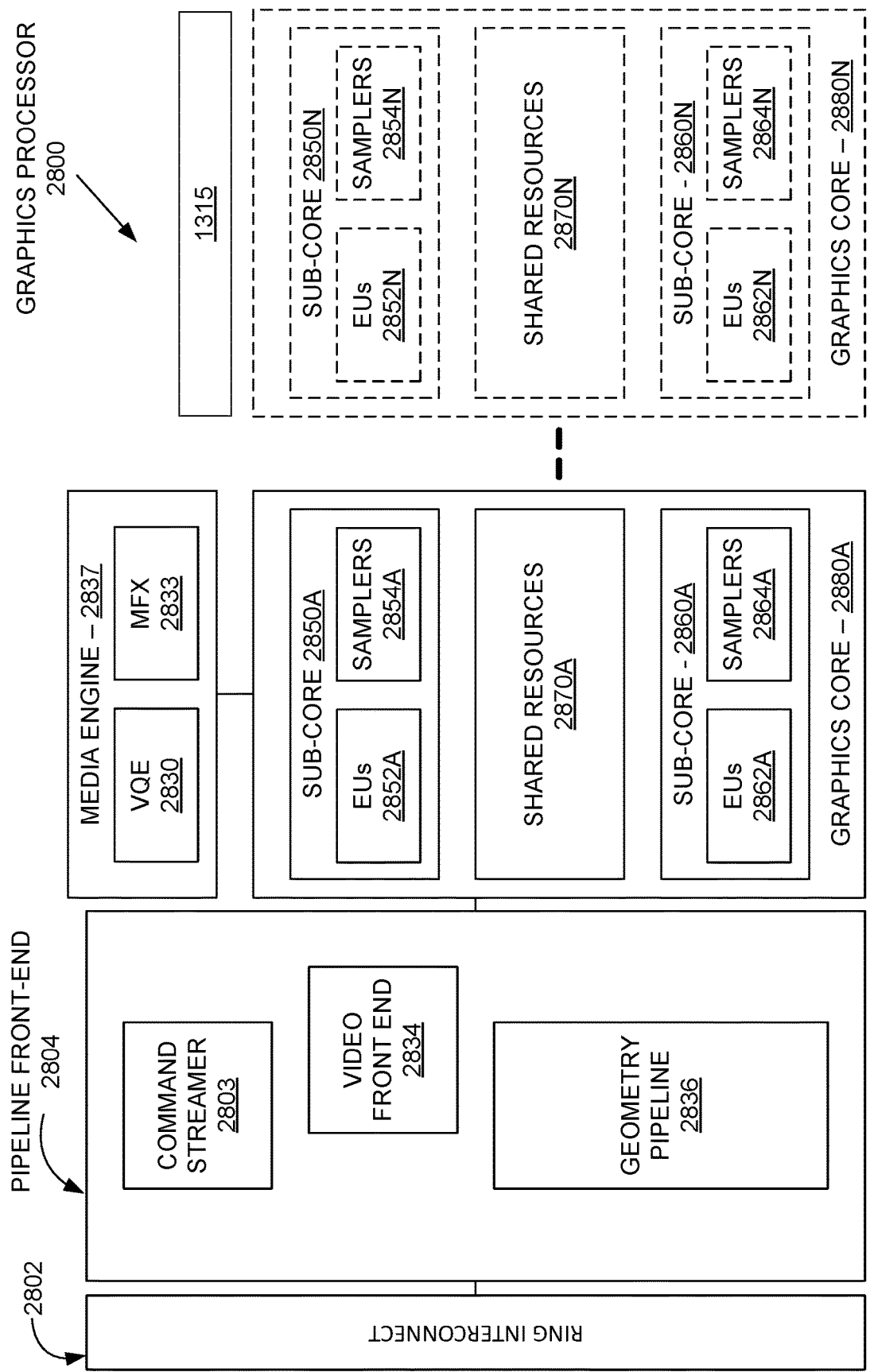
FIG. 28 illustrates a graphics processor, according to at least one embodiment.

FIG. 28 is a block diagram of a graphics processor 2800, according to at least one embodiment. In at least one embodiment, graphics processor 2800 includes a ring interconnect 2802, a pipeline front-end 2804, a media engine 2837, and graphics cores 2880A-2880N. In at least one embodiment, ring interconnect 2802 couples graphics processor 2800 to other processing units, including other graphics processors or one or more general-purpose processor cores. In at least one embodiment, graphics processor 2800 is one of many processors integrated within a multi-core processing system.

In at least one embodiment, graphics processor 2800 receives batches of commands via ring interconnect 2802. In at least one embodiment, incoming commands are interpreted by a command streamer 2803 in pipeline front-end 2804. In at least one embodiment, graphics processor 2800 includes scalable execution logic to perform 3D geometry processing and media processing via graphics core(s) 2880A-2880N. In at least one embodiment, for 3D geometry processing commands, command streamer 2803 supplies commands to geometry pipeline 2836. In at least one embodiment, for at least some media processing commands, command streamer 2803 supplies commands to a video front end 2834, which couples with a media engine 2837. In at least one embodiment, media engine 2837 includes a Video Quality Engine (VQE) 2830 for video and image post-processing and a multi-format encode/decode (MFX) 2833 engine to provide hardware-accelerated media data encode and decode. In at least one embodiment, geometry pipeline 2836 and media engine 2837 each generate execution threads for thread execution resources provided by at least one graphics core 2880A.

In at least one embodiment, graphics processor 2800 includes scalable thread execution resources featuring modular cores 2880A-2880N (sometimes referred to as core slices), each having multiple sub-cores 2850A-550N, 2860A-2860N (sometimes referred to as core sub-slices). In at least one embodiment, graphics processor 2800 can have any number of graphics cores 2880A through 2880N. In at least one embodiment, graphics processor 2800 includes a graphics core 2880A having at least a first sub-core 2850A and a second sub-core 2860A. In at least one embodiment, graphics processor 2800 is a low power processor with a single sub-core (e.g., 2850A). In at least one embodiment, graphics processor 2800 includes multiple graphics cores 2880A-2880N, each including a set of first sub-cores 2850A-2850N and a set of second sub-cores 2860A-2860N. In at least one embodiment, each sub-core in first sub-cores 2850A-2850N includes at least a first set of execution units 2852A-2852N and media/texture samplers 2854A-2854N. In at least one embodiment, each sub-core in second sub-cores 2860A-2860N includes at least a second set of execution units 2862A-2862N and samplers 2864A-2864N. In at least one embodiment, each sub-core 2850A-2850N, 2860A-2860N shares a set of shared resources 2870A-2870N. In at least one embodiment, shared resources include shared cache memory and pixel operation logic.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, inference and/or training logic 1315 may be used in graphics processor 2800 for inferencing or predicting operations based, at least in part, on weight parameters calculated using neural network training operations, neural network functions and/or architectures, or neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 29:
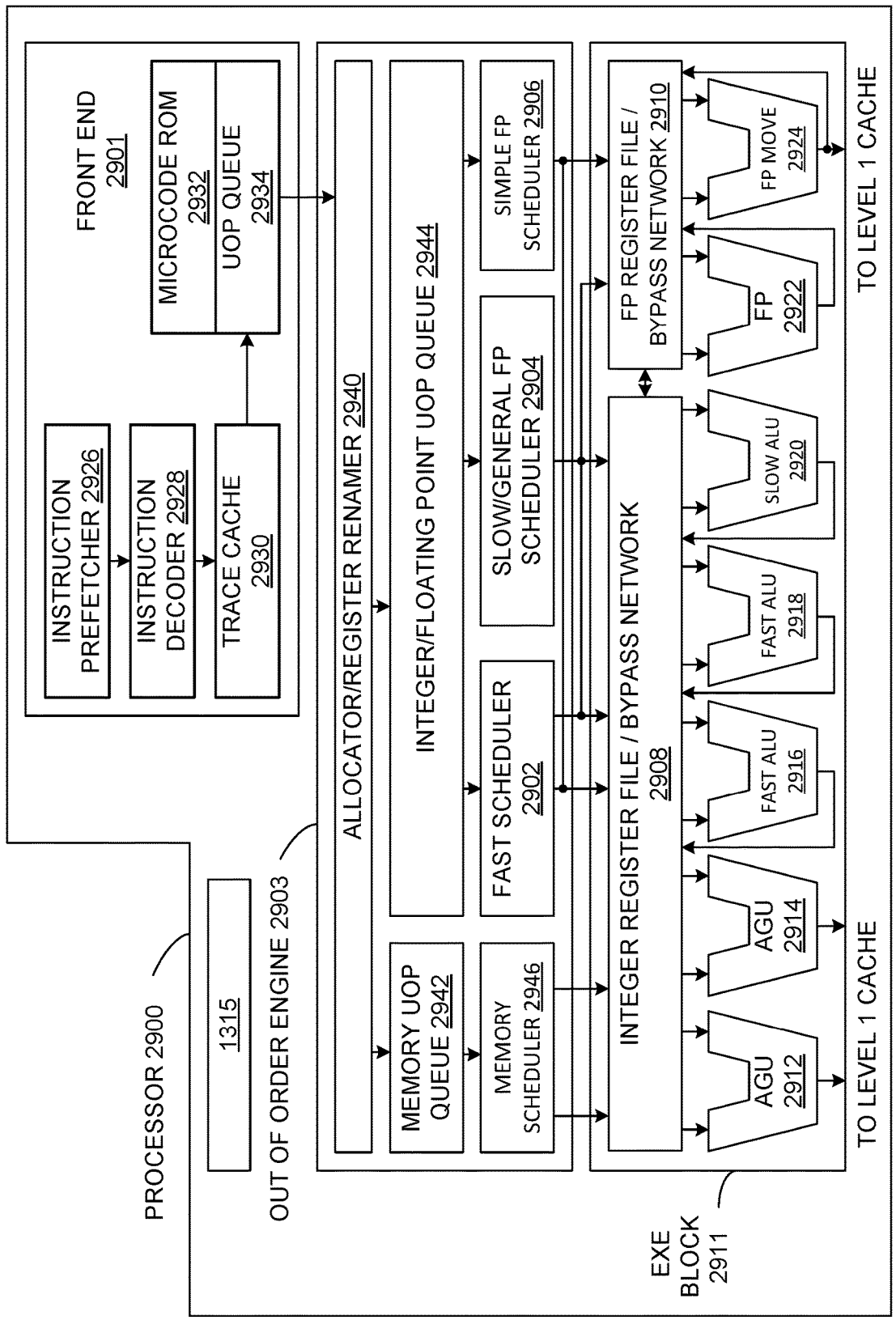
FIG. 29 is a block diagram illustrating a processor microarchitecture for a processor, according to at least one embodiment.

FIG. 29 is a block diagram illustrating micro-architecture for a processor 2900 that may include logic circuits to perform instructions, according to at least one embodiment. In at least one embodiment, processor 2900 may perform instructions, including x86 instructions, ARM instructions, specialized instructions for application-specific integrated circuits (ASICs), etc. In at least one embodiment, processor 2910 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2910 may perform instructions to accelerate machine learning or deep learning algorithms, training, or inferencing.

In at least one embodiment, processor 2900 includes an in-order front end ("front end") 2901 to fetch instructions to be executed and prepare instructions to be used later in processor pipeline. In at least one embodiment, front end 2901 may include several units. In at least one embodiment, an instruction prefetcher 2926 fetches instructions from memory and feeds instructions to an instruction decoder 2928 which in turn decodes or interprets instructions. For example, in at least one embodiment, instruction decoder 2928 decodes a received instruction into one or more operations called "micro-instructions" or "micro-operations" (also called "micro ops" or "uops") that machine may execute. In at least one embodiment, instruction decoder 2928 parses instruction into an opcode and corresponding data and control fields that may be used by micro-architecture to perform operations in accordance with at least one embodiment. In at least one embodiment, a trace cache 2930 may assemble decoded uops into program ordered sequences or traces in a uop queue 2934 for execution. In at least one embodiment, when trace cache 2930 encounters a complex instruction, a microcode ROM 2932 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 2928 may access microcode ROM 2932 to perform instruction. In at least one embodiment, an instruction may be decoded into a small number of micro-ops for processing at instruction decoder 2928. In at least one embodiment, an instruction may be stored within microcode ROM 2932 should a number of micro-ops be needed to accomplish operation. In at least one embodiment, trace cache 2930 refers to an entry point programmable logic array ("PLA") to determine a correct micro-instruction pointer for reading microcode sequences to complete one or more instructions from microcode ROM 2932 in accordance with at least one embodiment. In at least one embodiment, after microcode ROM 2932 finishes sequencing micro-ops for an instruction, front end 2901 of machine may resume fetching micro-ops from trace cache 2930.

In at least one embodiment, out-of-order execution engine ("out of order engine") 2903 may prepare instructions for execution. In at least one embodiment, out-of-order execution logic has a number of buffers to smooth out and re-order flow of instructions to optimize performance as they go down pipeline and get scheduled for execution. out-of-order execution engine 2903 includes, without limitation, an allocator/register renamer 2940, a memory uop queue 2942, an integer/floating point uop queue 2944, a memory scheduler 2946, a fast scheduler 2902, a slow/general floating point scheduler ("slow/general FP scheduler") 2904, and a simple floating point scheduler ("simple FP scheduler") 2906. In at least one embodiment, fast schedule 2902, slow/general floating point scheduler 2904, and simple floating point scheduler 2906 are also collectively referred to herein as "uop schedulers 2902, 2904, 2906." Allocator/register renamer 2940 allocates machine buffers and resources that each uop needs in order to execute. In at least one embodiment, allocator/register renamer 2940 renames logic registers onto entries in a register file. In at least one embodiment, allocator/register renamer 2940 also allocates an entry for each uop in one of two uop queues, memory uop queue 2942 for memory operations and integer/floating point uop queue 2944 for non-memory operations, in front of memory scheduler 2946 and uop schedulers 2902, 2904, 2906. In at least one embodiment, uop schedulers 2902, 2904, 2906, determine when a uop is ready to execute based on readiness of their dependent input register operand sources and availability of execution resources uops need to complete their operation. In at least one embodiment, fast scheduler 2902 of at least one embodiment may schedule on each half of main clock cycle while slow/general floating point scheduler 2904 and simple floating point scheduler 2906 may schedule once per main processor clock cycle. In at least one embodiment, uop schedulers 2902, 2904, 2906 arbitrate for dispatch ports to schedule uops for execution.

In at least one embodiment, execution block b11 includes, without limitation, an integer register file/bypass network 2908, a floating point register file/bypass network ("FP register file/bypass network") 2910, address generation units ("AGUs") 2912 and 2914, fast Arithmetic Logic Units (ALUs) ("fast ALUs") 2916 and 2918, a slow Arithmetic Logic Unit ("slow ALU") 2920, a floating point ALU ("FP") 2922, and a floating point move unit ("FP move") 2924. In at least one embodiment, integer register file/bypass network 2908 and floating point register file/bypass network 2910 are also referred to herein as "register files 2908, 2910." In at least one embodiment, AGUSs 2912 and 2914, fast ALUs 2916 and 2918, slow ALU 2920, floating point ALU 2922, and floating point move unit 2924 are also referred to herein as "execution units 2912, 2914, 2916, 2918, 2920, 2922, and 2924." In at least one embodiment, execution block b11 may include, without limitation, any number (including zero) and type of register files, bypass networks, address generation units, and execution units, in any combination.

In at least one embodiment, register files 2908, 2910 may be arranged between uop schedulers 2902, 2904, 2906, and execution units 2912, 2914, 2916, 2918, 2920, 2922, and 2924. In at least one embodiment, integer register file/bypass network 2908 performs integer operations. In at least one embodiment, floating point register file/bypass network 2910 performs floating point operations. In at least one embodiment, each of register files 2908, 2910 may include, without limitation, a bypass network that may bypass or forward just completed results that have not yet been written into register file to new dependent uops. In at least one embodiment, register files 2908, 2910 may communicate data with each other. In at least one embodiment, integer register file/bypass network 2908 may include, without limitation, two separate register files, one register file for low-order thirty-two bits of data and a second register file for high order thirty-two bits of data. In at least one embodiment, floating point register file/bypass network 2910 may include, without limitation, 128-bit wide entries because floating point instructions typically have operands from 64 to 128 bits in width.

In at least one embodiment, execution units 2912, 2914, 2916, 2918, 2920, 2922, 2924 may execute instructions. In at least one embodiment, register files 2908, 2910 store integer and floating point data operand values that micro-instructions need to execute. In at least one embodiment, processor 2900 may include, without limitation, any number and combination of execution units 2912, 2914, 2916, 2918, 2920, 2922, 2924. In at least one embodiment, floating point ALU 2922 and floating point move unit 2924, may execute floating point, MMX, SIMD, AVX and SSE, or other operations, including specialized machine learning instructions. In at least one embodiment, floating point ALU 2922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2916, 2918. In at least one embodiment, fast ALUS 2916, 2918 may execute fast operations with an effective latency of half a clock cycle. In at least one embodiment, most complex integer operations go to slow ALU 2920 as slow ALU 2920 may include, without limitation, integer execution hardware for long-latency type of operations, such as a multiplier, shifts, flag logic, and branch processing. In at least one embodiment, memory load/store operations may be executed by AGUS 2912, 2914. In at least one embodiment, fast ALU 2916, fast ALU 2918, and slow ALU 2920 may perform integer operations on 64-bit data operands. In at least one embodiment, fast ALU 2916, fast ALU 2918, and slow ALU 2920 may be implemented to support a variety of data bit sizes including sixteen, thirty-two, 128, 256, etc. In at least one embodiment, floating point ALU 2922 and floating point move unit 2924 may be implemented to support a range of operands having bits of various widths. In at least one embodiment, floating point ALU 2922 and floating point move unit 2924 may operate on 128-bit wide packed data operands in conjunction with SIMD and multimedia instructions.

In at least one embodiment, uop schedulers 2902, 2904, 2906, dispatch dependent operations before parent load has finished executing. In at least one embodiment, as uops may be speculatively scheduled and executed in processor 2900, processor 2900 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment portions or all of inference and/or training logic 1315 may be incorporated into EXE Block 2911 and other memory or registers shown or not shown. For example, in at least one embodiment, training and/or inferencing techniques described herein may use one or more of ALUs illustrated in EXE Block 2911. Moreover, weight parameters may be stored in on-chip or off-chip memory and/or registers (shown or not shown) that configure ALUs of EXE Block 2911 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 30:
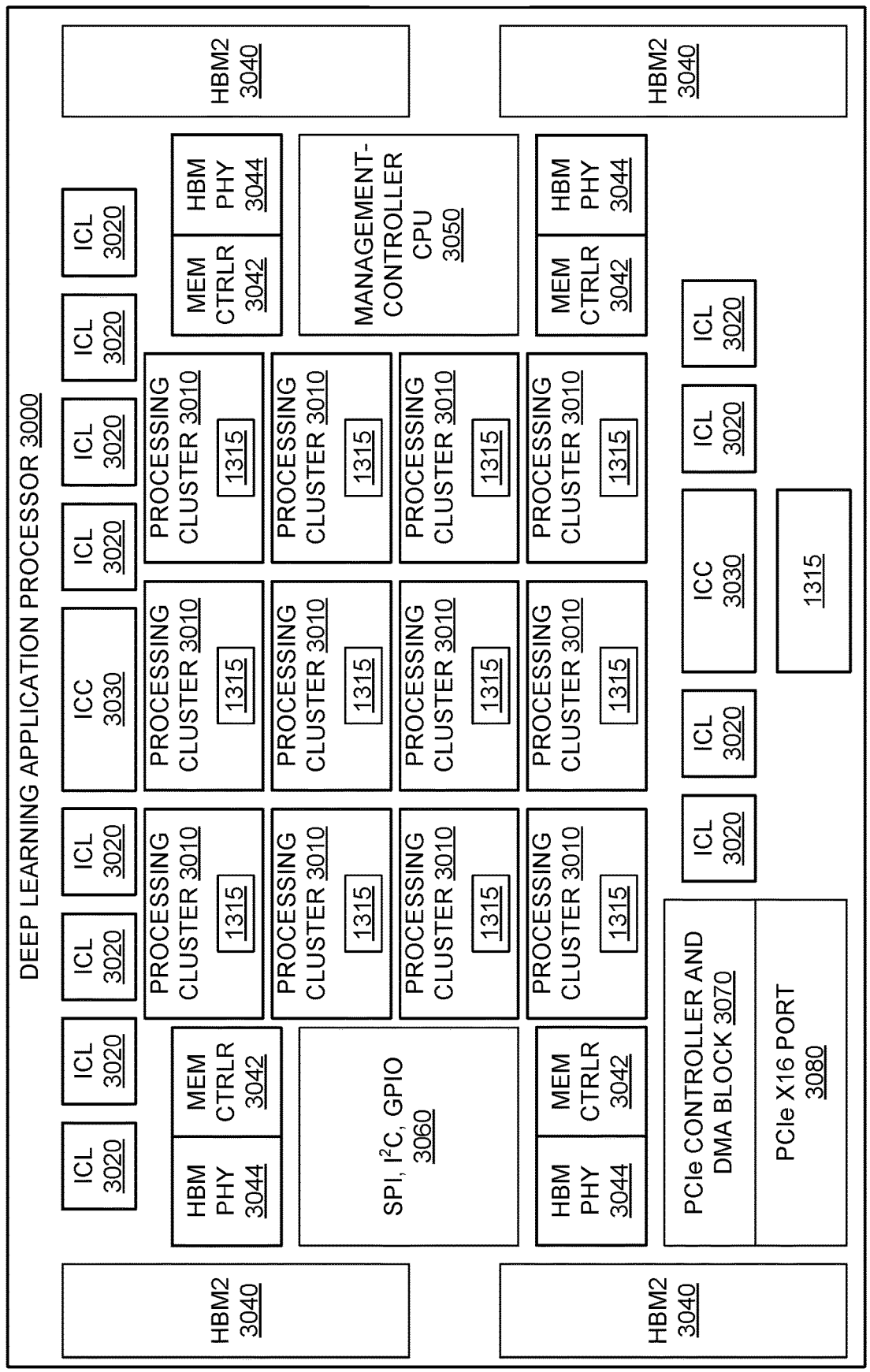
FIG. 30 illustrates a deep learning application processor, according to at least one embodiment.

FIG. 30 illustrates a deep learning application processor 3000, according to at least one embodiment. In at least one embodiment, deep learning application processor 3000 uses instructions that, if executed by deep learning application processor 3000, cause deep learning application processor 3000 to perform some or all of processes and techniques described throughout this disclosure. In at least one embodiment, deep learning application processor 3000 is an application-specific integrated circuit (ASIC). In at least one embodiment, application processor 3000 performs matrix multiply operations either "hard-wired" into hardware as a result of performing one or more instructions or both. In at least one embodiment, deep learning application processor 3000 includes, without limitation, processing clusters 3010(1)-3010(12), Inter-Chip Links ("ICLs") 3020(1)-3020(12), Inter-Chip Controllers ("ICCs") 3030(1)-3030(2), high bandwidth memory second generation ("HBM2") 3040(1)-3040(4), memory controllers ("Mem Ctrlrs") 3042(1)-3042(4), high bandwidth memory physical layer ("HBM PHY") 3044(1)-3044(4), a management-controller central processing unit ("management-controller CPU") 3050, a Serial Peripheral Interface, Inter-Integrated Circuit, and General Purpose Input/Output block ("SPI, I2C, GPIO") 3060, a peripheral component interconnect express controller and direct memory access block ("PCIe Controller and DMA") 3070, and a sixteen-lane peripheral component interconnect express port ("PCI Express x 16") 3080.

In at least one embodiment, processing clusters 3010 may perform deep learning operations, including inference or prediction operations based on weight parameters calculated one or more training techniques, including those described herein. In at least one embodiment, each processing cluster 3010 may include, without limitation, any number and type of processors. In at least one embodiment, deep learning application processor 3000 may include any number and type of processing clusters 3000. In at least one embodiment, Inter-Chip Links 3020 are bi-directional. In at least one embodiment, Inter-Chip Links 3020 and Inter-Chip Controllers 3030 enable multiple deep learning application processors 3000 to exchange information, including activation information resulting from performing one or more machine learning algorithms embodied in one or more neural networks. In at least one embodiment, deep learning application processor 3000 may include any number (including zero) and type of ICLs 3020 and ICCs 3030.

In at least one embodiment, HBM2s 3040 provide a total of 32 Gigabytes (GB) of memory. HBM2 3040(*i*) is associated with both memory controller 3042(*i*) and HBM PHY 3044(*i*). In at least one embodiment, any number of HBM2s 3040 may provide any type and total amount of high bandwidth memory and may be associated with any number (including zero) and type of memory controllers 3042 and HBM PHYs 3044. In at least one embodiment, SPI, I2C, GPIO 3060, PCIe Controller and DMA 3070, and/or PCIe 3080 may be replaced with any number and type of blocks that enable any number and type of communication standards in any technically feasible fashion.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, deep learning application processor is used to train a machine learning model, such as a neural network, to predict or infer information provided to deep learning application processor 3000. In at least one embodiment, deep learning application processor 3000 is used to infer or predict information based on a trained machine learning model (e.g., neural network) that has been trained by another processor or system or by deep learning application processor 3000. In at least one embodiment, processor 3000 may be used to perform one or more neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 31:
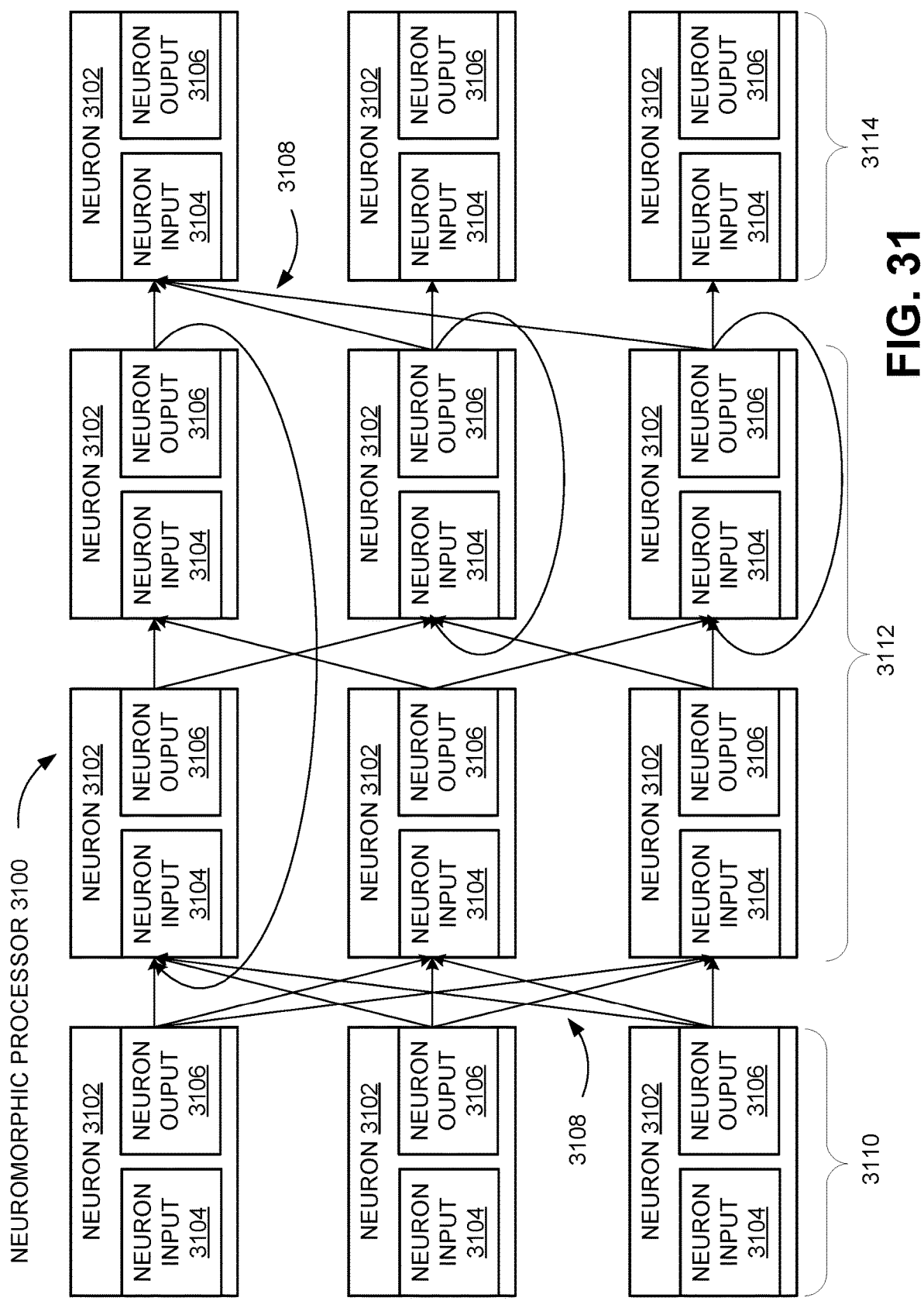
FIG. 31 is a block diagram illustrating an example neuromorphic processor, according to at least one embodiment.

FIG. 31 is a block diagram of a neuromorphic processor 3100, according to at least one embodiment. In at least one embodiment, neuromorphic processor 3100 may receive one or more inputs from sources external to neuromorphic processor 3100. In at least one embodiment, these inputs may be transmitted to one or more neurons 3102 within neuromorphic processor 3100. In at least one embodiment, neurons 3102 and components thereof may be implemented using circuitry or logic, including one or more arithmetic logic units (ALUs). In at least one embodiment, neuromorphic processor 3100 may include, without limitation, thousands or millions of instances of neurons 3102, but any suitable number of neurons 3102 may be used. In at least one embodiment, each instance of neuron 3102 may include a neuron input 3104 and a neuron output 3106. In at least one embodiment, neurons 3102 may generate outputs that may be transmitted to inputs of other instances of neurons 3102. For example, in at least one embodiment, neuron inputs 3104 and neuron outputs 3106 may be interconnected via synapses 3108.

In at least one embodiment, neurons 3102 and synapses 3108 may be interconnected such that neuromorphic processor 3100 operates to process or analyze information received by neuromorphic processor 3100. In at least one embodiment, neurons 3102 may transmit an output pulse (or "fire" or "spike") when inputs received through neuron input 3104 exceed a threshold. In at least one embodiment, neurons 3102 may sum or integrate signals received at neuron inputs 3104. For example, in at least one embodiment, neurons 3102 may be implemented as leaky integrate-and-fire neurons, wherein if a sum (referred to as a "membrane potential") exceeds a threshold value, neuron 3102 may generate an output (or "fire") using a transfer function such as a sigmoid or threshold function. In at least one embodiment, a leaky integrate-and-fire neuron may sum signals received at neuron inputs 3104 into a membrane potential and may also apply a decay factor (or leak) to reduce a membrane potential. In at least one embodiment, a leaky integrate-and-fire neuron may fire if multiple input signals are received at neuron inputs 3104 rapidly enough to exceed a threshold value (i.e., before a membrane potential decays too low to fire). In at least one embodiment, neurons 3102 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 3102 may include, without limitation, comparator circuits or logic that generate an output spike at neuron output 3106 when result of applying a transfer function to neuron input 3104 exceeds a threshold. In at least one embodiment, once neuron 3102 fires, it may disregard previously received input information by, for example, resetting a membrane potential to 0 or another suitable default value. In at least one embodiment, once membrane potential is reset to 0, neuron 3102 may resume normal operation after a suitable period of time (or refractory period).

In at least one embodiment, neurons 3102 may be interconnected through synapses 3108. In at least one embodiment, synapses 3108 may operate to transmit signals from an output of a first neuron 3102 to an input of a second neuron 3102. In at least one embodiment, neurons 3102 may transmit information over more than one instance of synapse 3108. In at least one embodiment, one or more instances of neuron output 3106 may be connected, via an instance of synapse 3108, to an instance of neuron input 3104 in same neuron 3102. In at least one embodiment, an instance of neuron 3102 generating an output to be transmitted over an instance of synapse 3108 may be referred to as a "pre-synaptic neuron" with respect to that instance of synapse 3108. In at least one embodiment, an instance of neuron 3102 receiving an input transmitted over an instance of synapse 3108 may be referred to as a "post-synaptic neuron" with respect to that instance of synapse 3108. Because an instance of neuron 3102 may receive inputs from one or more instances of synapse 3108, and may also transmit outputs over one or more instances of synapse 3108, a single instance of neuron 3102 may therefore be both a "pre-synaptic neuron" and "post-synaptic neuron," with respect to various instances of synapses 3108, in at least one embodiment.

In at least one embodiment, neurons 3102 may be organized into one or more layers. Each instance of neuron 3102 may have one neuron output 3106 that may fan out through one or more synapses 3108 to one or more neuron inputs 3104. In at least one embodiment, neuron outputs 3106 of neurons 3102 in a first layer 3110 may be connected to neuron inputs 3104 of neurons 3102 in a second layer 3112. In at least one embodiment, layer 3110 may be referred to as a "feed-forward layer." In at least one embodiment, each instance of neuron 3102 in an instance of first layer 3110 may fan out to each instance of neuron 3102 in second layer 3112. In at least one embodiment, first layer 3110 may be referred to as a "fully connected feed-forward layer." In at least one embodiment, each instance of neuron 3102 in an instance of second layer 3112 may fan out to fewer than all instances of neuron 3102 in a third layer 3114. In at least one embodiment, second layer 3112 may be referred to as a "sparsely connected feed-forward layer." In at least one embodiment, neurons 3102 in second layer 3112 may fan out to neurons 3102 in multiple other layers, including to neurons 3102 in (same) second layer 3112. In at least one embodiment, second layer 3112 may be referred to as a "recurrent layer." Neuromorphic processor 3100 may include, without limitation, any suitable combination of recurrent layers and feed-forward layers, including, without limitation, both sparsely connected feed-forward layers and fully connected feed-forward layers.

In at least one embodiment, neuromorphic processor 3100 may include, without limitation, a reconfigurable interconnect architecture or dedicated hard wired interconnects to connect synapse 3108 to neurons 3102. In at least one embodiment, neuromorphic processor 3100 may include, without limitation, circuitry or logic that allows synapses to be allocated to different neurons 3102 as needed based on neural network topology and neuron fan-in/out. For example, in at least one embodiment, synapses 3108 may be connected to neurons 3102 using an interconnect fabric, such as network-on-chip, or with dedicated connections. In at least one embodiment, synapse interconnections and components thereof may be implemented using circuitry or logic.

Techniques described above may be used, for example, to implement a system for performing human-robot object exchanges. Some examples use the inference and/or training logic to create a neural network trained to generate a grasp of an object being held by a human hand as described above.

Figure 32:
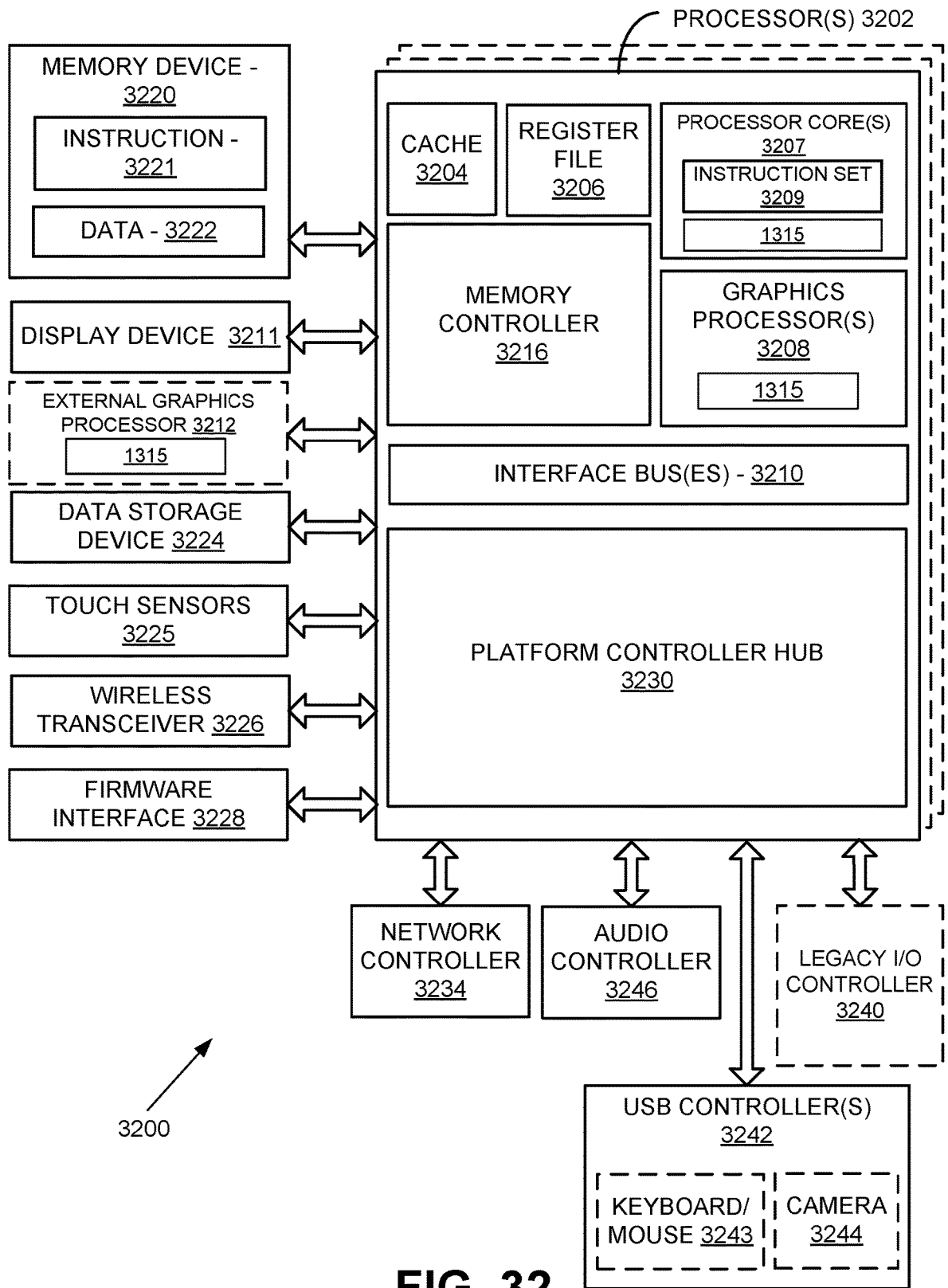
FIG. 32 illustrates at least portions of a graphics processor, according to one or more embodiments.

FIG. 32 is a block diagram of a processing system, according to at least one embodiment. In at least one embodiment, system 3200 includes one or more processors 3202 and one or more graphics processors 3208, and may be a single processor desktop system, a multiprocessor workstation system, or a server system having a large number of processors 3202 or processor cores 3207. In at least one embodiment, system 3200 is a processing platform incorporated within a system-on-a-chip (SoC) integrated circuit for use in mobile, handheld, or embedded devices.

In at least one embodiment, system 3200 can include, or be incorporated within a server-based gaming platform, a game console, including a game and media console, a mobile gaming console, a handheld game console, or an online game console. In at least one embodiment, system 3200 is a mobile phone, smart phone, tablet computing device or mobile Internet device. In at least one embodiment, processing system 3200 can also include, couple with, or be integrated within a wearable device, such as a smart watch wearable device, smart eyewear device, augmented reality device, or virtual reality device. In at least one embodiment, processing system 3200 is a television or set top box device having one or more processors 3202 and a graphical interface generated by one or more graphics processors 3208.

In at least one embodiment, one or more processors 3202 each include one or more processor cores 3207 to process instructions which, when executed, perform operations for system and user software. In at least one embodiment, each of one or more processor cores 3207 is configured to process a specific instruction set 3209. In at least one embodiment, instruction set 3209 may facilitate Complex Instruction Set Computing (CISC), Reduced Instruction Set Computing (RISC), or computing via a Very Long Instruction Word (VLIW). In at least one embodiment, processor cores 3207 may each process a different instruction set 3209, which may include instructions to facilitate emulation of other instruction sets. In at least one embodiment, processor core 3207 may also include other processing devices, such a Digital Signal Processor (DSP).

In at least one embodiment, processor 3202 includes cache memory 3204. In at least one embodiment, processor 3202 can have a single internal cache or multiple levels of internal cache. In at least one embodiment, cache memory is shared among various components of processor 3202. In at least one embodiment, processor 3202 also uses an external cache (e.g., a Level-3 (L3) cache or Last Level Cache (LLC)) (not shown), which may be shared among processor cores 3207 using known cache coherency techniques. In at least one embodiment, register file 3206 is additionally included in processor 3202 which may include different types of registers for storing different types of data (e.g., integer registers, floating point registers, status registers, and an instruction pointer register). In at least one embodiment, register file 3206 may include general-purpose registers or other registers.

In at least one embodiment, one or more processor(s) 3202 are coupled with one or more interface bus(es) 3210 to transmit communication signals such as address, data, or control signals between processor 3202 and other components in system 3200. In at least one embodiment interface bus 3210, in one embodiment, can be a processor bus, such as a version of a Direct Media Interface (DMI) bus. In at least one embodiment, interface 3210 is not limited to a DMI bus, and may include one or more Peripheral Component Interconnect buses (e.g., PCI, PCI Express), memory busses, or other types of interface busses. In at least one embodiment processor(s) 3202 include an integrated memory controller 3216 and a platform controller hub 3230. In at least one embodiment, memory controller 3216 facilitates communication between a memory device and other components of system 3200, while platform controller hub (PCH) 3230 provides connections to I/O devices via a local I/O bus.

In at least one embodiment, memory device 3220 can be a dynamic random access memory (DRAM) device, a static random access memory (SRAM) device, flash memory device, phase-change memory device, or some other memory device having suitable performance to serve as process memory. In at least one embodiment memory device 3220 can operate as system memory for system 3200, to store data 3222 and instructions 3221 for use when one or more processors 3202 executes an application or process. In at least one embodiment, memory controller 3216 also couples with an optional external graphics processor 3212, which may communicate with one or more graphics processors 3208 in processors 3202 to perform graphics and media operations. In at least one embodiment, a display device 3211 can connect to processor(s) 3202. In at least one embodiment display device 3211 can include one or more of an internal display device, as in a mobile electronic device or a laptop device or an external display device attached via a display interface (e.g., DisplayPort, etc.). In at least one embodiment, display device 3211 can include a head mounted display (HMD) such as a stereoscopic display device for use in virtual reality (VR) applications or augmented reality (AR) applications.

In at least one embodiment, platform controller hub 3230 enables peripherals to connect to memory device 3220 and processor 3202 via a high-speed I/O bus. In at least one embodiment, I/O peripherals include, but are not limited to, an audio controller 3246, a network controller 3234, a firmware interface 3228, a wireless transceiver 3226, touch sensors 3225, a data storage device 3224 (e.g., hard disk drive, flash memory, etc.). In at least one embodiment, data storage device 3224 can connect via a storage interface (e.g., SATA) or via a peripheral bus, such as a Peripheral Component Interconnect bus (e.g., PCI, PCI Express). In at least one embodiment, touch sensors 3225 can include touch screen sensors, pressure sensors, or fingerprint sensors. In at least one embodiment, wireless transceiver 3226 can be a Wi-Fi transceiver, a Bluetooth transceiver, or a mobile network transceiver such as a 3G, 4G, or Long Term Evolution (LTE) transceiver. In at least one embodiment, firmware interface 3228 enables communication with system firmware, and can be, for example, a unified extensible firmware interface (UEFI). In at least one embodiment, network controller 3234 can enable a network connection to a wired network. In at least one embodiment, a high-performance network controller (not shown) couples with interface bus 3210. In at least one embodiment, audio controller 3246 is a multi-channel high definition audio controller. In at least one embodiment, system 3200 includes an optional legacy I/O controller 3240 for coupling legacy (e.g., Personal System 2 (PS/2)) devices to system. In at least one embodiment, platform controller hub 3230 can also connect to one or more Universal Serial Bus (USB) controllers 3242 connect input devices, such as keyboard and mouse 3243 combinations, a camera 3244, or other USB input devices.

In at least one embodiment, an instance of memory controller 3216 and platform controller hub 3230 may be integrated into a discreet external graphics processor, such as external graphics processor 3212. In at least one embodiment, platform controller hub 3230 and/or memory controller 3216 may be external to one or more processor(s) 3202. For example, in at least one embodiment, system 3200 can include an external memory controller 3216 and platform controller hub 3230, which may be configured as a memory controller hub and peripheral controller hub within a system chipset that is in communication with processor(s) 3202.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment portions or all of inference and/or training logic 1315 may be incorporated into graphics processor 3200. For example, in at least one embodiment, training and/or inferencing techniques described herein may use one or more of ALUs embodied in 3D pipeline 3212. Moreover, in at least one embodiment, inferencing and/or training operations described herein may be done using logic other than logic illustrated in FIG. 13A or 13B. In at least one embodiment, weight parameters may be stored in on-chip or off-chip memory and/or registers (shown or not shown) that configure ALUs of graphics processor 3200 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 33:
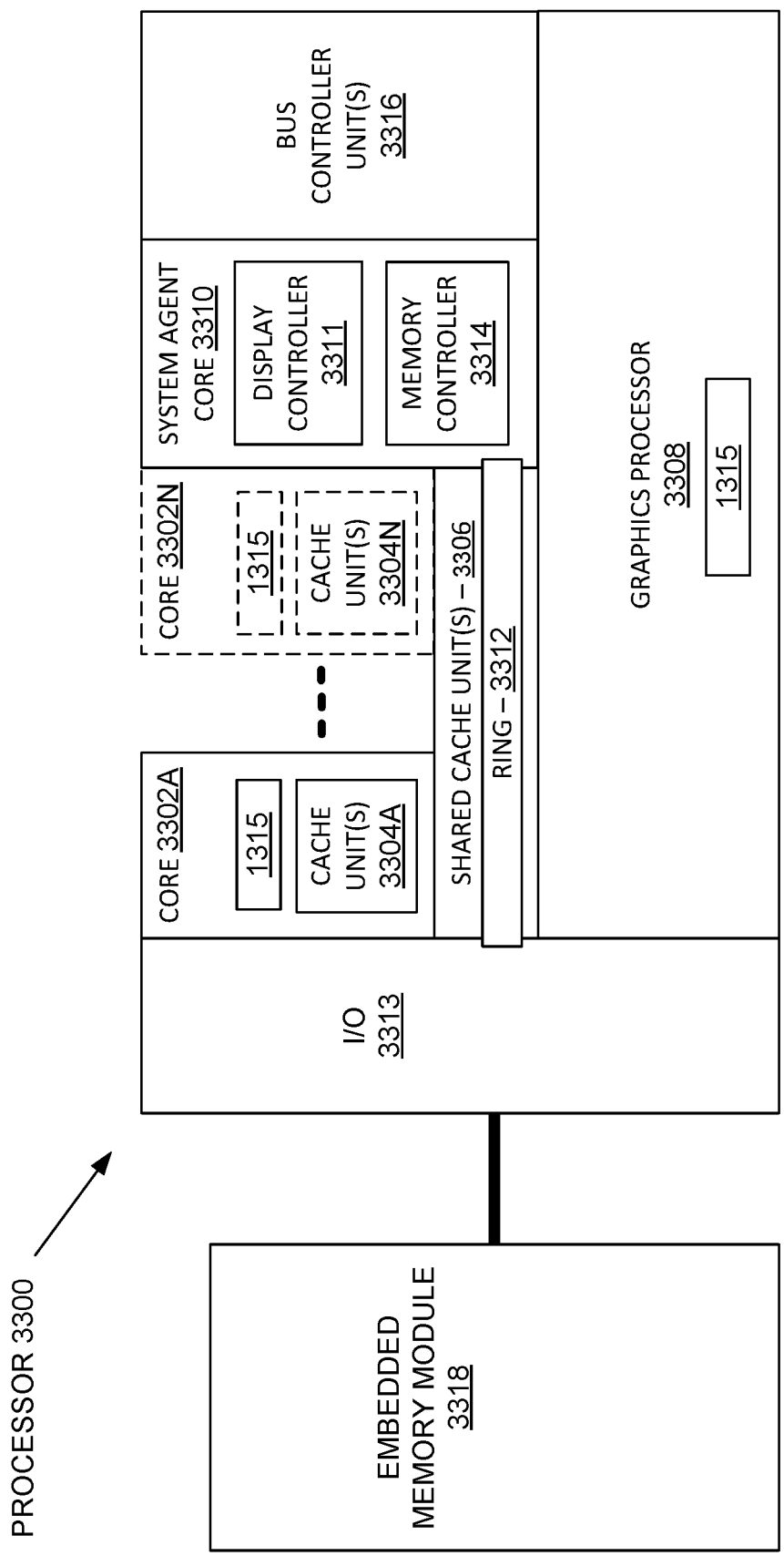
FIG. 33 illustrates at least portions of a graphics processor, according to one or more embodiments.

FIG. 33 is a block diagram of a processor 3300 having one or more processor cores 3302A-3302N, an integrated memory controller 3314, and an integrated graphics processor 3308, according to at least one embodiment. In at least one embodiment, processor 3300 can include additional cores up to and including additional core 3302N represented by dashed lined boxes. In at least one embodiment, each of processor cores 3302A-3302N includes one or more internal cache units 3304A-3304N. In at least one embodiment, each processor core also has access to one or more shared cached units 3306.

In at least one embodiment, internal cache units 3304A-3304N and shared cache units 3306 represent a cache memory hierarchy within processor 3300. In at least one embodiment, cache memory units 3304A-3304N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 3306 and 3304A-3304N.

In at least one embodiment, processor 3300 may also include a set of one or more bus controller units 3316 and a system agent core 3310. In at least one embodiment, one or more bus controller units 3316 manage a set of peripheral buses, such as one or more PCI or PCI express busses. In at least one embodiment, system agent core 3310 provides management functionality for various processor components. In at least one embodiment, system agent core 3310 includes one or more integrated memory controllers 3314 to manage access to various external memory devices (not shown).

In at least one embodiment, one or more of processor cores 3302A-3302N include support for simultaneous multi-threading. In at least one embodiment, system agent core 3310 includes components for coordinating and operating cores 3302A-3302N during multi-threaded processing. In at least one embodiment, system agent core 3310 may additionally include a power control unit (PCU), which includes logic and components to regulate one or more power states of processor cores 3302A-3302N and graphics processor 3308.

In at least one embodiment, processor 3300 additionally includes graphics processor 3308 to execute graphics processing operations. In at least one embodiment, graphics processor 3308 couples with shared cache units 3306, and system agent core 3310, including one or more integrated memory controllers 3314. In at least one embodiment, system agent core 3310 also includes a display controller 3311 to drive graphics processor output to one or more coupled displays. In at least one embodiment, display controller 3311 may also be a separate module coupled with graphics processor 3308 via at least one interconnect, or may be integrated within graphics processor 3308.

In at least one embodiment, a ring based interconnect unit 3312 is used to couple internal components of processor 3300. In at least one embodiment, an alternative interconnect unit may be used, such as a point-to-point interconnect, a switched interconnect, or other techniques. In at least one embodiment, graphics processor 3308 couples with ring interconnect 3312 via an I/O link 3313.

In at least one embodiment, I/O link 3313 represents at least one of multiple varieties of I/O interconnects, including an on package I/O interconnect which facilitates communication between various processor components and a high-performance embedded memory module 3318, such as an eDRAM module. In at least one embodiment, each of processor cores 3302A-3302N and graphics processor 3308 use embedded memory modules 3318 as a shared Last Level Cache.

In at least one embodiment, processor cores 3302A-3302N are homogenous cores executing a common instruction set architecture. In at least one embodiment, processor cores 3302A-3302N are heterogeneous in terms of instruction set architecture (ISA), where one or more of processor cores 3302A-3302N execute a common instruction set, while one or more other cores of processor cores 3302A-3302N executes a subset of a common instruction set or a different instruction set. In at least one embodiment, processor cores 3302A-3302N are heterogeneous in terms of microarchitecture, where one or more cores having a relatively higher power consumption couple with one or more power cores having a lower power consumption. In at least one embodiment, processor 3300 can be implemented on one or more chips or as an SoC integrated circuit.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment portions or all of inference and/or training logic 1315 may be incorporated into graphics processor 3310. For example, in at least one embodiment, training and/or inferencing techniques described herein may use one or more of ALUs embodied in 3D pipeline 3212, graphics core(s) 3315A, shared function logic 3316, graphics core(s) 3315B, shared function logic 3320, or other logic in FIG. 33. Moreover, in at least one embodiment, inferencing and/or training operations described herein may be done using logic other than logic illustrated in FIG. 13A or 13B. In at least one embodiment, weight parameters may be stored in on-chip or off-chip memory and/or registers (shown or not shown) that configure ALUs of graphics processor 3310 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 34:
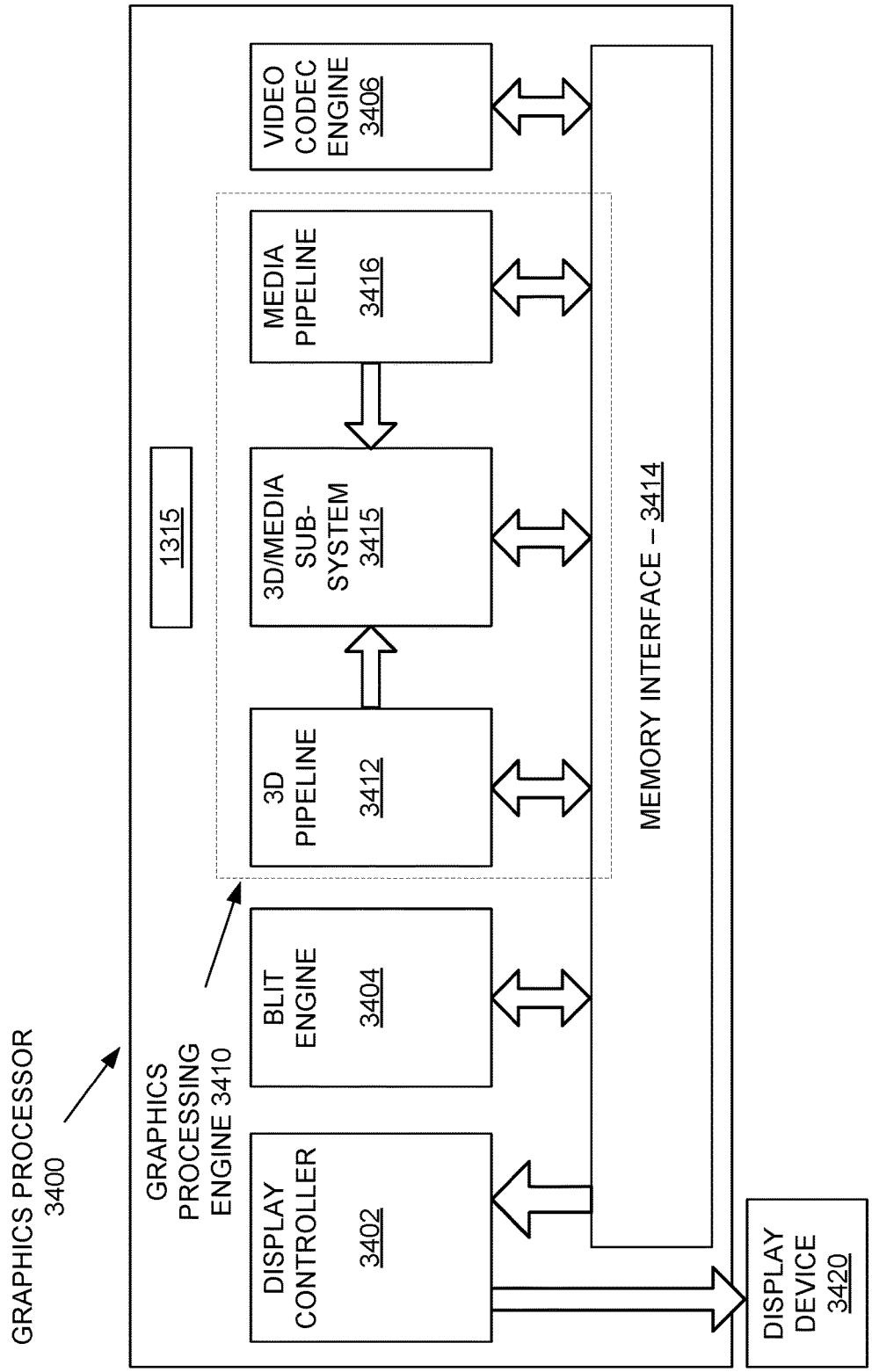
FIG. 34 illustrates at least portions of a graphics processor, according to one or more embodiments.

FIG. 34 is a block diagram of a graphics processor 3400, which may be a discrete graphics processing unit, or may be a graphics processor integrated with a plurality of processing cores. In at least one embodiment, graphics processor 3400 communicates via a memory mapped I/O interface to registers on graphics processor 3400 and with commands placed into memory. In at least one embodiment, graphics processor 3400 includes a memory interface 3414 to access memory. In at least one embodiment, memory interface 3414 is an interface to local memory, one or more internal caches, one or more shared external caches, and/or to system memory.

In at least one embodiment, graphics processor 3400 also includes a display controller 3402 to drive display output data to a display device 3420. In at least one embodiment, display controller 3402 includes hardware for one or more overlay planes for display device 3420 and composition of multiple layers of video or user interface elements. In at least one embodiment, display device 3420 can be an internal or external display device. In at least one embodiment, display device 3420 is a head mounted display device, such as a virtual reality (VR) display device or an augmented reality (AR) display device. In at least one embodiment, graphics processor 3400 includes a video codec engine 3406 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 3400 includes a block image transfer (BLIT) engine 3404 to perform two-dimensional (2D) rasterizer operations including, for example, bit-boundary block transfers. However, in at least one embodiment, 2D graphics operations are performed using one or more components of graphics processing engine (GPE) 3410. In at least one embodiment, GPE 3410 is a compute engine for performing graphics operations, including three-dimensional (3D) graphics operations and media operations.

In at least one embodiment, GPE 3410 includes a 3D pipeline 3412 for performing 3D operations, such as rendering three-dimensional images and scenes using processing functions that act upon 3D primitive shapes (e.g., rectangle, triangle, etc.). 3D pipeline 3412 includes programmable and fixed function elements that perform various tasks and/or spawn execution threads to a 3D/Media subsystem 3415. While 3D pipeline 3412 can be used to perform media operations, in at least one embodiment, GPE 3410 also includes a media pipeline 3416 that is used to perform media operations, such as video post-processing and image enhancement.

In at least one embodiment, media pipeline 3416 includes fixed function or programmable logic units to perform one or more specialized media operations, such as video decode acceleration, video de-interlacing, and video encode acceleration in place of, or on behalf of video codec engine 3406. In at least one embodiment, media pipeline 3416 additionally includes a thread spawning unit to spawn threads for execution on 3D/Media sub-system 3415. In at least one embodiment, spawned threads perform computations for media operations on one or more graphics execution units included in 3D/Media sub-system 3415.

In at least one embodiment, 3D/Media subsystem 3415 includes logic for executing threads spawned by 3D pipeline 3412 and media pipeline 3416. In at least one embodiment, 3D pipeline 3412 and media pipeline 3416 send thread execution requests to 3D/Media subsystem 3415, which includes thread dispatch logic for arbitrating and dispatching various requests to available thread execution resources. In at least one embodiment, execution resources include an array of graphics execution units to process 3D and media threads. In at least one embodiment, 3D/Media subsystem 3415 includes one or more internal caches for thread instructions and data. In at least one embodiment, subsystem 3415 also includes shared memory, including registers and addressable memory, to share data between threads and to store output data.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment portions or all of inference and/or training logic 1315 may be incorporated into graphics processor 3400. For example, in at least one embodiment, training and/or inferencing techniques described herein may use one or more of ALUs embodied in 3D pipeline 3412. Moreover, in at least one embodiment, inferencing and/or training operations described herein may be done using logic other than logic illustrated in FIG. 13A or 13B. In at least one embodiment, weight parameters may be stored in on-chip or off-chip memory and/or registers (shown or not shown) that configure ALUs of graphics processor 3400 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 35:
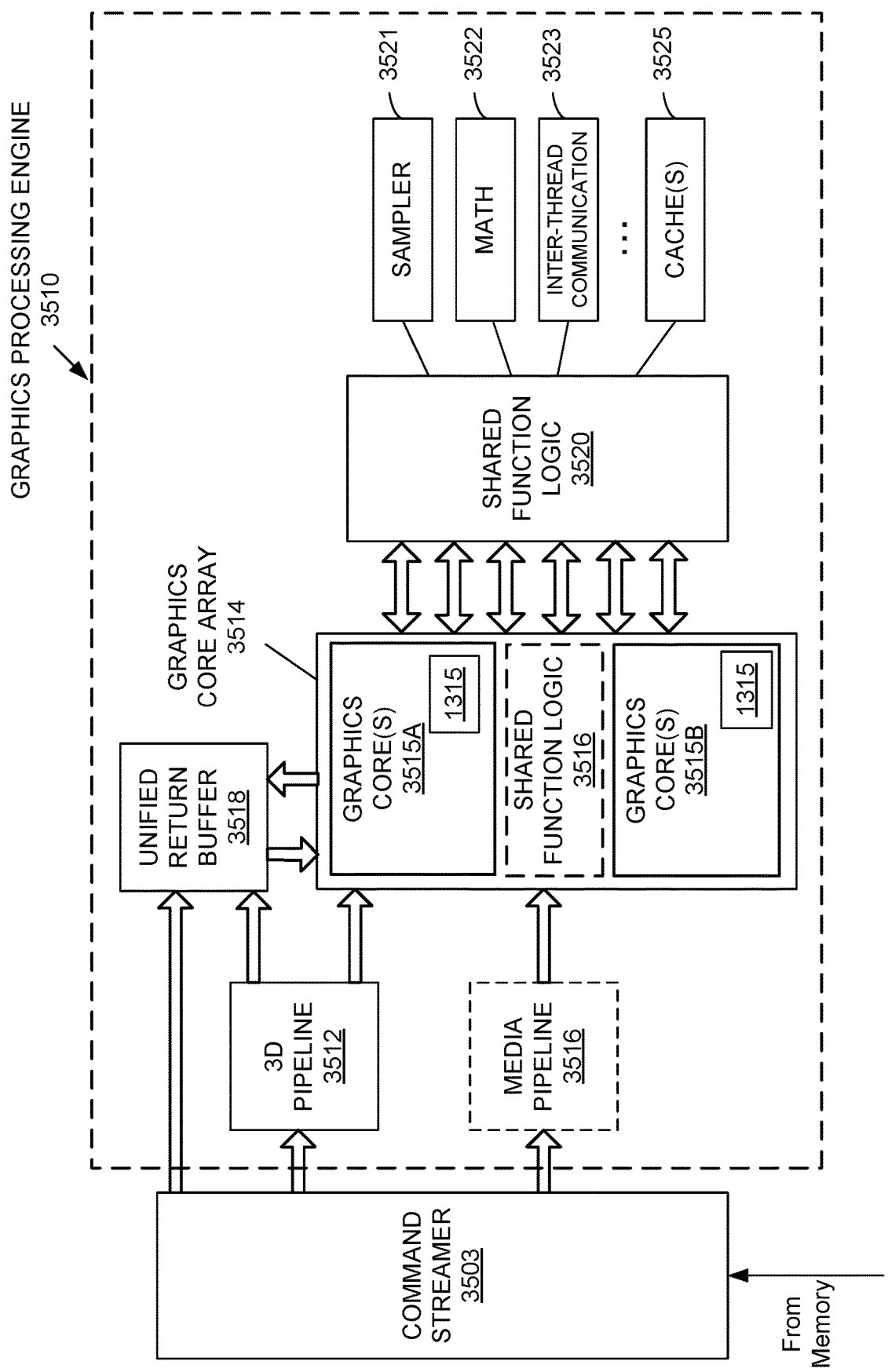
FIG. 35 is a block diagram of a graphics processing engine 3510 of a graphics processor in accordance with at least one embodiment.

FIG. 35 is a block diagram of a graphics processing engine 3510 of a graphics processor in accordance with at least one embodiment. In at least one embodiment, graphics processing engine (GPE) 3510 is a version of GPE 3410 shown in FIG. 34. In at least one embodiment, media pipeline 3416 is optional and may not be explicitly included within GPE 3510. In at least one embodiment, a separate media and/or image processor is coupled to GPE 3510.

In at least one embodiment, GPE 3510 is coupled to or includes a command streamer 3503, which provides a command stream to 3D pipeline 3412 and/or media pipelines 3416. In at least one embodiment, command streamer 3503 is coupled to memory, which can be system memory, or one or more of internal cache memory and shared cache memory. In at least one embodiment, command streamer 3503 receives commands from memory and sends commands to 3D pipeline 3412 and/or media pipeline 3416. In at least one embodiment, commands are instructions, primitives, or micro-operations fetched from a ring buffer, which stores commands for 3D pipeline 3412 and media pipeline 3416. In at least one embodiment, a ring buffer can additionally include batch command buffers storing batches of multiple commands. In at least one embodiment, commands for 3D pipeline 3412 can also include references to data stored in memory, such as but not limited to vertex and geometry data for 3D pipeline 3412 and/or image data and memory objects for media pipeline 3416. In at least one embodiment, 3D pipeline 3412 and media pipeline 3416 process commands and data by performing operations or by dispatching one or more execution threads to a graphics core array 3514. In at least one embodiment graphics core array 3514 includes one or more blocks of graphics cores (e.g., graphics core(s) 3515A, graphics core(s) 3515B), each block including one or more graphics cores. In at least one embodiment, each graphics core includes a set of graphics execution resources that includes general-purpose and graphics specific execution logic to perform graphics and compute operations, as well as fixed function texture processing and/or machine learning and artificial intelligence acceleration logic, including inference and/or training logic 1315 in FIG. 13A and FIG. 13B.

In at least one embodiment, 3D pipeline 3412 includes fixed function and programmable logic to process one or more shader programs, such as vertex shaders, geometry shaders, pixel shaders, fragment shaders, compute shaders, or other shader programs, by processing instructions and dispatching execution threads to graphics core array 3514. In at least one embodiment, graphics core array 3514 provides a unified block of execution resources for use in processing shader programs. In at least one embodiment, multi-purpose execution logic (e.g., execution units) within graphics core(s) 3515A-3515B of graphic core array 3514 includes support for various 3D API shader languages and can execute multiple simultaneous execution threads associated with multiple shaders.

In at least one embodiment, graphics core array 3514 also includes execution logic to perform media functions, such as video and/or image processing. In at least one embodiment, execution units additionally include general-purpose logic that is programmable to perform parallel general-purpose computational operations, in addition to graphics processing operations.

In at least one embodiment, output data generated by threads executing on graphics core array 3514 can output data to memory in a unified return buffer (URB) 3518. URB 3518 can store data for multiple threads. In at least one embodiment, URB 3518 may be used to send data between different threads executing on graphics core array 3514. In at least one embodiment, URB 3518 may additionally be used for synchronization between threads on graphics core array 3514 and fixed function logic within shared function logic 3520.

In at least one embodiment, graphics core array 3514 is scalable, such that graphics core array 3514 includes a variable number of graphics cores, each having a variable number of execution units based on a target power and performance level of GPE 3510. In at least one embodiment, execution resources are dynamically scalable, such that execution resources may be enabled or disabled as needed.

In at least one embodiment, graphics core array 3514 is coupled to shared function logic 3520 that includes multiple resources that are shared between graphics cores in graphics core array 3514. In at least one embodiment, shared functions performed by shared function logic 3520 are embodied in hardware logic units that provide specialized supplemental functionality to graphics core array 3514. In at least one embodiment, shared function logic 3520 includes but is not limited to sampler 3521, math 3522, and inter-thread communication (ITC) 3523 logic. In at least one embodiment, one or more cache(s) 3525 are in included in or couple to shared function logic 3520.

In at least one embodiment, a shared function is used if demand for a specialized function is insufficient for inclusion within graphics core array 3514. In at least one embodiment, a single instantiation of a specialized function is used in shared function logic 3520 and shared among other execution resources within graphics core array 3514. In at least one embodiment, specific shared functions within shared function logic 3520 that are used extensively by graphics core array 3514 may be included within shared function logic 3516 within graphics core array 3514. In at least one embodiment, shared function logic 3516 within graphics core array 3514 can include some or all logic within shared function logic 3520. In at least one embodiment, all logic elements within shared function logic 3520 may be duplicated within shared function logic 3516 of graphics core array 3514. In at least one embodiment, shared function logic 3520 is excluded in favor of shared function logic 3516 within graphics core array 3514.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment portions or all of inference and/or training logic 1315 may be incorporated into graphics processor 3510. For example, in at least one embodiment, training and/or inferencing techniques described herein may use one or more of ALUs embodied in 3D pipeline 3412, graphics core(s) 3515A, shared function logic 3516, graphics core(s) 3515B, shared function logic 3520, or other logic in FIG. 35. Moreover, in at least one embodiment, inferencing and/or training operations described herein may be done using logic other than logic illustrated in FIG. 13A or 13B. In at least one embodiment, weight parameters may be stored in on-chip or off-chip memory and/or registers (shown or not shown) that configure ALUs of graphics processor 3510 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 36:
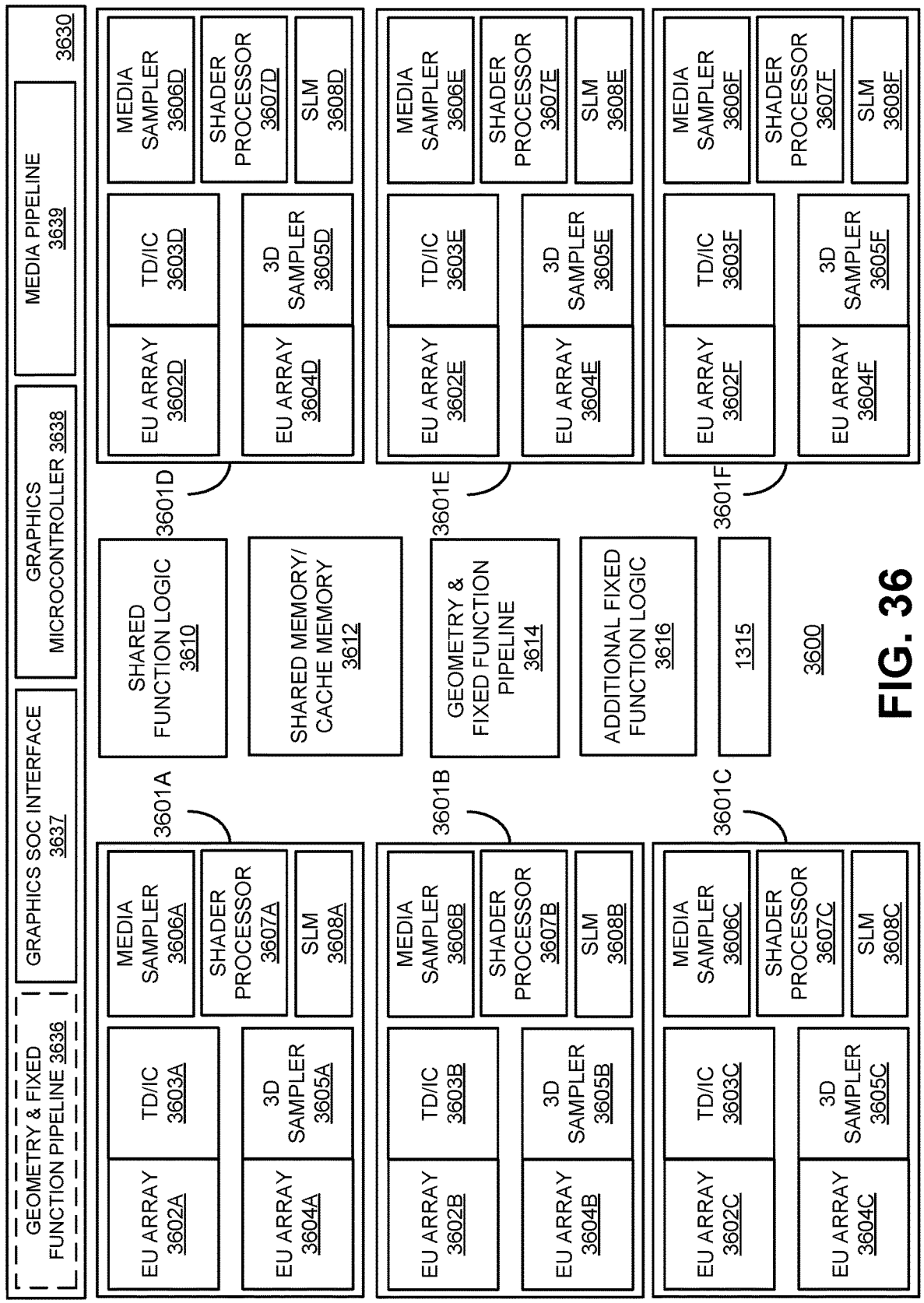
FIG. 36 is a block diagram of at least portions of a graphics processor core, according to at least one embodiment.

FIG. 36 is a block diagram of hardware logic of a graphics processor core 3600, according to at least one embodiment described herein. In at least one embodiment, graphics processor core 3600 is included within a graphics core array. In at least one embodiment, graphics processor core 3600, sometimes referred to as a core slice, can be one or multiple graphics cores within a modular graphics processor. In at least one embodiment, graphics processor core 3600 is exemplary of one graphics core slice, and a graphics processor as described herein may include multiple graphics core slices based on target power and performance envelopes. In at least one embodiment, each graphics core 3600 can include a fixed function block 3630 coupled with multiple sub-cores 3601A-3601F, also referred to as sub-slices, that include modular blocks of general-purpose and fixed function logic.

In at least one embodiment, fixed function block 3630 includes a geometry/fixed function pipeline 3636 that can be shared by all sub-cores in graphics processor 3600, for example, in lower performance and/or lower power graphics processor implementations. In at least one embodiment, geometry/fixed function pipeline 3636 includes a 3D fixed function pipeline, a video front-end unit, a thread spawner and thread dispatcher, and a unified return buffer manager, which manages unified return buffers.

In at least one embodiment fixed function block 3630 also includes a graphics SoC interface 3637, a graphics microcontroller 3638, and a media pipeline 3639. Graphics SoC interface 3637 provides an interface between graphics core 3600 and other processor cores within a system on a chip integrated circuit. In at least one embodiment, graphics microcontroller 3638 is a programmable sub-processor that is configurable to manage various functions of graphics processor 3600, including thread dispatch, scheduling, and pre-emption. In at least one embodiment, media pipeline 3639 includes logic to facilitate decoding, encoding, pre-processing, and/or post-processing of multimedia data, including image and video data. In at least one embodiment, media pipeline 3639 implement media operations via requests to compute or sampling logic within sub-cores 3601-3601F.

In at least one embodiment, SoC interface 3637 enables graphics core 3600 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3637 can also enable communication with fixed function devices within an SoC, such as camera imaging pipelines, and enables use of and/or implements global memory atomics that may be shared between graphics core 3600 and CPUs within an SoC. In at least one embodiment, SoC interface 3637 can also implement power management controls for graphics core 3600 and enable an interface between a clock domain of graphic core 3600 and other clock domains within an SoC. In at least one embodiment, SoC interface 3637 enables receipt of command buffers from a command streamer and global thread dispatcher that are configured to provide commands and instructions to each of one or more graphics cores within a graphics processor. In at least one embodiment, commands and instructions can be dispatched to media pipeline 3639, when media operations are to be performed, or a geometry and fixed function pipeline (e.g., geometry and fixed function pipeline 3636, geometry and fixed function pipeline 3614) when graphics processing operations are to be performed.

In at least one embodiment, graphics microcontroller 3638 can be configured to perform various scheduling and management tasks for graphics core 3600. In at least one embodiment, graphics microcontroller 3638 can perform graphics and/or compute workload scheduling on various graphics parallel engines within execution unit (EU) arrays 3602A-3602F, 3604A-3604F within sub-cores 3601A-3601F. In at least one embodiment, host software executing on a CPU core of an SoC including graphics core 3600 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3638 can also facilitate low-power or idle states for graphics core 3600, providing graphics core 3600 with an ability to save and restore registers within graphics core 3600 across low-power state transitions independently from an operating system and/or graphics driver software on a system.

In at least one embodiment, graphics core 3600 may have greater than or fewer than illustrated sub-cores 3601A-3601F, up to N modular sub-cores. For each set of N sub-cores, in at least one embodiment, graphics core 3600 can also include shared function logic 3610, shared and/or cache memory 3612, a geometry/fixed function pipeline 3614, as well as additional fixed function logic 3616 to accelerate various graphics and compute processing operations. In at least one embodiment, shared function logic 3610 can include logic units (e.g., sampler, math, and/or inter-thread communication logic) that can be shared by each N sub-cores within graphics core 3600. Shared and/or cache memory 3612 can be a last-level cache for N sub-cores 3601A-3601F within graphics core 3600 and can also serve as shared memory that is accessible by multiple sub-cores. In at least one embodiment, geometry/fixed function pipeline 3614 can be included instead of geometry/fixed function pipeline 3636 within fixed function block 3630 and can include same or similar logic units.

In at least one embodiment, graphics core 3600 includes additional fixed function logic 3616 that can include various fixed function acceleration logic for use by graphics core 3600. In at least one embodiment, additional fixed function logic 3616 includes an additional geometry pipeline for use in position only shading. In position-only shading, at least two geometry pipelines exist, whereas in a full geometry pipeline within geometry/fixed function pipeline 3616, 3636, and a cull pipeline, which is an additional geometry pipeline which may be included within additional fixed function logic 3616. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3616 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3616 can also include machine-learning acceleration logic, such as fixed function matrix multiplication logic, for implementations including optimizations for machine learning training or inferencing.

In at least one embodiment, within each graphics sub-core 3601A-3601F includes a set of execution resources that may be used to perform graphics, media, and compute operations in response to requests by graphics pipeline, media pipeline, or shader programs. In at least one embodiment, graphics sub-cores 3601A-3601F include multiple EU arrays 3602A-3602F, 3604A-3604F, thread dispatch and inter-thread communication (TD/IC) logic 3603A-3603F, a 3D (e.g., texture) sampler 3605A-3605F, a media sampler 3606A-3606F, a shader processor 3607A-3607F, and shared local memory (SLM) 3608A-3608F. EU arrays 3602A-3602F, 3604A-3604F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3603A-3603F performs local thread dispatch and thread control operations for execution units within a sub-core and facilitate communication between threads executing on execution units of a sub-core. In at least one embodiment, 3D sampler 3605A-3605F can read texture or other 3D graphics related data into memory. In at least one embodiment, 3D sampler can read texture data differently based on a configured sample state and texture format associated with a given texture. In at least one embodiment, media sampler 3606A-3606F can perform similar read operations based on a type and format associated with media data. In at least one embodiment, each graphics sub-core 3601A-3601F can alternately include a unified 3D and media sampler. In at least one embodiment, threads executing on execution units within each of sub-cores 3601A-3601F can make use of shared local memory 3608A-3608F within each sub-core, to enable threads executing within a thread group to execute using a common pool of on-chip memory.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, portions or all of inference and/or training logic 1315 may be incorporated into graphics processor 3610. For example, in at least one embodiment, training and/or inferencing techniques described herein may use one or more of ALUs embodied in 3D pipeline 3610, graphics microcontroller 3638, geometry & fixed function pipeline 3614 and 3636, or other logic in FIG. 33. Moreover, in at least one embodiment, inferencing and/or training operations described herein may be done using logic other than logic illustrated in FIG. 13A or 13B. In at least one embodiment, weight parameters may be stored in on-chip or off-chip memory and/or registers (shown or not shown) that configure ALUs of graphics processor 3600 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 37A:
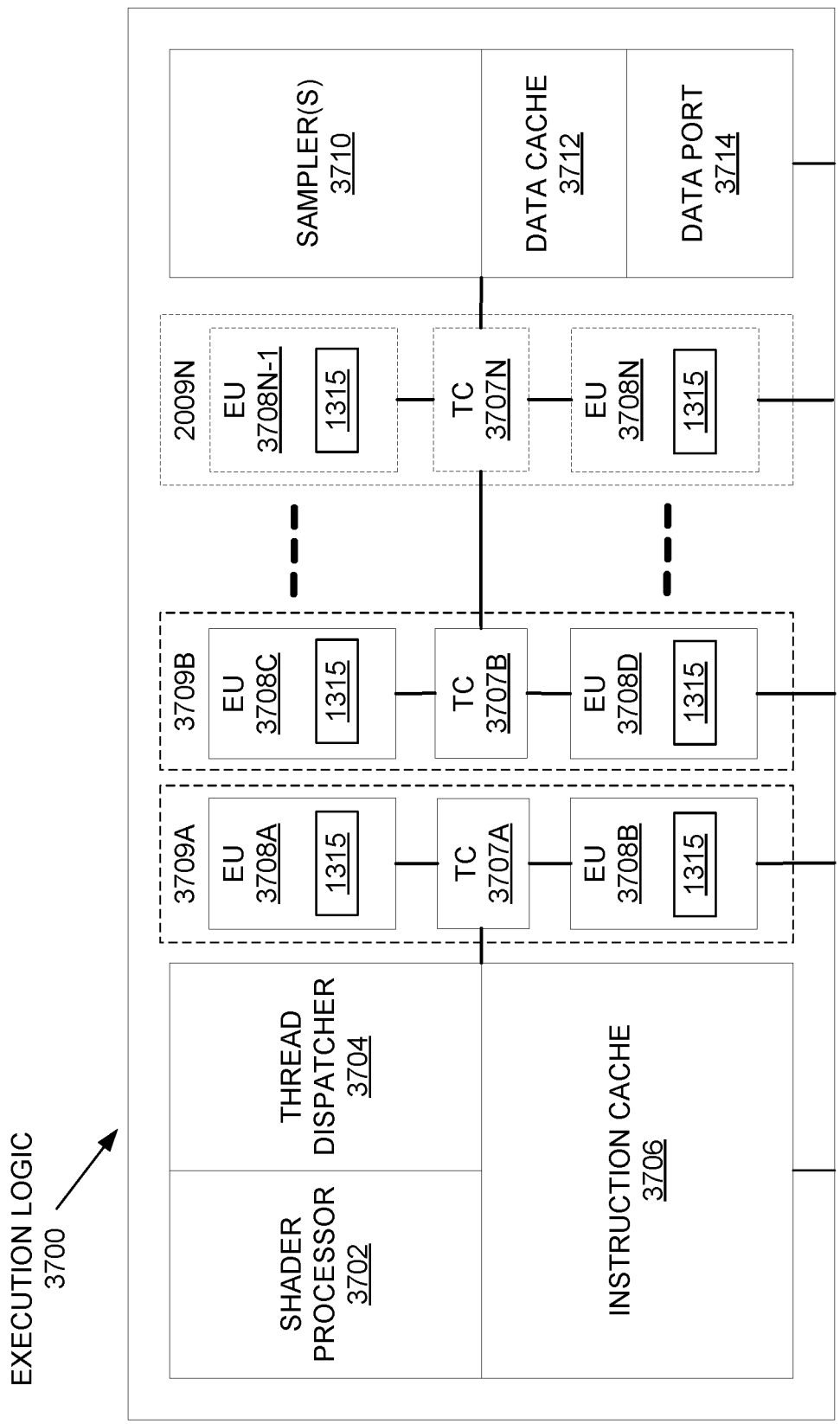
FIGS. 37A and 37B illustrate thread execution logic 3700 including an array of processing elements of a graphics processor core according to at least one embodiment.
Figure 37B:
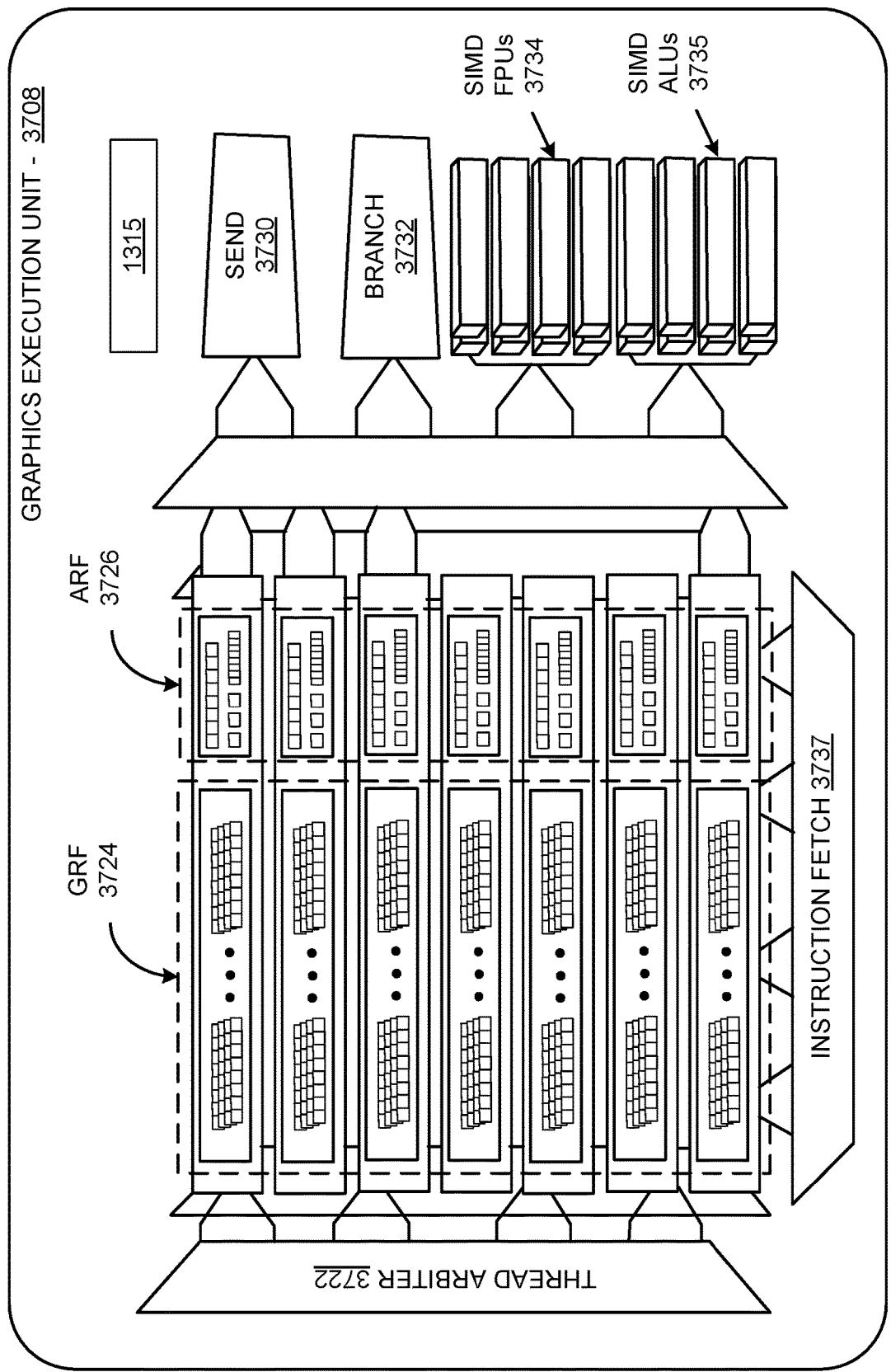

FIGS. 37A-37B illustrate thread execution logic 3700 including an array of processing elements of a graphics processor core according to at least one embodiment. FIG. 37A illustrates at least one embodiment, in which thread execution logic 3700 is used. FIG. 37B illustrates exemplary internal details of an execution unit, according to at least one embodiment.

As illustrated in FIG. 37A, in at least one embodiment, thread execution logic 3700 includes a shader processor 3702, a thread dispatcher 3704, instruction cache 3706, a scalable execution unit array including a plurality of execution units 3708A-3708N, a sampler 3710, a data cache 3712, and a data port 3714. In at least one embodiment a scalable execution unit array can dynamically scale by enabling or disabling one or more execution units (e.g., any of execution unit 3708A, 3708B, 3708C, 3708D, through 3708N-1 and 3708N) based on computational requirements of a workload, for example. In at least one embodiment, scalable execution units are interconnected via an interconnect fabric that links to each of execution unit. In at least one embodiment, thread execution logic 3700 includes one or more connections to memory, such as system memory or cache memory, through one or more of instruction cache 3706, data port 3714, sampler 3710, and execution units 3708A-3708N. In at least one embodiment, each execution unit (e.g., 3708A) is a stand-alone programmable general-purpose computational unit that is capable of executing multiple simultaneous hardware threads while processing multiple data elements in parallel for each thread. In at least one embodiment, array of execution units 3708A-3708N is scalable to include any number individual execution units.

In at least one embodiment, execution units 3708A-3708N are primarily used to execute shader programs. In at least one embodiment, shader processor 3702 can process various shader programs and dispatch execution threads associated with shader programs via a thread dispatcher 3704. In at least one embodiment, thread dispatcher 3704 includes logic to arbitrate thread initiation requests from graphics and media pipelines and instantiate requested threads on one or more execution units in execution units 3708A-3708N. For example, in at least one embodiment, a geometry pipeline can dispatch vertex, tessellation, or geometry shaders to thread execution logic for processing. In at least one embodiment, thread dispatcher 3704 can also process runtime thread spawning requests from executing shader programs.

In at least one embodiment, execution units 3708A-3708N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3708A-3708N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 3708A-3708N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3708A-3708N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3708A-3708N support integer and floating-point data types.

In at least one embodiment, an execution unit instruction set includes SIMD instructions. In at least one embodiment, various data elements can be stored as a packed data type in a register and execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3709A-3709N having thread control logic (3707A-3707N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3709A-3709N includes at least two execution units. For example, in at least one embodiment, fused execution unit 3709A includes a first EU 3708A, second EU 3708B, and thread control logic 3707A that is common to first EU 3708A and second EU 3708B. In at least one embodiment, thread control logic 3707A controls threads executed on fused graphics execution unit 3709A, allowing each EU within fused execution units 3709A-3709N to execute using a common instruction pointer register.

In at least one embodiment, one or more internal instruction caches (e.g., 3706) are included in thread execution logic 3700 to cache thread instructions for execution units. In at least one embodiment, one or more data caches (e.g., 3712) are included to cache thread data during thread execution. In at least one embodiment, a sampler 3710 is included to provide texture sampling for 3D operations and media sampling for media operations. In at least one embodiment, sampler 3710 includes specialized texture or media sampling functionality to process texture or media data during sampling process before providing sampled data to an execution unit.

During execution, in at least one embodiment, graphics and media pipelines send thread initiation requests to thread execution logic 3700 via thread spawning and dispatch logic. In at least one embodiment, once a group of geometric objects has been processed and rasterized into pixel data, pixel processor logic (e.g., pixel shader logic, fragment shader logic, etc.) within shader processor 3702 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3702 then executes an application programming interface (API)-supplied pixel or fragment shader program. In at least one embodiment, to execute a shader program, shader processor 3702 dispatches threads to an execution unit (e.g., 3708A) via thread dispatcher 3704. In at least one embodiment, shader processor 3702 uses texture sampling logic in sampler 3710 to access texture data in texture maps stored in memory. In at least one embodiment, arithmetic operations on texture data and input geometry data compute pixel color data for each geometric fragment, or discards one or more pixels from further processing.

In at least one embodiment, data port 3714 provides a memory access mechanism for thread execution logic 3700 to output processed data to memory for further processing on a graphics processor output pipeline. In at least one embodiment, data port 3714 includes or couples to one or more cache memories (e.g., data cache 3712) to cache data for memory access via a data port.

As illustrated in FIG. 37B, in at least one embodiment, a graphics execution unit 3708 can include an instruction fetch unit 3737, a general register file array (GRF) 3724, an architectural register file array (ARF) 3726, a thread arbiter 3722, a send unit 3730, a branch unit 3732, a set of SIMD floating point units (FPUs) 3734, and In at least one embodiment a set of dedicated integer SIMD ALUs 3735. In at least one embodiment, GRF 3724 and ARF 3726 includes a set of general register files and architecture register files associated with each simultaneous hardware thread that may be active in graphics execution unit 3708. In at least one embodiment, per thread architectural state is maintained in ARF 3726, while data used during thread execution is stored in GRF 3724. In at least one embodiment, execution state of each thread, including instruction pointers for each thread, can be held in thread-specific registers in ARF 3726.

In at least one embodiment, graphics execution unit 3708 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3708 can co-issue multiple instructions, which may each be different instructions. In at least one embodiment, thread arbiter 3722 of graphics execution unit thread 3708 can dispatch instructions to one of send unit 3730, branch unit 3742, or SIMD FPU(s) 3734 for execution. In at least one embodiment, each execution thread can access 128 general-purpose registers within GRF 3724, where each register can store 32 bytes, accessible as a SIMD 8-element vector of 32-bit data elements. In at least one embodiment, each execution unit thread has access to 4 Kbytes within GRF 3724, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 3724 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3730. In at least one embodiment, branch instructions are dispatched to a dedicated branch unit 3732 to facilitate SIMD divergence and eventual convergence.

In at least one embodiment graphics execution unit 3708 includes one or more SIMID floating point units (FPU(s)) 3734 to perform floating-point operations. In at least one embodiment, FPU(s) 3734 also support integer computation. In at least one embodiment FPU(s) 3734 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 3735 are also present, and may be specifically optimized to perform operations associated with machine learning computations.

In at least one embodiment, arrays of multiple instances of graphics execution unit 3708 can be instantiated in a graphics sub-core grouping (e.g., a sub-slice). In at least one embodiment execution unit 3708 can execute instructions across a plurality of execution channels. In at least one embodiment, each thread executed on graphics execution unit 3708 is executed on a different channel.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, portions or all of inference and/or training logic 1315 may be incorporated into execution logic 3700. Moreover, in at least one embodiment, inferencing and/or training operations described herein may be done using logic other than logic illustrated in FIG. 13A or 13B. In at least one embodiment, weight parameters may be stored in on-chip or off-chip memory and/or registers (shown or not shown) that configure ALUs of execution logic 3700 to perform one or more machine learning algorithms, neural network architectures, use cases, or training techniques described herein.

Techniques described above may be used, for example, to implement a system for performing human-robot object exchanges. Some examples use the inference and/or training logic to create a neural network trained to generate a grasp of an object being held by a human hand as described above.

Figure 38:
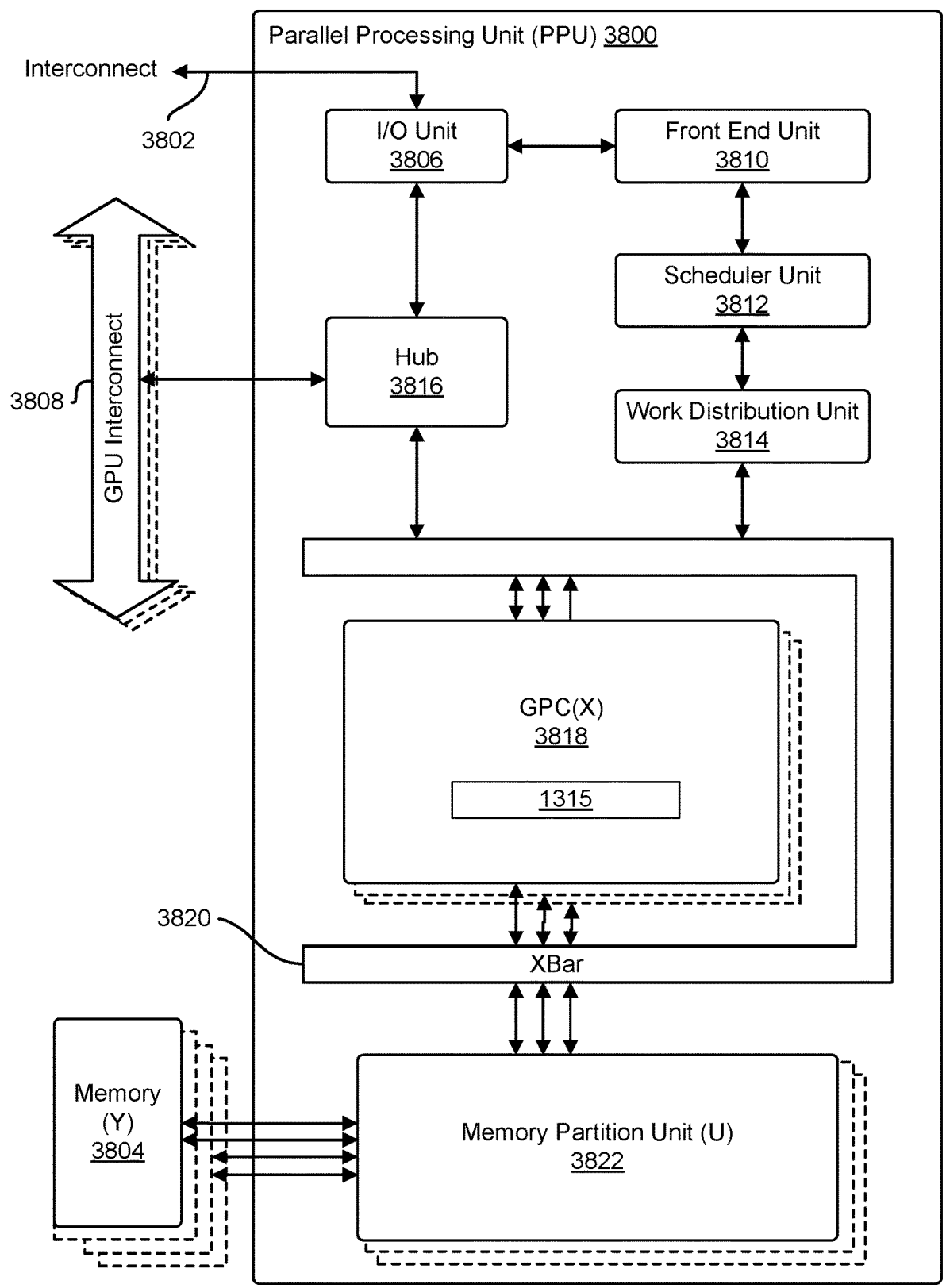
FIG. 38 illustrates a parallel processing unit ("PPU"), according to at least one embodiment.

FIG. 38 illustrates a parallel processing unit ("PPU") 3800, according to at least one embodiment. In at least one embodiment, PPU 3800 is configured with machine-readable code that, if executed by PPU 3800, causes PPU 3800 to perform some or all of processes and techniques described throughout this disclosure. In at least one embodiment, PPU 3800 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3800. In at least one embodiment, PPU 3800 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3800 is utilized to perform computations such as linear algebra operations and machine-learning operations. FIG. 38 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3800 are configured to accelerate High Performance Computing ("HPC"), data center, and machine learning applications. In at least one embodiment, PPU 3800 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3800 includes, without limitation, an Input/Output ("I/O") unit 3806, a front-end unit 3810, a scheduler unit 3812, a work distribution unit 3814, a hub 3816, a crossbar ("Xbar") 3820, one or more general processing clusters ("GPCs") 3818, and one or more partition units ("memory partition units") 3822. In at least one embodiment, PPU 3800 is connected to a host processor or other PPUs 3800 via one or more high-speed GPU interconnects ("GPU interconnects") 3808. In at least one embodiment, PPU 3800 is connected to a host processor or other peripheral devices via an interconnect 3802. In at least one embodiment, PPU 3800 is connected to a local memory comprising one or more memory devices ("memory") 3804. In at least one embodiment, memory devices 3804 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3808 may refer to a wire-based multi-lane communications link that is used by systems to scale and include one or more PPUs 3800 combined with one or more central processing units ("CPUs"), supports cache coherence between PPUs 3800 and CPUs, and CPU mastering. In at least one embodiment, data and/or commands are transmitted by high-speed GPU interconnect 3808 through hub 3816 to/from other units of PPU 3800 such as one or more copy engines, video encoders, video decoders, power management units, and other components which may not be explicitly illustrated in FIG. 38.

In at least one embodiment, I/O unit 3806 is configured to transmit and receive communications (e.g., commands, data) from a host processor (not illustrated in FIG. 38) over system bus 3802. In at least one embodiment, I/O unit 3806 communicates with host processor directly via system bus 3802 or through one or more intermediate devices such as a memory bridge. In at least one embodiment, I/O unit 3806 may communicate with one or more other processors, such as one or more of PPUs 3800 via system bus 3802. In at least one embodiment, I/O unit 3806 implements a Peripheral Component Interconnect Express ("PCIe") interface for communications over a PCIe bus. In at least one embodiment, I/O unit 3806 implements interfaces for communicating with external devices.

In at least one embodiment, I/O unit 3806 decodes packets received via system bus 3802. In at least one embodiment, at least some packets represent commands configured to cause PPU 3800 to perform various operations. In at least one embodiment, I/O unit 3806 transmits decoded commands to various other units of PPU 3800 as specified by commands. In at least one embodiment, commands are transmitted to front-end unit 3810 and/or transmitted to hub 3816 or other units of PPU 3800 such as one or more copy engines, a video encoder, a video decoder, a power management unit, etc. (not explicitly illustrated in FIG. 38). In at least one embodiment, I/O unit 3806 is configured to route communications between and among various logical units of PPU 3800.

In at least one embodiment, a program executed by host processor encodes a command stream in a buffer that provides workloads to PPU 3800 for processing. In at least one embodiment, a workload comprises instructions and data to be processed by those instructions. In at least one embodiment, buffer is a region in a memory that is accessible (e.g., read/write) by both host processor and PPU 3800 a host interface unit may be configured to access buffer in a system memory connected to system bus 3802 via memory requests transmitted over system bus 3802 by I/O unit 3806. In at least one embodiment, host processor writes command stream to buffer and then transmits a pointer to start of command stream to PPU 3800 such that front-end unit 3810 receives pointers to one or more command streams and manages one or more command streams, reading commands from command streams and forwarding commands to various units of PPU 3800.

In at least one embodiment, front-end unit 3810 is coupled to scheduler unit 3812 that configures various GPCs 3818 to process tasks defined by one or more command streams. In at least one embodiment, scheduler unit 3812 is configured to track state information related to various tasks managed by scheduler unit 3812 where state information may indicate which of GPCs 3818 a task is assigned to, whether task is active or inactive, a priority level associated with task, and so forth. In at least one embodiment, scheduler unit 3812 manages execution of a plurality of tasks on one or more of GPCs 3818.

In at least one embodiment, scheduler unit 3812 is coupled to work distribution unit 3814 that is configured to dispatch tasks for execution on GPCs 3818. In at least one embodiment, work distribution unit 3814 tracks a number of scheduled tasks received from scheduler unit 3812 and work distribution unit 3814 manages a pending task pool and an active task pool for each of GPCs 3818. In at least one embodiment, pending task pool comprises a number of slots (e.g., 32 slots) that contain tasks assigned to be processed by a particular GPC 3818; active task pool may comprise a number of slots (e.g., 4 slots) for tasks that are actively being processed by GPCs 3818 such that as one of GPCs 3818 completes execution of a task, that task is evicted from active task pool for GPC 3818 and one of other tasks from pending task pool is selected and scheduled for execution on GPC 3818. In at least one embodiment, if an active task is idle on GPC 3818, such as while waiting for a data dependency to be resolved, then active task is evicted from GPC 3818 and returned to pending task pool while another task in pending task pool is selected and scheduled for execution on GPC 3818.

In at least one embodiment, work distribution unit 3814 communicates with one or more GPCs 3818 via XBar 3820. In at least one embodiment, XBar 3820 is an interconnect network that couples many of units of PPU 3800 to other units of PPU 3800 and can be configured to couple work distribution unit 3814 to a particular GPC 3818. In at least one embodiment, one or more other units of PPU 3800 may also be connected to XBar 3820 via hub 3816.

In at least one embodiment, tasks are managed by scheduler unit 3812 and dispatched to one of GPCs 3818 by work distribution unit 3814. GPC 3818 is configured to process task and generate results. In at least one embodiment, results may be consumed by other tasks within GPC 3818, routed to a different GPC 3818 via XBar 3820, or stored in memory 3804. In at least one embodiment, results can be written to memory 3804 via partition units 3822, which implement a memory interface for reading and writing data to/from memory 3804. In at least one embodiment, results can be transmitted to another PPU 3804 or CPU via high-speed GPU interconnect 3808. In at least one embodiment, PPU 3800 includes, without limitation, a number U of partition units 3822 that is equal to number of separate and distinct memory devices 3804 coupled to PPU 3800. In at least one embodiment, partition unit 3822 will be described in more detail herein in conjunction with FIG. 40.

In at least one embodiment, a host processor executes a driver kernel that implements an application programming interface ("API") that enables one or more applications executing on host processor to schedule operations for execution on PPU 3800. In at least one embodiment, multiple compute applications are simultaneously executed by PPU 3800 and PPU 3800 provides isolation, quality of service ("QoS"), and independent address spaces for multiple compute applications. In at least one embodiment, an application generates instructions (e.g., in form of API calls) that cause driver kernel to generate one or more tasks for execution by PPU 3800 and driver kernel outputs tasks to one or more streams being processed by PPU 3800. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 40.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, deep learning application processor is used to train a machine learning model, such as a neural network, to predict or infer information provided to PPU 3800. In at least one embodiment, deep learning application processor 3800 is used to infer or predict information based on a trained machine learning model (e.g., neural network) that has been trained by another processor or system or by PPU 3800. In at least one embodiment, PPU 3800 may be used to perform one or more neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 39:
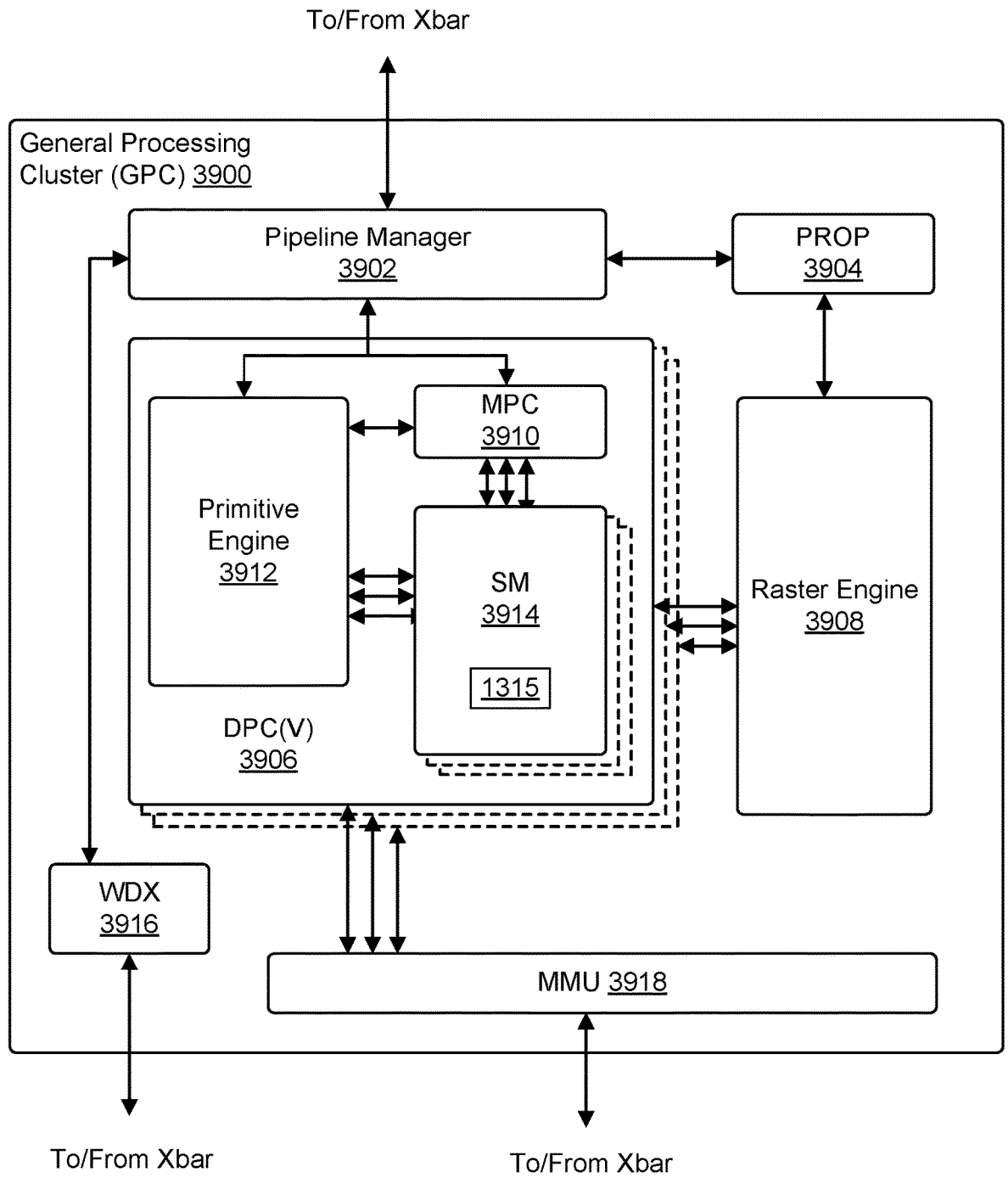
FIG. 39 illustrates a general processing cluster ("GPC"), according to at least one embodiment.

FIG. 39 illustrates a general processing cluster ("GPC") 3900, according to at least one embodiment. In at least one embodiment, GPC 3900 is GPC 3818 of FIG. 38. In at least one embodiment, each GPC 3900 includes, without limitation, a number of hardware units for processing tasks and each GPC 3900 includes, without limitation, a pipeline manager 3902, a pre-raster operations unit ("PROP") 3904, a raster engine 3908, a work distribution crossbar ("WDX") 3916, a memory management unit ("MMU") 3918, one or more Data Processing Clusters ("DPCs") 3906, and any suitable combination of parts.

In at least one embodiment, operation of GPC 3900 is controlled by pipeline manager 3902. In at least one embodiment, pipeline manager 3902 manages configuration of one or more DPCs 3906 for processing tasks allocated to GPC 3900. In at least one embodiment, pipeline manager 3902 configures at least one of one or more DPCs 3906 to implement at least a portion of a graphics rendering pipeline. In at least one embodiment, DPC 3906 is configured to execute a vertex shader program on a programmable streaming multi-processor ("SM") 3914. In at least one embodiment, pipeline manager 3902 is configured to route packets received from a work distribution unit to appropriate logical units within GPC 3900, in at least one embodiment, and some packets may be routed to fixed function hardware units in PROP 3904 and/or raster engine 3908 while other packets may be routed to DPCs 3906 for processing by a primitive engine 3912 or SM 3914. In at least one embodiment, pipeline manager 3902 configures at least one of DPCs 3906 to implement a neural network model and/or a computing pipeline.

In at least one embodiment, PROP unit 3904 is configured, in at least one embodiment, to route data generated by raster engine 3908 and DPCs 3906 to a Raster Operations ("ROP") unit in partition unit 3822, described in more detail above in conjunction with FIG. 38. In at least one embodiment, PROP unit 3904 is configured to perform optimizations for color blending, organize pixel data, perform address translations, and more. In at least one embodiment, raster engine 3908 includes, without limitation, a number of fixed function hardware units configured to perform various raster operations, in at least one embodiment, and raster engine 3908 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 3908 comprises fragments to be processed by any suitable entity such as by a fragment shader implemented within DPC 3906.

In at least one embodiment, each DPC 3906 included in GPC 3900 comprise, without limitation, an M-Pipe Controller ("MPC") 3910; primitive engine 3912; one or more SMs 3914; and any suitable combination thereof. In at least one embodiment, MPC 3910 controls operation of DPC 3906, routing packets received from pipeline manager 3902 to appropriate units in DPC 3906. In at least one embodiment, packets associated with a vertex are routed to primitive engine 3912, which is configured to fetch vertex attributes associated with vertex from memory; in contrast, packets associated with a shader program may be transmitted to SM 3914.

In at least one embodiment, SM 3914 comprises, without limitation, a programmable streaming processor that is configured to process tasks represented by a number of threads. In at least one embodiment, SM 3914 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 3914 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 3914 are described in more detail herein.

In at least one embodiment, MMU 3918 provides an interface between GPC 3900 and memory partition unit (e.g., partition unit 3822 of FIG. 38) and MMU 3918 provides translation of virtual addresses into physical addresses, memory protection, and arbitration of memory requests. In at least one embodiment, MMU 3918 provides one or more translation lookaside buffers ("TLBs") for performing translation of virtual addresses into physical addresses in memory.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, deep learning application processor is used to train a machine learning model, such as a neural network, to predict or infer information provided to GPC 3900. In at least one embodiment, GPC 3900 is used to infer or predict information based on a trained machine learning model (e.g., neural network) that has been trained by another processor or system or by GPC 3900. In at least one embodiment, GPC 3900 may be used to perform one or more neural network use cases described herein.

Techniques described above may be used, for example, to implement a system for performing human-robot object exchanges. Some examples use the inference and/or training logic to create a neural network trained to generate a grasp of an object being held by a human hand as described above.

Figure 40:
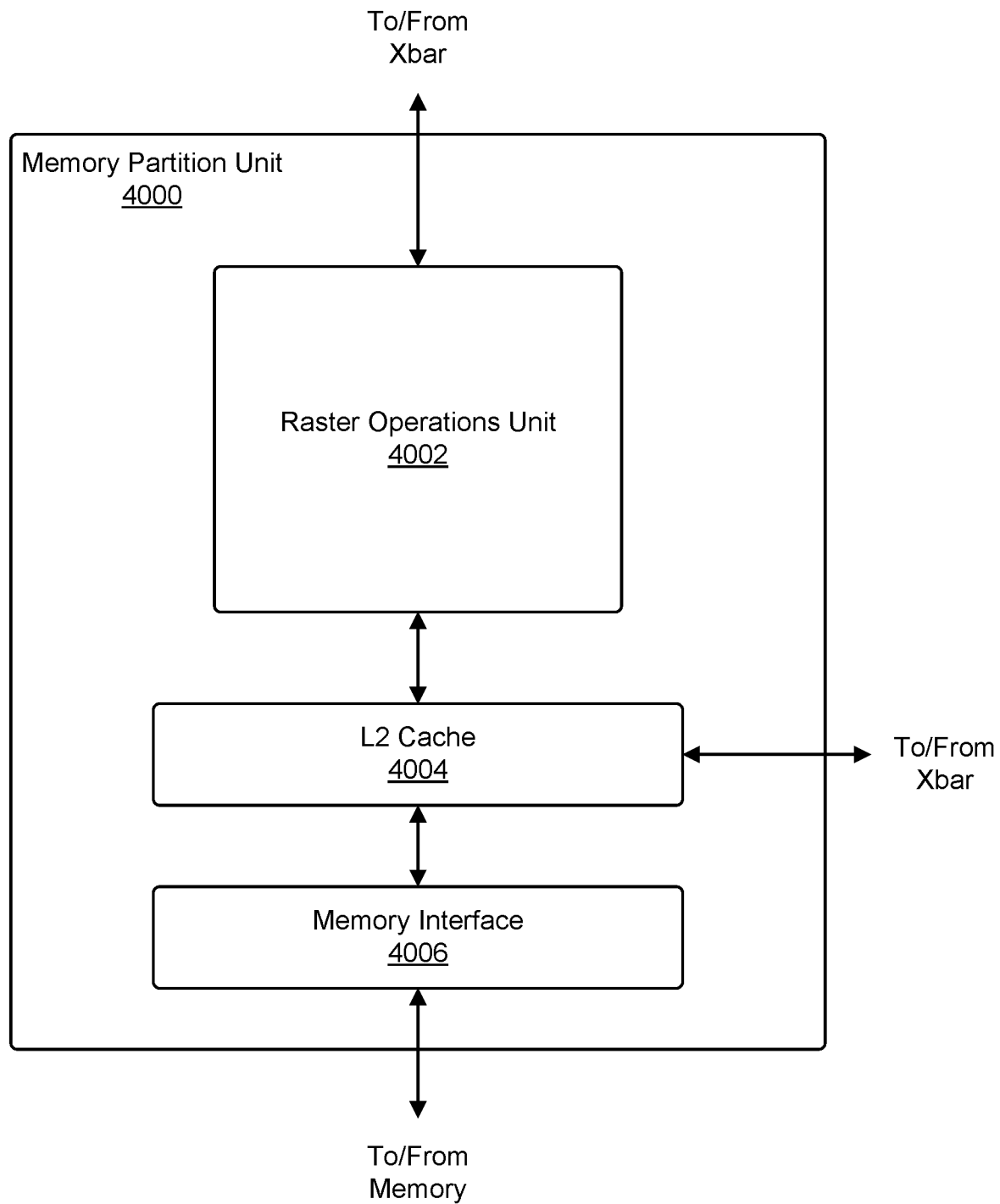
FIG. 40 illustrates a memory partition unit of a parallel processing unit ("PPU"), according to at least one embodiment.

FIG. 40 illustrates a memory partition unit 4000 of a parallel processing unit ("PPU"), in accordance with at least one embodiment. In at least one embodiment, memory partition unit 4000 includes, without limitation, a Raster Operations ("ROP") unit 4002; a level two ("L2") cache 4004; a memory interface 4006; and any suitable combination thereof. Memory interface 4006 is coupled to memory. Memory interface 4006 may implement 32, 64, 128, 1024-bit data buses, or like, for high-speed data transfer. In at least one embodiment, PPU incorporates U memory interfaces 4006, one memory interface 4006 per pair of partition units 4000, where each pair of partition units 4000 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 4006 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 4000 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3808 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 4000 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3804 of FIG. 38 or other system memory is fetched by memory partition unit 4000 and stored in L2 cache 4004, which is located on-chip and is shared between various GPCs, in accordance with at least one embodiment. Each memory partition unit 4000, in at least one embodiment, includes, without limitation, at least a portion of L2 cache associated with a corresponding memory device. In at least one embodiment, lower level caches are implemented in various units within GPCs. In at least one embodiment, each of SMs 3914 may implement a level one ("L1") cache wherein L1 cache is private memory that is dedicated to a particular SM 3914 and data from L2 cache 4004 is fetched and stored in each of L1 caches for processing in functional units of SMs 3914. In at least one embodiment, L2 cache 4004 is coupled to memory interface 4006 and XBar 3820.

ROP unit 4002 performs graphics raster operations related to pixel color, such as color compression, pixel blending, and more, in at least one embodiment. ROP unit 4002, in at least one embodiment, implements depth testing in conjunction with raster engine 3908, receiving a depth for a sample location associated with a pixel fragment from culling engine of raster engine 3908. In at least one embodiment, depth is tested against a corresponding depth in a depth buffer for a sample location associated with fragment. In at least one embodiment, if fragment passes depth test for sample location, then ROP unit 4002 updates depth buffer and transmits a result of depth test to raster engine 3908. It will be appreciated that number of partition units 4000 may be different than number of GPCs and, therefore, each ROP unit 4002 can, in at least one embodiment, be coupled to each of GPCs. In at least one embodiment, ROP unit 4002 tracks packets received from different GPCs and determines which that a result generated by ROP unit 4002 is routed to through XBar 3820.

Figure 41:
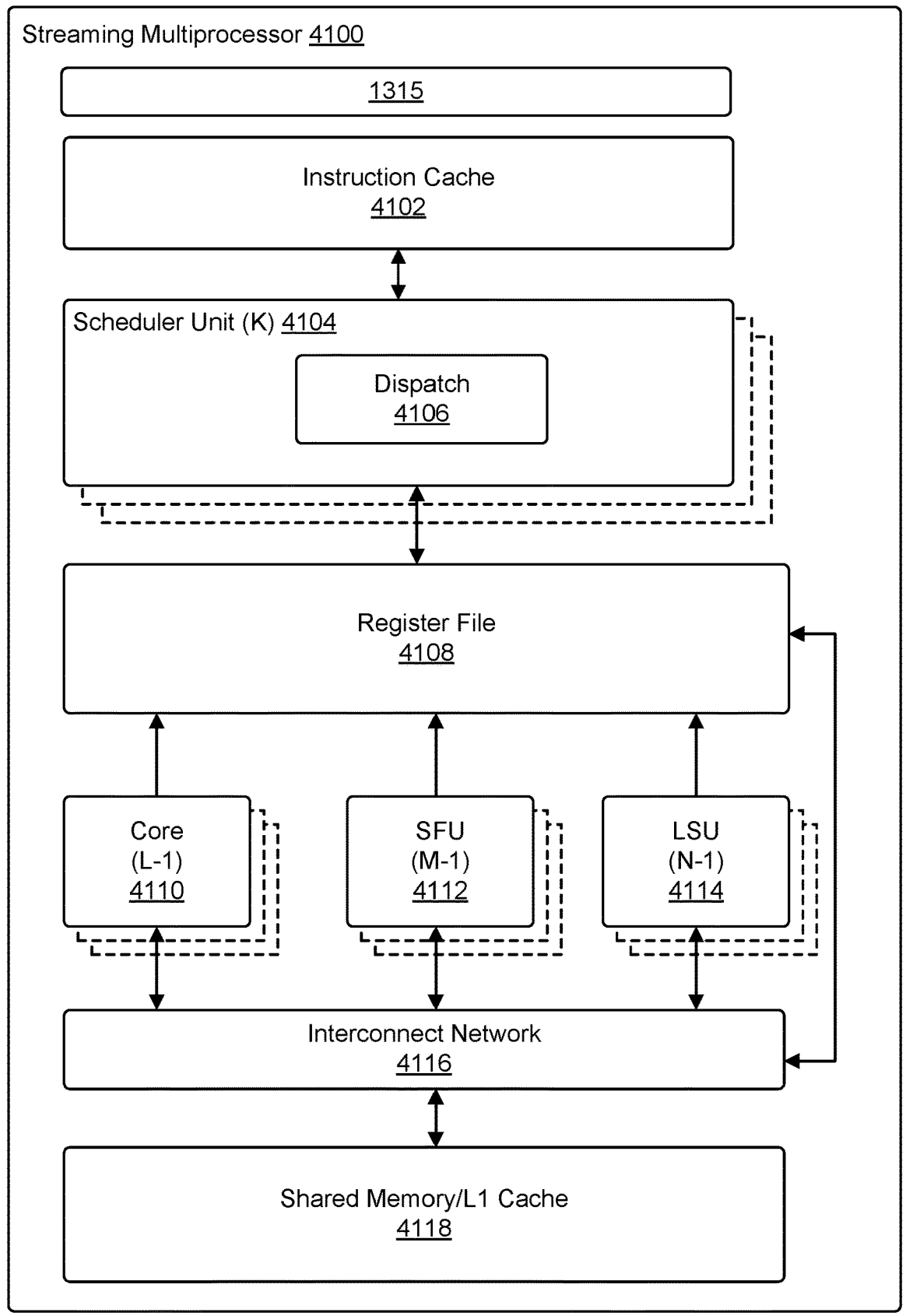
FIG. 41 illustrates a streaming multi-processor, according to at least one embodiment.

FIG. 41 illustrates a streaming multi-processor ("SM") 4100, according to at least one embodiment. In at least one embodiment, SM 4100 is SM of FIG. 39. In at least one embodiment, SM 4100 includes, without limitation, an instruction cache 4102; one or more scheduler units 4104; a register file 4108; one or more processing cores ("cores") 4110; one or more special function units ("SFUs") 4112; one or more load/store units ("LSUs") 4114; an interconnect network 4116; a shared memory/level one ("L1") cache 4118; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 4100. In at least one embodiment, scheduler unit 4104 receives tasks from work distribution unit and manages instruction scheduling for one or more thread blocks assigned to SM 4100. In at least one embodiment, scheduler unit 4104 schedules thread blocks for execution as warps of parallel threads, wherein each thread block is allocated at least one warp. In at least one embodiment, each warp executes threads. In at least one embodiment, scheduler unit 4104 manages a plurality of different thread blocks, allocating warps to different thread blocks and then dispatching instructions from plurality of different cooperative groups to various functional units (e.g., processing cores 4110, SFUs 4112, and LSUs 4114) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. Programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 4106 is configured to transmit instructions to one or more of functional units and scheduler unit 4104 includes, without limitation, two dispatch units 4106 that enable two different instructions from same warp to be dispatched during each clock cycle. In at least one embodiment, each scheduler unit 4104 includes a single dispatch unit 4106 or additional dispatch units 4106.

In at least one embodiment, each SM 4100, in at least one embodiment, includes, without limitation, register file 4108 that provides a set of registers for functional units of SM 4100. In at least one embodiment, register file 4108 is divided between each of functional units such that each functional unit is allocated a dedicated portion of register file 4108. In at least one embodiment, register file 4108 is divided between different warps being executed by SM 4100 and register file 4108 provides temporary storage for operands connected to data paths of functional units. In at least one embodiment, each SM 4100 comprises, without limitation, a plurality of L processing cores 4110. In at least one embodiment, SM 4100 includes, without limitation, a large number (e.g., 128 or more) of distinct processing cores 4110. In at least one embodiment, each processing core 4110, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 4110 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 4110. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 4100 comprises, without limitation, M SFUs 4112 that perform special functions (e.g., attribute evaluation, reciprocal square root, and like). In at least one embodiment, SFUs 4112 include, without limitation, a tree traversal unit configured to traverse a hierarchical tree data structure. In at least one embodiment, SFUs 4112 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 4100. In at least one embodiment, texture maps are stored in shared memory/L1 cache 4118. In at least one embodiment, texture units implement texture operations such as filtering operations using mip-maps (e.g., texture maps of varying levels of detail), in accordance with at least one embodiment. In at least one embodiment, each SM 4100 includes, without limitation, two texture units.

Each SM 4100 comprises, without limitation, N LSUs 4114 that implement load and store operations between shared memory/L1 cache 4118 and register file 4108, in at least one embodiment. Each SM 4100 includes, without limitation, interconnect network 4116 that connects each of functional units to register file 4108 and LSU 4114 to register file 4108 and shared memory/L1 cache 4118 in at least one embodiment. In at least one embodiment, interconnect network 4116 is a crossbar that can be configured to connect any of functional units to any of registers in register file 4108 and connect LSUs 4114 to register file 4108 and memory locations in shared memory/L1 cache 4118.

In at least one embodiment, shared memory/L1 cache 4118 is an array of on-chip memory that allows for data storage and communication between SM 4100 and primitive engine and between threads in SM 4100, in at least one embodiment. In at least one embodiment, shared memory/L1 cache 4118 comprises, without limitation, 128 KB of storage capacity and is in path from SM 4100 to partition unit. In at least one embodiment, shared memory/L1 cache 4118, in at least one embodiment, is used to cache reads and writes. In at least one embodiment, one or more of shared memory/L1 cache 4118, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 4118 enables shared memory/L1 cache 4118 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 4100 to execute program and perform calculations, shared memory/L1 cache 4118 to communicate between threads, and LSU 4114 to read and write global memory through shared memory/L1 cache 4118 and memory partition unit. In at least one embodiment, when configured for general purpose parallel computation, SM 4100 writes commands that scheduler unit 4104 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. Graphics card may be configured to interface with a PCIe slot on a motherboard of a desktop computer. In at least one embodiment, PPU may be an integrated graphics processing unit ("iGPU") included in chipset of motherboard.

Inference and/or training logic 1315 are used to perform inferencing and/or training operations associated with one or more embodiments. Details regarding inference and/or training logic 1315 are provided herein in conjunction with FIGS. 13A and/or 13B. In at least one embodiment, deep learning application processor is used to train a machine learning model, such as a neural network, to predict or infer information provided to SM 4100. In at least one embodiment, SM 4100 is used to infer or predict information based on a trained machine learning model (e.g., neural network) that has been trained by another processor or system or by SM 4100. In at least one embodiment, SM 4100 may be used to perform one or more neural network use cases described herein.

Techniques described above may be used, for example, to implement a system for performing human-robot object exchanges. Some examples use the inference and/or training logic to create a neural network trained to generate a grasp of an object being held by a human hand as described above.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1904 and/or secondary storage. Computer programs, if executed by one or more processors, enable system 1900 to perform various functions in accordance with at least one embodiment. Memory 1904, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1902; parallel processing system 1912; an integrated circuit capable of at least a portion of capabilities of both CPU 1902; parallel processing system 1912; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1900 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1912 includes, without limitation, a plurality of parallel processing units ("PPUs") 1914 and associated memories 1916. In at least one embodiment, PPUs 1914 are connected to a host processor or other peripheral devices via an interconnect 1918 and a switch 1920 or multiplexer. In at least one embodiment, parallel processing system 1912 distributes computational tasks across PPUs 1914 which can be parallelizable for example, as part of distribution of computational tasks across multiple graphics processing unit ("GPU") thread blocks. In at least one embodiment, memory is shared and accessible (e.g., for read and/or write access) across some or all of PPUs 1914, although such shared memory may incur performance penalties relative to use of local memory and registers resident to a PPU 1914. In at least one embodiment, operation of PPUs 1914 is synchronized through use of a command such as _syncthreads( ), wherein all threads in a block (e.g., executed across multiple PPUs 1914) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). Number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. Set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising one or more computers comprising one or more processors to:
   obtain a point cloud that represents a hand holding an object;
   determine, from a first portion of the point cloud, a pose of the object;
   determine, from a second portion of the point cloud, a pose of the hand;
   generate a set of grasp poses that allow a robot to grasp the object;
   select, from the set of grasp poses, based at least in part on the pose of the hand, a target grasp pose that does not interfere with the hand; and
   cause the robot to perform the target grasp pose.

2. The processor of claim 1, wherein the pose of the hand identifies a plurality of segments and joint angles.

3. The processor of claim 1, wherein the one or more processors:
   obtain a three-dimensional image from a depth camera; and
   produce the point cloud from the three-dimensional image.

4. The processor of claim 1, wherein:
   the set of grasp poses are poses for a robotic gripper of the robot; and
   the robotic gripper has two opposed digits that perform the grasp.

5. The processor of claim 1, wherein the pose of the object includes three angles that indicate an orientation of the object and information that identifies a position of the object.

6. The processor of claim 1, wherein the robot takes the object from the hand.

7. A system, comprising:
   one or more processors coupled to non-transitory computer-readable media;
   the non-transitory computer-readable media storing executable instructions that, as a result of being executed by the one or more processors, cause the system to:
      determine, from a three-dimensional image of an appendage holding an object, a pose of the appendage and a pose of the object;
      determine a set of grasp poses that allow a robotic gripper to grasp the object;
      select, from the set of grasp poses, a grasp pose that does not interfere with the appendage; and
      perform the grasp pose.

8. The system of claim 7, wherein the three dimensional image is generated from a depth camera, radar image, LIDAR image, or three dimensional medical imaging device.

9. The system of claim 7, wherein the executable instructions, as a result of being executed by the one or more processors, further cause the system to:
   generate a point cloud from the three-dimensional image;
   identify a first portion of the point cloud that represents the appendage; and
   identify a second portion of the point cloud that represents the object.

10. The system of claim 7, wherein the executable instructions, as a result of being executed by the one or more processors, further cause the system to:
    determine a type of hand pose from the three-dimensional image; and
    determine a grasp pose based at least in part on the type of hand pose.

11. The system of claim 7, wherein the executable instructions, as a result of being executed by the one or more processors, further cause the system to:
    generate a point cloud from the three-dimensional image; and
    provide the point cloud to a trained model that outputs the grasp pose.

12. The system of claim 11, wherein the train model is trained by providing ground truth data that includes point cloud information and corresponding grasp poses.

13. The system of claim 7, wherein the grasp pose is determined to interfere with the appendage when the robotic gripper is predicted to touch the appendage during performance of the grasp pose.

14. A non-transitory machine-readable medium having stored thereon a set of instructions, which if performed by one or more processors, cause the one or more processors to at least:
    obtain a three-dimensional image of an appendage holding an object;
    generate a 3D model from the three dimensional image;
    provide the 3D model to a trained network, the trained network producing a grasp pose for a robotic gripper that is able to grasp the object without contacting the appendage; and
    cause the robotic gripper to perform the grasp pose.

15. The non-transitory machine-readable medium of claim 14, wherein the trained network is trained at least in part by providing, to a network, training data that includes a colored 3D model of an appendage holding an object, and a proposed grasp for the robotic gripper such that the robotic gripper can receive the object from the appendage without touching the appendage.

16. The non-transitory machine-readable storage medium of claim 15, wherein training data is generated by at least:
   generating a dataset of human object handovers; and
   annotating the dataset with ground truth hand poses and ground truth object poses.

17. The non-transitory machine-readable medium of claim 14, wherein the instructions further comprise instructions that, as a result of being executed by the one or more processors, cause the one or more processors to:
   determine, from the 3D model, a pose of the appendage; and
   determine, from the 3D model, a pose of the object.

18. The non-transitory machine-readable storage medium of claim 17, wherein:
   the grasp pose is based at least in part on the pose of the object and the pose of the appendage; and
   the grasp pose is determined as a grasp that will successfully grasp the object while not touching the appendage.

19. The non-transitory machine-readable storage medium of claim 14, wherein the network is trained using images of the appendage holding different object types.

20. The non-transitory machine-readable medium of claim 14, wherein the instructions further comprise instructions that, as a result of being executed by the one or more processors, cause the one or more processors to determine the grasp pose as a result of determining that the pose of the appendage is a pose type that is offering the object to the robot.

21. A processor comprising: one or more arithmetic logic units (ALUs) to train one or more neural networks, at least in part, by providing, to a network, training data that includes a 3D model of a appendage holding an object, and a proposed grasp for the robotic gripper such that the robotic gripper can receive the object from the appendage without interfering with the appendage.

22. The processor of claim 21, wherein training data is generated by at least:
   generating a dataset of human object handovers; and
   annotating the dataset with ground truth hand poses and ground truth object poses.

23. The processor of claim 21, wherein the network:
   determines, from the 3D model, a pose of the appendage; and
   determines, from the 3D model, a pose of the object.

24. The processor of claim 21, wherein the 3D model is generated from a three dimensional image of the appendage holding the object.

25. The processor of claim 21, wherein the 3D model is a point cloud.

26. The processor of claim 21, wherein the appendage is a human hand, a robotic gripper or hand, a part of an animal, or a human leg or arm.

* * * * *